(12) United States Patent
Katsuyama

(10) Patent No.: US 10,744,786 B2
(45) Date of Patent: Aug. 18, 2020

(54) IMAGE RECORDING APPARATUS, DITHER MASK, AND IMAGE RECORDING METHOD

(71) Applicant: FUJIFILM Corporation, Tokyo (JP)

(72) Inventor: Kimito Katsuyama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/563,965

(22) Filed: Sep. 9, 2019

(65) Prior Publication Data

US 2020/0001616 A1    Jan. 2, 2020

Related U.S. Application Data

(63) Continuation of application No. PCT/JP2018/012112, filed on Mar. 26, 2018.

(30) Foreign Application Priority Data

Mar. 31, 2017    (JP) .................................. 2017-071100

(51) Int. Cl.
   *B41J 29/38*    (2006.01)
   *B41J 2/205*    (2006.01)
   *B41J 2/045*    (2006.01)
   (Continued)

(52) U.S. Cl.
   CPC ......... *B41J 2/2054* (2013.01); *B41J 2/04595* (2013.01); *B41J 2/145* (2013.01);
   (Continued)

(58) Field of Classification Search
   CPC ............................ B41J 2/2132; H04N 1/4051
   (Continued)

(56) References Cited

U.S. PATENT DOCUMENTS

| 7,986,440 B2 | 7/2011 | Yanai et al. |
| 8,130,415 B2 | 3/2012 | Yanai et al. |

(Continued)

FOREIGN PATENT DOCUMENTS

| JP | 2005088467 | 4/2005 |
| JP | 2008188805 | 8/2008 |

(Continued)

OTHER PUBLICATIONS

International Search Report (Form PCT/ISA/210) of PCT/JP2018/012112, dated Jun. 12, 2018, with English translation thereof, pp. 1-5.

(Continued)

*Primary Examiner* — Lam S Nguyen
(74) *Attorney, Agent, or Firm* — JCIPRNET

(57) ABSTRACT

Provided are an image recording apparatus, a dither mask, and an image recording method capable of reducing occurrence of concentration unevenness without decrease in productivity. In an image recording apparatus that repeats a main scan operation of relatively moving a recording head having a nozzle row with respect to a recording medium in a main scan direction to perform recording and a sub scan operation of relatively moving the recording medium with respect to the recording head in a sub scan direction, a nozzle jetting rate of each nozzle is controlled by a dither mask. The dither mask is subjected to threshold setting so that a sum of a sum of nozzle jetting rates of corresponding nozzles of respective nozzle groups used in recording a first half scan for recording each scan band and a sum of nozzle jetting rates of corresponding nozzles of respective nozzle groups used in recording a second half scan becomes a specific value that is in a defined allowable range, with respect to at least a part of a recording duty range.

17 Claims, 66 Drawing Sheets

(51) Int. Cl.
*B41J 2/145* (2006.01)
*B41J 2/21* (2006.01)
*B41J 2/51* (2006.01)
*H04N 1/405* (2006.01)

(52) U.S. Cl.
CPC ............. *B41J 2/2125* (2013.01); *B41J 2/512* (2013.01); *H04N 1/4051* (2013.01)

(58) Field of Classification Search
USPC .......................................................... 347/15
See application file for complete search history.

(56) References Cited

U.S. PATENT DOCUMENTS

| | | | |
|---|---|---|---|
| 8,517,494 B2* | 8/2013 | Kakutani | B41J 2/2132 347/15 |
| 9,973,652 B2* | 5/2018 | Katsuyama | H04N 1/4051 |
| 2006/0152766 A1 | 7/2006 | Saquib | |
| 2009/0179935 A1 | 7/2009 | Otokita | |

FOREIGN PATENT DOCUMENTS

| | | |
|---|---|---|
| JP | 2009160876 | 7/2009 |
| JP | 2009184344 | 8/2009 |
| JP | 2010162770 | 7/2010 |
| JP | 2014100861 | 6/2014 |

OTHER PUBLICATIONS

"Written Opinion of the International Searching Authority (Form PCT/ISA/237) of PCT/JP2018/012112", dated Jun. 12, 2018, with English translation thereof, pp. 1-13.

* cited by examiner

FIG. 2

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 25 | 100 | 25 | 100 | 25 | 100 | 25 | 100 | 25 | 100 | 25 | 100 | 25 | 100 | 25 | 100 |
| 2 | 100 | 100 | 100 | 100 | 100 | 100 | 100 | 100 | 100 | 100 | 100 | 100 | 100 | 100 | 100 | 100 |
| 3 | 50 | 100 | 50 | 100 | 50 | 100 | 50 | 100 | 50 | 100 | 50 | 100 | 50 | 100 | 50 | 100 |
| 4 | 100 | 100 | 100 | 100 | 100 | 100 | 100 | 100 | 100 | 100 | 100 | 100 | 100 | 100 | 100 | 100 |
| 5 | 75 | 100 | 75 | 100 | 75 | 100 | 75 | 100 | 75 | 100 | 75 | 100 | 75 | 100 | 75 | 100 |
| 6 | 100 | 100 | 100 | 100 | 100 | 100 | 100 | 100 | 100 | 100 | 100 | 100 | 100 | 100 | 100 | 100 |
| 7 | 100 | 100 | 100 | 100 | 100 | 100 | 100 | 100 | 100 | 100 | 100 | 100 | 100 | 100 | 100 | 100 |
| 8 | 100 | 100 | 100 | 100 | 100 | 100 | 100 | 100 | 100 | 100 | 100 | 100 | 100 | 100 | 100 | 100 |
| 9 | 100 | 100 | 100 | 100 | 100 | 100 | 100 | 100 | 100 | 100 | 100 | 100 | 100 | 100 | 100 | 100 |
| 10 | 100 | 75 | 100 | 75 | 100 | 75 | 100 | 75 | 100 | 75 | 100 | 75 | 100 | 75 | 100 | 75 |
| 11 | 100 | 100 | 100 | 100 | 100 | 100 | 100 | 100 | 100 | 100 | 100 | 100 | 100 | 100 | 100 | 100 |
| 12 | 100 | 50 | 100 | 50 | 100 | 50 | 100 | 50 | 100 | 50 | 100 | 50 | 100 | 50 | 100 | 50 |
| 13 | 100 | 100 | 100 | 100 | 100 | 100 | 100 | 100 | 100 | 100 | 100 | 100 | 100 | 100 | 100 | 100 |
| 14 | 100 | 25 | 100 | 25 | 100 | 25 | 100 | 25 | 100 | 25 | 100 | 25 | 100 | 25 | 100 | 25 |
| 15 | 100 | 100 | 100 | 100 | 100 | 100 | 100 | 100 | 100 | 100 | 100 | 100 | 100 | 100 | 100 | 100 |
| 16 | 100 | 25 | 100 | 25 | 100 | 25 | 100 | 25 | 100 | 25 | 100 | 25 | 100 | 25 | 100 | 25 |
| 17 | 100 | 100 | 100 | 100 | 100 | 100 | 100 | 100 | 100 | 100 | 100 | 100 | 100 | 100 | 100 | 100 |
| 18 | 100 | 50 | 100 | 50 | 100 | 50 | 100 | 50 | 100 | 50 | 100 | 50 | 100 | 50 | 100 | 50 |
| 19 | 100 | 100 | 100 | 100 | 100 | 100 | 100 | 100 | 100 | 100 | 100 | 100 | 100 | 100 | 100 | 100 |
| 20 | 100 | 75 | 100 | 75 | 100 | 75 | 100 | 75 | 100 | 75 | 100 | 75 | 100 | 75 | 100 | 75 |
| 21 | 100 | 100 | 100 | 100 | 100 | 100 | 100 | 100 | 100 | 100 | 100 | 100 | 100 | 100 | 100 | 100 |
| 22 | 100 | 100 | 100 | 100 | 100 | 100 | 100 | 100 | 100 | 100 | 100 | 100 | 100 | 100 | 100 | 100 |
| 23 | 100 | 100 | 100 | 100 | 100 | 100 | 100 | 100 | 100 | 100 | 100 | 100 | 100 | 100 | 100 | 100 |
| 24 | 100 | 100 | 100 | 100 | 100 | 100 | 100 | 100 | 100 | 100 | 100 | 100 | 100 | 100 | 100 | 100 |
| 25 | 100 | 75 | 100 | 75 | 100 | 75 | 100 | 75 | 100 | 75 | 100 | 75 | 100 | 75 | 100 | 75 |
| 26 | 100 | 100 | 100 | 100 | 100 | 100 | 100 | 100 | 100 | 100 | 100 | 100 | 100 | 100 | 100 | 100 |
| 27 | 100 | 50 | 100 | 50 | 100 | 50 | 100 | 50 | 100 | 50 | 100 | 50 | 100 | 50 | 100 | 50 |
| 28 | 100 | 100 | 100 | 100 | 100 | 100 | 100 | 100 | 100 | 100 | 100 | 100 | 100 | 100 | 100 | 100 |
| 29 | 100 | 25 | 100 | 25 | 100 | 25 | 100 | 25 | 100 | 25 | 100 | 25 | 100 | 25 | 100 | 25 |
| 30 | 100 | 100 | 100 | 100 | 100 | 100 | 100 | 100 | 100 | 100 | 100 | 100 | 100 | 100 | 100 | 100 |
| 31 | 100 | 25 | 100 | 25 | 100 | 25 | 100 | 25 | 100 | 25 | 100 | 25 | 100 | 25 | 100 | 25 |
| 32 | 100 | 100 | 100 | 100 | 100 | 100 | 100 | 100 | 100 | 100 | 100 | 100 | 100 | 100 | 100 | 100 |
| 33 | 100 | 50 | 100 | 50 | 100 | 50 | 100 | 50 | 100 | 50 | 100 | 50 | 100 | 50 | 100 | 50 |
| 34 | 100 | 100 | 100 | 100 | 100 | 100 | 100 | 100 | 100 | 100 | 100 | 100 | 100 | 100 | 100 | 100 |
| 35 | 100 | 75 | 100 | 75 | 100 | 75 | 100 | 75 | 100 | 75 | 100 | 75 | 100 | 75 | 100 | 75 |
| 36 | 100 | 100 | 100 | 100 | 100 | 100 | 100 | 100 | 100 | 100 | 100 | 100 | 100 | 100 | 100 | 100 |
| 37 | 100 | 100 | 100 | 100 | 100 | 100 | 100 | 100 | 100 | 100 | 100 | 100 | 100 | 100 | 100 | 100 |
| 38 | 100 | 100 | 100 | 100 | 100 | 100 | 100 | 100 | 100 | 100 | 100 | 100 | 100 | 100 | 100 | 100 |
| 39 | 100 | 100 | 100 | 100 | 100 | 100 | 100 | 100 | 100 | 100 | 100 | 100 | 100 | 100 | 100 | 100 |
| 40 | 75 | 100 | 75 | 100 | 75 | 100 | 75 | 100 | 75 | 100 | 75 | 100 | 75 | 100 | 75 | 100 |
| 41 | 100 | 100 | 100 | 100 | 100 | 100 | 100 | 100 | 100 | 100 | 100 | 100 | 100 | 100 | 100 | 100 |
| 42 | 50 | 100 | 50 | 100 | 50 | 100 | 50 | 100 | 50 | 100 | 50 | 100 | 50 | 100 | 50 | 100 |
| 43 | 100 | 100 | 100 | 100 | 100 | 100 | 100 | 100 | 100 | 100 | 100 | 100 | 100 | 100 | 100 | 100 |
| 44 | 25 | 100 | 25 | 100 | 25 | 100 | 25 | 100 | 25 | 100 | 25 | 100 | 25 | 100 | 25 | 100 |
| 45 | 100 | 100 | 100 | 100 | 100 | 100 | 100 | 100 | 100 | 100 | 100 | 100 | 100 | 100 | 100 | 100 |
| 46 | 25 | 100 | 25 | 100 | 25 | 100 | 25 | 100 | 25 | 100 | 25 | 100 | 25 | 100 | 25 | 100 |
| 47 | 100 | 100 | 100 | 100 | 100 | 100 | 100 | 100 | 100 | 100 | 100 | 100 | 100 | 100 | 100 | 100 |
| 48 | 50 | 100 | 50 | 100 | 50 | 100 | 50 | 100 | 50 | 100 | 50 | 100 | 50 | 100 | 50 | 100 |
| 49 | 100 | 100 | 100 | 100 | 100 | 100 | 100 | 100 | 100 | 100 | 100 | 100 | 100 | 100 | 100 | 100 |
| 50 | 75 | 100 | 75 | 100 | 75 | 100 | 75 | 100 | 75 | 100 | 75 | 100 | 75 | 100 | 75 | 100 |
| 51 | 100 | 100 | 100 | 100 | 100 | 100 | 100 | 100 | 100 | 100 | 100 | 100 | 100 | 100 | 100 | 100 |
| 52 | 100 | 100 | 100 | 100 | 100 | 100 | 100 | 100 | 100 | 100 | 100 | 100 | 100 | 100 | 100 | 100 |
| 53 | 100 | 100 | 100 | 100 | 100 | 100 | 100 | 100 | 100 | 100 | 100 | 100 | 100 | 100 | 100 | 100 |
| 54 | 100 | 100 | 100 | 100 | 100 | 100 | 100 | 100 | 100 | 100 | 100 | 100 | 100 | 100 | 100 | 100 |
| 55 | 75 | 100 | 75 | 100 | 75 | 100 | 75 | 100 | 75 | 100 | 75 | 100 | 75 | 100 | 75 | 100 |
| 56 | 100 | 100 | 100 | 100 | 100 | 100 | 100 | 100 | 100 | 100 | 100 | 100 | 100 | 100 | 100 | 100 |
| 57 | 50 | 100 | 50 | 100 | 50 | 100 | 50 | 100 | 50 | 100 | 50 | 100 | 50 | 100 | 50 | 100 |
| 58 | 100 | 100 | 100 | 100 | 100 | 100 | 100 | 100 | 100 | 100 | 100 | 100 | 100 | 100 | 100 | 100 |
| 59 | 25 | 100 | 25 | 100 | 25 | 100 | 25 | 100 | 25 | 100 | 25 | 100 | 25 | 100 | 25 | 100 |
| 60 | 100 | 100 | 100 | 100 | 100 | 100 | 100 | 100 | 100 | 100 | 100 | 100 | 100 | 100 | 100 | 100 |

FIG. 5

| | 1 | 2 |
|---|---|---|
| 1 | 25 | 100 |
| 2 | 100 | 100 |
| 3 | 50 | 100 |
| 4 | 100 | 100 |
| 5 | 62.5 | 100 |
| 6 | 100 | 87.5 |
| 7 | 75 | 100 |
| 8 | 100 | 75 |
| 9 | 87.5 | 100 |
| 10 | 100 | 62.5 |
| 11 | 100 | 100 |
| 12 | 100 | 50 |
| 13 | 100 | 100 |
| 14 | 100 | 25 |
| 15 | 100 | 100 |
| 16 | 100 | 25 |
| 17 | 100 | 100 |
| 18 | 100 | 50 |
| 19 | 100 | 100 |
| 20 | 100 | 62.5 |
| 21 | 100 | 87.5 |
| 22 | 100 | 75 |
| 23 | 100 | 75 |
| 24 | 100 | 87.5 |
| 25 | 100 | 62.5 |
| 26 | 100 | 100 |
| 27 | 100 | 50 |
| 28 | 100 | 100 |
| 29 | 100 | 25 |
| 30 | 100 | 100 |
| 31 | 100 | 25 |
| 32 | 100 | 100 |
| 33 | 100 | 50 |
| 34 | 100 | 100 |
| 35 | 100 | 62.5 |
| 36 | 87.5 | 100 |
| 37 | 100 | 75 |
| 38 | 75 | 100 |
| 39 | 100 | 87.5 |
| 40 | 62.5 | 100 |
| 41 | 100 | 100 |
| 42 | 50 | 100 |
| 43 | 100 | 100 |
| 44 | 25 | 100 |
| 45 | 100 | 100 |
| 46 | 25 | 100 |
| 47 | 100 | 100 |
| 48 | 50 | 100 |
| 49 | 100 | 100 |
| 50 | 62.5 | 100 |
| 51 | 87.5 | 100 |
| 52 | 75 | 100 |
| 53 | 75 | 100 |
| 54 | 87.5 | 100 |
| 55 | 62.5 | 100 |
| 56 | 100 | 100 |
| 57 | 50 | 100 |
| 58 | 100 | 100 |
| 59 | 25 | 100 |
| 60 | 100 | 100 |

FIG. 8

|    | 1   | 2   |
|----|-----|-----|
| 1  | 25  | 100 |
| 2  | 100 | 100 |
| 3  | 55  | 100 |
| 4  | 100 | 100 |
| 5  | 46  | 100 |
| 6  | 100 | 100 |
| 7  | 100 | 100 |
| 8  | 100 | 100 |
| 9  | 100 | 100 |
| 10 | 100 | 46  |
| 11 | 100 | 100 |
| 12 | 100 | 55  |
| 13 | 100 | 100 |
| 14 | 100 | 25  |
| 15 | 100 | 100 |
| 16 | 100 | 25  |
| 17 | 100 | 100 |
| 18 | 100 | 55  |
| 19 | 100 | 100 |
| 20 | 100 | 46  |
| 21 | 100 | 100 |
| 22 | 100 | 100 |
| 23 | 100 | 100 |
| 24 | 100 | 100 |
| 25 | 100 | 46  |
| 26 | 100 | 100 |
| 27 | 100 | 55  |
| 28 | 100 | 100 |
| 29 | 100 | 25  |
| 30 | 100 | 100 |
| 31 | 100 | 25  |
| 32 | 100 | 100 |
| 33 | 100 | 55  |
| 34 | 100 | 100 |
| 35 | 100 | 46  |
| 36 | 100 | 100 |
| 37 | 100 | 100 |
| 38 | 100 | 100 |
| 39 | 100 | 100 |
| 40 | 46  | 100 |
| 41 | 100 | 100 |
| 42 | 55  | 100 |
| 43 | 100 | 100 |
| 44 | 25  | 100 |
| 45 | 100 | 100 |
| 46 | 25  | 100 |
| 47 | 100 | 100 |
| 48 | 55  | 100 |
| 49 | 100 | 100 |
| 50 | 46  | 100 |
| 51 | 100 | 100 |
| 52 | 100 | 100 |
| 53 | 100 | 100 |
| 54 | 100 | 100 |
| 55 | 46  | 100 |
| 56 | 100 | 100 |
| 57 | 55  | 100 |
| 58 | 100 | 100 |
| 59 | 25  | 100 |
| 60 | 100 | 100 |

FIG. 11

|    | 1   | 2   |
|----|-----|-----|
| 1  | 50  | 100 |
| 2  | 100 | 100 |
| 3  | 50  | 100 |
| 4  | 100 | 100 |
| 5  | 50  | 100 |
| 6  | 100 | 100 |
| 7  | 100 | 100 |
| 8  | 100 | 100 |
| 9  | 100 | 100 |
| 10 | 100 | 50  |
| 11 | 100 | 100 |
| 12 | 100 | 50  |
| 13 | 100 | 100 |
| 14 | 100 | 50  |
| 15 | 100 | 100 |
| 16 | 100 | 50  |
| 17 | 100 | 100 |
| 18 | 100 | 50  |
| 19 | 100 | 100 |
| 20 | 100 | 50  |
| 21 | 100 | 100 |
| 22 | 100 | 100 |
| 23 | 100 | 100 |
| 24 | 100 | 100 |
| 25 | 100 | 50  |
| 26 | 100 | 100 |
| 27 | 100 | 50  |
| 28 | 100 | 100 |
| 29 | 100 | 50  |
| 30 | 100 | 100 |
| 31 | 100 | 50  |
| 32 | 100 | 100 |
| 33 | 100 | 50  |
| 34 | 100 | 100 |
| 35 | 100 | 50  |
| 36 | 100 | 100 |
| 37 | 100 | 100 |
| 38 | 100 | 100 |
| 39 | 100 | 100 |
| 40 | 50  | 100 |
| 41 | 100 | 100 |
| 42 | 50  | 100 |
| 43 | 100 | 100 |
| 44 | 50  | 100 |
| 45 | 100 | 100 |
| 46 | 50  | 100 |
| 47 | 100 | 100 |
| 48 | 50  | 100 |
| 49 | 100 | 100 |
| 50 | 50  | 100 |
| 51 | 100 | 100 |
| 52 | 100 | 100 |
| 53 | 100 | 100 |
| 54 | 100 | 100 |
| 55 | 50  | 100 |
| 56 | 100 | 100 |
| 57 | 50  | 100 |
| 58 | 100 | 100 |
| 59 | 50  | 100 |
| 60 | 100 | 100 |

FIG. 13

|    | 1   | 2   |
|----|-----|-----|
| 1  | 0   | 100 |
| 2  | 100 | 100 |
| 3  | 0   | 100 |
| 4  | 100 | 100 |
| 5  | 0   | 100 |
| 6  | 100 | 100 |
| 7  | 100 | 100 |
| 8  | 100 | 100 |
| 9  | 100 | 100 |
| 10 | 100 | 0   |
| 11 | 100 | 100 |
| 12 | 100 | 0   |
| 13 | 100 | 100 |
| 14 | 100 | 0   |
| 15 | 100 | 100 |
| 16 | 100 | 0   |
| 17 | 100 | 100 |
| 18 | 100 | 0   |
| 19 | 100 | 100 |
| 20 | 100 | 0   |
| 21 | 100 | 100 |
| 22 | 100 | 100 |
| 23 | 100 | 100 |
| 24 | 100 | 100 |
| 25 | 100 | 0   |
| 26 | 100 | 100 |
| 27 | 100 | 0   |
| 28 | 100 | 100 |
| 29 | 100 | 0   |
| 30 | 100 | 100 |
| 31 | 100 | 0   |
| 32 | 100 | 100 |
| 33 | 100 | 0   |
| 34 | 100 | 100 |
| 35 | 100 | 0   |
| 36 | 100 | 100 |
| 37 | 100 | 100 |
| 38 | 100 | 100 |
| 39 | 100 | 100 |
| 40 | 0   | 100 |
| 41 | 100 | 100 |
| 42 | 0   | 100 |
| 43 | 100 | 100 |
| 44 | 0   | 100 |
| 45 | 100 | 100 |
| 46 | 0   | 100 |
| 47 | 100 | 100 |
| 48 | 0   | 100 |
| 49 | 100 | 100 |
| 50 | 0   | 100 |
| 51 | 100 | 100 |
| 52 | 100 | 100 |
| 53 | 100 | 100 |
| 54 | 100 | 100 |
| 55 | 0   | 100 |
| 56 | 100 | 100 |
| 57 | 0   | 100 |
| 58 | 100 | 100 |
| 59 | 0   | 100 |
| 60 | 100 | 100 |

FIG. 16

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 25 | 100 | 25 | 100 | 25 | 100 | 25 | 100 | 25 | 100 | 25 | 100 | 25 | 100 | 25 | 100 |
| 2 | 68 | 57 | 68 | 57 | 68 | 57 | 68 | 57 | 68 | 57 | 68 | 57 | 68 | 57 | 68 | 57 |
| 3 | 30 | 95 | 30 | 95 | 30 | 95 | 30 | 95 | 30 | 95 | 30 | 95 | 30 | 95 | 30 | 95 |
| 4 | 73 | 52 | 73 | 52 | 73 | 52 | 73 | 52 | 73 | 52 | 73 | 52 | 73 | 52 | 73 | 52 |
| 5 | 36 | 89 | 36 | 89 | 36 | 89 | 36 | 89 | 36 | 89 | 36 | 89 | 36 | 89 | 36 | 89 |
| 6 | 79 | 46 | 79 | 46 | 79 | 46 | 79 | 46 | 79 | 46 | 79 | 46 | 79 | 46 | 79 | 46 |
| 7 | 41 | 84 | 41 | 84 | 41 | 84 | 41 | 84 | 41 | 84 | 41 | 84 | 41 | 84 | 41 | 84 |
| 8 | 84 | 41 | 84 | 41 | 84 | 41 | 84 | 41 | 84 | 41 | 84 | 41 | 84 | 41 | 84 | 41 |
| 9 | 46 | 79 | 46 | 79 | 46 | 79 | 46 | 79 | 46 | 79 | 46 | 79 | 46 | 79 | 46 | 79 |
| 10 | 89 | 36 | 89 | 36 | 89 | 36 | 89 | 36 | 89 | 36 | 89 | 36 | 89 | 36 | 89 | 36 |
| 11 | 52 | 73 | 52 | 73 | 52 | 73 | 52 | 73 | 52 | 73 | 52 | 73 | 52 | 73 | 52 | 73 |
| 12 | 95 | 30 | 95 | 30 | 95 | 30 | 95 | 30 | 95 | 30 | 95 | 30 | 95 | 30 | 95 | 30 |
| 13 | 57 | 68 | 57 | 68 | 57 | 68 | 57 | 68 | 57 | 68 | 57 | 68 | 57 | 68 | 57 | 68 |
| 14 | 100 | 25 | 100 | 25 | 100 | 25 | 100 | 25 | 100 | 25 | 100 | 25 | 100 | 25 | 100 | 25 |
| 15 | 63 | 63 | 63 | 63 | 63 | 63 | 63 | 63 | 63 | 63 | 63 | 63 | 63 | 63 | 63 | 63 |
| 16 | 100 | 25 | 100 | 25 | 100 | 25 | 100 | 25 | 100 | 25 | 100 | 25 | 100 | 25 | 100 | 25 |
| 17 | 68 | 57 | 68 | 57 | 68 | 57 | 68 | 57 | 68 | 57 | 68 | 57 | 68 | 57 | 68 | 57 |
| 18 | 95 | 30 | 95 | 30 | 95 | 30 | 95 | 30 | 95 | 30 | 95 | 30 | 95 | 30 | 95 | 30 |
| 19 | 73 | 52 | 73 | 52 | 73 | 52 | 73 | 52 | 73 | 52 | 73 | 52 | 73 | 52 | 73 | 52 |
| 20 | 89 | 36 | 89 | 36 | 89 | 36 | 89 | 36 | 89 | 36 | 89 | 36 | 89 | 36 | 89 | 36 |
| 21 | 79 | 46 | 79 | 46 | 79 | 46 | 79 | 46 | 79 | 46 | 79 | 46 | 79 | 46 | 79 | 46 |
| 22 | 84 | 41 | 84 | 41 | 84 | 41 | 84 | 41 | 84 | 41 | 84 | 41 | 84 | 41 | 84 | 41 |
| 23 | 84 | 41 | 84 | 41 | 84 | 41 | 84 | 41 | 84 | 41 | 84 | 41 | 84 | 41 | 84 | 41 |
| 24 | 79 | 46 | 79 | 46 | 79 | 46 | 79 | 46 | 79 | 46 | 79 | 46 | 79 | 46 | 79 | 46 |
| 25 | 89 | 36 | 89 | 36 | 89 | 36 | 89 | 36 | 89 | 36 | 89 | 36 | 89 | 36 | 89 | 36 |
| 26 | 73 | 52 | 73 | 52 | 73 | 52 | 73 | 52 | 73 | 52 | 73 | 52 | 73 | 52 | 73 | 52 |
| 27 | 95 | 30 | 95 | 30 | 95 | 30 | 95 | 30 | 95 | 30 | 95 | 30 | 95 | 30 | 95 | 30 |
| 28 | 68 | 57 | 68 | 57 | 68 | 57 | 68 | 57 | 68 | 57 | 68 | 57 | 68 | 57 | 68 | 57 |
| 29 | 100 | 25 | 100 | 25 | 100 | 25 | 100 | 25 | 100 | 25 | 100 | 25 | 100 | 25 | 100 | 25 |
| 30 | 63 | 63 | 63 | 63 | 63 | 63 | 63 | 63 | 63 | 63 | 63 | 63 | 63 | 63 | 63 | 63 |
| 31 | 100 | 25 | 100 | 25 | 100 | 25 | 100 | 25 | 100 | 25 | 100 | 25 | 100 | 25 | 100 | 25 |
| 32 | 57 | 68 | 57 | 68 | 57 | 68 | 57 | 68 | 57 | 68 | 57 | 68 | 57 | 68 | 57 | 68 |
| 33 | 95 | 30 | 95 | 30 | 95 | 30 | 95 | 30 | 95 | 30 | 95 | 30 | 95 | 30 | 95 | 30 |
| 34 | 52 | 73 | 52 | 73 | 52 | 73 | 52 | 73 | 52 | 73 | 52 | 73 | 52 | 73 | 52 | 73 |
| 35 | 89 | 36 | 89 | 36 | 89 | 36 | 89 | 36 | 89 | 36 | 89 | 36 | 89 | 36 | 89 | 36 |
| 36 | 46 | 79 | 46 | 79 | 46 | 79 | 46 | 79 | 46 | 79 | 46 | 79 | 46 | 79 | 46 | 79 |
| 37 | 84 | 41 | 84 | 41 | 84 | 41 | 84 | 41 | 84 | 41 | 84 | 41 | 84 | 41 | 84 | 41 |
| 38 | 41 | 84 | 41 | 84 | 41 | 84 | 41 | 84 | 41 | 84 | 41 | 84 | 41 | 84 | 41 | 84 |
| 39 | 79 | 46 | 79 | 46 | 79 | 46 | 79 | 46 | 79 | 46 | 79 | 46 | 79 | 46 | 79 | 46 |
| 40 | 36 | 89 | 36 | 89 | 36 | 89 | 36 | 89 | 36 | 89 | 36 | 89 | 36 | 89 | 36 | 89 |
| 41 | 73 | 52 | 73 | 52 | 73 | 52 | 73 | 52 | 73 | 52 | 73 | 52 | 73 | 52 | 73 | 52 |
| 42 | 30 | 95 | 30 | 95 | 30 | 95 | 30 | 95 | 30 | 95 | 30 | 95 | 30 | 95 | 30 | 95 |
| 43 | 68 | 57 | 68 | 57 | 68 | 57 | 68 | 57 | 68 | 57 | 68 | 57 | 68 | 57 | 68 | 57 |
| 44 | 25 | 100 | 25 | 100 | 25 | 100 | 25 | 100 | 25 | 100 | 25 | 100 | 25 | 100 | 25 | 100 |
| 45 | 63 | 63 | 63 | 63 | 63 | 63 | 63 | 63 | 63 | 63 | 63 | 63 | 63 | 63 | 63 | 63 |
| 46 | 25 | 100 | 25 | 100 | 25 | 100 | 25 | 100 | 25 | 100 | 25 | 100 | 25 | 100 | 25 | 100 |
| 47 | 57 | 68 | 57 | 68 | 57 | 68 | 57 | 68 | 57 | 68 | 57 | 68 | 57 | 68 | 57 | 68 |
| 48 | 30 | 95 | 30 | 95 | 30 | 95 | 30 | 95 | 30 | 95 | 30 | 95 | 30 | 95 | 30 | 95 |
| 49 | 52 | 73 | 52 | 73 | 52 | 73 | 52 | 73 | 52 | 73 | 52 | 73 | 52 | 73 | 52 | 73 |
| 50 | 36 | 89 | 36 | 89 | 36 | 89 | 36 | 89 | 36 | 89 | 36 | 89 | 36 | 89 | 36 | 89 |
| 51 | 46 | 79 | 46 | 79 | 46 | 79 | 46 | 79 | 46 | 79 | 46 | 79 | 46 | 79 | 46 | 79 |
| 52 | 41 | 84 | 41 | 84 | 41 | 84 | 41 | 84 | 41 | 84 | 41 | 84 | 41 | 84 | 41 | 84 |
| 53 | 41 | 84 | 41 | 84 | 41 | 84 | 41 | 84 | 41 | 84 | 41 | 84 | 41 | 84 | 41 | 84 |
| 54 | 46 | 79 | 46 | 79 | 46 | 79 | 46 | 79 | 46 | 79 | 46 | 79 | 46 | 79 | 46 | 79 |
| 55 | 36 | 89 | 36 | 89 | 36 | 89 | 36 | 89 | 36 | 89 | 36 | 89 | 36 | 89 | 36 | 89 |
| 56 | 52 | 73 | 52 | 73 | 52 | 73 | 52 | 73 | 52 | 73 | 52 | 73 | 52 | 73 | 52 | 73 |
| 57 | 30 | 95 | 30 | 95 | 30 | 95 | 30 | 95 | 30 | 95 | 30 | 95 | 30 | 95 | 30 | 95 |
| 58 | 57 | 68 | 57 | 68 | 57 | 68 | 57 | 68 | 57 | 68 | 57 | 68 | 57 | 68 | 57 | 68 |
| 59 | 25 | 100 | 25 | 100 | 25 | 100 | 25 | 100 | 25 | 100 | 25 | 100 | 25 | 100 | 25 | 100 |
| 60 | 63 | 63 | 63 | 63 | 63 | 63 | 63 | 63 | 63 | 63 | 63 | 63 | 63 | 63 | 63 | 63 |

FIG. 31

| 0 |
|---|
| 1 |
| 2 |
| 3 |
| 4 |
| 5 |
| 6 |
| 7 |
| 8 |
| 9 |
| 10 |
| 11 |
| 12 |
| 13 |
| 14 |
| 15 |
| 16 |
| 17 |
| 18 |
| 19 |
| 20 |
| 21 |
| 22 |
| 23 |
| 24 |
| 25 |
| 26 |
| 27 |
| 28 |
| 29 |

FIG. 34

| FIRST HALF SCAN | | SECOND HALF SCAN | |
|---|---|---|---|
| SCAN 1 | SCAN 2 | SCAN 3 | SCAN 4 |
| 23 | 15 | 8 | 0 |
| 24 | 16 | 9 | 1 |
| 25 | 17 | 10 | 2 |
| 26 | 18 | 11 | 3 |
| 27 | 19 | 12 | 4 |
| 28 | 20 | 13 | 5 |
| 29 | 21 | 14 | 6 |
| 0 | 22 | 15 | 7 |

FIG. 35

| FIRST HALF SCAN | | SECOND HALF SCAN | |
|---|---|---|---|
| SCAN 1 | SCAN 2 | SCAN 3 | SCAN 4 |
| 81.25 | 100 | 100 | 25 |
| 71.875 | 100 | 100 | 34.375 |
| 62.5 | 100 | 100 | 43.75 |
| 53.125 | 100 | 100 | 53.125 |
| 43.75 | 100 | 100 | 62.5 |
| 34.375 | 100 | 100 | 71.875 |
| 25 | 100 | 100 | 81.25 |
| 25 | 90.625 | 100 | 90.625 |

FIG. 37

|    | 1      | 2      |
|----|--------|--------|
| 1  | 25     | 100    |
| 2  | 100    | 81.25  |
| 3  | 34.375 | 100    |
| 4  | 100    | 71.875 |
| 5  | 43.75  | 100    |
| 6  | 100    | 62.5   |
| 7  | 53.125 | 100    |
| 8  | 100    | 53.125 |
| 9  | 62.5   | 100    |
| 10 | 100    | 43.75  |
| 11 | 71.875 | 100    |
| 12 | 100    | 34.375 |
| 13 | 81.25  | 100    |
| 14 | 100    | 25     |
| 15 | 90.625 | 90.625 |
| 16 | 100    | 25     |
| 17 | 100    | 81.25  |
| 18 | 100    | 34.375 |
| 19 | 100    | 71.875 |
| 20 | 100    | 43.75  |
| 21 | 100    | 62.5   |
| 22 | 100    | 53.125 |
| 23 | 100    | 53.125 |
| 24 | 100    | 62.5   |
| 25 | 100    | 43.75  |
| 26 | 100    | 71.875 |
| 27 | 100    | 34.375 |
| 28 | 100    | 81.25  |
| 29 | 100    | 25     |
| 30 | 90.625 | 90.625 |
| 31 | 100    | 25     |
| 32 | 81.25  | 100    |
| 33 | 100    | 34.375 |
| 34 | 71.875 | 100    |
| 35 | 100    | 43.75  |
| 36 | 62.5   | 100    |
| 37 | 100    | 53.125 |
| 38 | 53.125 | 100    |
| 39 | 100    | 62.5   |
| 40 | 43.75  | 100    |
| 41 | 100    | 71.875 |
| 42 | 34.375 | 100    |
| 43 | 100    | 81.25  |
| 44 | 25     | 100    |
| 45 | 90.625 | 90.625 |
| 46 | 25     | 100    |
| 47 | 81.25  | 100    |
| 48 | 34.375 | 100    |
| 49 | 71.875 | 100    |
| 50 | 43.75  | 100    |
| 51 | 62.5   | 100    |
| 52 | 53.125 | 100    |
| 53 | 53.125 | 100    |
| 54 | 62.5   | 100    |
| 55 | 43.75  | 100    |
| 56 | 71.875 | 100    |
| 57 | 34.375 | 100    |
| 58 | 81.25  | 100    |
| 59 | 25     | 100    |
| 60 | 90.625 | 90.625 |

| FIRST HALF SCAN | | SECOND HALF SCAN | |
|---|---|---|---|
| SCAN 1 | SCAN 2 | SCAN 3 | SCAN 4 |
| 30 | 100 | 70 | 0 |
| 25 | 90 | 75 | 10 |
| 20 | 80 | 80 | 20 |
| 15 | 70 | 85 | 30 |
| 10 | 60 | 90 | 40 |
| 5 | 50 | 95 | 50 |
| 0 | 40 | 100 | 60 |
| 0 | 35 | 100 | 65 |

FIG. 41

| | 1 | 2 |
|---|---|---|
| 1 | 0 | 100 |
| 2 | 70 | 30 |
| 3 | 10 | 90 |
| 4 | 75 | 25 |
| 5 | 20 | 80 |
| 6 | 80 | 20 |
| 7 | 30 | 70 |
| 8 | 85 | 15 |
| 9 | 40 | 60 |
| 10 | 90 | 10 |
| 11 | 50 | 50 |
| 12 | 95 | 5 |
| 13 | 60 | 40 |
| 14 | 100 | 0 |
| 15 | 65 | 35 |
| 16 | 100 | 0 |
| 17 | 70 | 30 |
| 18 | 90 | 10 |
| 19 | 75 | 25 |
| 20 | 80 | 20 |
| 21 | 80 | 20 |
| 22 | 70 | 30 |
| 23 | 85 | 15 |
| 24 | 60 | 40 |
| 25 | 90 | 10 |
| 26 | 50 | 50 |
| 27 | 95 | 5 |
| 28 | 40 | 60 |
| 29 | 100 | 0 |
| 30 | 35 | 65 |
| 31 | 100 | 0 |
| 32 | 30 | 70 |
| 33 | 90 | 10 |
| 34 | 25 | 75 |
| 35 | 80 | 20 |
| 36 | 20 | 80 |
| 37 | 70 | 30 |
| 38 | 15 | 85 |
| 39 | 60 | 40 |
| 40 | 10 | 90 |
| 41 | 50 | 50 |
| 42 | 5 | 95 |
| 43 | 40 | 60 |
| 44 | 0 | 100 |
| 45 | 35 | 65 |
| 46 | 0 | 100 |
| 47 | 30 | 70 |
| 48 | 10 | 90 |
| 49 | 25 | 75 |
| 50 | 20 | 80 |
| 51 | 20 | 80 |
| 52 | 30 | 70 |
| 53 | 15 | 85 |
| 54 | 40 | 60 |
| 55 | 10 | 90 |
| 56 | 50 | 50 |
| 57 | 5 | 95 |
| 58 | 60 | 40 |
| 59 | 0 | 100 |
| 60 | 65 | 35 |

| FIRST HALF SCAN | | | SECOND HALF SCAN | | |
|---|---|---|---|---|---|
| SCAN 1 | SCAN 2 | SCAN 3 | SCAN 4 | SCAN 5 | SCAN 6 |
| 24 | 19 | 14 | 10 | 5 | 0 |
| 25 | 20 | 15 | 11 | 6 | 1 |
| 26 | 21 | 16 | 12 | 7 | 2 |
| 27 | 22 | 17 | 13 | 8 | 3 |
| 0 | 23 | 18 | 14 | 9 | 4 |

| FIRST HALF SCAN | | | SECOND HALF SCAN | | |
|---|---|---|---|---|---|
| SCAN 1 | SCAN 2 | SCAN 3 | SCAN 4 | SCAN 5 | SCAN 6 |
| 15 | 68 | 100 | 100 | 80 | 0 |
| 10 | 56 | 95 | 100 | 85 | 17 |
| 5 | 44 | 90 | 100 | 90 | 34 |
| 0 | 32 | 85 | 100 | 95 | 51 |
| 0 | 20 | 80 | 100 | 100 | 68 |

FIG. 47

|    | 1   | 2   |
|----|-----|-----|
| 1  | 0   | 100 |
| 2  | 80  | 68  |
| 3  | 100 | 15  |
| 4  | 17  | 95  |
| 5  | 85  | 56  |
| 6  | 100 | 10  |
| 7  | 34  | 90  |
| 8  | 90  | 44  |
| 9  | 100 | 5   |
| 10 | 51  | 85  |
| 11 | 95  | 32  |
| 12 | 100 | 0   |
| 13 | 68  | 80  |
| 14 | 100 | 20  |
| 15 | 100 | 0   |
| 16 | 80  | 68  |
| 17 | 100 | 15  |
| 18 | 95  | 17  |
| 19 | 85  | 56  |
| 20 | 100 | 10  |
| 21 | 90  | 34  |
| 22 | 90  | 44  |
| 23 | 100 | 5   |
| 24 | 85  | 51  |
| 25 | 95  | 32  |
| 26 | 100 | 0   |
| 27 | 80  | 68  |
| 28 | 100 | 20  |
| 29 | 100 | 0   |
| 30 | 68  | 80  |
| 31 | 100 | 15  |
| 32 | 95  | 17  |
| 33 | 56  | 85  |
| 34 | 100 | 10  |
| 35 | 90  | 34  |
| 36 | 44  | 90  |
| 37 | 100 | 5   |
| 38 | 85  | 51  |
| 39 | 32  | 95  |
| 40 | 100 | 0   |
| 41 | 80  | 68  |
| 42 | 20  | 100 |
| 43 | 100 | 0   |
| 44 | 68  | 80  |
| 45 | 15  | 100 |
| 46 | 95  | 17  |
| 47 | 56  | 85  |
| 48 | 10  | 100 |
| 49 | 90  | 34  |
| 50 | 44  | 90  |
| 51 | 5   | 100 |
| 52 | 85  | 51  |
| 53 | 32  | 95  |
| 54 | 0   | 100 |
| 55 | 80  | 68  |
| 56 | 20  | 100 |
| 57 | 0   | 100 |
| 58 | 68  | 80  |
| 59 | 15  | 100 |
| 60 | 17  | 95  |

| FIRST HALF SCAN | | SECOND HALF SCAN | |
|---|---|---|---|
| SCAN 1 | SCAN 2 | SCAN 3 | SCAN 4 |
| 85 | 100 | 100 | 25 |
| 77.5 | 100 | 100 | 32.5 |
| 66.25 | 100 | 100 | 43.75 |
| 55 | 100 | 100 | 55 |
| 43.75 | 100 | 100 | 66.25 |
| 32.5 | 100 | 100 | 77.5 |
| 25 | 100 | 100 | 85 |
| 25 | 92.5 | 100 | 92.5 |

FIG. 51

|    | 1     | 2     |
|----|-------|-------|
| 1  | 25    | 100   |
| 2  | 100   | 85    |
| 3  | 32.5  | 100   |
| 4  | 100   | 77.5  |
| 5  | 43.75 | 100   |
| 6  | 100   | 66.25 |
| 7  | 55    | 100   |
| 8  | 100   | 55    |
| 9  | 66.25 | 100   |
| 10 | 100   | 43.75 |
| 11 | 77.5  | 100   |
| 12 | 100   | 32.5  |
| 13 | 85    | 100   |
| 14 | 100   | 25    |
| 15 | 92.5  | 92.5  |
| 16 | 100   | 25    |
| 17 | 100   | 85    |
| 18 | 100   | 32.5  |
| 19 | 100   | 77.5  |
| 20 | 100   | 43.75 |
| 21 | 100   | 66.25 |
| 22 | 100   | 55    |
| 23 | 100   | 55    |
| 24 | 100   | 66.25 |
| 25 | 100   | 43.75 |
| 26 | 100   | 77.5  |
| 27 | 100   | 32.5  |
| 28 | 100   | 85    |
| 29 | 100   | 25    |
| 30 | 92.5  | 92.5  |
| 31 | 100   | 25    |
| 32 | 85    | 100   |
| 33 | 100   | 32.5  |
| 34 | 77.5  | 100   |
| 35 | 100   | 43.75 |
| 36 | 66.25 | 100   |
| 37 | 100   | 55    |
| 38 | 55    | 100   |
| 39 | 100   | 66.25 |
| 40 | 43.75 | 100   |
| 41 | 100   | 77.5  |
| 42 | 32.5  | 100   |
| 43 | 100   | 85    |
| 44 | 25    | 100   |
| 45 | 92.5  | 92.5  |
| 46 | 25    | 100   |
| 47 | 85    | 100   |
| 48 | 32.5  | 100   |
| 49 | 77.5  | 100   |
| 50 | 43.75 | 100   |
| 51 | 66.25 | 100   |
| 52 | 55    | 100   |
| 53 | 55    | 100   |
| 54 | 66.25 | 100   |
| 55 | 43.75 | 100   |
| 56 | 77.5  | 100   |
| 57 | 32.5  | 100   |
| 58 | 85    | 100   |
| 59 | 25    | 100   |
| 60 | 92.5  | 92.5  |

| FIRST HALF SCAN | | SECOND HALF SCAN | |
|---|---|---|---|
| SCAN 1 | SCAN 2 | SCAN 3 | SCAN 4 |
| 87.68 | 100 | 100 | 25 |
| 77.5 | 100 | 100 | 35.18 |
| 65.93 | 100 | 100 | 46.75 |
| 53.93 | 100 | 100 | 58.75 |
| 42.46 | 100 | 100 | 70.22 |
| 32.5 | 100 | 100 | 80.18 |
| 25 | 100 | 100 | 87.68 |
| 25 | 95.5 | 100 | 95.5 |

FIG. 55

| | 1 | 2 |
|---|---|---|
| 1 | 25 | 100 |
| 2 | 100 | 87.68 |
| 3 | 35.18 | 100 |
| 4 | 100 | 77.5 |
| 5 | 46.75 | 100 |
| 6 | 100 | 65.93 |
| 7 | 58.75 | 100 |
| 8 | 100 | 53.93 |
| 9 | 70.22 | 100 |
| 10 | 100 | 42.46 |
| 11 | 80.18 | 100 |
| 12 | 100 | 32.5 |
| 13 | 87.68 | 100 |
| 14 | 100 | 25 |
| 15 | 95.5 | 95.5 |
| 16 | 100 | 25 |
| 17 | 100 | 87.68 |
| 18 | 100 | 35.18 |
| 19 | 100 | 77.5 |
| 20 | 100 | 46.75 |
| 21 | 100 | 65.93 |
| 22 | 100 | 58.75 |
| 23 | 100 | 53.93 |
| 24 | 100 | 70.22 |
| 25 | 100 | 42.46 |
| 26 | 100 | 80.18 |
| 27 | 100 | 32.5 |
| 28 | 100 | 87.68 |
| 29 | 100 | 25 |
| 30 | 95.5 | 95.5 |
| 31 | 100 | 25 |
| 32 | 87.68 | 100 |
| 33 | 100 | 35.18 |
| 34 | 77.5 | 100 |
| 35 | 100 | 46.75 |
| 36 | 65.93 | 100 |
| 37 | 100 | 58.75 |
| 38 | 53.93 | 100 |
| 39 | 100 | 70.22 |
| 40 | 42.46 | 100 |
| 41 | 100 | 80.18 |
| 42 | 32.5 | 100 |
| 43 | 100 | 87.68 |
| 44 | 25 | 100 |
| 45 | 95.5 | 95.5 |
| 46 | 25 | 100 |
| 47 | 87.68 | 100 |
| 48 | 35.18 | 100 |
| 49 | 77.5 | 100 |
| 50 | 46.75 | 100 |
| 51 | 65.93 | 100 |
| 52 | 58.75 | 100 |
| 53 | 53.93 | 100 |
| 54 | 70.22 | 100 |
| 55 | 42.46 | 100 |
| 56 | 80.18 | 100 |
| 57 | 32.5 | 100 |
| 58 | 87.68 | 100 |
| 59 | 25 | 100 |
| 60 | 95.5 | 95.5 |

FIG. 58

| FIRST HALF SCAN | SECOND HALF SCAN |
|---|---|
| SCAN 1 | SCAN 2 |
| 13 | 0 |
| 14 | 1 |
| 15 | 2 |
| 16 | 3 |
| 17 | 4 |
| 18 | 5 |
| 19 | 6 |
| 20 | 7 |
| 21 | 8 |
| 22 | 9 |
| 23 | 10 |
| 24 | 11 |
| 0 | 12 |

| FIRST HALF SCAN | | SECOND HALF SCAN |
|---|---|---|
| SCAN 1 | SCAN 2 | SCAN 3 |
| 17 | 9 | 0 |
| 18 | 10 | 1 |
| 19 | 11 | 2 |
| 20 | 12 | 3 |
| 21 | 13 | 4 |
| 22 | 14 | 5 |
| 23 | 15 | 6 |
| 24 | 16 | 7 |
| 0 | 17 | 8 |

FIG. 61

| FIRST HALF SCAN | | SECOND HALF SCAN | |
|---|---|---|---|
| SCAN 1 | SCAN 2 | SCAN 3 | SCAN 4 |
| 19 | 13 | 7 | 0 |
| 20 | 14 | 8 | 1 |
| 21 | 15 | 9 | 2 |
| 22 | 16 | 10 | 3 |
| 23 | 17 | 11 | 4 |
| 24 | 18 | 12 | 5 |
| 0 | 19 | 13 | 6 |

| FIRST HALF SCAN | | SECOND HALF SCAN | |
|---|---|---|---|
| SCAN 1 | SCAN 2 | SCAN 3 | SCAN 4 |
| 70 | 100 | 85 | 25 |
| 62.5 | 100 | 85 | 32.5 |
| 55 | 100 | 85 | 40 |
| 47.5 | 100 | 85 | 47.5 |
| 40 | 100 | 85 | 55 |
| 32.5 | 92.5 | 92.5 | 62.5 |
| 25 | 85 | 100 | 70 |
| 25 | 77.5 | 100 | 77.5 |

FIG. 65

|    | 1    | 2    |
|----|------|------|
| 1  | 25   | 100  |
| 2  | 85   | 70   |
| 3  | 32.5 | 100  |
| 4  | 85   | 62.5 |
| 5  | 40   | 100  |
| 6  | 85   | 55   |
| 7  | 47.5 | 100  |
| 8  | 85   | 47.5 |
| 9  | 55   | 100  |
| 10 | 85   | 40   |
| 11 | 62.5 | 92.5 |
| 12 | 92.5 | 32.5 |
| 13 | 70   | 85   |
| 14 | 100  | 25   |
| 15 | 77.5 | 77.5 |
| 16 | 100  | 25   |
| 17 | 85   | 70   |
| 18 | 100  | 32.5 |
| 19 | 85   | 62.5 |
| 20 | 100  | 40   |
| 21 | 85   | 55   |
| 22 | 100  | 47.5 |
| 23 | 85   | 47.5 |
| 24 | 100  | 55   |
| 25 | 85   | 40   |
| 26 | 92.5 | 62.5 |
| 27 | 92.5 | 32.5 |
| 28 | 85   | 70   |
| 29 | 100  | 25   |
| 30 | 77.5 | 77.5 |
| 31 | 100  | 25   |
| 32 | 70   | 85   |
| 33 | 100  | 32.5 |
| 34 | 62.5 | 85   |
| 35 | 100  | 40   |
| 36 | 55   | 85   |
| 37 | 100  | 47.5 |
| 38 | 47.5 | 85   |
| 39 | 100  | 55   |
| 40 | 40   | 85   |
| 41 | 92.5 | 62.5 |
| 42 | 32.5 | 92.5 |
| 43 | 85   | 70   |
| 44 | 25   | 100  |
| 45 | 77.5 | 77.5 |
| 46 | 25   | 100  |
| 47 | 70   | 85   |
| 48 | 32.5 | 100  |
| 49 | 62.5 | 85   |
| 50 | 40   | 100  |
| 51 | 55   | 85   |
| 52 | 47.5 | 100  |
| 53 | 47.5 | 85   |
| 54 | 55   | 100  |
| 55 | 40   | 85   |
| 56 | 62.5 | 92.5 |
| 57 | 32.5 | 92.5 |
| 58 | 70   | 85   |
| 59 | 25   | 100  |
| 60 | 77.5 | 77.5 |

FIG. 68

| | |
|---:|---:|
| 7 | 22 |
| 15 | 0 |
| 8 | 23 |
| 16 | 1 |
| 9 | 24 |
| 17 | 2 |
| 10 | 25 |
| 18 | 3 |
| 11 | 26 |
| 19 | 4 |
| 12 | 27 |
| 20 | 5 |
| 13 | 28 |
| 21 | 6 |
| 14 | 29 |

FIG. 69

| FIRST HALF SCAN | | SECOND HALF SCAN | |
|---|---|---|---|
| SCAN 1 | SCAN 2 | SCAN 3 | SCAN 4 |
| 22 | 15 | 7 | 0 |
| 23 | 16 | 8 | 1 |
| 24 | 17 | 9 | 2 |
| 25 | 18 | 10 | 3 |
| 26 | 19 | 11 | 4 |
| 27 | 20 | 12 | 5 |
| 28 | 21 | 13 | 6 |
| 29 | 22 | 14 | 7 |

FIG. 81

| LEFT NOZZLE NUMBER | RIGHT NOZZLE NUMBER | LEFT NOZZLE JETTING RATE | RIGHT NOZZLE JETTING RATE | THE NUMBER OF LEFT NOZZLE PRIORITY PIXELS | THE NUMBER OF RIGHT NOZZLE PRIORITY PIXELS |
|---|---|---|---|---|---|
| 0 | 15 | 25 | 100 | 7.5 | 30 |
| 8 | 23 | 67.86 | 57.14 | 20.36 | 17.14 |
| 1 | 16 | 30.36 | 94.64 | 9.11 | 28.39 |
| 9 | 24 | 73.21 | 51.79 | 21.96 | 15.54 |
| 2 | 17 | 35.71 | 89.29 | 10.71 | 26.79 |
| 10 | 25 | 78.57 | 46.43 | 23.57 | 13.93 |
| 3 | 18 | 41.07 | 83.93 | 12.32 | 25.18 |
| 11 | 26 | 83.93 | 41.07 | 25.18 | 12.32 |
| 4 | 19 | 46.43 | 78.57 | 13.93 | 23.57 |
| 12 | 27 | 89.29 | 35.71 | 26.79 | 10.71 |
| 5 | 20 | 51.79 | 73.21 | 15.54 | 21.96 |
| 13 | 28 | 94.64 | 30.36 | 28.39 | 9.11 |
| 6 | 21 | 57.14 | 67.86 | 17.14 | 20.36 |
| 14 | 29 | 100 | 25 | 30 | 7.5 |
| 7 | 22 | 62.5 | 62.5 | 18.75 | 18.75 |
| 15 | 0 | 100 | 25 | 30 | 7.5 |
| 8 | 23 | 67.86 | 57.14 | 20.36 | 17.14 |
| 16 | 1 | 94.64 | 30.36 | 28.39 | 9.11 |

IMAGE RECORDING APPARATUS, DITHER MASK, AND IMAGE RECORDING METHOD

CROSS-REFERENCE TO RELATED APPLICATIONS

The present application is a Continuation of PCT International Application No. PCT/JP2018/012112 filed on Mar. 26, 2018 claiming priority under 35 U.S.0 §119(a) to Japanese Patent Application No. 2017-071100 filed on Mar. 31, 2017. Each of the above applications is hereby expressly incorporated by reference, in its entirety, into the present application.

BACKGROUND OF THE INVENTION

1. Field of the Invention

The present invention relates to an image recording apparatus, a dither mask, and an image recording method, and more particularly, to a halftone processing technique suitable for an ink jet control in a serial-type ink jet printer.

2. Description of the Related Art

The serial-type ink jet printer repeats a main scan operation of jetting ink from nozzles of a recording head while moving the recording head in a main scan direction to perform recording and a sub scan operation that is a medium feeding operation of intermittently transporting the recording medium in a sub scan direction, to thereby record an image on the recording medium.

In such an image recording method, a behavior of landed droplets, that is, a behavior of dots on the recording medium is changed due to a recording position error of each dot onto the recording medium from each nozzle of the recording head or a jetting amount error of each nozzle, or a dot recording order, a recording timing, or the like. As the dot behavior on the recording medium is changed, concentration unevenness called "banding", such as occurrence of a change in a recording concentration at a repetitive cycle of each printing path or a noticeable boundary of each printing path is generated. In a case where the banding is generated, there is a problem in that a printing image quality is lowered.

With respect to such a problem, for example, JP2005-088467A and JP2009-160876A disclose methods for controlling usage rates of respective nozzles using a mask pattern in allocating a halftone processing result to respective scans and respective nozzles. The usage rate of the nozzle represents a frequency at which droplets are jetted from a nozzle for recording a dot, and may be understood as a nozzle usage frequency or a jetting rate.

JP2010-162770A discloses a serial-type ink jet printer that performs halftone processing by a systematic dither method using a dither mask to control a usage rate of each nozzle.

In the printer disclosed in JP2010-162770A, a threshold of a dither mask is set so that a nozzle usage rate of at least one of nozzle groups respectively disposed in both end portions of a nozzle row of a recording head is smaller than a nozzle usage rate of a medium nozzle group disposed between the nozzle groups in both the end portions, and thus, suppression of banding is achieved. JP2010-162770A discloses a method for generating a dither mask that sets a dot density of pixels recorded by the nozzle groups in both the end portions of the nozzle row to be lower than a dot density recorded by the medium nozzle group, in order to suppress banding.

The "printing head" disclosed in JP2010-162770A may be understood as a term corresponding to a "recording head" in the present specification.

SUMMARY OF THE INVENTION

As in the methods disclosed in JP2005-088467A and JP2009-160876A, a method for controlling jetting rates of respective nozzles using a mask pattern for allocating a halftone processing result to respective scans and respective nozzles has a problem in that productivity is lowered. That is, as in the methods disclosed in JP2005-088467A and JP2009-160876A, a technique capable of controlling which scan and nozzle each pixel is to be recorded by using such a mask pattern is based on a premise that the pixel can be recorded any scan and nozzle, and thus, extra scans as much are necessary, to thereby lower a printing speed.

On the other hand, as in the method disclosed in JP2010-162770A, in the case of a method for reflecting jetting rates of respective nozzles in a dither mask to be applied to halftone processing to control the jetting rates of the respective nozzles, the problem of the productivity decrease may be solved. That is, in a case where the jetting rates of the respective nozzles in the halftone processing result, one scan and one nozzle capable of performing recording with respect to each pixel are determined in advance. Accordingly, since extra scans are not necessary, and thus, it is possible to avoid the problem of the productivity decrease.

In the method disclosed in JP2010-162770A, a dither mask in which a usage rate of a nozzle group in at least one end portion in a nozzle row is set to be smaller than a usage rate of a nozzle group in a medium portion is generated. By performing halftone processing using the dither mask generated by the method disclosed in JP2010-162770A, a dot pattern in which the usage rate in the nozzle group in the end portion of the nozzle row and the nozzle group in the medium portion thereof are non-uniform.

Since the method for reflecting the jetting rates of the respective nozzles in the halftone processing result in this way becomes a method for controlling, for each nozzle, a ratio of pixels that are actually recorded, among predetermined recordable pixels for each scan and each nozzle, there is no problem of the productivity decrease.

On the other hand, in the case of the method for reflecting the jetting rates of the respective nozzles in the halftone processing result to control recording dots using the respective nozzles, in a case where the jetting rates of the respective nozzles in the nozzle row are non-uniform, an average jetting rate per unit area becomes non-uniform in accordance with a setting method of the jetting rates of the respective nozzles. As a result, in a dot disposition of the halftone processing result, a density of dots becomes non-uniform, and concentration unevenness occurs due to sparseness and density of a dot density. Specific description about such a problem and review of causes will be described later.

The invention has been made in view of such circumstances, and an object of the invention is to provide an image recording apparatus, a dither mask, and an image recording method capable of solving the above-mentioned problems and reducing occurrence of concentration unevenness without decreasing productivity.

In order to solve the problems, the following aspects of the invention are provided.

According to a first aspect of the invention, there is provided an image recording apparatus comprising: a recording head that includes a nozzle row in which a plurality of nozzles that jet ink are arranged in a sub scan direction; a halftone processing unit that performs halftone processing with respect to image data by using a dither mask; and a recording control section that controls the jetting of the ink from the nozzles on the basis of dot data generated through the halftone processing and performs a control for recording an image on a recording medium by repeating a main scan operation of jetting the ink from the nozzles while relatively moving the recording head with respect to the recording medium in a main scan direction that is orthogonal to the sub scan direction to perform recording and a sub scan operation of relatively moving the recording medium with respect to the recording head in the sub scan direction, in which in a recording process of completing, with respect to each scan band that is a region having a width of a sub scan movement amount of one sub scan operation of the recording medium in the sub scan direction, recording of the scan band by repeating a plurality of the main scan operations, in a case where the plurality of scans necessary for the completion of the recording of the scan band are divided into a first half scan and a second half scan on the basis of a scan order, when a nozzle disposed closest to a central side of the nozzle row in a first half scan nozzle group that is a nozzle group used in the recording of the first half scan in the nozzle row is referred to as a first half side central nozzle, a nozzle disposed closest to an end side of the nozzle row in the first half scan nozzle group is referred to as a front end nozzle, a nozzle disposed closest to a central side of the nozzle row in a second half scan nozzle group that is a nozzle group used in the recording of the second half scan in the nozzle row is referred to as a second half side central nozzle, a nozzle disposed closest to an end side of the nozzle row in the second half scan nozzle group is referred to as a rear end nozzle, the number of the main scan operations necessary for recording of one of rasters formed in the main scan direction is referred to as the number of overlaps, a region of a unit area represented by a product of the number of overlaps in the main scan direction and a nozzle pitch of the nozzle row in the sub scan direction is referred to as a unit region, and nozzles that record the same unit region in the nozzle groups for the respective scans used in the recording of the plurality of scans are referred to as corresponding nozzles, the dither mask is subjected to threshold setting for generating a dot disposition in which nozzle jetting rates that are relative usage rates of the respective nozzles of the nozzle row become nozzle jetting rates that satisfy a predetermined specific condition, in at least a part of a range of a recording duty, and the nozzle jetting rates that satisfy the specific condition are set such that the nozzle jetting rates are decreased at two or more kinds of different inclinations, from the first half side central nozzle toward the front end nozzle in the first half scan nozzle group, the nozzle jetting rates are decreased at two or more kinds of different inclinations, from the second half side central nozzle toward the rear end nozzle in the second half scan nozzle group, with respect to the nozzle groups for each scan used in recording of each scan that belongs to the first half scan, a first half jetting rate sum obtained by summing up the nozzle jetting rates of the corresponding nozzles is increased from the front end nozzle to the first half side central nozzle, with respect to the nozzle groups for each scan used in recording of each scan that belongs to the second half scan, a second half jetting rate sum obtained by summing up the nozzle jetting rates of the corresponding nozzles is decreased from the second half side central nozzle toward the rear end nozzle, and with respect to the nozzle groups for each scan used in recording of each of the plurality of scans, a sum of the first half jetting rate sum and the second half jetting rate sum of the corresponding nozzles becomes a specific value that is in a defined allowable range.

According to the first aspect, it is possible to uniformize an average ink jetting rate per unit area. Thus, in a dot disposition of a halftone processing result, it is possible to uniformize the density of dots, to thereby suppress concentration unevenness. The average ink jetting rate per unit area is referred to as an "average jetting rate per unit area". Further, the first aspect has no problem of productivity decrease since nozzles that are allocated for recording of respective positions on a recording medium and a scan order are specified in advance, and the ratio of pixels that are actually recorded is controlled for each nozzle on the basis of the halftone processing result.

The "at least a part of a recording duty range" includes a medium tone range, preferably. The "inclination of nozzle jetting rates" may be expressed by a difference between nozzle jetting rates of adjacent nozzles in the sub scan direction inside the nozzle row.

According to a second aspect of the invention, in the image recording apparatus according to the first aspect of the invention, when a relationship between nozzle jetting rates of nozzle groups, for which a sum of nozzle jetting rates of corresponding nozzles becomes constant, in different nozzle groups in the nozzle row, is referred to as a complementary relationship, the nozzle jetting rates of any one nozzle group among the nozzle groups for each scan used in the recording of each scan that belongs to the second half scan may be in the complementary relationship with the nozzle jetting rates of the nozzle group for each scan used in the recording of each scan that belongs to the first half scan.

According to a third aspect of the invention, in the image recording apparatus in the second aspect of the invention, the nozzle groups for each scan used in the recording of each scan that belongs to the first half scan and the nozzle groups of the scan that belongs to the second half scan, which are respectively in the complementary relationship with the nozzle groups of the scan that belongs to the first half scan, may be in a positional relationship in which positions of the scan nozzle groups are symmetrical with reference to the center of the nozzle row.

According to a fourth aspect of the invention, in the image recording apparatus according to any one of the first to third aspects of the invention, an inclination of the nozzle jetting rates may be constant in the nozzle group for each scan used in the recording of each of the plurality of scans.

In order to secure robustness against banding, it is preferable that the inclination of the nozzle jetting rates inside the nozzle group for each scan is one type (inclination is constant). In the case of the fourth aspect of the invention, the inclination is changed at an end nozzle of the nozzle group for each scan and/or a branch of the nozzle groups.

According to a fifth aspect of the invention, in the image recording apparatus according to the fourth aspect of the invention, an inclination of the nozzle jetting rates of the nozzle group used in recording of at least one of a first scan or a final scan, among inclinations of the nozzle jetting rates in the nozzle group for each scan used in the recording of each of the plurality of scans, may be the largest.

According to a sixth aspect of the invention, in the image recording apparatus according to any one of the first to third aspects of the invention, an inclination of the nozzle jetting rates may be changed inside at least one nozzle group among the nozzle groups for each scan used in the recording of each of the plurality of scans.

According to a seventh aspect of the invention, in the image recording apparatus according to the sixth aspect of the invention, the first half jetting rate sum may non-linearly increases with respect to a nozzle position change from the front end nozzle to the first half side central nozzle, and the second half jetting rate sum may non-linearly decrease with respect to a nozzle position change from the second half side central nozzle to the rear end nozzle.

According to an eighth aspect of the invention, in the image recording apparatus according to the sixth aspect or the seventh aspect of the invention, the nozzle jetting rates may be changed at two or more kinds of inclinations inside the nozzle group used in recording of a first scan in the first half scan, and when an inclination from the front end nozzle inside the nozzle group used in the recording of the first scan is referred to as a first inclination, in a case where the inclination of the nozzle jetting rates is changed from the first inclination to a second inclination from the front end nozzle toward the first half side central nozzle, the first inclination may be smaller than the second inclination.

By reducing the amount of ink to be first recorded on the recording medium for each scan band as much as possible, it is possible to suppress bleeding and/or agglutination.

According to a ninth aspect of the invention, in the image recording apparatus according to any one of the first to eighth aspects of the invention, an inclination of nozzle jetting rates of a nozzle group used in recording of a scan in a central portion among the plurality of scans may be zero.

Here, the "scan in the central portion" represents one central scan in a scan order of a plurality of scans, or at least one of two scans corresponding to the center. According to the ninth aspect of the invention, by reducing a nozzle jetting rate in the vicinity of the center in the nozzle row, it is possible to suppress occurrence of streaks and/or bleeding.

According to a tenth aspect of the invention, in the image recording apparatus according to any one of the first to ninth aspects of the invention, with respect to a graph shape in a case where a relationship between a position of each nozzle in the nozzle row and a nozzle jetting rate of each nozzle is expressed by a graph, a nozzle jetting rate of each nozzle that belongs to the first half scan nozzle group and a nozzle jetting rate of each nozzle that belongs to the second half scan nozzle group may be symmetrical.

According to an eleventh aspect of the invention, in the image recording apparatus according to any one of the first to ninth aspects of the invention, with respect to a graph shape in a case where a relationship between a position of each nozzle in the nozzle row and a nozzle jetting rate of each nozzle is expressed by a graph, a nozzle jetting rate of each nozzle that belongs to the first half scan nozzle group and a nozzle jetting rate of each nozzle that belongs to the second half scan nozzle group may be asymmetrical.

According to a twelfth aspect of the invention, in the image recording apparatus according to the eleventh aspect of the invention, the first half jetting rate sum may be smaller than the second half jetting rate sum.

According to the twelfth aspect of the invention, by reducing the amount of ink to be first recorded on the recording medium for each scan band, it is possible to suppress bleeding and/or agglutination.

According to a thirteenth aspect of the invention, in the image recording apparatus according to the eleventh aspect or the twelfth aspect of the invention, a value obtained by averaging nozzle jetting rates of respective nozzles of a nozzle group used in recording of a first scan in the first half scan may be smaller than a value obtained by averaging nozzle jetting rates of respective nozzles of a nozzle group used in recording of a final scan in the second half scan.

In a case where the nozzle group used in recording of the first scan in the first half scan is referred to as a leading scan nozzle group and the nozzle group used in recording of the final scan in the second half scan is referred to as a final scan nozzle group, by setting an average value of nozzle jetting rates of respective nozzles that belong to the leading scan nozzle group to be smaller than an average value of nozzle jetting rates of respective nozzles that belong to the final scan nozzle group, it is possible to reduce the amount of ink to be first recorded on the recording medium.

According to a fourteenth aspect of the invention, in the image recording apparatus according to any one of the eleventh aspect to the thirteenth aspect of the invention, in a case where average values of inclinations of the nozzle jetting rates with respect to the nozzle groups for each scan used in the recording of each of the plurality of scans are compared with each other, except for a nozzle group of a scan in which the average value of the inclinations is zero, an average value of an inclination of the nozzle jetting rates of the nozzle group used in the recording of the first scan in the first half scan may be the smallest.

According to the twelfth aspect to the fourteenth aspect of the invention, since the amount of ink to be first recorded on the recording medium for each scan band is reduced, it is possible to suppress bleeding and/or agglutination.

According to a fifteenth aspect of the invention, in the image recording apparatus according to any one of the first to fourteenth aspects of the invention, the defined allowable range may be a range where a change of an average nozzle jetting rate per unit area is equal to or greater than 0% and equal to or smaller than 10%.

According to a sixteenth aspect of the invention, there is provided a dither mask used in halftone processing for recording an image on a recording medium by repeating a main scan operation of jetting ink from nozzles, while relatively moving a recording head that includes a nozzle row in which a plurality of the nozzles that jet the ink are arranged in a sub scan direction with respect to the recording medium in a main scan direction that is orthogonal to the sub scan direction, to perform recording and a sub scan operation of relatively moving the recording medium with respect to the recording head in the sub scan direction, in which in a recording process of completing, with respect to each scan band that is a region having a width of a sub scan movement amount of one sub scan operation of the recording medium in the sub scan direction, recording of the scan band by repeating a plurality of the main scan operations, in a case where the plurality of scans necessary for the completion of the recording of the scan band are divided into a first half scan and a second half scan on the basis of a scan order, when a nozzle disposed closest to a central side of the nozzle row in a first half scan nozzle group that is a nozzle group used in the recording of the first half scan in the nozzle row is referred to as a first half side central nozzle, a nozzle disposed closest to an end side of the nozzle row in the first half scan nozzle group is referred to as a front end nozzle, a nozzle disposed closest to a central side of the nozzle row in a second half scan nozzle group that is a nozzle group used in the recording of the second half scan in the nozzle row is referred to as a second half side central nozzle, a nozzle disposed closest to an end side of the nozzle row in the second half scan nozzle group is referred to as a rear end nozzle, the number of the main scan operations necessary for recording of one of rasters formed in the main scan direction is referred to as the number of overlaps, a region of a unit area represented by a product of the number of overlaps in the main scan direction and a nozzle pitch of the nozzle row in the sub scan direction is referred to as a unit region, and nozzles that record the same unit region in the nozzle groups for the respective scans used in the recording of the plurality of scans are referred to as corresponding nozzles, the dither mask is subjected to threshold setting for generating a dot disposition in which nozzle jetting rates that are relative usage rates of the respective nozzles of the nozzle row become nozzle jetting rates that satisfy a predetermined specific condition, in at least a part of a range of a recording duty, and the nozzle jetting rates that satisfy the specific condition are set such that the nozzle jetting rates are decreased at two or more kinds of different inclinations, from the first half side central nozzle toward the front end nozzle in the first half scan nozzle group, the nozzle jetting rates are decreased at two or more kinds of different inclinations, from the second half side central nozzle toward the rear end nozzle in the second half scan nozzle group, with respect to the nozzle groups for each scan used in recording of each scan that belongs to the first half scan, a first half jetting rate sum obtained by summing up the nozzle jetting rates of the corresponding nozzles is increased from the front end nozzle to the first half side central nozzle, with respect to the nozzle groups for each scan used in recording of each scan that belongs to the second half scan, a second half jetting rate sum obtained by summing up the nozzle jetting rates of the corresponding nozzles is decreased from the second half side central nozzle toward the rear end nozzle, and with respect to the nozzle groups for each scan used in recording of each of the plurality of scans, a sum of the first half jetting rate sum and the second half jetting rate sum of the corresponding nozzles becomes a specific value that is in a defined allowable range.

With respect to the dither mask according to the sixteenth aspect of the invention, the same configurations as the specific configurations of the image recording apparatus specified in the second aspect to the fifteenth aspect may be appropriately combined.

According to a seventeenth aspect of the invention, there is provided an image recording method for recording an image on a recording medium using a recording head that includes a nozzle row in which a plurality of nozzles that jet ink are arranged in a sub scan direction, the method comprising: a halftone processing step of performing halftone processing with respect to image data by using a dither mask; and a recording control step of controlling the jetting of the ink from the nozzles on the basis of dot data generated through the halftone processing and performs a control for recording an image on a recording medium by repeating a main scan operation of jetting the ink from the nozzles while relatively moving the recording head with respect to the recording medium in a main scan direction that is orthogonal to the sub scan direction to perform recording and a sub scan operation of relatively moving the recording medium with respect to the recording head in the sub scan direction, in which in a recording process of completing, with respect to each scan band that is a region having a width of a sub scan movement amount of one sub scan operation of the recording medium in the sub scan direction, recording of the scan band by repeating a plurality of the main scan operations, in a case where the plurality of scans necessary for the completion of the recording of the scan band are divided into a first half scan and a second half scan on the basis of a scan order, when a nozzle disposed closest to a central side of the nozzle row in a first half scan nozzle group that is a nozzle group used in the recording of the first half scan in the nozzle row is referred to as a first half side central nozzle, a nozzle disposed closest to an end side of the nozzle row in the first half scan nozzle group is referred to as a front end nozzle, a nozzle disposed closest to a central side of the nozzle row in a second half scan nozzle group that is a nozzle group used in the recording of the second half scan in the nozzle row is referred to as a second half side central nozzle, a nozzle disposed closest to an end side of the nozzle row in the second half scan nozzle group is referred to as a rear end nozzle, the number of the main scan operations necessary for recording of one of rasters formed in the main scan direction is referred to as the number of overlaps, a region of a unit area represented by a product of the number of overlaps in the main scan direction and a nozzle pitch of the nozzle row in the sub scan direction is referred to as a unit region, and nozzles that record the same unit region in the nozzle groups for the respective scans used in the recording of the plurality of scans are referred to as corresponding nozzles, the dither mask is subjected to threshold setting for generating a dot disposition in which nozzle jetting rates that are relative usage rates of the respective nozzles of the nozzle row become nozzle jetting rates that satisfy a predetermined specific condition, in at least a part of a range of a recording duty, and the nozzle jetting rates that satisfy the specific condition are set such that the nozzle jetting rates are decreased at two or more kinds of different inclinations, from the first half side central nozzle toward the front end nozzle in the first half scan nozzle group, the nozzle jetting rates are decreased at two or more kinds of different inclinations, from the second half side central nozzle toward the rear end nozzle in the second half scan nozzle group, with respect to the nozzle groups for each scan used in recording of each scan that belongs to the first half scan, a first half jetting rate sum obtained by summing up the nozzle jetting rates of the corresponding nozzles is increased from the front end nozzle to the first half side central nozzle, with respect to the nozzle groups for each scan used in recording of each scan that belongs to the second half scan, a second half jetting rate sum obtained by summing up the nozzle jetting rates of the corresponding nozzles is decreased from the second half side central nozzle toward the rear end nozzle, and with respect to the nozzle groups for each scan used in recording of each of the plurality of scans, a sum of the first half jetting rate sum and the second half jetting rate sum of the corresponding nozzles becomes a specific value that is in a defined allowable range.

With respect to the image recording method according to the seventeenth aspect of the invention, the same configurations as the specific configurations of the image recording apparatus specified in the second aspect to the fifteenth aspect may be appropriately combined. The image recording method of the seventeenth aspect of the invention may be considered as a printed matter manufacturing method.

According to the invention, in a case where a main scan operation and a sub scan operation are repeated to record an image on a recording medium, it is possible to suppress occurrence of concentration unevenness without reducing productivity.

BRIEF DESCRIPTION OF THE DRAWINGS

FIG. 2 is a chart showing a jetting rate pattern obtained by developing the nozzle effective rates shown in FIG. 1 in accordance with a nozzle pattern shown in "FIG. 4" and "FIG. 5" disclosed in JP2010-162770A.

FIG. 5 is a chart showing a jetting rate pattern obtained by developing the nozzle effective rates shown in FIG. 4 in accordance with the nozzle pattern shown in "FIG. 4" and "FIG. 5" disclosed in JP2010-162770A.

FIG. 8 is a chart showing a jetting rate pattern obtained by developing the nozzle effective rates shown in FIG. 7 in accordance with the nozzle pattern shown in "FIG. 4" and "FIG. 5" disclosed in JP2010-162770A.

FIG. 11 is a chart showing a jetting rate pattern obtained by developing the nozzle effective rates shown in FIG. 10A in accordance with the nozzle pattern shown in "FIG. 4" and "FIG. 5" disclosed in JP2010-162770A.

FIG. 13 is a chart showing a jetting rate pattern obtained by developing the nozzle effective rates shown in FIG. 10B in accordance with the nozzle pattern shown in "FIG. 4" and "FIG. 5" disclosed in JP2010-162770A.

FIG. 16 is a chart showing a jetting rate pattern obtained by developing the nozzle effective rates shown in FIG. 15 in accordance with the nozzle pattern shown in "FIG. 4" and "FIG. 5" disclosed in JP2010-162770A.

FIG. 31 is a diagram for illustrating a state where a nozzle row of a recording head is symbolized.

FIG. 34 is a chart showing a nozzle group of each scan for recording a scan band.

FIG. 35 is a chart showing an example of jetting rates of each scan nozzle group that are finally obtained according to Example 1 (Embodiment 1).

FIG. 37 is a chart showing a jetting pattern based on the nozzle jetting rates shown in FIG. 35.

FIG. 41 is a chart showing a jetting pattern based on the nozzle jetting rates shown in FIG. 41.

FIG. 47 is a chart showing a jetting rate pattern based on the nozzle jetting rates shown in FIG. 46.

FIG. 51 is a diagram showing a jetting rate pattern based on the nozzle jetting rates shown in FIG. 50.

FIG. 55 is a chart showing a jetting rate pattern based on the nozzle jetting rates shown in FIG. 54.

FIG. 58 is a chart showing nozzle groups of respective scans of scan 1 and scan 2.

FIG. 59 is a diagram showing an example of a relationship between nozzles and a raster in each scan, and a part of a nozzle pattern.

FIG. 60 is a chart showing nozzle groups used for recording of respective scans of scan 1, scan 2, and scan 3.

FIG. 61 is a diagram showing an example of a relationship between nozzles and a raster in each scan, and a part of a nozzle pattern.

FIG. 65 is a diagram showing a jetting rate pattern based on the nozzle jetting rates shown in FIG. 64.

FIG. 68 is a diagram showing a nozzle pattern in a case where a different setting example is employed with respect to a scan band range.

FIG. 69 is a chart showing nozzles of respective scans for recording each unit region in a case where the different setting example is employed with respect to the scan band range.

FIG. 81 is a diagram showing an example of disposition of dot priority pixels.

DESCRIPTION OF THE PREFERRED EMBODIMENTS

Figure 1:
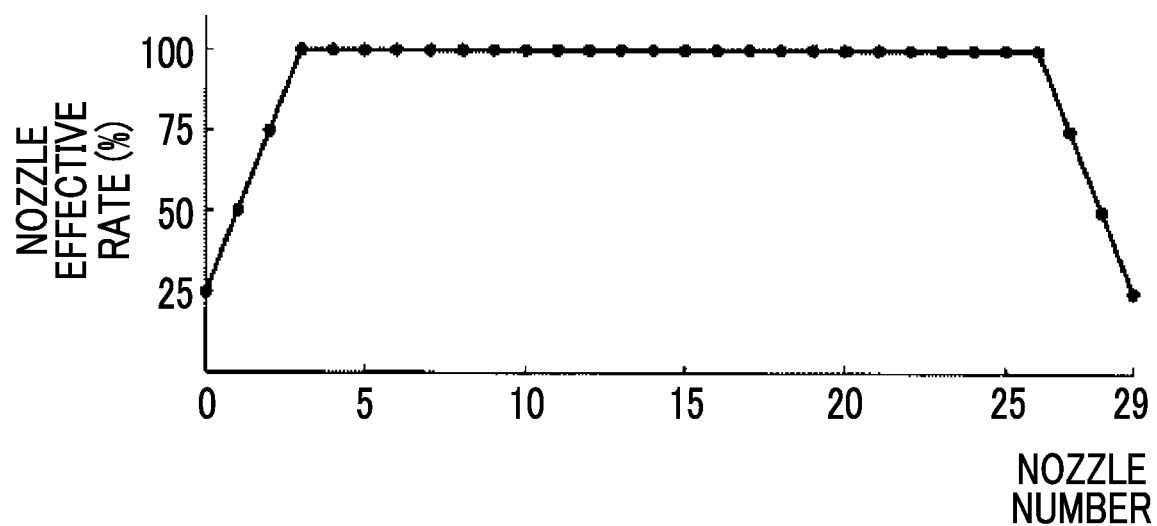
FIG. 1 is a diagram transcriptively showing a graph of nozzle effective rates shown in "FIG. 8" disclosed in JP2010-162770A.

Hereinafter, preferred embodiments of the invention will be described with reference to the accompanying drawings.

<Description about Terms>

Terms used in the present disclosure will be described.

(1) Scan Band

A serial-type ink jet printer repeats a main scan operation of jetting ink drops onto a recording medium while moving a recording head having a nozzle row where a plurality of nozzles that jet the ink drops are arranged in a sub scan direction, in a main scan direction to perform recording and a sub scan operation of transporting the recording medium in the sub scan direction perpendicular to the main scan direction, to thereby perform image recording. With respect to the same region of the recording medium, the main scan operation is repeatedly performed plural times, so that the recording is performed. Here, the width of the "same region" in the sub scan direction is equal to the width of transportation of the recording medium. The width of transportation of the recording medium corresponds to a feed amount (transportation amount) of the recording medium per one sub scan operation. The "same region" where a plurality of main scan operations are repeated so that the recording is performed is referred to as a "scan band".

Whenever the main scan operation and the sub scan operation are repeated, a new scan band is recorded. Taking interest in a certain one scan band, when the scan band is referred to as a "focused scan band", after the interested scan band is first recorded by the first main scan operation, the recording medium is transported in the sub scan direction, the interested scan band is recorded again by the second main scan operation, and so forth. In this way, the main scan operation and the sub scan operation are repeated, and when the recording head passes through the interested scan band, the recording of the interested scan band is completed.

(2) First Half Scan and Second Half Scan

In the present disclosure, in the above-described recording process, a method of dividing a plurality of scans where respective scan bands are recorded into a first half scan and a second half scan is considered. In a case where recording of each scan band is completed through N-time scans where an integer N is an even number, the first half scans correspond to scan 1, scan 2, . . . , and scan N/2, and the second half scans correspond to scan (N/2)+1, scan (N/2)+2, . . . , and scan N. For example, in a case where N is 4, scan 1 and scan 2 correspond to the first half scans, and scan 3 and scan 4 correspond to the second half scans.

In a case where N is an odd number, scan 1, scan 2, . . . , and scan INT(N/2) correspond to the first half scans, and scan INT{(N/2)+2}, scan INT{(N/2)+3}, . . . , scan N correspond to the second half scans. Here, INT(x) is a function for omitting decimals of x to an integer.

For example, in a case where N is 3, scan 1 becomes the first half scan, and scan 3 becomes the second half scan. Further, for example, in a case where N is 5, scan 1 and scan 2 correspond to the first half scans, and scan 4 and scan 5 correspond to the second half scans. That is, in a case where N is an odd number, a scan in the middle of scan 1 to scan N does not belong to any one of the first half scan and the second half scan. For example, in a case where N is 3, scan 2 does not belong to any one of the first half scan and the second half scan. Further, in a case where N is 5, scan 3 does not belong to any one of the first half scan and the second half scan. The reason why it is appropriate to handle scans without including such a middle scan in a case where N is an odd number will be described later.

In the nozzle row of the recording head, a nozzle group that belongs to the first half scans is referred to as a "first half scan nozzle group". The first half scan nozzle group is a nozzle group that performs recording of the first half scans in the nozzle row of the recording head. A nozzle group that belongs to the second half scans is referred to as a "second half scan nozzle group". The second half scan nozzle group is a nozzle group that performs recording of the second half scan in the nozzle row of the recording head.

(3) Scan Nozzle Group

In the nozzle row of the recording head, a nozzle group divided in the unit of the width of the scan band is referred to as a "scan nozzle group". That is, with respect to each scan among N scans, a nozzle group used in each scan is the scan nozzle group. The scan nozzle group corresponding to each scan is expressed as a scan 1 nozzle group, a scan 2 nozzle group, a scan 3 nozzle group, a scan 4 nozzle group, . . . , and a scan N nozzle group in accordance with a scan order for recording the scan bands.

(4) End Nozzle and Central Nozzle

In each nozzle group of the first half scan nozzle group or the second half scan nozzle group, a nozzle disposed closest to an end side of the nozzle row is referred to as an "end nozzle". An end nozzle of the first half scan nozzle group corresponds to a nozzle disposed at one end on an upstream side in a paper feed direction, among both ends in the nozzle row in the recording head. An end nozzle of the second half scan nozzle group corresponds to a nozzle disposed at the other end on a downstream side in the paper feed direction, among both ends in the nozzle row in the recording head. The end nozzle of the first half scan nozzle group is referred to as a "front end nozzle". The end nozzle of the second half scan nozzle group is referred to as a "rear end nozzle".

In each nozzle group of the first half scan nozzle group or the second half scan nozzle group, a nozzle disposed closest to a central side in the nozzle row is referred to as a "central nozzle". In the first half scan nozzle group, a nozzle (central nozzle) disposed on a central side in the nozzle row is referred to as a "first half side central nozzle". In the second half scan nozzle group, a nozzle (central nozzle) disposed closest to a central side in the nozzle row is referred to as a "second half side central nozzle".

The first half side central nozzle and the second half side central nozzle are approximately contiguous to each other in the vicinity of the center of the nozzle row. Here, "approximately" means that in a case where a "gap nozzle" that does not belong to any scan among the first half scan and the second half scan is present between the first half scan nozzle group and the second half scan nozzle group, the first half side central nozzle and the second half side central nozzle are not contiguous to each other. The "gap nozzle" will be specifically described later. Further, in a case where N is an odd number, since a scan in the middle of N scans does not belong to either of the first half scan or the second half scan, the first half side central nozzle and the second half side central nozzle are not contiguous to each other. Details in a case where N is the odd number will be specifically described later.

(5) Jetting Rate

Here, a jetting rate will be described. The jetting rate of a nozzle includes an absolute jetting rate and a relative jetting rate. The nozzle absolute jetting rate is a value indicating a ratio of recording pixels of which dots are recorded by ink jetting of each nozzle, among recording allocated pixels that are allocated to each nozzle, which are pixels of which recording is allocated to each of a plurality of nozzles in the recording head.

The nozzle absolute jetting rate is determined for each nozzle. The nozzle absolute jetting rate is expressed as a quotient of division in a case where the number of recording allocated pixels that are allocated to each nozzle is a denominator and the number of recording pixels of which dots are recorded by ink jetting of each nozzle is a numerator, which may be expressed as a numerical value that is equal to or greater than 0 and is equal to or smaller than 1. Further, the nozzle absolute jetting rate may also be expressed as a percentage. The nozzle absolute jetting rate increases as a recording duty increases, and becomes "1.0" or "100%" that is a maximum value at a recording duty of 100%. Here, the "recording duty" refers to a ratio of pixels that are in a dot-on state among respective pixels of an image to be recorded on a recording medium. The recording duty may be referred to as a term such as a printing duty, an ink duty, a printing rate, or a recording rate, or may be simply referred to as a duty. In this specification, hereinafter, the recording duty is expressed as the "duty".

In short, the nozzle absolute jetting rate represents an ink jetting rate of each nozzle. The ink jetting rate of each nozzle is equal to a recording pixel rate of each nozzle. The nozzle absolute jetting rate may be understood as a rate of usage of a nozzle, which may be considered as a nozzle usage rate, or a nozzle operating rate.

Specifically, the nozzle absolute jetting rate represents a usage rate of each nozzle in a case where a usage rate of each nozzle in performing recording of a solid pattern that corresponds to a uniform gradation image of a maximum concentration is set to "1.0" or "100%" that is a reference value. The usage rate of each nozzle may be replaced with an ink jetting amount of each nozzle, or may be replaced with the number of recording pixels for each nozzle.

On the other hand, a relative usage rate of each nozzle is referred to as a nozzle jetting rate. The nozzle jetting rate becomes a control target of the nozzle absolute jetting rate. The nozzle jetting rate is a relative jetting rate indicating a relative ratio of each nozzle with respect to the nozzle absolute jetting rate. The nozzle jetting rate means a relative ratio between nozzles, of the nozzle absolute jetting rates of the respective nozzles, and an absolute value or a maximum value of a numerical value of the nozzle jetting rate does not mean a particular physical quantity. The absolute value of the nozzle jetting rate of the respective nozzles may be set by standardizing a sum of nozzle jetting rates of all nozzles to 1, or may be set by standardizing a maximum value to "1" or "100%". In this embodiment, for ease of description, the nozzle absolute jetting rate of a maximum jetting (maximum usage rate) is set to "100%", and the nozzle jetting rate is expressed as a ratio with respect to the maximum value. That is, in this embodiment, a value of the nozzle jetting rate is expressed as a percentage. Hereinafter, in a case where the "jetting rate" is simply used, the jetting rate indicates the nozzle jetting rate that represents the relative usage rate of each nozzle.

(6) Inclination of Jetting Rate

In the present disclosure, a concept of "inclination" is introduced with respect to the nozzle jetting rate indicating the relative usage rate of each nozzle. In each nozzle group of the first half scan nozzle group and the second half scan nozzle group, a difference between a jetting rate of each nozzle and a jetting rate of a nozzle that is contiguous to each nozzle is referred to as an "inclination of a jetting rate" at a nozzle position, or is simply referred to as an "inclination". The "inclination of the jetting rate" is identical to an "inclination of a nozzle jetting rate". A difference between jetting rates of contiguous nozzles in the nozzle row in a sub scan direction represents a variation of the jetting rates between the contiguous nozzles. The inclination of the jetting rate represents a variation or a changing rate of the jetting rate.

For example, in a coordinate system in a case where a lateral axis represents a nozzle number indicating a nozzle position and a longitudinal axis represents a value of a nozzle jetting rate, the "inclination of the jetting rate" is expressed in a graph shape as an inclination of a graph indicating a relationship between a position and a nozzle jetting rate of each nozzle. The relationship between the position of the nozzle and the nozzle jetting rate of each nozzle is referred to as a profile of the nozzle jetting rate, and a graph shape of the profile is referred to as a profile shape.

In each of the first half scan nozzle group and the second half scan nozzle group, in a case where differences of jetting rates between contiguous nozzles at all nozzle positions are equal to each other, it is expressed that there is one kind of inclination or the inclination is one type.

Problems to be solved occurs in a case where in each of the first half scan nozzle group and the second half scan nozzle group, inclinations of jetting rates have two or more different values in accordance with positions of nozzles.

<<Description of Problems>>

Here, with respect to the problems to be solved, technical content disclosed in JP2010-162770A will be described as an example. Hereinafter, the description will be made using a part of the disclosure of JP2010-162770A. A term of "sheet" or "paper" is used as the same meaning as "recording medium".

<Description of problem 1>

Figure 4:
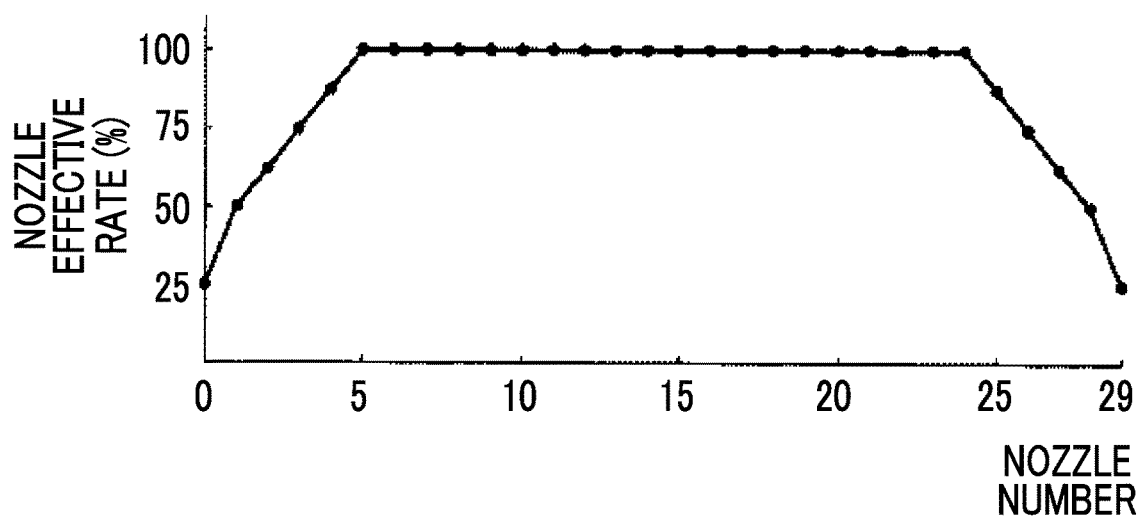
FIG. 4 is a diagram transcriptively showing a graph of nozzle effective rates shown in "FIG. 11" disclosed in JP2010-162770A.

In paragraphs "0032" to "0036", and "FIG. 4" and "FIG. 5" in JP2010-162770A, a nozzle pattern in a case where the number of nozzles in a nozzle row is "30", a paper feed amount is "15", a nozzle pitch is "2", and the number of overlaps in a main scan direction is "2" is shown. In the present specification, attachment of "FIG. 4" and "FIG. 5" in JP2010-162770A will be omitted.

The paper feed amount refers to the amount of transportation of a sheet in a sub scan direction in one main scan. In a case where a relative movement of a recording head with respect to a sheet in the sub scan direction is present, it may be understood that the paper feed amount is the amount of relative movement of the recording head with respect the sheet in the sub scan direction in one main scan. The paper feed amount is expressed as the number of rasters in the sub scan direction. The number of rasters may be expressed as the number of pixels. The paper feed amount corresponds to a sub scan movement amount per sub scan operation.

The nozzle pitch refers to a nozzle interval in the sub scan direction in the nozzle row, which is a distance between centers of contiguous nozzles in the sub scan direction. The nozzle pitch is expressed in the unit of one pixel size that is a minimum recording unit defined by a recording resolution. That is, the nozzle pitch may be expressed as a number obtained by adding a value of 1 to the number of rasters that are present between two contiguous nozzles in the sub scan direction. In a case where the nozzle pitch is "2", it means that a dot is formed every other raster in one main scan of the recording head.

The number of overlaps refers to the number of main scans necessary for entirely filling one raster formed in the main scan direction with dots. The number of overlaps "2" means that one raster is completed in the main scan direction through two main scans.

The nozzle pattern refers to a nozzle mapping pattern indicating which one of a plurality of nozzles included in a recording head a dot at each position on a sheet is formed by. That is, the nozzle pattern is an array pattern of nozzle numbers indicating a correlation between a position of each pixel in a certain image region and a nozzle number of a nozzle that records each pixel. The nozzle pattern may be a chart corresponding to a relationship diagram in which relationships between pixels and nozzle numbers are specified.

As disclosed in JP2010-162770A, the nozzle pattern is repeated at a period of the number of overlaps in the main scan direction, and at a period of "paper feed amount× number of overlaps×nozzle pitch" in the sub scan direction. A nozzle pattern shown in "FIG. 4" and "FIG. 5" disclosed in JP2010-162770A is repeated at a period of two pixels in the main scan direction, and at a period of 60 pixels in the sub scan direction.

The nozzle pattern shown in "FIG. 4" and "FIG. 5" disclosed in JP2010-162770A has a periodicity in which a repetitive minimum unit of "2 columns×60 rows" formed by the first column to the second column and the first row to the sixtieth row is repeated in the main scan direction and the sub scan direction. The periodicity of the nozzle pattern relates to repetition of a "filling order" that is an order in filling a unit region of a predetermined pixel range with dots, in which repetition occurs in the unit of the number of overlaps in the main scan direction and repletion occurs in the unit of a product of a paper feed amount and the number of filling order repetition units. The number of filling order repetition units is expressed as a product of the nozzle pitch and the number of overlaps.

The size of the unit region matches the number of overlaps in the main scan direction, and matches the nozzle pitch in the sub scan direction. In this example in which the number of overlaps is "2" and the nozzle pitch is "2", the unit area corresponds to a pixel range of 2×2. The area of the unit region is referred to as a "unit area". The unit area represents the area of the unit region formed by the number of overlaps in the main scan direction and the number of pixels corresponding to the nozzle pitch in the sub scan direction. That is, the unit area is the area of the unit region formed by a pixel range of "the number of overlaps×nozzle pitch". In the case of this example, the unit area is filled by four scans (=2×2).

FIG. 1 is a diagram transcriptively showing a graph of nozzle effective rates shown in "FIG. 8" disclosed in JP2010-162770A. The term "nozzle effective rate" corresponds to the "nozzle jetting rate" in this specification.

FIG. 2 shows a jetting rate pattern obtained by developing the nozzle effective rate shown in FIG. 1 in accordance with the nozzle pattern shown in "FIG. 4" and "FIG. 5" disclosed in JP2010-162770A. The jetting rate pattern refers to an array pattern of nozzle jetting rates indicating correlations in which a nozzle jetting rate of a nozzle that records each pixel is specified for each pixel. The jetting rate pattern may be a chart corresponding to a relationship diagram in which a relationship between a pixel and a nozzle jetting rate of a nozzle that records the pixel is specified.

Figure 3:
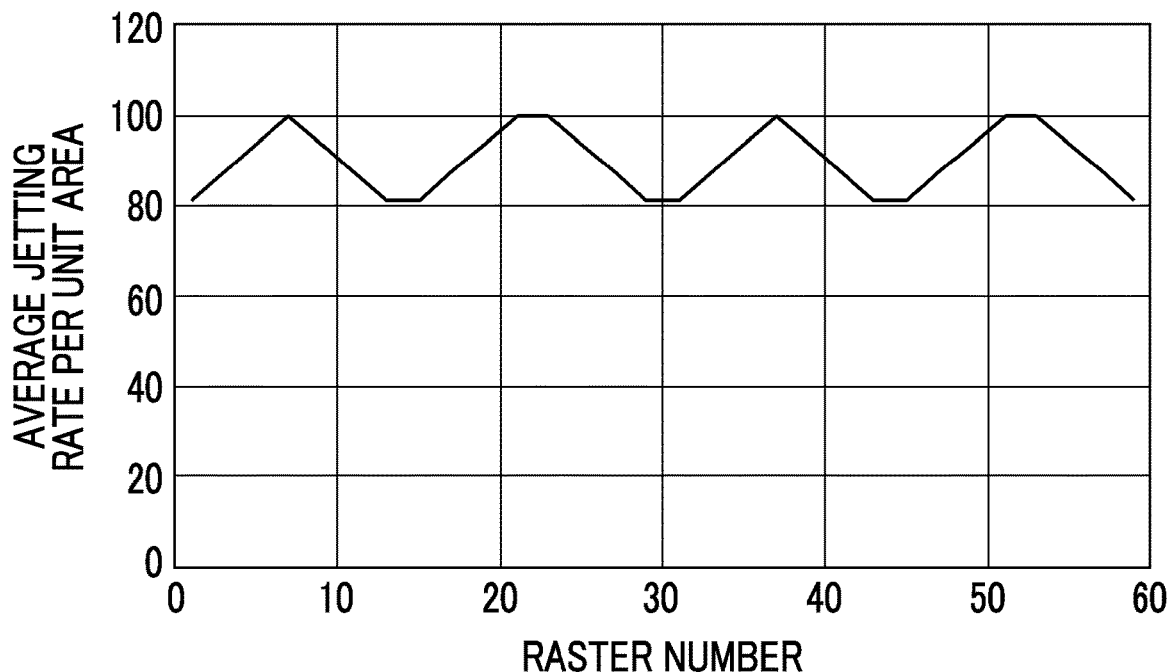
FIG. 3 is a diagram showing, as a graph, a result obtained by calculating an average jetting rate per unit area in each raster number on the basis of the jetting rate pattern shown in FIG. 2.

FIG. 3 is a diagram showing, as a graph, a result obtained by calculating an average jetting rate per unit area in each raster number on the basis of the jetting rate pattern shown in FIG. 2. In FIG. 3, a lateral axis represents a position in the sub scan direction using a raster number, and a longitudinal axis represents an average jetting rate per unit area. The raster represents each line recorded in the main scan direction. The raster number represents a raster's position in the sub scan direction. In FIG. 3, the average jetting rate per unit area is an average value of nozzle jetting rates of respective pixels that belong to the unit area in the jetting rate pattern.

In a case where positions of respective cells in the jetting rate pattern shown in FIG. 2 are expressed in a coordinate format (x, y) using a column number x×a row number y, a unit area in a raster number 1 represents the area of a unit region formed by 2×2 pixels of (1, 1), (2, 1), (1, 2), and (2, 2). An average jetting rate per unit area of 2×2 pixels in the raster number 1 is obtained by averaging a jetting rate 25% of the first column and a jetting rate 100% of the second column in the raster number 1, and a jetting rate 100% of the first column and a jetting rate 100% of the second column in a raster number 2, which becomes a jetting rate of 81.25%. That is, the average jetting rate per unit area in the raster number 1 is (25+100+100+100)/4=81.25.

A unit area in the raster number 2 is equal to the unit area in the raster number 1, which is the area of a unit region formed by four pixels of (1, 1), (2, 1), (1, 2), and (2, 2). Accordingly, an average jetting rate per unit area in the raster number 2 is equal to the average jetting rate in the raster number 1, that is, (25+100+100+100)/4=81.25. That is, since an average jetting rate per unit area in raster numbers that belong to the same unit area becomes the same value, an average jetting rate per unit area in odd raster numbers is shown in FIG. 3.

Similarly, an average jetting rate per unit area 2×2 pixels in a raster number 3 is calculated as follows. A unit area of the raster number 3 is the area of a unit region formed by four pixels of (1, 3), (2, 3), (1, 4), and (2, 4). The average jetting rate per unit area of 2×2 pixels in the raster number 3 is obtained by averaging a jetting rate 50% of the first column and a jetting rate 100% of the second column in the raster number 3, and a jetting rate 100% of the first column and a jetting rate 100% of the second column in a raster number 4, which becomes a jetting rate of 87.5%. That is, the average jetting rate per unit area in the raster number 3 is (50+100+100+100)/4=87.5.

A unit area in a raster number 5 is the area of a unit region formed by four pixels of (1, 5), (2, 5), (1, 6), and (2, 6). An average jetting rate per unit area in the raster number 5 is (75+100+100+100)/4=93.75.

Thereafter, an average jetting rate per unit area in each raster number may be calculated in accordance with the same operation rule.

A graph obtained by calculating an average jetting rate per unit area of 2×2 pixels in odd raster numbers 1, 3, 5, ... is as shown in FIG. 3.

The graph shown in FIG. 3 shows that the average jetting rate per unit area non-uniformly changes in the sub scan direction, in which positions of respective unit regions in the sub scan direction are allocated to odd raster numbers for ease of illustration. A lateral axis in FIG. 3 represents odd raster numbers, but is not limited thereto, and may be similarly applied to even raster numbers. In short, it is shown that the average jetting rate per unit area shows a non-uniform distribution in the sub scan direction.

In the case of this example, the average jetting rate per unit area of 2×2 pixels is not changed in the main scan direction. The fact that the average jetting rate per unit area of 2×2 pixels is constant in the main scan direction is obvious from the jetting rate pattern shown in FIG. 2.

As shown in FIG. 3, in the technique disclosed in JP2010-162770A, the average jetting rate per unit area is non-uniformly changed in the sub scan direction. That is, in a case where a dither mask is generated to obtain the nozzle jetting rate shown in FIG. 1, a dot disposition which is a result obtained by performing halftone processing using the generated dither mask causes a non-uniform dot density in the sub scan direction, which leads to concentration unevenness.

Figure 14:
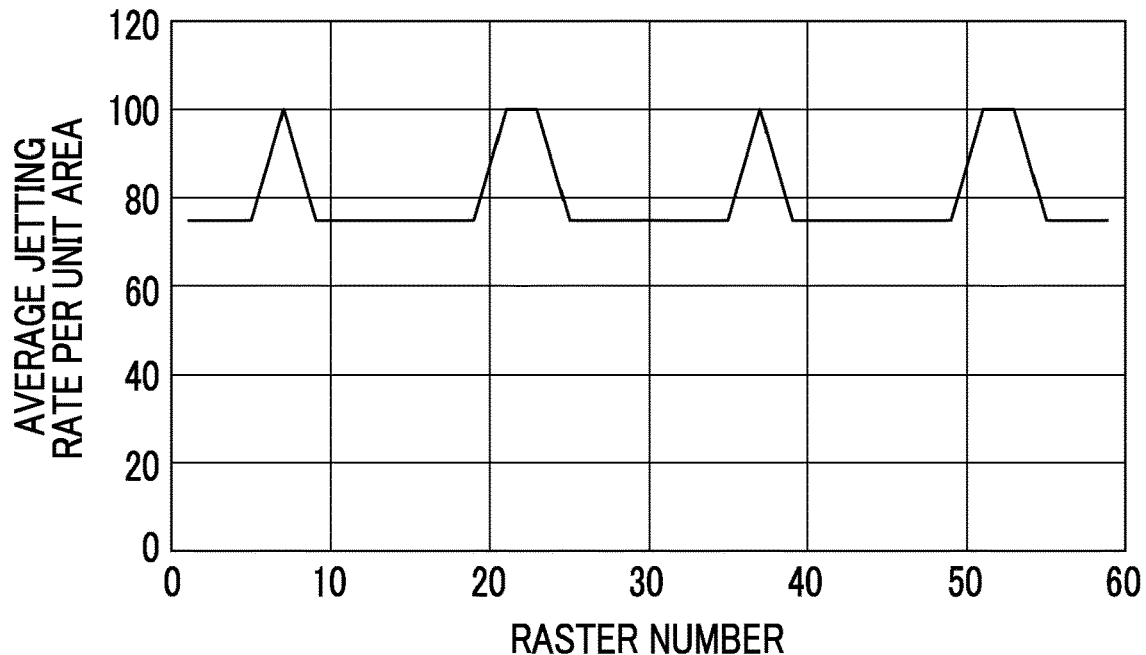
FIG. 14 is a diagram showing, as a graph, a result obtained by calculating an average jetting rate per unit area in each raster number on the basis of the jetting rate pattern shown in FIG. 13.

Such a problem similarly occurs in a case where any nozzle effective rate disclosed in "FIG. 11", "FIG. 13", and "FIG. 14" disclosed in JP2010-162770A is employed.

FIG. 4 is a diagram transcriptively showing a graph of nozzle effective rates shown in "FIG. 11" disclosed in JP2010-162770A. FIG. 5 shows a jetting rate pattern obtained by developing the nozzle effective rate shown in FIG. 4 in accordance with the nozzle pattern shown in "FIG. 4" and "FIG. 5" disclosed in JP2010-162770A. In FIG. 5, the jetting rate pattern of the repetitive minimum unit is shown.

Figure 6:
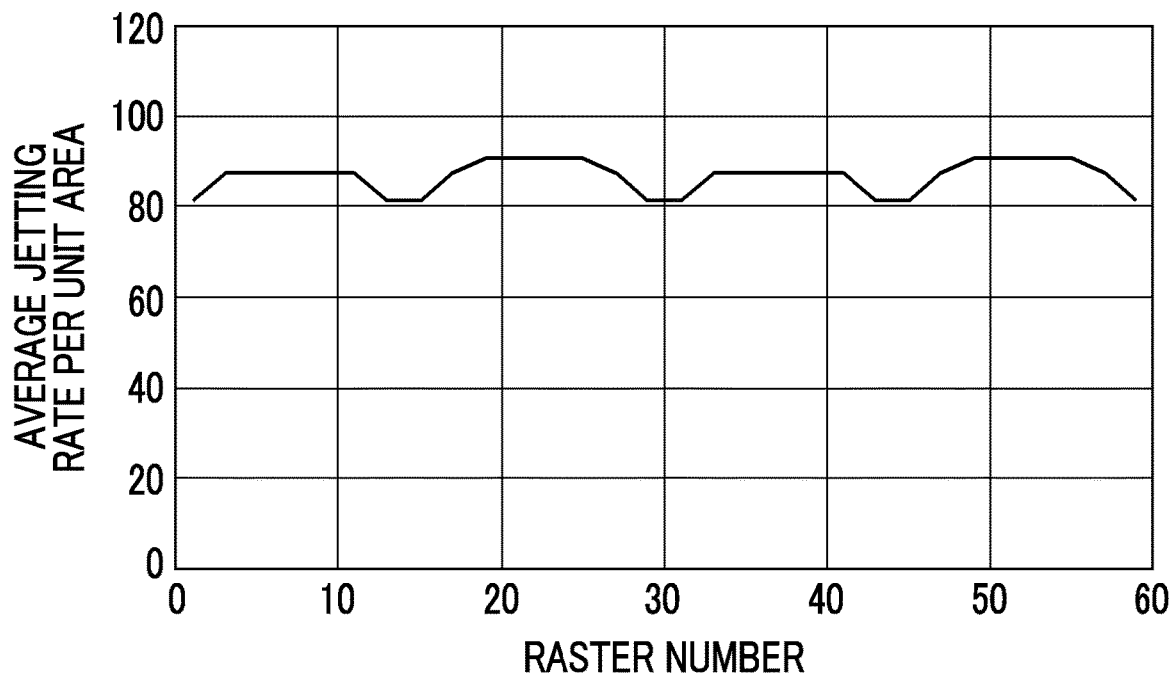
FIG. 6 is a diagram showing, as a graph, a result obtained by calculating an average jetting rate per unit area in each raster number on the basis of the jetting rate pattern shown in FIG. 5.

FIG. 6 is a diagram showing, as a graph, a result obtained by calculating an average jetting rate per unit area in each raster number on the basis of the jetting rate pattern shown in FIG. 5.

Figure 7:
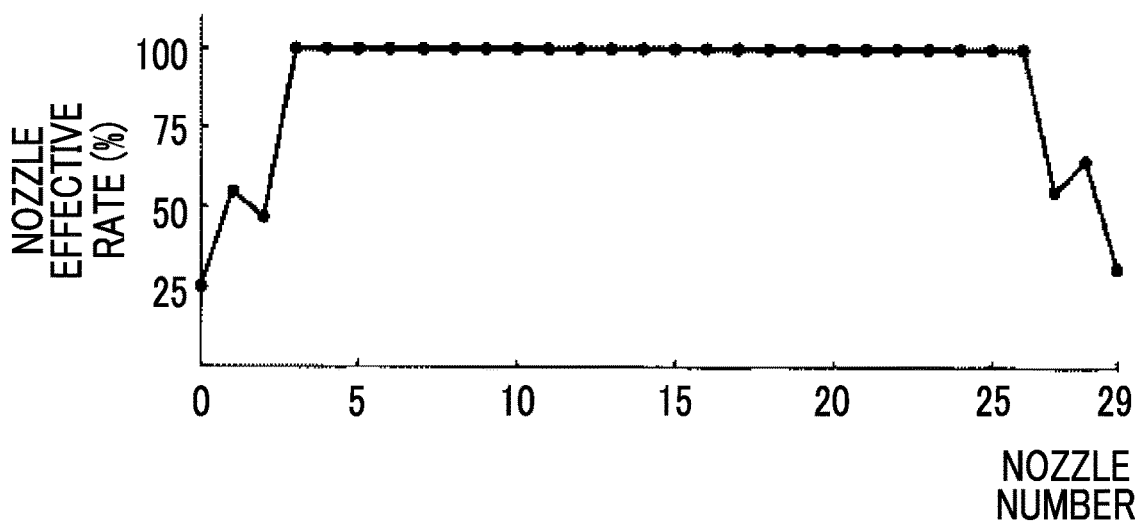
FIG. 7 is a diagram transcriptively showing a graph of nozzle effective rates shown in "FIG. 13" disclosed in JP2010-162770A.

FIG. 7 is a diagram transcriptively showing a graph of nozzle effective rates shown in "FIG. 13" disclosed in JP2010-162770A. FIG. 8 shows a jetting rate pattern obtained by developing the nozzle effective rate shown in FIG. 7 in accordance with the nozzle pattern shown in "FIG. 4" and "FIG. 5" disclosed in JP2010-162770A.

Figure 9:
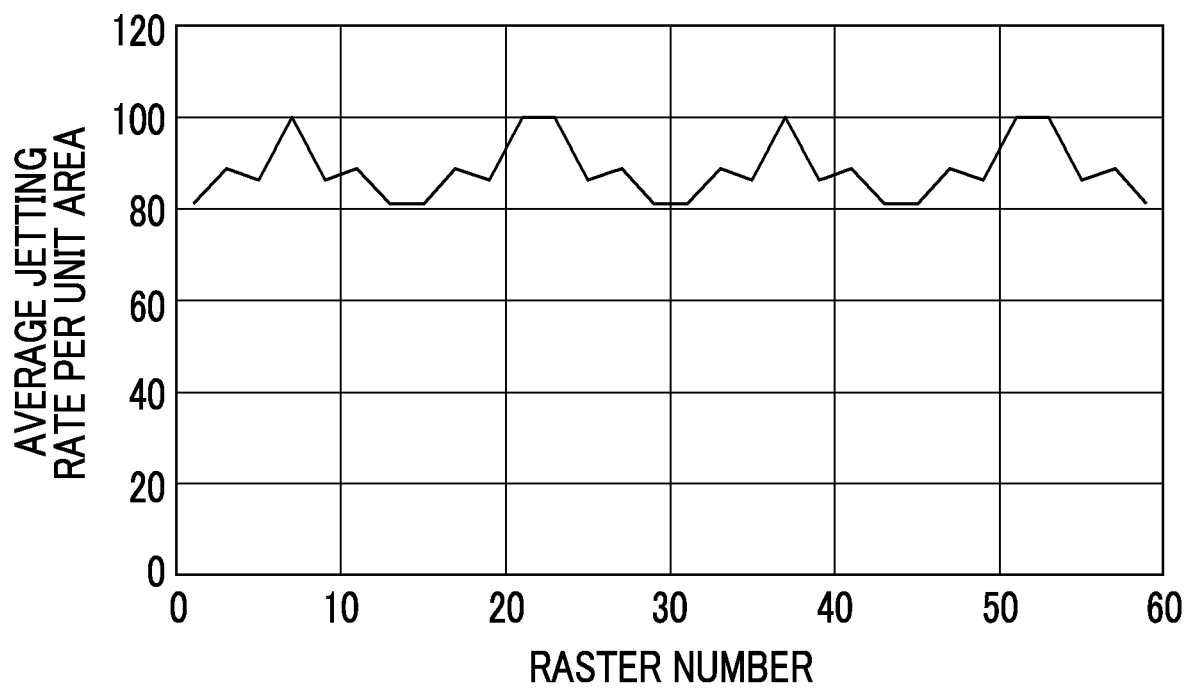
FIG. 9 is a diagram showing, as a graph, a result obtained by calculating an average jetting rate per unit area in each raster number on the basis of the jetting rate pattern shown in FIG. 8.

FIG. 9 is a diagram showing, as a graph, a result obtained by calculating an average jetting rate per unit area in each raster number on the basis of the jetting rate pattern shown in FIG. 8.

Figure 10A:
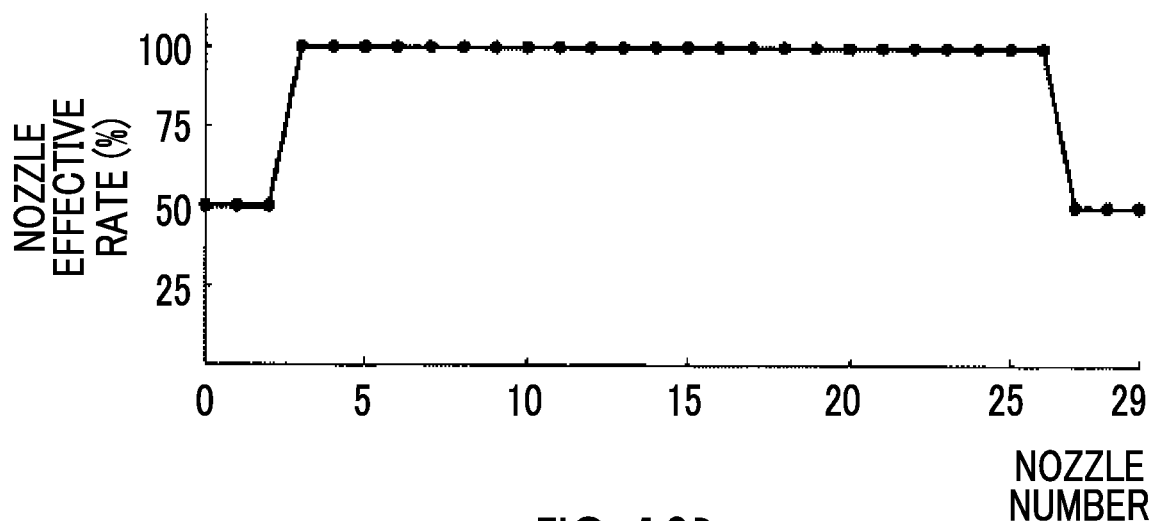
FIGS. 10A and 10B are diagrams transcriptively showing a graph of nozzle effective rates shown in "FIG. 14" disclosed in JP2010-162770A.
Figure 10B:
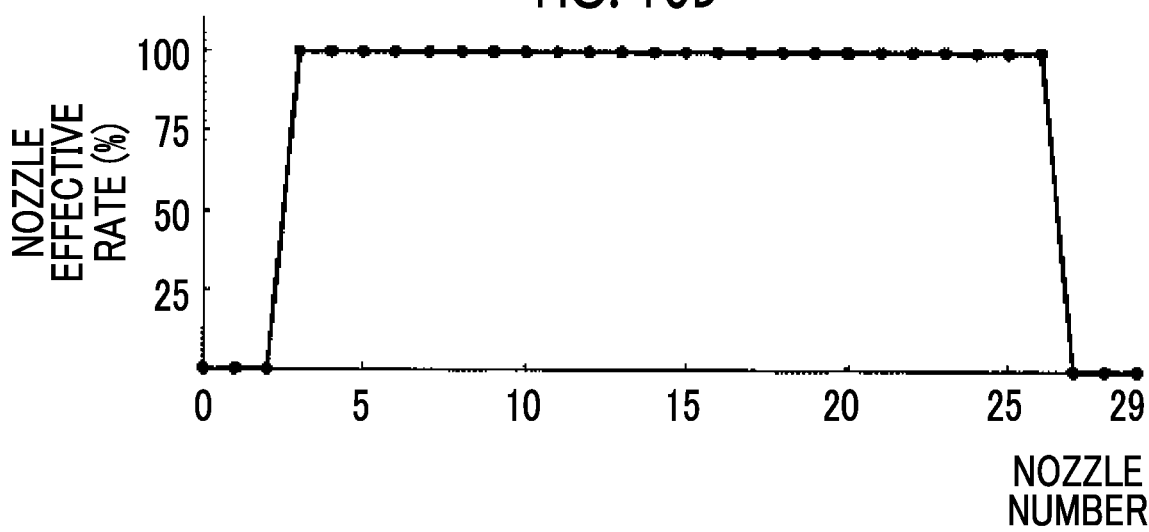

FIG. 10A and FIG. 10B are diagrams transcriptively showing a graph of nozzle effective rates shown in "FIG. 14" disclosed in JP2010-162770A. FIG. 11 is a chart showing a jetting rate pattern obtained by developing the nozzle effective rate shown in FIG. 10A in accordance with the nozzle pattern shown in "FIG. 4" and "FIG. 5" disclosed in JP2010-162770A.

Figure 12:
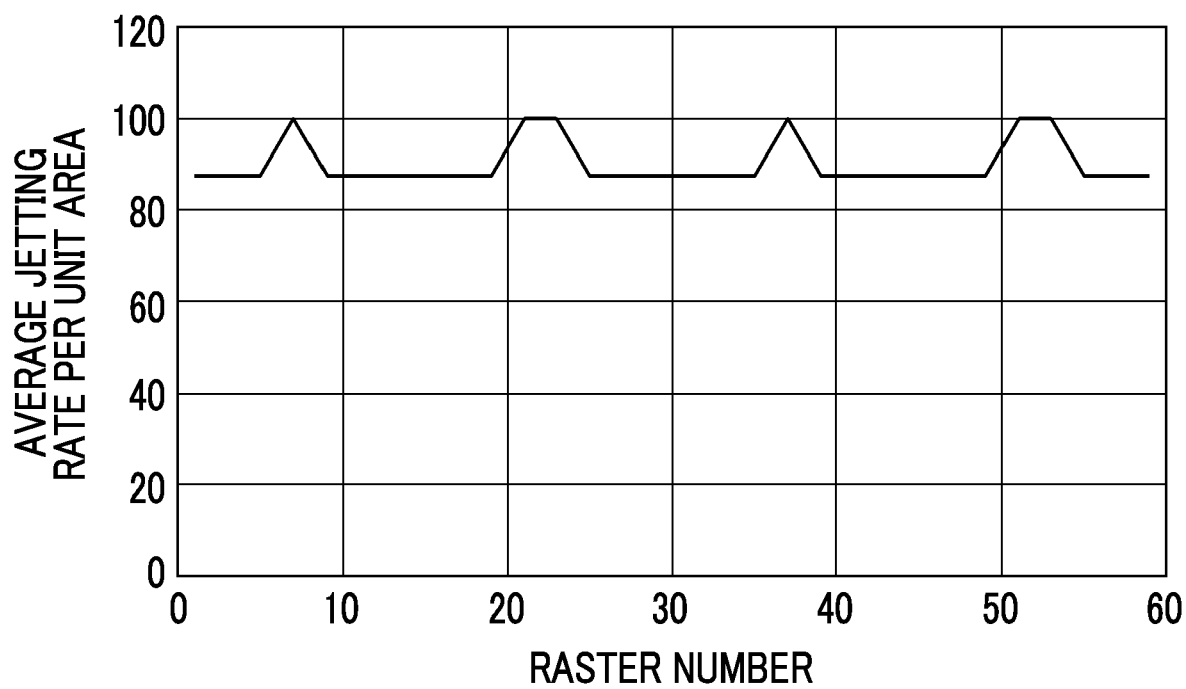
FIG. 12 is a diagram showing, as a graph, a result obtained by calculating an average jetting rate per unit area in each raster number on the basis of the jetting rate pattern shown in FIG. 11.

FIG. 12 is a diagram showing, as a graph, a result obtained by calculating an average jetting rate per unit area in each raster number on the basis of the jetting rate pattern shown in FIG. 11.

FIG. 13 shows a jetting rate pattern obtained by developing the nozzle effective rate shown in FIG. 10B in accordance with the nozzle pattern shown in "FIG. 4" and "FIG. 5" disclosed in JP2010-162770A.

FIG. 14 is a diagram showing, as a graph, a result obtained by calculating an average jetting rate per unit area in each raster number on the basis of the jetting rate pattern shown in FIG. 13.

A lateral axis and a longitudinal axis in each drawing of FIG. 4, FIG. 7, and FIGS. 10A and 10B are identical to the lateral axis and the longitudinal axis shown in FIG. 1. Further, a lateral axis and a longitudinal axis in each drawing of FIG. 6, FIG. 9, FIG. 12, and FIG. 13 are identical to the lateral axis and the longitudinal axis shown in FIG. 3.

As shown in FIGS. 3, 6, 9, 12, and 14, in a case where any nozzle jetting rate shown in FIG. 1, FIG. 4, FIG. 7, FIGS. 10A and 10B are employed, an average jetting rate per unit area is non-uniformly changed in the sub scan direction. As a result, in a case where halftone processing is performed using a dither mask generated by reflecting such a nozzle jetting rate, a dot disposition obtained as its result causes a non-uniform dot density in the sub scan direction, which leads to concentration unevenness.

Such a problem noticeably occurs in a case where the nozzle jetting rate is set to be changed with at least two kinds of inclinations from a central nozzle toward an end nozzle in the nozzle row of the recording head.

The kind of "inclination" also includes a flat where an inclination is zero. That is, one kind of inclination among the "two kinds of inclinations" may be a zero inclination. The graph shown in FIG. 1 includes a section where the nozzle jetting rate is constant and a section where the nozzle jetting rate is reduced from the central nozzle toward the end nozzle. The section where the nozzle jetting rate is constant is a section where the inclination is zero.

<Description of Problem 2>

On the other hand, in "FIG. 8" and "FIG. 11" disclosed in JP2016-107603A, an example in which a nozzle jetting rate of a nozzle disposed at a central portion in a nozzle row is a maximum value "1.0" and the nozzle jetting rate is reduced at a constant inclination, that is, one kind of inclination from the nozzle at the central portion toward a nozzle disposed at an end portion in the nozzle row. In this specification, attachment of "FIG. 8" and "FIG. 11" disclosed in JP2016-107603A is omitted. A "nozzle relative jetting rate" in JP2016-107603A corresponds to the "nozzle jetting rate" in this specification.

Figure 15:
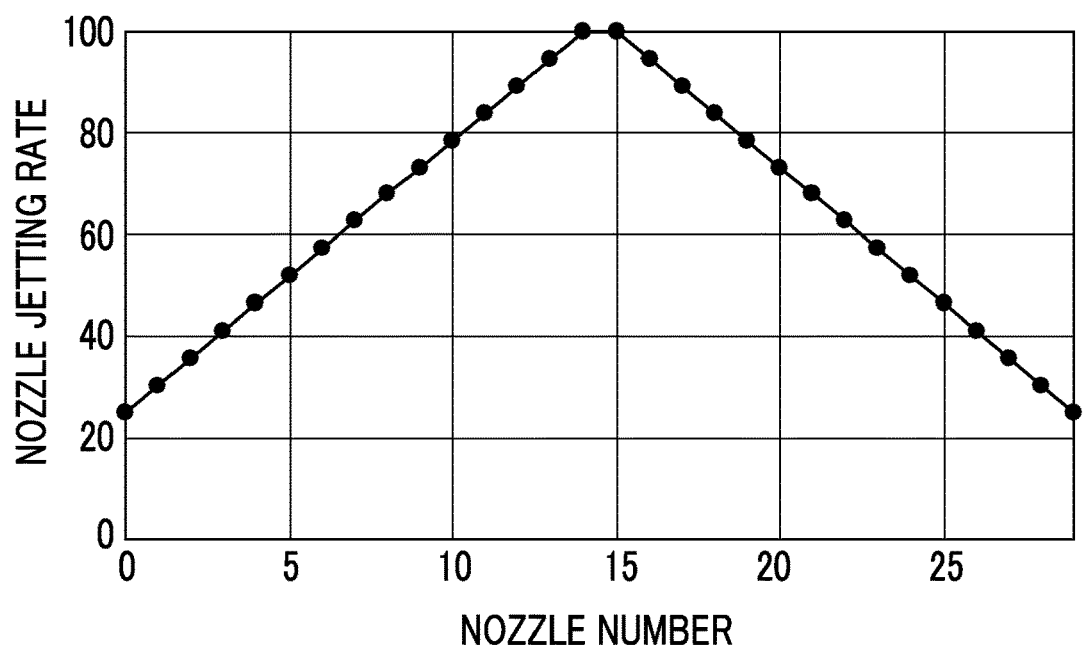
FIG. 15 is a diagram showing an example in which nozzle jetting rates are decreased from a central nozzle toward an end nozzle in a nozzle row at one kind of inclination.

FIG. 15 is a diagram showing an example in which a nozzle relative jetting rate is reduced from a central nozzle toward an end nozzle in a nozzle row at one kind of inclination. A lateral axis in FIG. 15 represents a nozzle number, and a longitudinal axis represents a nozzle jetting rate as a percentage.

FIG. 16 shows a jetting rate pattern obtained by developing the nozzle effective rate shown in FIG. 15 in accordance with the nozzle pattern shown in "FIG. 4" and "FIG. 5" disclosed in JP2010-162770A.

Figure 17:
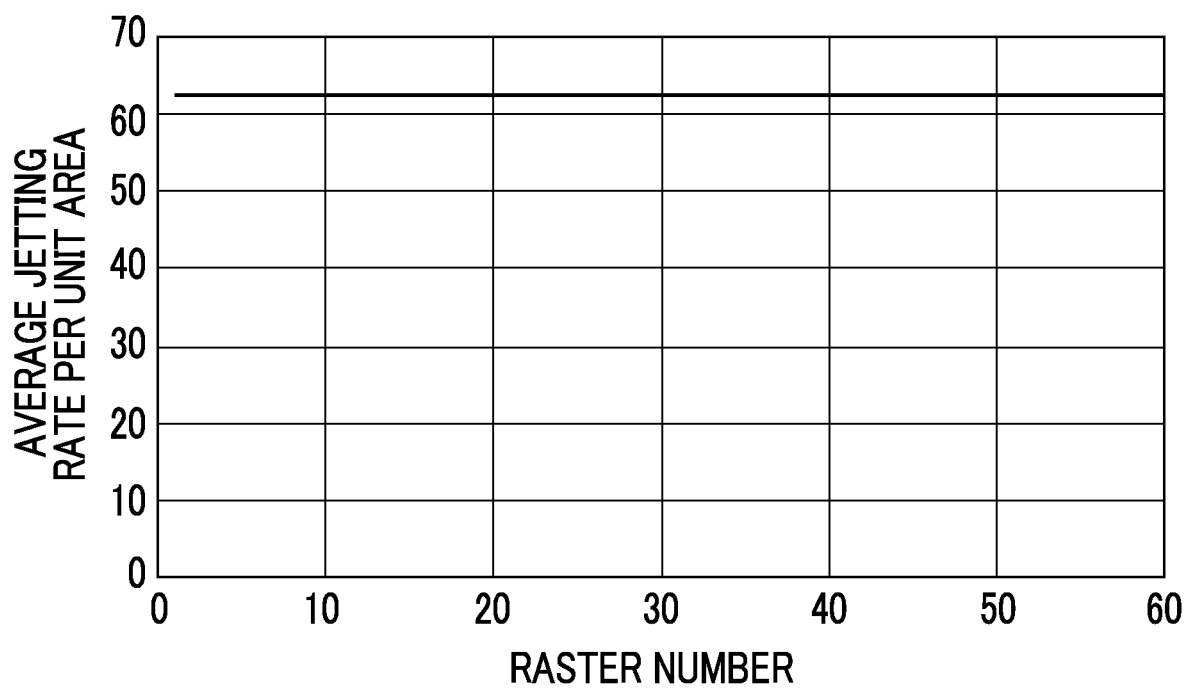
FIG. 17 is a diagram showing, as a graph, a result obtained by calculating an average jetting rate per unit area in each raster number on the basis of the jetting rate pattern shown in FIG. 16.

FIG. 17 is a diagram showing, as a graph, a result obtained by calculating an average jetting rate per unit area in each raster number on the basis of the jetting rate pattern shown in FIG. 16. A lateral axis and a longitudinal axis in FIG. 17 are identical to the lateral axis and the longitudinal axis shown in FIG. 3. As shown in FIG. 17, it can be understood that the average jetting rate per unit area is uniform in the sub scan direction.

In order to reduce banding, in a case where a nozzle jetting rate is lowered from a central nozzle toward an end nozzle in a nozzle row, as in the example disclosed in JP2016-107603A or the example shown in FIG. 15, by employing a simple method for lowering the nozzle jetting rate from the central nozzle toward the end nozzle in the nozzle row at a constant inclination, that is, one kind of inclination, it is possible to set the average jetting rate per unit area to be uniform as shown in FIG. 17.

However, in this case, since the nozzle jetting rate at the central nozzle becomes large and recording of the central nozzle in a raster that is recorded by the central nozzle becomes dominant, in a case where malfunction or landing deviation occurs in the central nozzle, a streak becomes noticeable. Further, since the amount of ink jetted from the central nozzle increases, bleeding easily occurs.

In addition, since there is an upper limit in a duty capable of performing recording recorded while generally maintaining a profile shape of the nozzle jetting rate of each nozzle, there is also a risk that it is not possible to perform printing with a sufficient density. For example, in a case of the profile shape of the nozzle jetting rate shown in FIG. 15, it is possible to perform recording only up to a duty of 63%. In other words, in a case where the recording is performed at the duty of 63%, the jetting rate at the central nozzle becomes 100%.

Here, the banding may be sufficiently controlled even in a case where the width of an inclination-reduced section where the nozzle jetting rate is lowered from the central nozzle toward the end nozzle in the nozzle row is made to be narrower than that in the example disclosed in JP2016-107603A, or that in the example of FIG. 15, for example.

Accordingly, from the point of view of reduction of the streak or bleeding and high duty recording, as shown in the example of FIG. 1, it is particularly preferable to reduce the occurrence of the streak or bleeding and perform recording up to a high duty by making an inclination steep by narrowing the width of the inclination-reducing section as much as possible and making the inclination zero or smooth in the vicinity of the central nozzle so that the nozzle jetting rate does not become excessively large.

In the case of the example ("FIG. 8" disclosed in JP2010-162770A") shown in FIG. 1, it is possible to perform recording up to a duty of 90% while maintaining the profile shape of the nozzle jetting rate. Here, since the jetting rate of the central nozzle is yet 70% in the case of a duty of 63%, the streak or bleeding does not become noticeable.

From the above-described point of view, in a range where the banding can be reduced, it is preferable to narrow the width of lowering of the nozzle jetting rate by making the inclination zero or smooth in the vicinity of the central nozzle as much as possible.

On the other hand, in a case where the nozzle jetting rate is lowered while changing the inclination from the central nozzle to the end nozzle, as described in problem 1, unless attention is paid to a lower side thereof, the average jetting rate per unit area in the jetting rate pattern shows a non-uniform distribution in the sub scan direction, which causes concentration unevenness.

<<Outline of Embodiments>>

In the present disclosure, a method for changing and reducing nozzle rates of respective nozzles that form a nozzle row from a central nozzle toward an end nozzle in the nozzle row, and designing the nozzle jetting rate of each nozzle so that the distribution of the average jetting rate per unit area becomes uniform will be described. Further, a method for creating a dither mask capable of controlling jetting of each nozzle to achieve the above-described nozzle jetting rate, and a half-tone processing method for performing a half-tone process using the created dither mask will be described.

<<Principle of Solution of Problem>>

Here, first, a basic method for designing a nozzle jetting rate of each nozzle to uniformize a distribution of an average jetting rate per unit area will be described.

Figure 18:
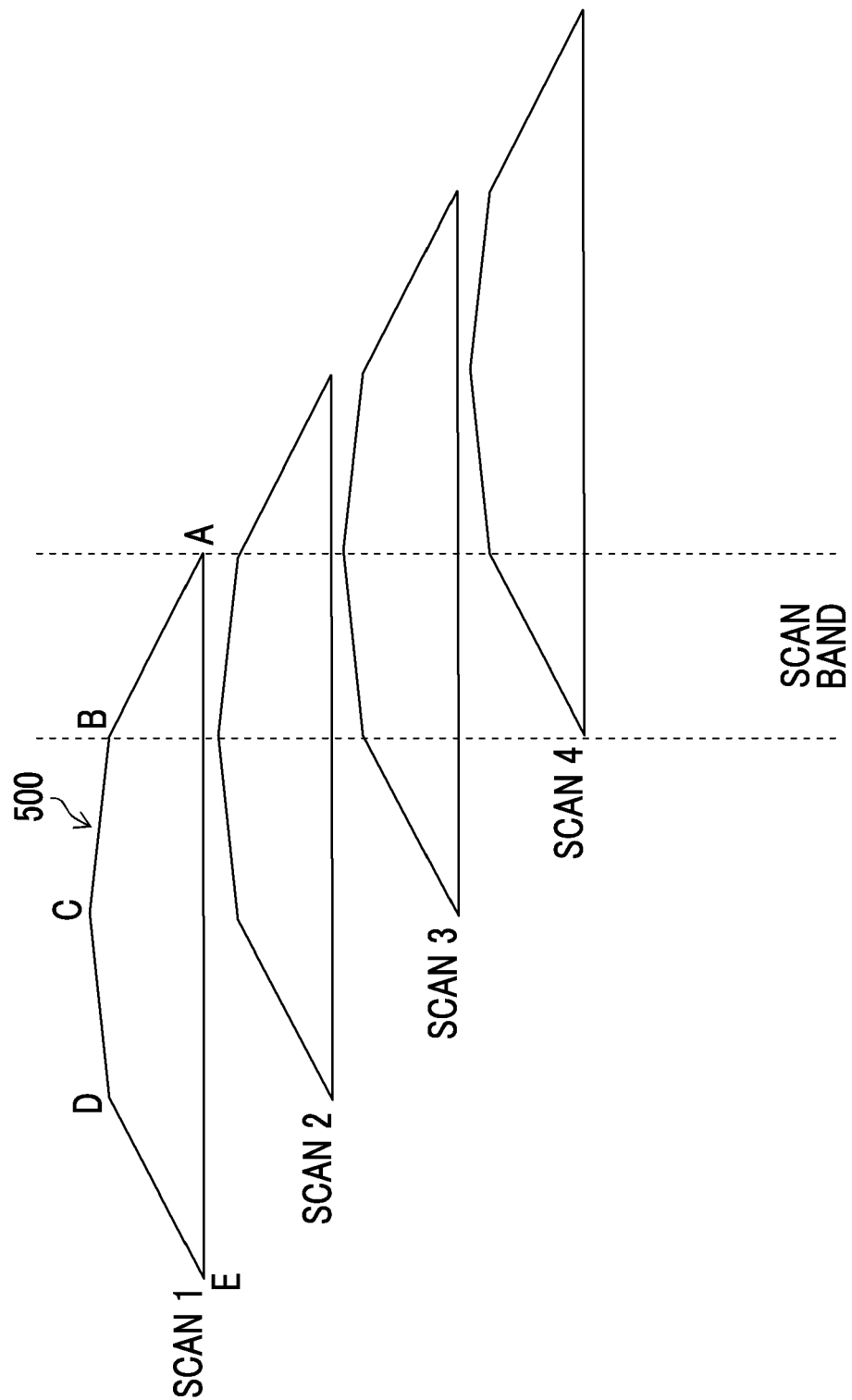
FIG. 18 is a diagram conceptually showing a positional relationship between nozzle jetting rates designed so that an inclination is lowered to vary from a smooth angle to a steep angle, from the central nozzle in the nozzle row toward each of both end nozzles, and each scan.

FIG. 18 is a diagram conceptually showing a positional relationship between nozzle jetting rates designed so that an inclination is lowered to vary from a smooth angle to a steep angle, from the central nozzle in the nozzle row toward each of both end nozzles, and each scan. In FIG. 18, an example of a scan method for performing recording of dots to fill a unit area through four scans from scan 1 to scan 4 is shown. A lateral direction in FIG. 18 is a sub scan direction. In FIG. 18, for ease of description, it is shown that a recording head is moved in the sub scan direction with respect to a stopped recording medium. That is, FIG. 18 shows an example in which a scan band is completely recorded through four scans, in which a state where the position of the nozzle row of the recording head is moved in a right direction of FIG. 18 is expressed by movement of the profile shape of the nozzle jetting rate, by relative movement of the recording head and the sheet due to paper feeding for each scan.

In FIG. 18, a shape 500 including a bending line ABCDE and a line segment EA schematically shows the nozzle jetting rate of each nozzle of the recording head in the nozzle row. The line segment EA represents the nozzle row. It can be understood that the respective nozzles are arranged along the line segment EA. One end of the line segment EA corresponds to a nozzle number "0" that is a minimum nozzle number, and the other end of the line segment EA corresponds to a nozzle number "Nmax" that is a maximum nozzle number. For example, an end nozzle on the left side (point E side) in FIG. 18, that is, an end nozzle on a downstream side in a paper feed direction in the nozzle row is set to the nozzle number "0", and an end nozzle on the right side (point A side) in FIG. 18, that is, an end nozzle on an upper stream side in the paper feed direction is set to the nozzle number "Nmax".

The bending line ABCDE represents the nozzle jetting rates of the respective nozzles, and a longitudinal direction in FIG. 18 corresponds to an axis indicating values of the nozzle jetting rates. In FIG. 18, the axis indicating the value of the nozzle jetting rate is not shown. The bending line ABCDE corresponds to a graph shape indicating a relationship between the position of each nozzle and the nozzle jetting rate. A point C shows the nozzle jetting rate of the central nozzle in the nozzle row. The bending line ABCDE is an example of a profile of the nozzle jetting rates in the nozzle row.

In FIG. 18, the nozzle jetting rate is lowered from the central nozzle toward each of both end nozzles, and its inclination is changed. An inclination of a line segment CB and an inclination of a line segment BA are different from each other. The inclination of the line segment CB close to the central nozzle is relatively smooth, and the inclination of the line segment BA close to the end nozzle is steeper than the inclination of the line segment CB. Similarly, an inclination of a line segment CD close to the central nozzle is relatively smooth, and an inclination of a line segment DE close to the end nozzle is steeper than the inclination of the line segment CD.

As described above, the serial-type ink jet printer repeats recording of dots with the width of a scan band that is equal to the paper feed amount by paper feeding in the sub scan direction and scan of the recording head in the main scan direction to perform image recording. Here, in FIG. 18, taking interest in a certain scan band, even in a case where nozzle jetting rates of nozzle groups used in recording in respective scans are not uniform, it can be understood that it is possible to uniformize sums of nozzle jetting rates of corresponding nozzles of respective groups for each scan used for completing recording of one scan band as long as a certain condition is satisfied. In a case where the sums of the jetting rates of the corresponding nozzles of the respective nozzle groups for each scan used for completing the recording with respect to each scan band become uniform, it is possible to uniformize an average jetting rate per unit area in a jetting rate pattern in the sub scan direction.

Uniformizing the sums of the nozzle jetting rates of the corresponding nozzles of the respective nozzle groups for each scan used for completing the recording with respect to each scan band will be briefly referred to as "uniformizing the sums of the nozzle jetting rates in the scan band".

<<Condition for Uniformizing Sums of Nozzle Jetting Rates in Scan Band>>

Figure 19:
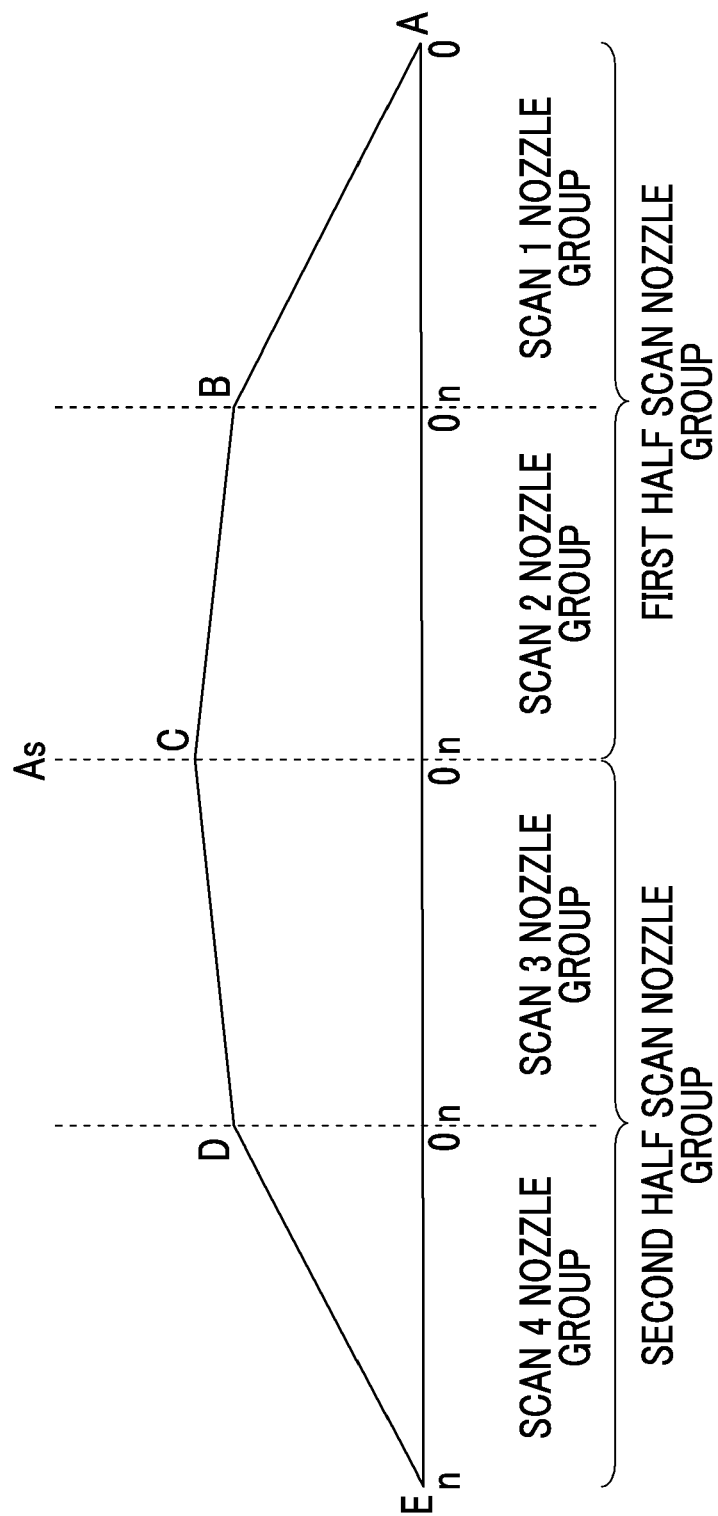
FIG. 19 is an enlarged view of a profile of the nozzle jetting rates shown in FIG. 18.

FIG. 19 is an enlarged view of a profile of the nozzle jetting rate shown in FIG. 18. In order to describe a condition capable of uniformizing the sums of the nozzle jetting rates in the scan band, as shown in FIG. 19, the respective nozzles in the nozzle row are divided into a plurality of nozzle groups along the width of the scan band. In the example shown in FIG. 19, the nozzle row is divided into four nozzle groups along the width of the scan band. In FIG. 19, in accordance with a scan order for recording the scan band, the nozzle groups are referred to as a scan 1 nozzle group, a scan 2 nozzle group, a scan 3 nozzle group, and a scan 4 nozzle group.

As understood from FIG. 18 and FIG. 19, in a case where the sums of the nozzle jetting rates in a case where the respective scan nozzle groups of the scan 1 nozzle group to the scan 4 nozzle group shown in FIG. 19 are shifted by the paper feed amount to overlap each other in accordance with the order for recording the same scan band are constant, it can be understood that it is possible to uniformize the average jetting rate per unit area.

Specifically, when nozzles for recording the same raster position are named as a nozzle 1, a nozzle 2, a nozzle 3, and a nozzle 4 in the scan 1 nozzle group, the scan 2 nozzle group, the scan 3 nozzle group, and the scan 4 nozzle group, in a case where a sum of "a nozzle jetting rate of the nozzle 1", "a nozzle jetting rate of the nozzle 2", "a nozzle jetting rate of the nozzle 3", and "a nozzle jetting rate of the nozzle 4" is constant regardless of raster positions or nozzle numbers, it can be understood that it is possible to uniformize an average jetting rate per unit area. The nozzle 1 is a nozzle that belongs to the scan 1 nozzle group, the nozzle 2 is a nozzle that belongs to the scan 2 nozzle group, the nozzle 3 is a nozzle that belongs to the scan 3 nozzle group, and the nozzle 4 is a nozzle that belongs to the scan 4 nozzle group.

Here, a pixel position recorded by each nozzle is exclusive, and thus, the same pixel is not recorded by different nozzles. Here, "recording the same raster position" means "recording the same unit region". The nozzles for recording the same raster position represents nozzles for recording a raster position that belongs to the same unit region. The unit region is the nozzle 1 to the nozzle 4.

In order to more specify the condition, the nozzle row is divided into a first half scan nozzle group and a second half scan nozzle group. In the example of FIG. 19, since one scan band is recorded by four scans, the scan 1 nozzle group and the scan 2 nozzle group that are respectively used in scan 1 and scan 2 that are the first half two scans among the four scans correspond to the "first half scan nozzle group".

Further, the scan 3 nozzle group and the scan 4 nozzle group that are respectively used in scan 3 and scan 4 that are the second half two scans among the four scans correspond to the "second half scan nozzle group".

Further, in the scan 1 nozzle group to the scan 4 nozzle group, the nozzles for recording the same raster position are referred to as "corresponding nozzles". The above-described nozzle 1, nozzle 2, nozzle 3, and nozzle 4 are the "corresponding nozzles".

Values of the sums of the nozzle jetting rates of the corresponding nozzles of the respective scan nozzle groups that belong to the first half scan nozzle group are referred to as "first half scan nozzle group jetting rates". Values of the sums of the nozzle jetting rates of the corresponding nozzles of the respective scan nozzle groups that belong to the second half scan nozzle group are referred to as "second half scan nozzle group jetting rates".

The first half scan nozzle group jetting rates and the second half scan nozzle group jetting rates are not constant, but in a case where the values of the sums of the first half scan nozzle group jetting rates and the second half scan nozzle group jetting rates become constant, it is possible to uniformize a distribution of an average jetting rate per unit area.

A relationship between jetting rates in a case where the sums of the nozzle jetting rates of the corresponding nozzles are constant in different nozzle groups is referred to as a "complementary relationship". That is, in a case where the first half scan nozzle group jetting rates and the second half scan nozzle group jetting rates are in the complementary relationship, it is possible to uniformize a distribution of an average jetting rate per unit area.

In the case of FIG. 19, it can be understood that one scan nozzle group that is in the complementary relationship with each of the scan nozzle groups that belong to the first half scan nozzle group is present at a symmetrical position of the second half scan nozzle group. Here, the "symmetrical position" represents a positional relationship in which positions of the scan nozzle groups are symmetrical with a central nozzle being interposed therebetween. Further, the profile of the nozzle jetting rates shown in FIG. 19 has a line symmetrical shape (bilateral symmetry in FIG. 19) with respect to a symmetrical axis As centering around the central nozzle in the nozzle row. In the case of FIG. 19, the scan 4 nozzle group disposed at a position that is symmetrical to the scan 1 nozzle group is in the complementary relationship with the scan 1 nozzle group. Further, the scan 3 nozzle group disposed at a position that is symmetrical to the scan 2 nozzle group is in the complementary relationship with the scan 2 nozzle group.

A case where one scan nozzle group that belongs to the first half scan nozzle group and one scan nozzle group that belongs to the second half scan nozzle group are in the complementary relationship one-to-one is expressed as a "one-to-one complementary relationship" or a "complementary relationship is one-to-one". Further, a case where the scan nozzle groups that are complementary to each other are symmetrical to each other with a central nozzle being interposed therebetween is expressed as a "symmetrical complementary relationship" or the "complementary relationship is symmetrical". FIG. 19 is a diagram showing a case where the complementary relationship is one-to-one and symmetrical.

Establishment of the complementary relationship does not need a one-to-one and symmetrical relationship. For example, there may be a case where the complementary relationship is a one-to-one relationship but is an asymmetrical relationship. Further, there may be a one-to-plural complementary relationship in which one scan nozzle group and a plurality of scan nozzle groups are in a complementary relationship, or a plural-to-plural complementary relationship in which a plurality of scan nozzle groups and a plurality of scan nozzle groups are in a complementary relationship.

<<Generalization of Condition Capable of Uniformizing Sums of Nozzle Jetting Rates in Scan Band>>

In FIGS. 18 and 19, an example in which each scan band is recorded by four scans is shown. From the point of enlarged view, let's assume that each band is recorded by N scans. Here, it is assumed that N is an even number. A case where N is an odd number will be described later. N scans are written as scan 1, scan 2, . . . , and scan N, and nozzle groups that belong to the respective scans are named as a scan 1 nozzle group, a scan 2 nozzle group, . . . , and a scan N nozzle group, respectively. Further, it is assumed that the numbers of nozzles of the respective scan nozzle groups of scan 1 to scan N are identical to each other, and the number is (n+1).

A relative nozzle number j indicating a relative position of a nozzle in each scan nozzle group is given to the (n+1) nozzles of each scan nozzle group. The relative nozzle number j is a relative nozzle number defined in each scan nozzle group. Here, j may have an integer value in a range of 0 to n. In FIG. 19, "0" and "n" respectively represent a nozzle position of a relative nozzle number j=0 and a nozzle position of a relative nozzle number j=n, in each scan nozzle group of scan 1 to scan 4.

Using a scan number i indicating a scan order of N scans, and the relative nozzle number j, nozzle jetting rates of the relative nozzle number j in a scan i nozzle group are expressed as $t[i, j]$. That is, nozzle jetting rates of a scan 1 nozzle group are expressed as $t[1, 0], t[1, 1], \ldots,$ and $t[1, n]$. Similarly, nozzle jetting rates of a scan 2 nozzle group are expressed as $t[2, 0], t[2, 1], \ldots,$ and $t[2, n]$, nozzle jetting rates of a scan 3 nozzle group are expressed as $t[3, 0], t[3, 1], \ldots,$ and $t[3, n]$, and nozzle jetting rates of a scan N nozzle group are expressed as $t[N, 0], t[N, 1], \ldots,$ and $t[N, n]$. Here, it should be noted that a first scan is expressed as scan 1, but the first nozzle number in each scan group is given "0".

A jetting rate sum of the respective nozzles in the first half scan nozzle group is expressed as the following expression [1].

[Expression 1]

$$Tf[j] = \sum_{i=1}^{N/2} t[i,j] = t[1,j] + t[2,j] + \ldots t[N/2,j] \quad [1]$$

In the expression, i represents a scan number, j represents a relative nozzle number, t[i, j] represents a nozzle jetting rate in the case of a scan i and a relative nozzle number j, and Tf[j] represents a nozzle jetting rate sum of the relative nozzle number j of the first half scan nozzle group. Here, j is an integer in a range of 0 to n.

Expression [1] means calculation of a sum of jetting rates with respect to the respective relative nozzle numbers j of the relative nozzle number j=0 to n in each scan i that belongs to the first half scan. Tf[j] obtained by the Expression [1] shows a non-uniform distribution in which the jetting rate increases from an end nozzle (j=0) to a central nozzle (j=n). The Tf[j] calculated from Expression [1] is a first half scan nozzle group jetting rate, which corresponds to a "first half jetting rate sum".

Similarly, a jetting rate sum of the respective nozzles in the second half scan nozzle group is expressed as the following expression [2].

[Expression 2]

$$Tl[j] = \sum_{i=(N/2)+1}^{N} t[i,j] = t[(N/2)+1,j] + t[(N/2)+2,j] + \ldots t[N,j] \quad [2]$$

Expression [2] means calculation of a sum of jetting rates with respect to the respective relative nozzle numbers j of the relative nozzle numbers 0 to n in each scan that belongs to the second half scan. In the expression, i, j, and t[i, j] are identical to those in Expression [1]. Tl[j] represents a nozzle jetting rate sum n of the relative nozzle numbers j of the second half scan nozzle group. The Tl[j] calculated by the expression [2] shows a non-uniform distribution in which the jetting rate decreases from a central nozzle (j=0) to an end nozzle (j=n) of the second half scan nozzle group. The Tl[j] calculated from the expression [2] is a second half scan nozzle group jetting rate, which corresponds to a "second half jetting rate sum".

Further, from Tf[j] calculated from Expression[1] and Tl[j] calculated from Expression [2], the jetting rate sum of all the scans is expressed as the following expression [3].

[Expression 3]

$$T[j]=Tf[j]+Tl[j] \quad [3]$$

In a case where T[j] given by Expression [3] becomes constant in the range of j=0 to n regardless of the relative nozzle number j, it is possible to uniformize a distribution in the sub scan direction, of an average jetting rate in unit area in a jetting rate pattern. That is, in a case where Tf[j] and Tl[j] are designed so that T[j] in Expression [3] becomes uniform regardless of the relative nozzle number j, it is possible to uniformize the average jetting rate in unit area. Here, design of Tf[j] means design of t[1, j], t[2, j], . . . , and t[N/2, j]. Further, design of Tl[j] means t[(N/2)+1, j], t[(N/2)+2, j], . . . , and t[N, j].

The example shown in FIG. 19 corresponds to a case where N in Expression [1] and Expression [2] is 4. Nozzles indicated by the same relative nozzle number j are the "corresponding nozzles". That is, respective nozzles for which the sum in Expression [1] and Expression [2] is to be taken are the "corresponding nozzles". Further, in a case where T[j] in Expression [3] is constant regardless of the relative nozzle number j, the first half scan nozzle group of which the jetting rates are given as Tf[j] in Expression [3], and the second half scan nozzle group of which the jetting rates are given as Tl[j] are in the complementary relationship.

In the case of the example shown in FIG. 19, a sum of jetting rates t[1, 0] to t[1, n] of the scan 1 nozzle group and a sum of jetting rates t[4, 0] to t[4, n] of the scan 4 nozzle group are constant in the range of the relative nozzle number j=0 to n, and the jetting rates of the scan 1 nozzle group and the jetting rates of the scan 4 nozzle group are in the complementary relationship. Further, similarly, a sum of jetting rates t[2, 0] to t[2, n] of the scan 2 nozzle group and a sum of jetting rates t[3, 0] to t[3, n] of the scan 3 nozzle group are constant in the range of the relative nozzle number j=0 to n, and the jetting rates of the scan 2 nozzle group and the jetting rates of the scan 3 nozzle group are in the complementary relationship.

This is expressed as follows.

[Expression 4]

$$T1=t[1,j]+t[4,j] \quad [4]$$

$$T2=t[2,j]+t[3,j]$$

In the above expression, T1 represents a sum of the jetting rates of the scan 1 nozzle group and the jetting rates of the scan 4 nozzle group, which is represented as a constant. T2 represents a sum of the jetting rates of the scan 2 nozzle group and the jetting rates of the scan 3 nozzle group, which is represented as a constant.

In the example shown in FIG. 19, an inclination is changed only in a branch of the respective scan nozzle groups of scan 1 to scan 4, and the inclination is constant inside each scan nozzle group. The "branch of scan nozzle group" refers to a boundary portion for subdivision of the respective scan nozzle groups in the nozzle row. In FIG. 19, a branch of the scan 1 nozzle group and the scan 2 nozzle group is a position corresponding to a point B. A branch of the scan 3 nozzle group and the scan 4 nozzle group is a position corresponding to a point D. Accordingly, in the case of FIG. 19, the jetting rate of each scan nozzle group may be expressed as the following expression.

[Expression 5]

$$t[1,j]=A1 \times j-t[1,0] \quad [5]$$

$$t[2,j]=A2 \times j-t[2,0]$$

$$t[3,j]=-A2 \times j-t[3,0]$$

$$t[4,j]=-A1 \times j-t[4,0]$$

In the expression, A1 represents an inclination of the jetting rates of the scan 1 nozzle group. A2 represents an inclination of the jetting rates of the scan 2 nozzle group. It can be easily understood from Expression [4] that an inclination of the jetting rates of the scan 3 nozzle group becomes "−A2" and an inclination of the jetting rates of the scan 4 nozzle group becomes "−A1".

In Expression [5], values of t[1, 0], t[2, 0], t[3, 0], and t[4, 0] may be discretionally designed, but in order to reduce banding, it is preferable that t[1, 0] has a small value (for example, zero) as much as possible, and in order to prevent occurrence of a density level difference in a boundary between respective scan bands, it is preferable that t[2, 0] is a consecutive value close to t[1, n], t[3, 0] is a consecutive value close to t[2, n], and t[4, 0] is a consecutive value close to t[3, n].

<<Another Design Example of Nozzle Jetting Rate>>

FIGS. 20 to 30 show variations of design examples of nozzle jetting rates in which the first half scan nozzle group jetting rates and the second half scan nozzle group jetting rates are in the complementary relationship. Instead of the design example of the nozzle jetting rates shown in FIG. 19, the nozzle jetting rates as shown in FIGS. 20 to 30 may be employed.

<Design Example 1>

Figure 20:
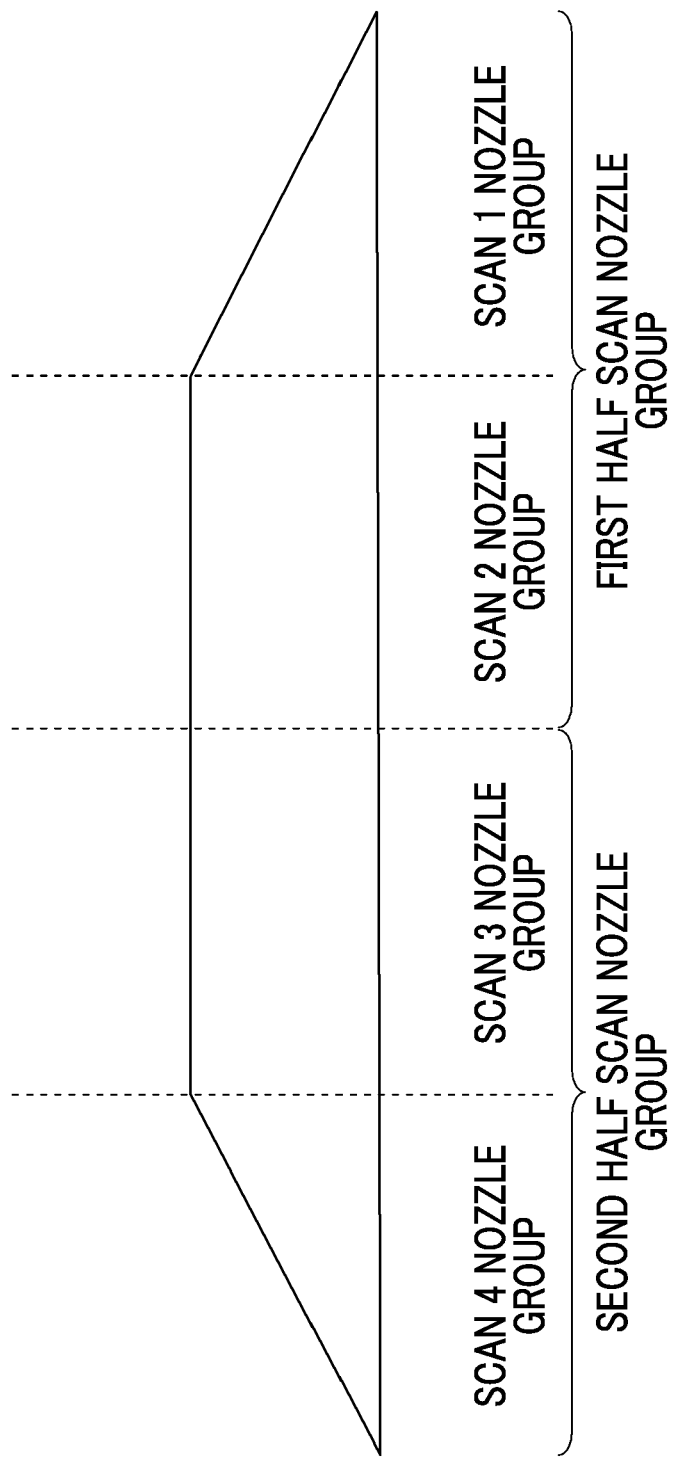
FIG. 20 is a diagram showing another design example 1 of nozzle jetting rates in which first half scan nozzle group jetting rates and second half scan nozzle group jetting rates are in a complementary relationship.

FIG. 20 is a diagram showing another design example 1 of nozzle jetting rates in which the first half scan nozzle group jetting rates and the second half scan nozzle group jetting rates are in the complementary relationship. A profile of the nozzle jetting rates shown in FIG. 20 is an example in which the respective scan nozzle groups of the first half scan nozzle group and the second half scan nozzle group are in the complementary relationship and the scan nozzle groups in the complementary relationship are at symmetrical positions. FIG. 20 shows an example in which an inclination is changed only at a branch of the respective scan nozzle groups from the central nozzle toward the end nozzle, with respect to the first half scan nozzle group and the second half scan nozzle group.

In FIG. 20, an example in which the inclination of the jetting rates of the scan 2 nozzle group is zero and the inclination of the jetting rate of the scan 3 nozzle group is zero is shown.

<Design Example 2>

Figure 21:
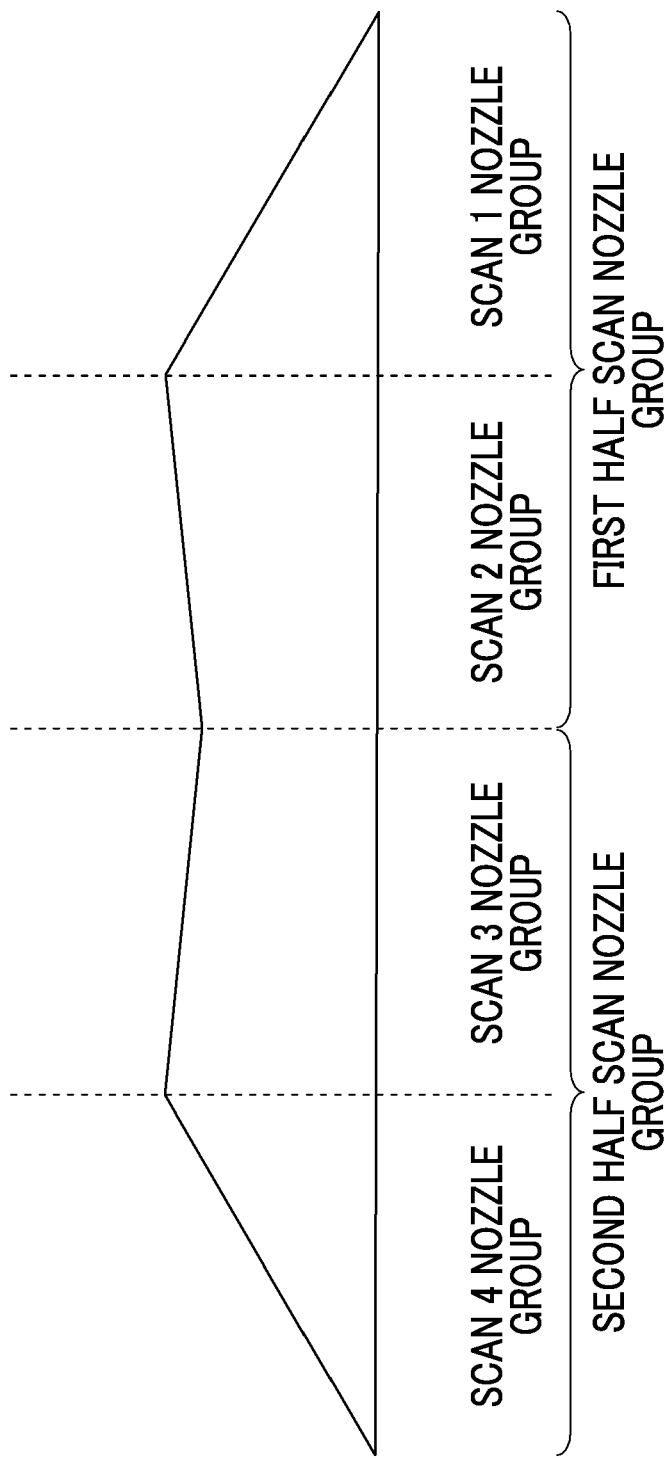
FIG. 21 is a diagram showing another design example 2 of nozzle jetting rates in which first half scan nozzle group jetting rates and second half scan nozzle group jetting rates are in a complementary relationship.

FIG. 21 is a diagram showing another design example 2 of nozzle jetting rates in which the first half scan nozzle group jetting rates and the second half scan nozzle group jetting rates are in the complementary relationship. A profile of the nozzle jetting rates shown in FIG. 21 is an example in which the respective scan nozzle groups of the first half scan nozzle group and the second half scan nozzle group are in the complementary relationship and the scan nozzle groups in the complementary relationship are at symmetrical positions. FIG. 21 shows an example in which an inclination is changed only at a branch of the respective scan nozzle groups from the central nozzle toward the end nozzle, with respect to the first half scan nozzle group and the second half scan nozzle group.

In FIG. 21, the nozzle jetting rate of the central nozzle is set to a value that is slightly lower than the nozzle jetting rate shown in FIG. 20. The nozzle jetting rate of the central nozzle should not be necessarily a maximum.

<Design Example 3>

Figure 22:
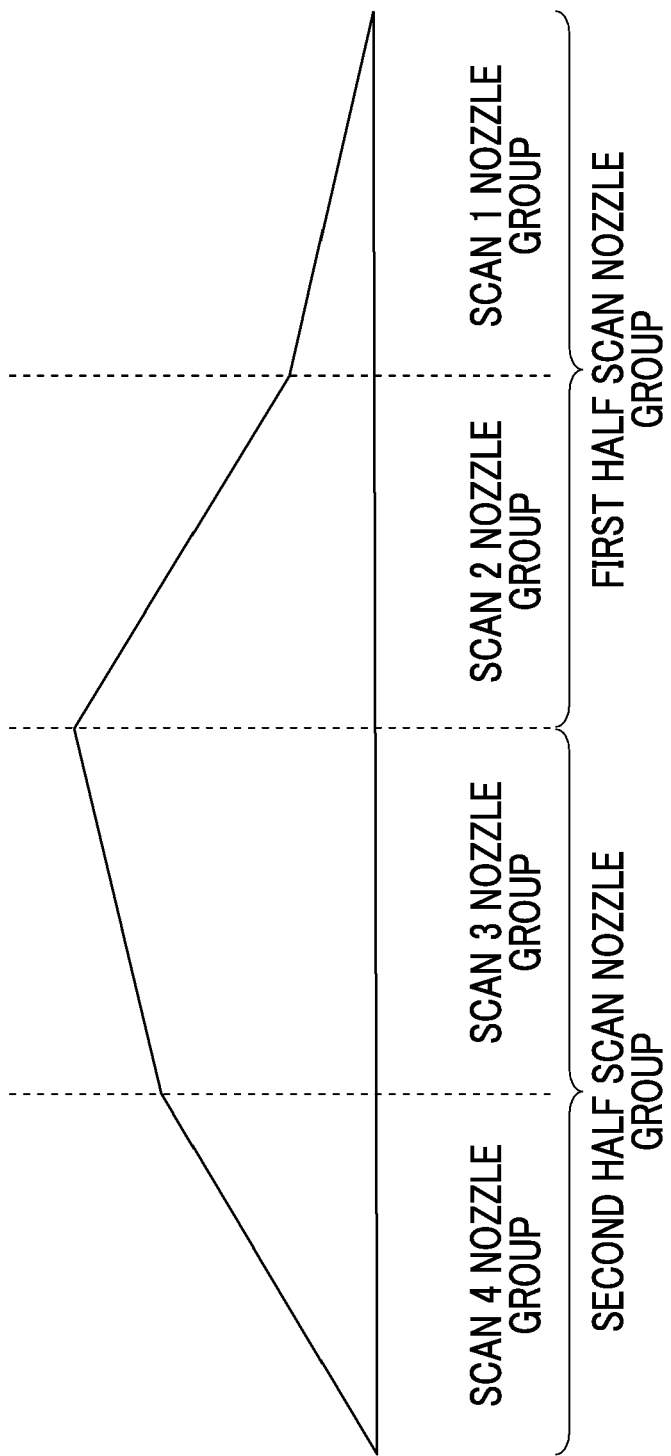
FIG. 22 is a diagram showing another design example 3 of nozzle jetting rates in which first half scan nozzle group jetting rates and second half scan nozzle group jetting rates are in a complementary relationship.

FIG. 22 is a diagram showing another design example 3 of nozzle jetting rates in which the first half scan nozzle group jetting rates and the second half scan nozzle group jetting rates are in the complementary relationship. A profile of the nozzle jetting rates shown in FIG. 22 is an example in which the complementary relationship is one-to-one but not symmetric. In the case of FIG. 22, the scan 1 nozzle group and the scan 3 nozzle group are in the complementary relationship, and the scan 2 nozzle group and the scan 4 nozzle group are in the complementary relationship.

That is, in the case of FIG. 22, the scan 1 nozzle group and the scan 3 nozzle group are in the complementary relationship in which sums of jetting rates t[1, 0] to t[1, n] of the scan 1 nozzle group and jetting rates t[3, 0] to t[3, n] of the scan 3 nozzle group are constant in the range of the relative nozzle number j=0 to n.

Further, similarly, the scan 2 nozzle group and the scan 4 nozzle group are in the complementary relationship in which sums of jetting rates t[2, 0] to t[2, n] of the scan 2 nozzle group and jetting rates t[4, 0] to t[4, n] of the scan 4 nozzle group are constant in the range of the relative nozzle number j=0 to n.

This is expressed as the following expression [6].

[Expression 6]

$$T1 = t[1,j] + t[3,j] \quad [6]$$

$$T2 = t[2,j] + t[4,j]$$

In FIG. 22, since the inclination is uniform inside the respective scan nozzle groups of scan 1 to scan 4, the jetting rates of each scan nozzle group may be also expressed as the following expression [7].

[Expression 7]

$$t[1,j] = A1 \times j - t[1,0] \quad [7]$$

$$t[2,j] = A2 \times j - t[2,0]$$

$$t[3,j] = -A1 \times j - t[3,0]$$

$$t[4,j] = -A2 \times j - t[4,0]$$

<Design example 4>

Figure 23:
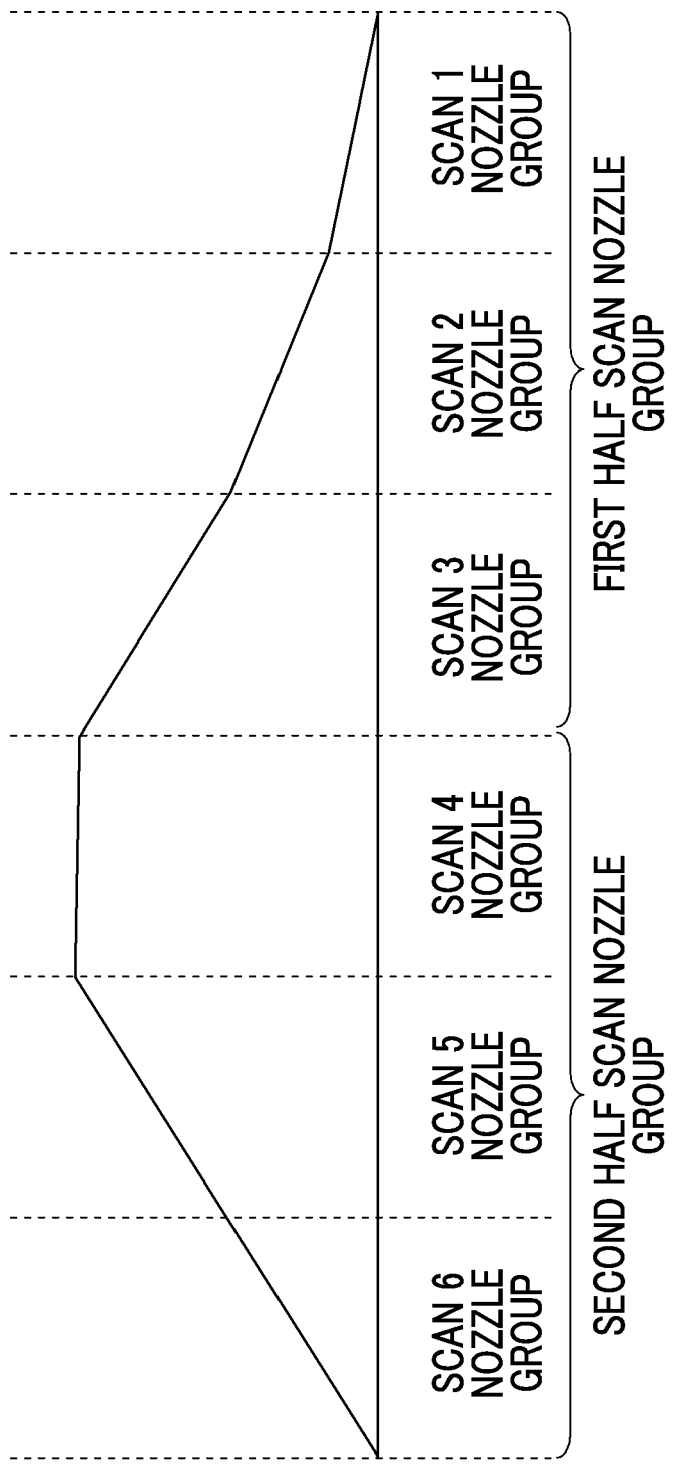
FIG. 23 is a diagram showing another design example 4 of nozzle jetting rates in which first half scan nozzle group jetting rates and second half scan nozzle group jetting rates are in a complementary relationship.

FIG. 23 is a diagram showing another design example 4 of nozzle jetting rates in which the first half scan nozzle group jetting rates and the second half scan nozzle group jetting rates are in the complementary relationship. A profile of the nozzle jetting rates shown in FIG. 23 shows an example in which N is 6, and includes a one-to-two complementary relationship. In the case of FIG. 23, jetting rates that are sums of jetting rates of the scan 1 nozzle group and the scan 2 nozzle group are in the complementary relationship with jetting rates of a scan 6 nozzle group, and the scan 3 nozzle group and a scan 5 nozzle group are in the complementary relationship.

This is expressed as the following expression [8].

[Expression 8]

$$T1 = t[1,j] + t[2,j] + t[6,j] \quad [8]$$

$$T3 = t[3,j] + t[5,j]$$

$$T4 = t[4,j]$$

Further, the jetting rates of each scan nozzle group may be expressed as the following expression [9].

[Expression 9]

$$t[1,j] = A1 \times j - t[1,0] \quad [9]$$

$$t[2,j] = A2 \times j - t[2,0]$$

$$t[3,j] = A3 \times j - t[3,0]$$

$$t[4,j] = t[4,0]$$

$$t[5,j] = -A3 \times j - t[5,0]$$

$$t[6,j] = -(A1 - A2) \times j - t[6,0]$$

In the expression, A3 represents an inclination of the jetting rates of the scan 3 nozzle group. In FIG. 23, an inclination of the jetting rates of the scan 4 nozzle group is zero.

<Discretional Features of Combination in which Complementary Relationship is Established>

FIGS. 19 to 22 show an example in which the complementary relationship of the respective scan nozzle groups of the first half scan nozzle group and the second half scan nozzle group is one-to-one, and FIG. 23 shows an example in which the complementary relationship is one-to-two. In addition, the complementary relationship may be established by a discretional combination of the scan nozzle groups, such as one-to-three, one-to-four, . . . , two-to-two, two-to-three, . . . , and so on. Further, there may be an example in which the first half scan nozzle group and the second half scan nozzle group are in the complementary relationship and T[j] in Expression [3] is constant regardless of the relative nozzle number j, but the complementary relationship is not established by any combination of the respective scan nozzle groups that belong to the first half scan nozzle group and respective scan nozzle groups that belong to the second half scan nozzle group. For example, there is a case where only a jetting rate sum of the first half scan nozzle group and a jetting rate sum of the second half scan nozzle group are in the complementary relationship.

Further, in the examples shown in FIGS. 19 to 23, the inclination is changed only at the branch of the respective scan nozzle groups, but the complementary relationship may be established even in a case where the inclination is changed inside each scan nozzle group.

Next, an example in which an inclination is changed inside at least one scan nozzle group among the respective scan nozzle groups will be described.

<Design Example 5>

Figure 24:
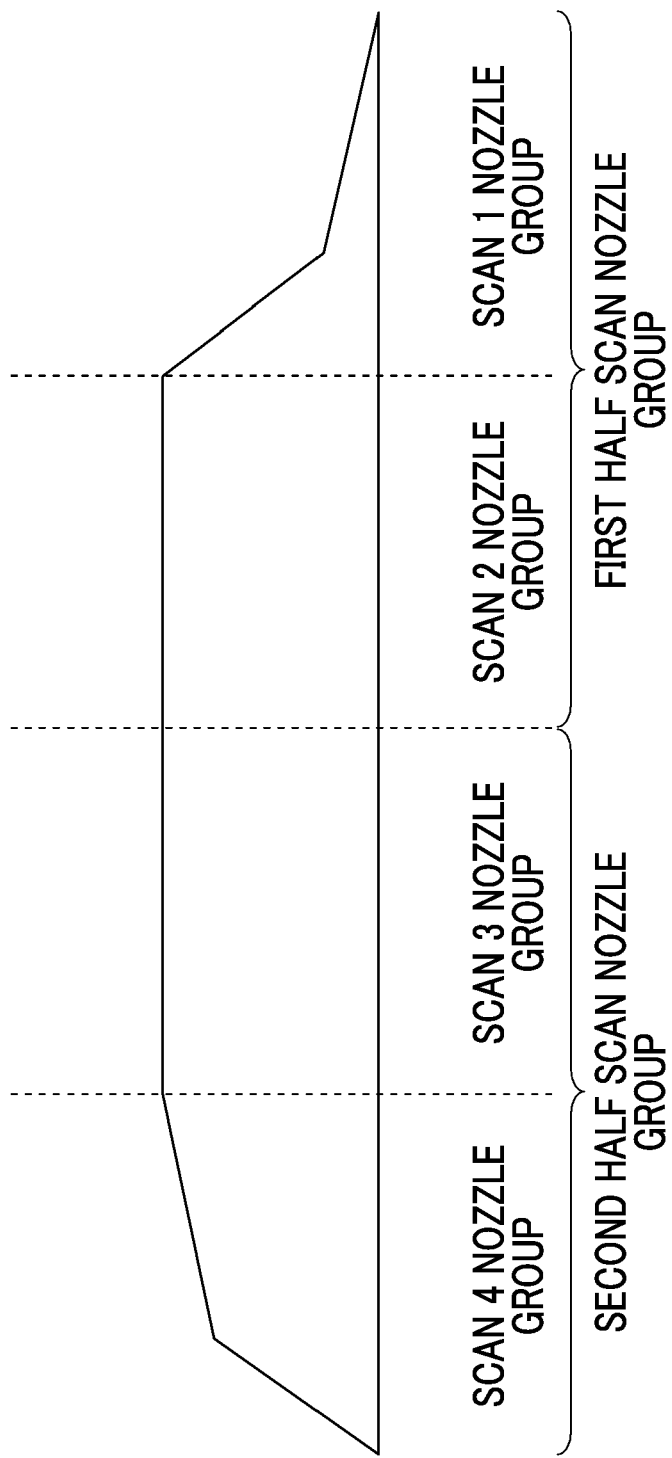
FIG. 24 is a diagram showing another design example 5 of nozzle jetting rates in which first half scan nozzle group jetting rates and second half scan nozzle group jetting rates are in a complementary relationship.

FIG. 24 is a diagram showing another design example 5 of nozzle jetting rates in which the first half scan nozzle group jetting rates and the second half scan nozzle group jetting rates are in the complementary relationship. In FIG. 24, the scan 1 nozzle group and the scan 4 nozzle group are in the complementary relationship even though the inclination is changed inside each scan nozzle group. Here, graph shapes of the jetting rates in the complementary relationship show a top and bottom symmetry, and should not necessarily be a bilateral symmetry.

Here, the top and bottom symmetry refers to a relationship that one graph shape may match the other graph shape in a case where the one graph shape is reversed in the vertical direction. The vertical direction in FIG. 24 is a longitudinal direction indicating a value of a jetting rate. Further, the bilateral symmetry refers to a relationship that one graph shape may match the other graph shape in a case where the one graph shape is reversed in the lateral direction. The lateral direction in FIG. 24 is a direction of a lateral axis indicating a position of a nozzle. Here, the "reverse" also includes reversing and shifting in the vertical direction and/or lateral direction.

In the case of FIG. 24, in a case where the graph shape of the jetting rates of the scan 1 nozzle group is reversed in the vertical direction, the graph shape matches the graph shape of the jetting rates of the scan 4 nozzle group.

In the case of FIG. 24, since the complementary relationship is symmetrical, the relationship of the jetting rates of the respective scan nozzle groups is expressed as Expression [4], in a similar way to FIG. 19. Further, in the case of FIG. 24, jetting rates t[2, j] of the scan 2 nozzle group are constant, and jetting rates t[3, j] of the scan 3 nozzle group are constant. Further, the jetting rates of each scan nozzle group may be expressed as the following expression [10].

[Expression 10]

$$t[1,j]=F1(j)-t[1,0]$$

$$t[2,j]=F2(j)-t[2,0]$$

$$t[3,j]=-F2(j)-t[3,0]$$

$$t[4,j]=-F1(j)-t[4,0]$$

[10]

In the expression, F1(j) is a function indicating a change of jetting rates of the scan 1 nozzle group due to the relative nozzle number j. F2(j) is a function indicating a change of jetting rates of the scan 2 nozzle group due to the relative nozzle number j. In a case where j is 0, F1(0)=F2(0)=0.

A change of jetting rates of the scan 3 nozzle group due to the relative nozzle number j is expressed as a function "−F2(j)" obtained by reversing F2(j). A change of jetting rates of the scan 4 nozzle group due to the relative nozzle number j is expressed as a function "−F1(j)" obtained by reversing F1(j).

<Design Example 6>

Figure 25:
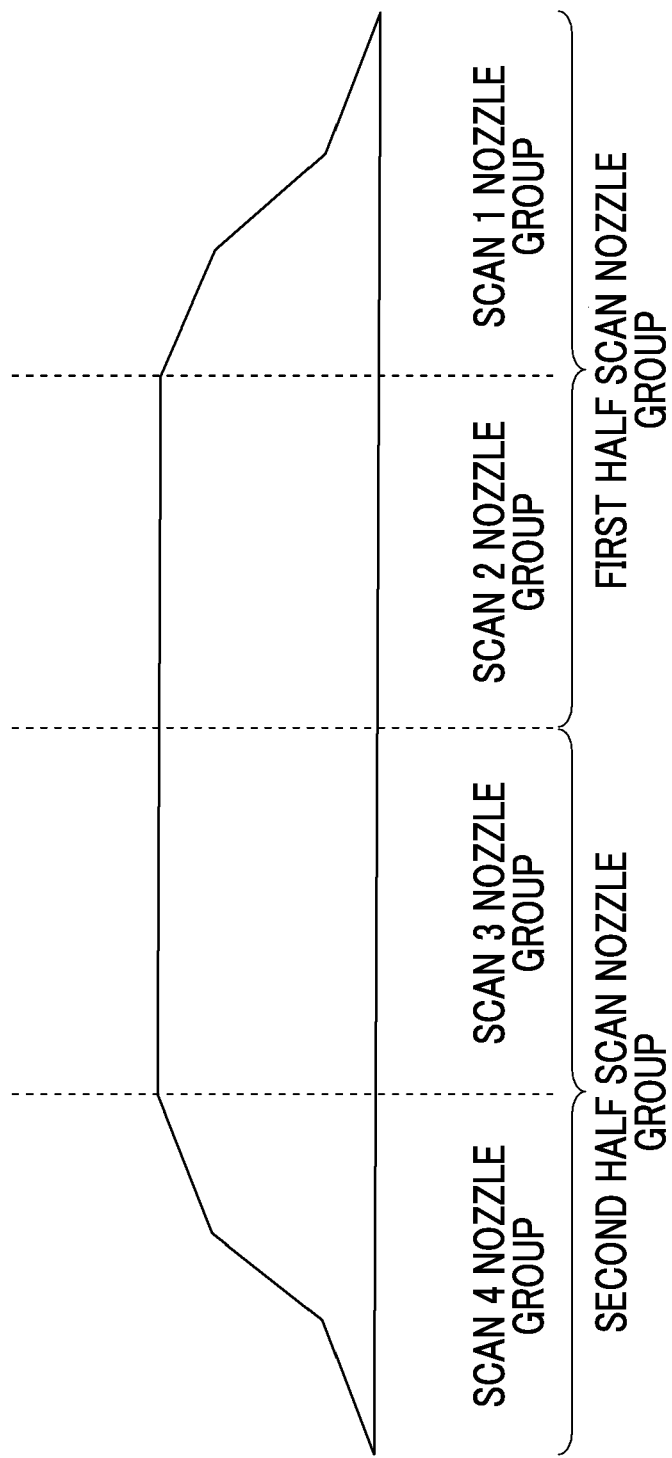
FIG. 25 is a diagram showing another design example 6 of nozzle jetting rates in which first half scan nozzle group jetting rates and second half scan nozzle group jetting rates are in a complementary relationship.

FIG. 25 is a diagram showing another design example 6 of nozzle jetting rates in which the first half scan nozzle group jetting rates and the second half scan nozzle group jetting rates are in the complementary relationship. In FIG. 25, the scan 1 nozzle group and the scan 4 nozzle group are in the complementary relationship even though an inclination is changed inside each scan nozzle group. FIG. 25 shows an example in which graph shapes of the jetting rates in the complementary relationship show a bilateral symmetry. Further, FIG. 25 shows an example in which the inclination is changed at a plurality of locations inside of each of the scan 1 nozzle group and the scan 4 nozzle group.

In the case of FIG. 25, since the complementary relationship is symmetrical, the relationship of the jetting rates of the respective scan nozzle groups is expressed as Expression [4], in a similar way to FIG. 19. Further, in the case of FIG. 25, jetting rates t[2, j] of the scan 2 nozzle group are constant, and jetting rates t[3, j] of the scan 3 nozzle group are constant. Further, the jetting rates of each scan nozzle group may be expressed as Expression [10].

<Design Example 7>

Figure 26:
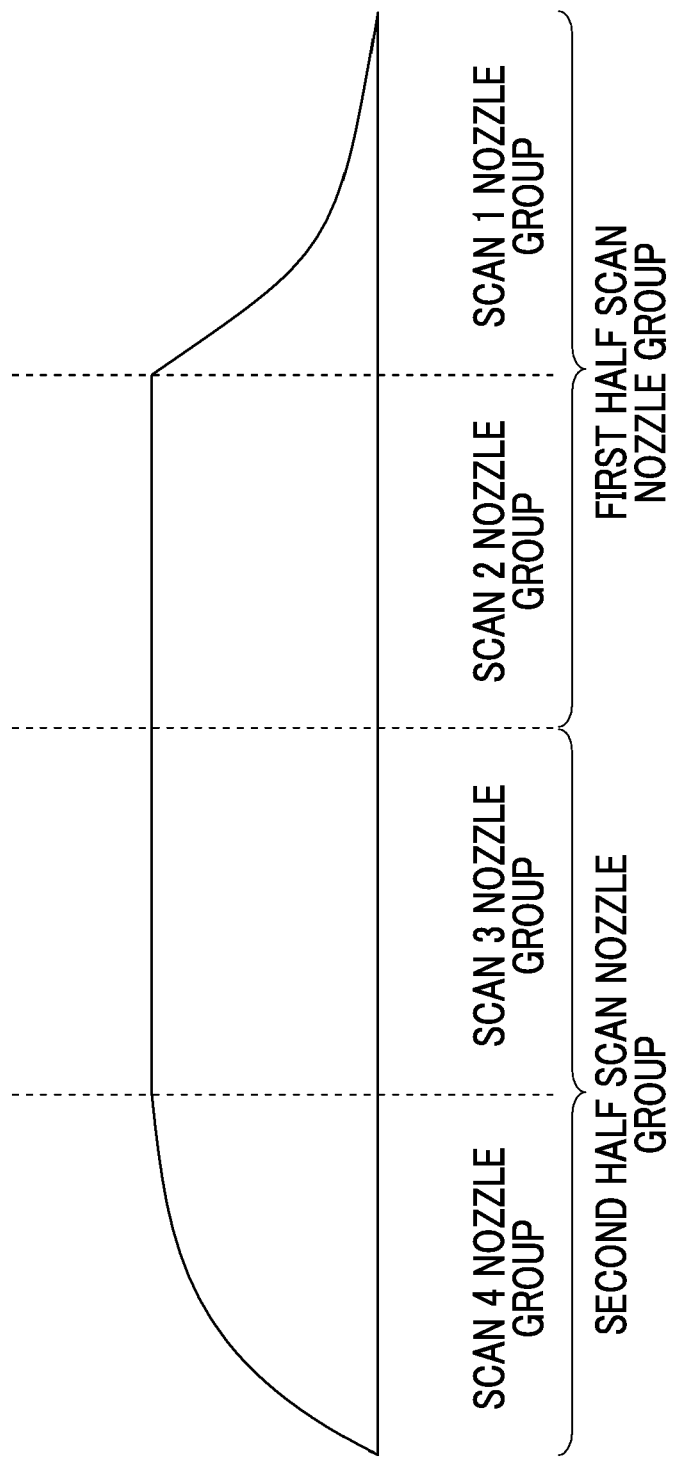
FIG. 26 is a diagram showing another design example 7 of nozzle jetting rates in which first half scan nozzle group jetting rates and second half scan nozzle group jetting rates are in a complementary relationship.

FIG. 26 is a diagram showing another design example 7 of nozzle jetting rates in which the first half scan nozzle group jetting rates and the second half scan nozzle group jetting rates are in the complementary relationship. In FIG. 26, the scan 1 nozzle group and the scan 4 nozzle group are in the complementary relationship even though the inclination is changed inside each scan nozzle group. FIG. 26 shows an example in which the inclination is consecutively changed inside each of the scan 1 nozzle group and the scan nozzle group 4. FIG. 26 shows an example in which graph shapes of the jetting rates in the complementary relationship are laterally asymmetric.

In the case of FIG. 26, since the complementary relationship is symmetrical, the relationship of the jetting rates of the respective scan nozzle groups is expressed as Expression [4], in a similar way to FIG. 19. Further, in the case of FIG. 26, jetting rates t[2, j] of the scan 2 nozzle group are constant, and jetting rates t[3, j] of the scan 3 nozzle group are constant. Further, the jetting rates of each scan nozzle group may be expressed as Expression [10].

<Design Example 8>

Figure 27:
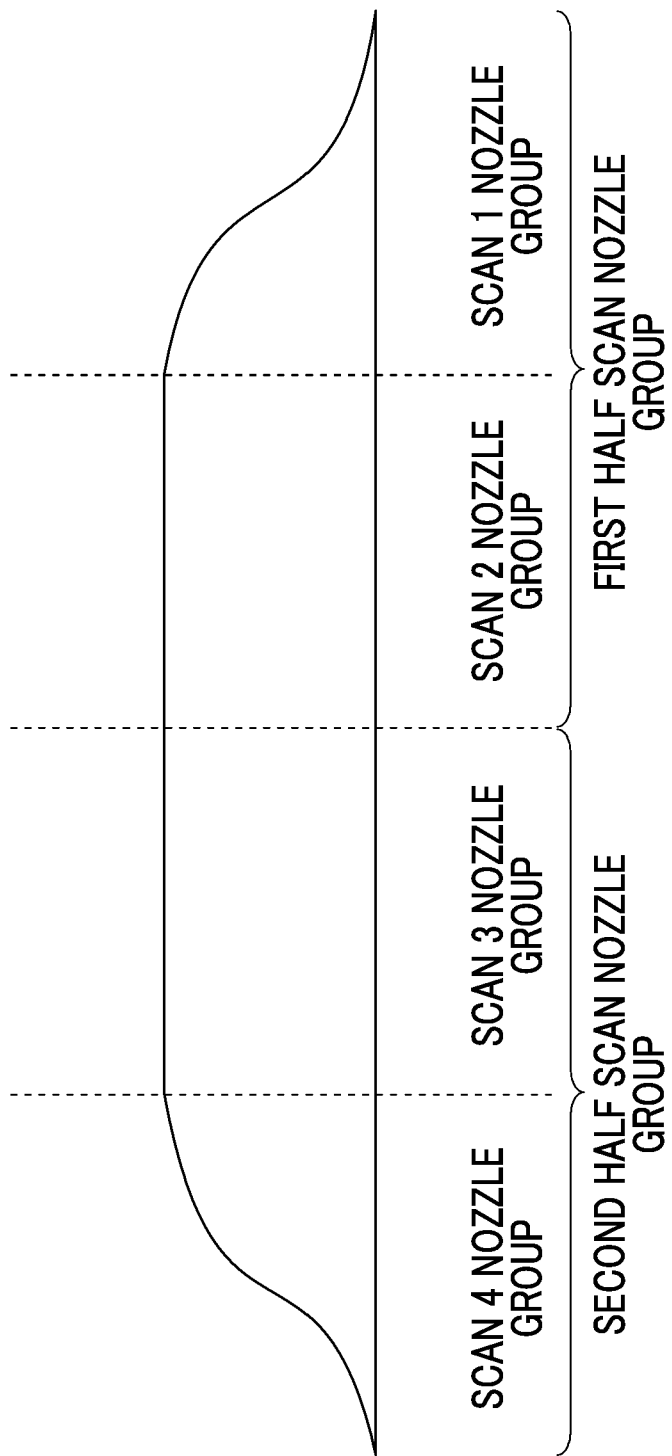
FIG. 27 is a diagram showing another design example 8 of nozzle jetting rates in which first half scan nozzle group jetting rates and second half scan nozzle group jetting rates are in a complementary relationship.

FIG. 27 is a diagram showing another design example 8 of nozzle jetting rates in which the first half scan nozzle group jetting rates and the second half scan nozzle group jetting rates are in the complementary relationship. In FIG. 27, the scan 1 nozzle group and the scan 4 nozzle group are in the complementary relationship even though the inclination is changed inside each scan nozzle group. FIG. 27 shows an example in which the inclination is consecutively changed inside each of the scan 1 nozzle group and the scan nozzle group 4. FIG. 27 shows an example in which graph shapes of the jetting rates in the complementary relationship are bilaterally symmetrical.

In the case of FIG. 27, the relationship of the jetting rates of the respective scan nozzle groups is expressed as Expression [4], in a similar way to FIG. 26. In the case of FIG. 27, jetting rates t[2, j] of the scan 2 nozzle group are constant, and jetting rates t[3, j] of the scan 3 nozzle group are constant. Further, the jetting rates of each scan nozzle group may be expressed as Expression [10].

<Design Example 9>

Figure 28:
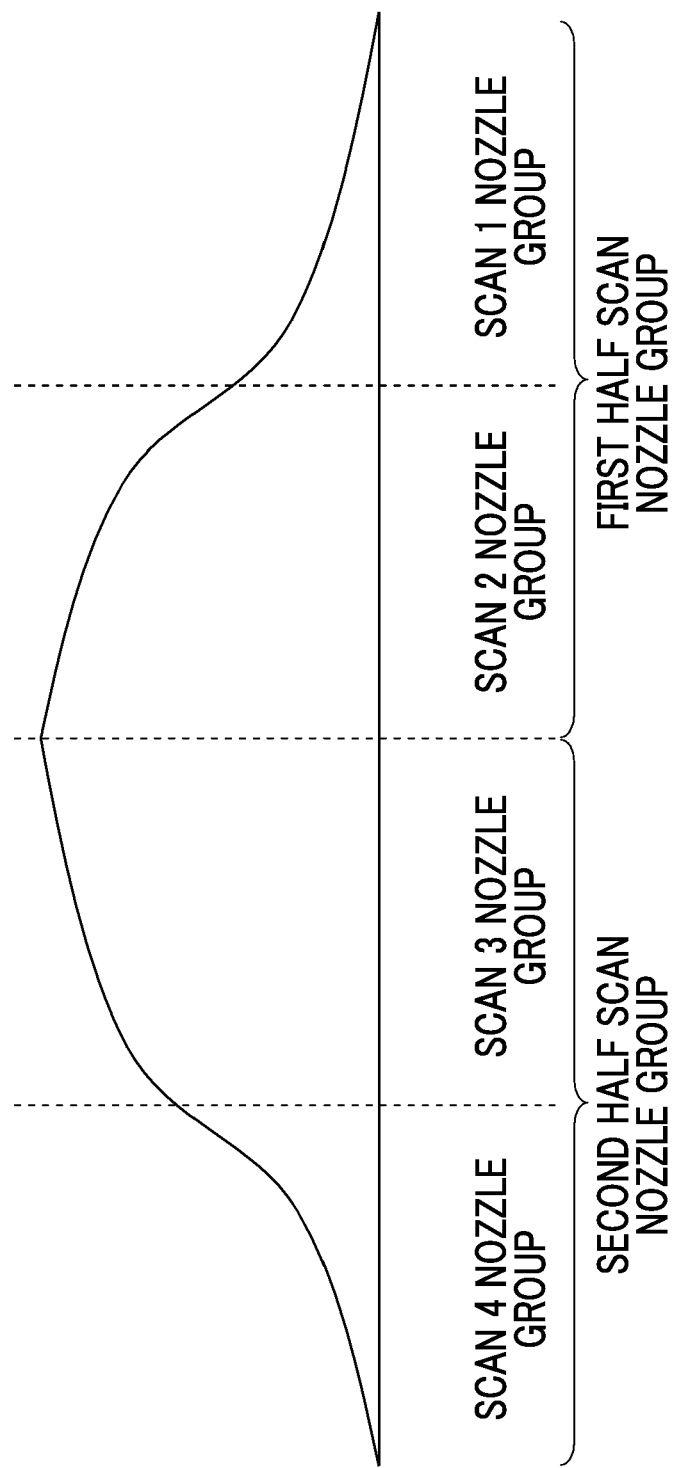
FIG. 28 is a diagram showing another design example 9 of nozzle jetting rates in which first half scan nozzle group jetting rates and second half scan nozzle group jetting rates are in a complementary relationship.

FIG. 28 is a diagram showing another design example 9 of nozzle jetting rates in which the first half scan nozzle group jetting rates and the second half scan nozzle group jetting rates are in the complementary relationship. FIG. 28 is a diagram showing an example in which the inclination is changed inside each of the scan 1 nozzle group and the scan nozzle group 4. FIG. 28 shows an example in which the inclination is consecutively changed inside each scan nozzle group. FIG. 28 shows that the scan 1 nozzle group and the scan 3 nozzle group are in the complementary relationship, and the scan 2 nozzle group and the scan 4 nozzle group are in the complementary relationship. FIG. 28 shows an example in which the scan nozzle groups in the complementary relationship are not at symmetrical positions, but graph shapes of the nozzle jetting are bilaterally symmetrical.

In the case of FIG. 28, the relationship of the jetting rates of the respective scan nozzle groups is expressed as Expression [6], in a similar way to FIG. 22. Further, in the case of FIG. 28, with respect to the jetting rates of the respective scan nozzle groups, instead of Expression [10], an expression in which t[4, j] and t[3, j] in Expression [10] are replaced with "−F1(j)" and "−F2(j)" is applied.

<Another Variation in which Complementary Relationship is Established>

Through the examples of FIG. 24 to FIG. 28, examples in which the inclination of the jetting rates inside the scan nozzle group is changed have been described. In any example shown in FIG. 24 to FIG. 28, the complementary relationship between the respective scan nozzle groups of the first half scan nozzle group and the second half scan nozzle group is one-to-one.

However, even in a case where the inclination of the jetting rates inside the respective scan nozzle groups is changed, the complementary relationship may be a discretional combination of the scan nozzle groups, for example, one-to-two, one-to-three, one-to-four, . . . , two-to-two, two-to-three, . . . , and so on, instead of the one-to-one relationship. Further, in a case where the inclination of the jetting rates is changed inside each scan nozzle group, similarly, there is a case where scans in the complementary relationship are not bilaterally symmetrical. There is also a case where the first half scan nozzle group and the second half scan nozzle group are in the complementary relationship but the complementary relationship is not established by any combination of the respective scan nozzle groups that belong to the first half scan nozzle group and the respective scan nozzle groups that belong to the second half scan nozzle group.

<<Case where N is Odd Number>>

In the above description, a case where N is an even number when each scan band is recorded by N scans has been described. Next, a case where N is an odd number will be described.

Figure 29:
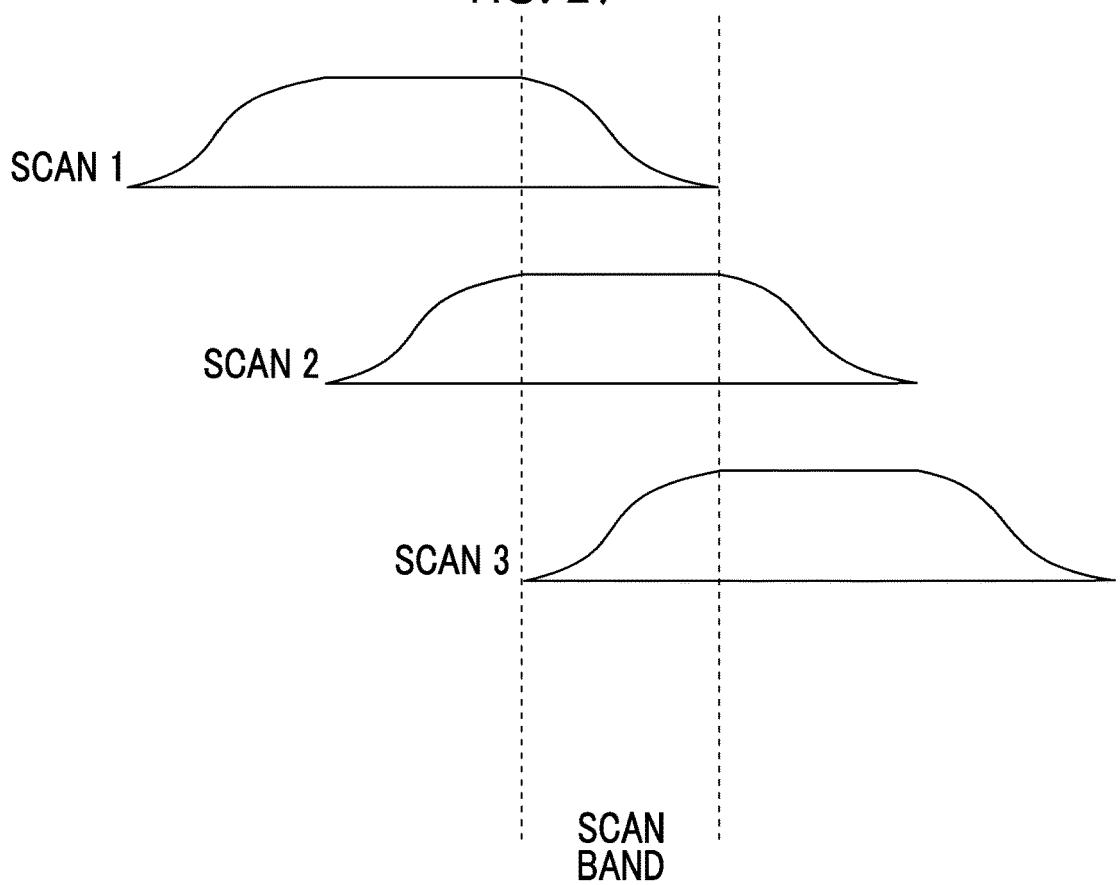
FIG. 29 is a diagram showing a positional relationship between respective scans in a case where the number of scans is N (=3) necessary for completing recording of a scan band.
Figure 30:
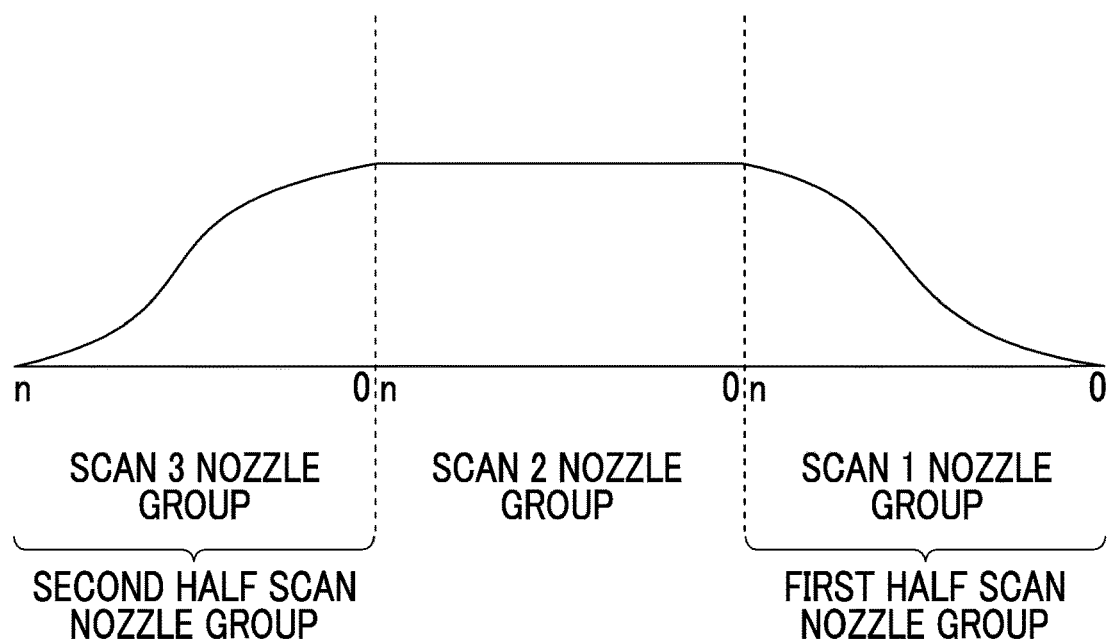
FIG. 30 is an enlarged view of a profile of nozzle jetting rates shown in FIG. 29.

FIG. 29 is a diagram showing a positional relationship between respective scans in a case where N is 3. FIG. 29 is an alternative view of FIG. 18. FIG. 30 is an enlarged view of a profile of nozzle jetting rates shown in FIG. 29. A notation rule in FIGS. 29 and 30 is similar to a notation rule in FIGS. 19 and 20.

In a case where N is 3, since there is no scan that is in the complementary relationship with scan 2, it can be understood that jetting rates should be constant with respect to the scan 2 nozzle group. Scan 1 corresponds to the first half scan, and scan 3 corresponds to the second half scan. In a case where scan nozzle groups of the respective scans of scan 1 and scan 3 are in the complementary relationship, it is possible to uniformize a distribution of an average jetting rate per unit area.

In a case where N is an odd number, a sum of jetting rates of the respective nozzles of the first half scan nozzle group is expressed as the following expression [11], instead of Expression [1].

[Expression 11]

$$Tf[j] = \sum_{i=1}^{INT(N/2)} t[i, j] = t[1, j] + t[2, j] + \ldots t[INT(N/2), j] \quad [11]$$

Further, a sum of jetting rates of the respective nozzles of the second half scan nozzle group is expressed as the following expression [12], instead of Expression [2].

[Expression 12]

$$Tl[j] = \sum_{i=INT(N/2)+2}^{N} t[i, j] = \\ t[INT(N/2)+2, j] + t[INT(N/2)+3, j] + \ldots t[N, j] \quad [12]$$

In a case where jetting rates T[j] of all scans calculated according to Expression [3] from the jetting rates Tf[j] of the first half scan nozzle group given by Expression [11] and the jetting rates Tl[j] of the second half scan nozzle group given by Expression [12] are constant in the range of the relative nozzle number j=0 to n regardless of the relative nozzle number j, it is possible to uniformize an average jetting rate per unit area.

In a case where N is an odd number, it is necessary to make jetting rates constant with respect to a middle nozzle group INT(N/2)+1 in the middle among scan 1 to scan N, but with respect to the other nozzle groups, the same method as that used in a case where N is an even number is used.

<<Example of Preferred Design of Nozzle Jetting Rates>>

In order to reduce banding, as in the examples of FIGS. 19 to 21, it is preferable to make an inclination of jetting rates constant in each scan nozzle group in the scan nozzle group.

This is because in a case where the inclination of the jetting rates is not constant in each scan nozzle group, there is a nozzle group of which an inclination is steep, and banding easily occurs in a region that is the nozzle group of which the inclination is steep.

However, as described in JP2009-184344A (paragraph [0030] or the like), in a case where bleeding and/or agglutination of ink easily occurs, there is a case where it is possible to suppress the bleeding and/or agglutination by suppressing the amount of ink for initial recording on a sheet as much as possible. Accordingly, preferably, there is a case where it is preferable to non-linearly change jetting rates in each scan nozzle group. In such a case, as in the examples shown in FIGS. 24 to 28, it is preferable to non-linearly change the jetting rates by suppressing jetting rates of the scan 1 nozzle group or jetting rates of a nozzle group disposed on an end side in the scan 1 nozzle group to become low. Further, in order to suppress the bleeding and/or agglutination of ink by lowering the jetting rates of the scan 1 nozzle group while maintaining a banding reducing effect by making an inclination of jetting rates constant in each scan nozzle group, a method for uniformizing jetting rates of the first half scan nozzle group and the second half scan nozzle group as in the example of FIG. 22 or FIG. 23 asymmetric to lower the jetting rates of the scan 1 nozzle group is also effective.

Compared with the example of FIG. 22 or FIG. 23, in the case of the examples of FIGS. 19 to 21, the inclination of the jetting rates of the scan 1 nozzle group is steep, and as a result, it is possible to effectively suppress occurrence of streak or bleeding in the vicinity of a central nozzle without excessively increasing a nozzle jetting rate in the vicinity of the central nozzle, and thus, it is possible to perform recording up to a high duty. On the other hand, in the case of the example of FIG. 22 or 23, it is possible to effectively to suppress bleeding and/or agglutination of ink as described in JP2009-184344A by suppressing the amount of ink for initial recording on a sheet.

<<Design of Nozzle Jetting Rates for Effectively Suppressing Bleeding and/or Agglutination of Ink Described in JP2009-184344A>>

In the examples shown in FIGS. 22 to 24, and FIG. 26, the graph shapes of the nozzle jetting rates are asymmetric, and Tf[j] that is the first half jetting rate sum is smaller than Tl[j] that is the second half jetting rate sum.

Further, in the examples shown in FIGS. 22 to 24, and FIG. 26, a value obtained by averaging jetting rates of respective nozzles of nozzle groups used for first scan recording in the first half scan is smaller than a value obtained by averaging nozzle jetting rates of respective nozzles of nozzle groups used for a final scan recording in the second half scan. For example, in the case of FIG. 22, an average value of the jetting rates of the respective nozzles that belong to the scan 1 nozzle group is smaller than an average value of the jetting rates of the respective nozzles that belong to the scan 4 nozzle group. This is similarly applied to the cases of FIGS. 23 to 24, and FIG. 26. Since the average value is obtained by dividing an integrated value that is a sum of data values by the number of pieces of data, a size relationship of average values is identical to a size relationship of integrated values.

In the examples shown in FIGS. 22 and 23, in comparing average values of inclinations of jetting rates with respect to nozzle groups for respective scans, used in plural times of recording of respective scans, an average value of inclinations of the scan 1 nozzle group used for the first scan recording in the first half scan is the minimum, except a scan nozzle group of a scan in which an average value of inclinations becomes zero.

In the examples shown in FIGS. 24 to 30, the nozzle jetting rates are changed at two or more kinds of inclinations inside the scan 1 nozzle group. With respect to the change of the inclinations, when an inclination from a front end nozzle inside the scan 1 nozzle group is referred to as a first inclination, with respect to a portion in which an inclination of the jetting rates is changed from the first inclination to a second inclination from the front end nozzle toward the first half side central nozzle, the first inclination is smaller than the second inclination.

By designing the nozzle jetting rates so as to satisfy the above-described conditions, it is possible to suppress the jetting rates of the first scan nozzle group, and thus, it is possible to suppress the amount of ink in the first scan for recording of each scan band. Thus, it is possible to suppress the bleeding and/or agglutination of ink as described in JP2009-184344A.

<<Specific Example of Design of Nozzle Jetting Rates for Uniformizing Distribution of Average Jetting Rate per Unit Area>>

Hereinbefore, a method for designing nozzle jetting rates for uniformizing a distribution of an average jetting rate per unit area has been conceptually described, with reference to FIGS. 18 to 30. Hereinafter, the method will be described using specific examples.

Here, a case where the number of nozzles in a recording head is 30, a nozzle pitch in the nozzle row is "2", a paper feed amount is "15", and the number of overlaps in a main scan direction is "2" will be described as an example.

FIG. 31 is a diagram for illustrating a state where a nozzle row of a recording head in which the number of nozzles is 30 and a nozzle pitch is "2" is symbolized. In FIG. 31, the nozzle row is divided into cells in a pixel unit, and numbers 0 to 29 indicating nozzle numbers are written in the cells. Positions of the cells with the nozzle numbers represent positions of the nozzles.

Figure 32:
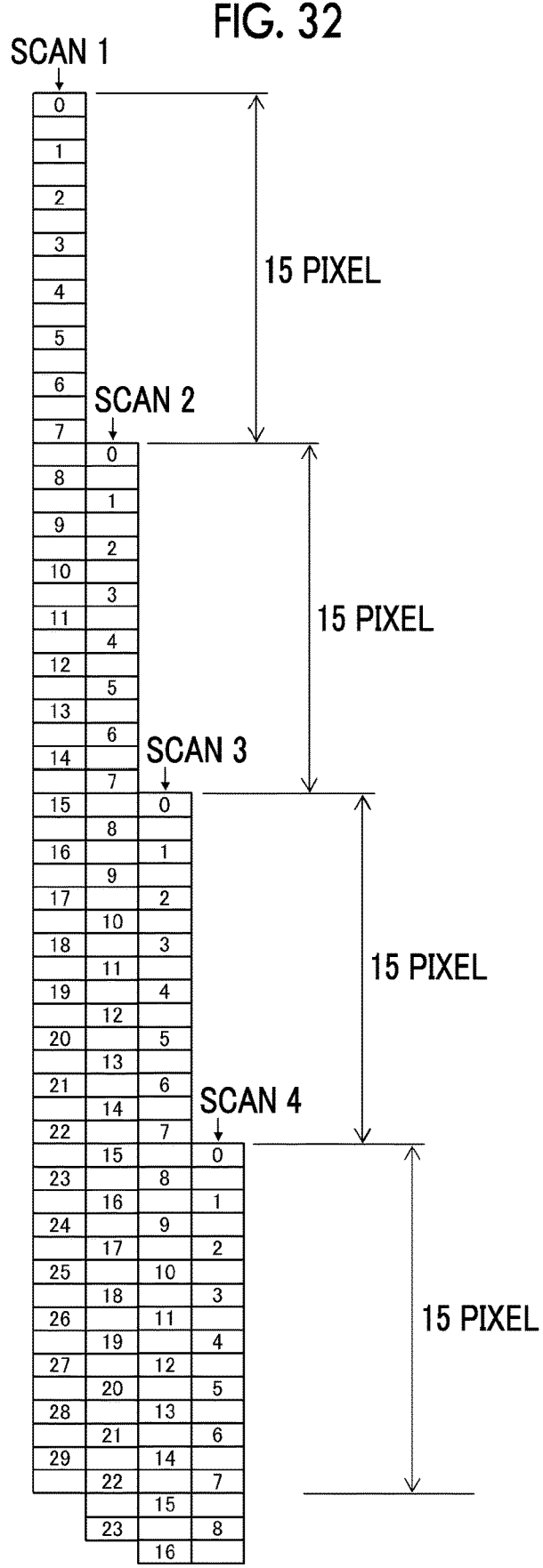
FIG. 32 is a diagram for illustrating a recording operation using a recording head having the nozzle row shown in FIG. 31.

FIG. 32 is a diagram for illustrating a recording operation using the recording head having the nozzle row shown in FIG. 31. In FIG. 32, a state where the recording head relatively moves in a sub scan direction in accordance with transportation of a sheet in the sub scan direction. The sheet is transported from the bottom to the top in FIG. 32. As shown in FIG. 32, the paper feed amount in the sub scan direction is 15 pixels, and recording of a scan band is completed through four scans of scan 1 to scan 4. The paper feed amount corresponds to "the amount of relative movement in one sub scan operation".

Figure 33:
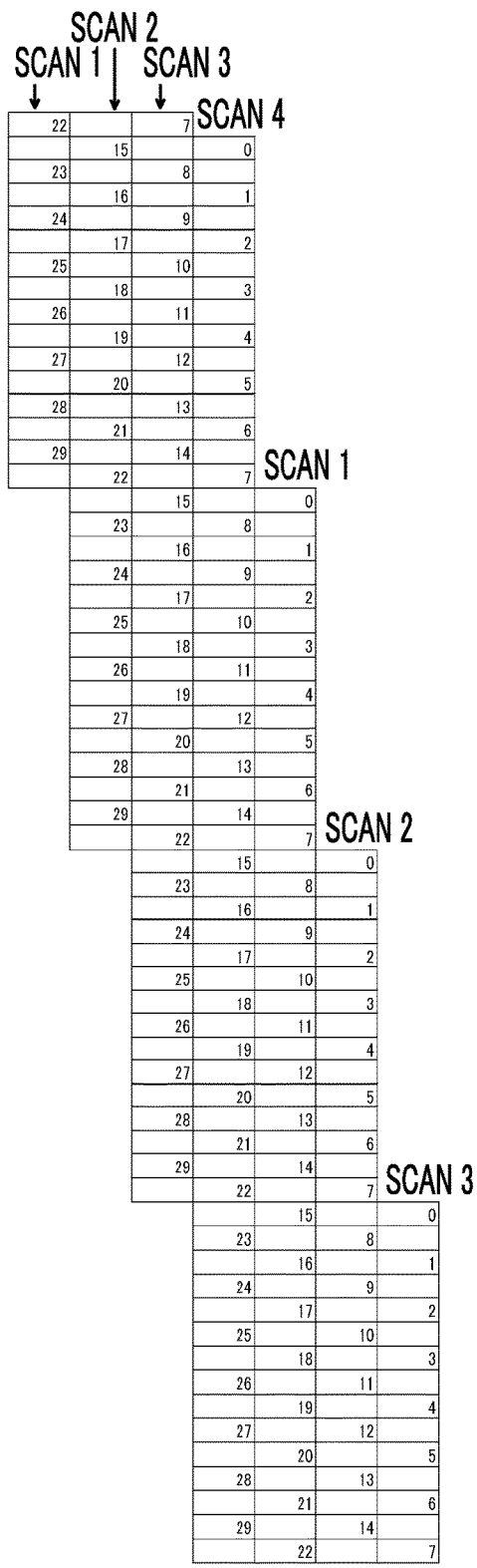
FIG. 33 is a diagram showing a relationship between nozzles and a raster in each scan, and a nozzle pattern.

FIG. 33 is a diagram showing a relationship between nozzles and a raster in each scan, and a nozzle pattern. A left view of FIG. 33 shows a state where recording operations of scan 1 to scan 4 are repeated. A central view of FIG. 33 shows a nozzle pattern of a minimum repetition unit. A right view of FIG. 33 shows a nozzle pattern for respective scan bands. Numbers shown in respective cells of the nozzle pattern represent nozzle numbers of nozzles for recording of pixels corresponding to positions of the cells.

FIG. 34 shows nozzle groups of respective scans. The nozzle group of each scan refers to a nozzle group for each scan used for reading of each scan. In FIG. 34, nozzles of respective scans for recording each unit area in each scan band. Written nozzle numbers represent nozzles of the nozzle numbers. Nozzles of a scan 1 nozzle group correspond to nozzle numbers 23 to 29. Nozzles of a scan 2 nozzle group correspond to nozzle numbers 15 to 22. Here, the nozzle number 22 represents a gap nozzle that records a gap raster. In FIG. 34, in order to show that the nozzle number 22 is the gap nozzle, a background of a cell of the nozzle number 22 is distinctly displayed by a screen tone. Nozzles of a scan 3 nozzle group correspond to nozzle numbers 8 to 14. Nozzles of a scan 4 nozzle group correspond to nozzle numbers 0 to 7. In FIG. 34, the nozzle number 7 is a gap nozzle that records a gap raster, and thus, a background of a cell of the nozzle number 7 is distinctly displayed by a screen tone. The nozzle number of the gap nozzle is referred to as a "gap nozzle number". There may be a case where the gap nozzle of the nozzle number is indicated by writing of the gap nozzle number.

It can be understood that in a case where sums of jetting rates of corresponding nozzles of respective scan nozzle groups shown in FIG. 34 can be set to be uniform regardless of a unit area, a jetting rate distribution in each scan band becomes constant.

In order to record all rasters one round, since the nozzle pitch and the paper feed amount are mutually prime, each scan band is necessarily indivisible by the unit area, which causes a gap. The gaps correspond to rasters recorded using the nozzle number 7 and the nozzle number 22. Such a raster corresponding to the gap may be referred to as a gap raster. Even in the gap raster, as long as a jetting rate of a nozzle that records the gap raster and jetting rates of nozzles before and after the gap nozzle are consecutive, a sum of jetting rates per unit area including the gap raster approximately becomes constant.

<<Example of Nozzle Jetting Rate Design Method for Uniformizing Distribution of Average Jetting Rate per Unit Area>>

A nozzle jetting rate design method for uniformizing a distribution of an average jetting rate per unit area will be described with reference to a case where an inclination of jetting rates of each scan nozzle group is not constant and a case where an inclination of jetting rates of each scan nozzle group is constant. The case where the inclination of the jetting rates of each scan nozzle group is constant refers to a case where the inclination is changed only in a branch of the respective scan nozzle groups.

The case where the inclination of the jetting rates of each scan nozzle group is not constant refers to a case where the inclination is changed inside the scan nozzle group.

<Case where Inclination of Jetting Rates of each Scan Nozzle Group is Constant>>

[Example 1 of Nozzle Jetting Rate Design Method]

FIG. 35 shows an example of jetting rates of each scan nozzle group that are finally obtained according to Example 1. A nozzle jetting rate design method will be described with reference to this example. First, design of jetting rates of the first half scan nozzle group is performed. To this end, first, a nozzle disposed at an end of each scan nozzle group and a nozzle that serves as a branch of the scan nozzle groups are determined. The "nozzle disposed at the end" includes an end nozzle, and also includes a nozzle disposed at an end inside each scan nozzle group. In the case of Example 1, an end nozzle of scan 1 is determined as a nozzle number 29, a branch nozzle of scan 1 and of scan 2 is determined as a nozzle number 23, 22, or 21, and a nozzle disposed at an end of the scan 2 nozzle group is determined as a nozzle number 15.

Here, the nozzle that becomes the branch of the respective scan nozzle groups may be a gap nozzle, or may be a nozzle that is different by about "±1 nozzle" before and after the gap nozzle. As shown in FIGS. 33 and 34, in Example 1, the nozzle number 22 that is the gap nozzle is present in scan 2, but the gap nozzle may not be present according to a scan method. In a case where the gap nozzle is not present, a nozzle disposed at an end of each scan nozzle group may be set as the branch nozzle. For example, the nozzle number 23 at the end of the scan 1 nozzle group or the nozzle number 21 at the end of the scan 2 nozzle group may be set as the branch nozzle.

Then, respective jetting rates of the nozzle disposed at the end of each scan nozzle group and the branch nozzle are determined. Further, from the jetting rates determined with respect to the nozzle disposed at the end of each scan nozzle group and the branch nozzle, jetting rates of respective nozzles therebetween are calculated through linear interpolation. That is, the jetting rates of the nozzles between the nozzles disposed at the end of each scan nozzle group and the branch nozzle are calculated to become consecutive through interpolation.

In FIG. 35, the end nozzle of scan 1 is set to the nozzle number 29, an end nozzle of scan 1 is set to the nozzle number 29, a branch nozzle of scan 1 and scan 2 is set to the nozzle number 21, and a nozzle disposed at an end of scan 2 is set to the nozzle number 15. A jetting rate of the nozzle number 29 is set to 25%, a jetting rate of the nozzle number 21 is set to 100%, and a jetting rate of the nozzle number 15 is set to 100%, respectively. By performing linear interpolation with respect to the respective nozzles therebetween, the jetting rates of the respective nozzles are determined.

Then, the jetting rates of each scan nozzle group of the second half scan nozzle group are set so that sums of the jetting rates of each scan nozzle group of the second half scan nozzle group and the jetting rates of each scan nozzle group of the first half scan nozzle group become constant. To this end, first, jetting rates of scan 4 nozzle group are calculated. First, in scan 4, a jetting rate of the nozzle number 0 is set to 25%, in a similar way to the nozzle number 29. Then, a jetting rate 81.25% of the nozzle number 23 of scan 1 is added to a jetting rate 25% of the nozzle number 0 of scan 4 to obtain 106.25%. This value corresponds to T1 in Expression [4].

Then, using T1=106.25%, jetting rates of the nozzle numbers 24 to 29 in scan 1 are subtracted from T1, respectively, according to Expression [4] to obtain jetting rates of the nozzle numbers 1 to 6 of scan 4 that form pairs with respect to the nozzle numbers 24 to 29 of scan 1. For example, a nozzle of scan 4 that forms a pair with the nozzle number 24 of scan 1 is the nozzle number 1. As the jetting rate of the nozzle 1 of scan 4, 71.875% (a jetting rate of the nozzle number 24) of scan 1 is subtracted from 106.25% (T1) to obtain 34.375%. Here, in this example, the range of j in Expression [4] corresponds to 0 to 6, in which j=0 of t[1, j] corresponds to the nozzle number 29, and j=6 corresponds to the nozzle number 23. Further, j=0 of t[4, j] corresponds to the nozzle number 6, and j=6 corresponds to the nozzle number 0.

Alternatively, the jetting rate of each nozzle in scan 4 may be calculated according to Expression [5]. That is, since an inclination A1 in Expression [5] is an inclination 9.375% of the jetting rates of the scan 1 nozzle group, the jetting rate of each nozzle may be calculated by increasing the inclination 9.375% from t[4, 6]=25% that is the jetting rate of the nozzle number 0 in scan 4.

Then, a jetting rate of the nozzle number 7 that is the gap nozzle is calculated. Since, in the first half scan, the jetting rate is set to 90.625% by increasing the jetting rate by 9.375% from the nozzle number 23 to the nozzle number 22, a jetting rate of the nozzle number 6 is set to 90.625% by increasing the jetting rate by 9.375%, which is set as the jetting rate of the nozzle number 7, in the second half scan.

Finally, jetting rates of the scan 3 nozzle group are calculated. To this end, first, a jetting rate of the nozzle number 8 in scan 3 is set to the same value as the jetting rate of the nozzle number 21 in scan 2 (in this example, 100%). Further, the jetting rate 100% of the nozzle number 15 in scan 2 is added to the jetting rate 100% of the nozzle number 8 in scan 3 to obtain 200%. This value corresponds to T2 in Expression [4].

Then, using T2=200%, jetting rates of the nozzle numbers 16 to 21 in scan 2 are subtracted from T2, respectively, according to Expression [4] to obtain jetting rates of the nozzle numbers 9 to 14 of scan 3 that form pairs with respect to the nozzle numbers 16 to 21 in scan 2. In this example, the jetting rates of the nozzle numbers 9 to 14 become 100%.

In Example 1, j=0 of t[2, j] in Expression [4] corresponds to the nozzle number 21, and j=6 corresponds to the nozzle number 15. Further, j=0 of t[3, j] corresponds to the nozzle number 14, and j=6 corresponds to the nozzle number 8.

Alternatively, the jetting rate of each nozzle in scan 3 may be calculated according to Expression [5]. That is, since an inclination A2 in Expression [5] is an inclination 0% of the jetting rates of the scan 2 nozzle group, the jetting rate of each nozzle may be calculated by increasing the inclination 0% from t[3, 6]=100% that is the jetting rate of the nozzle number 8 in scan 3.

According to the above-mentioned procedure, a nozzle jetting rate of each target nozzle may be designed.

In determining an optimal branch nozzle, jetting rates of respective nozzles and a nozzle pattern are developed into a jetting rate pattern to determine a branch nozzle in which an average jetting rate per unit area is most uniform. In this case, it should be noted that sums of respective nozzle jetting rates designed by respective branch nozzles are identical to each other.

Further, in order to prevent concentration unevenness (banding), streaks or bleeding, it is more preferable that only jetting rates of a nozzle group in a first scan of the first half scan nozzle group and jetting rates of a nozzle group of a final scan of the second half scan nozzle group are designed to have an inclination and an inclination of jetting rates of other scan nozzle groups is designed to be close to zero.

Figure 36:
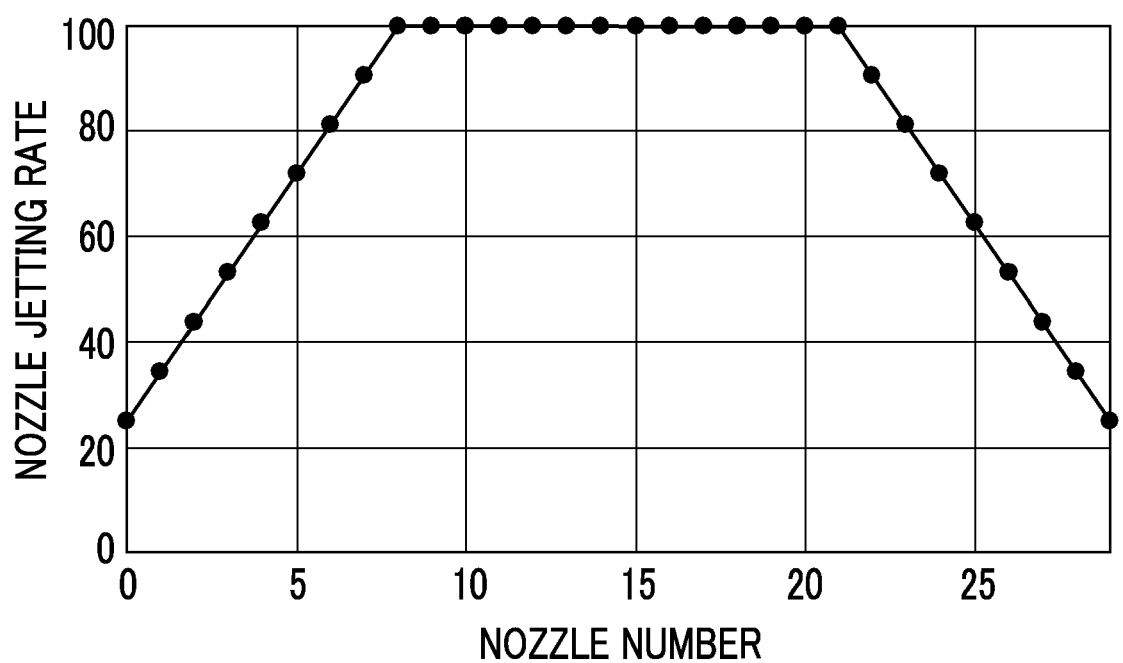
FIG. 36 is a graph of nozzle jetting rates designed in accordance with a nozzle jetting rate design method according to Example 1.

FIG. 36 is a graph of nozzle jetting rates designed in accordance with the nozzle jetting rate design method according to the above-described Example 1. A lateral axis in FIG. 36 represents a nozzle number, and a longitudinal axis represents a nozzle jetting rate.

Figures 38, 39:
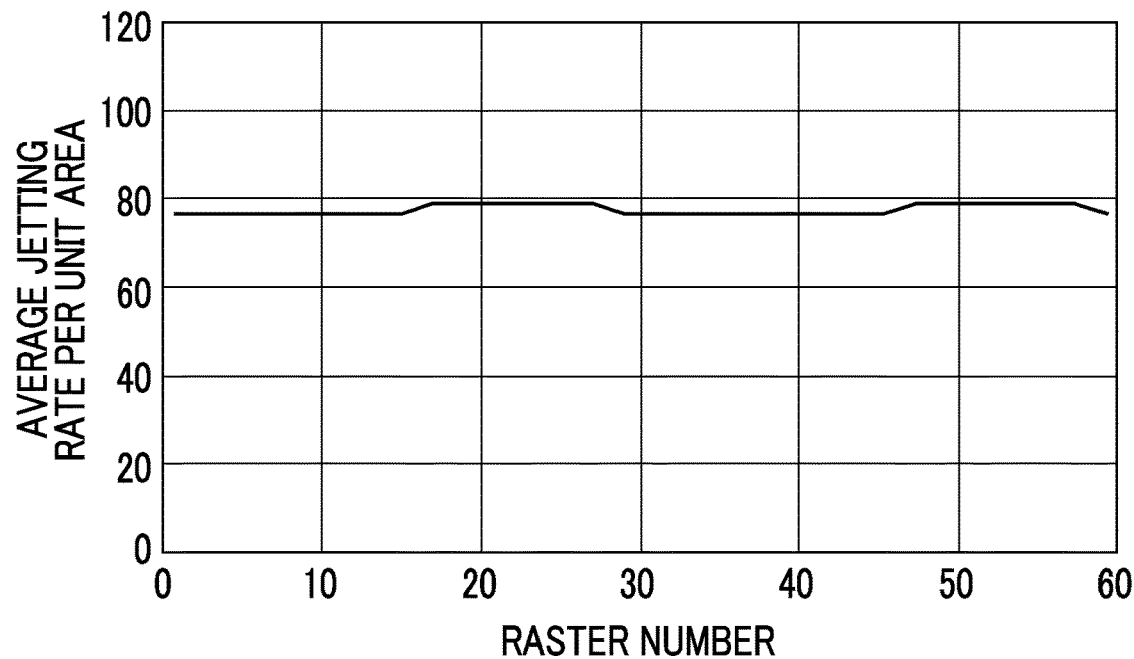
FIG. 38 is a graph showing an average jetting rate per unit area based on the jetting pattern shown in FIG. 37.
FIG. 39 is a chart showing an example of jetting rates of each scan nozzle group that are finally obtained according to Example 2.

FIG. 37 is a diagram showing a jetting pattern based on the nozzle jetting rates shown in FIG. 36. FIG. 38 is a graph showing an average jetting rate per unit area based on the jetting pattern shown in FIG. 37. A lateral axis in FIG. 38 represents a raster number, and a longitudinal axis represents an average jetting rate per unit area. As shown in FIG. 38, the average jetting rate per unit area is generally uniform.

<Example of Case where Inclination is Changed only at Branch of Respective Scan Nozzle Groups>

[Example 2 of Nozzle Jetting Rate Design Method]

Next, in a case where an inclination is changed only at a branch of respective scan nozzle groups, a nozzle jetting rate design method in a case corresponding to an example in which the complementary relationship is one-to-one and is laterally asymmetrical will be described as a specific example.

FIG. 39 shows an example of jetting rates of each scan nozzle group that are finally obtained according to Example 2. A nozzle jetting rate design method will be described with reference to the example of FIG. 39. First, as described above, a nozzle disposed at an end of each scan nozzle group and a branch nozzle in the first half scan nozzle group are determined, respective jetting rates of the nozzle disposed at the end of each scan nozzle group and the branch nozzle are determined, and linear interpolation is performed to obtain jetting rates of respective nozzles of the first half scan nozzle group. In Example 2, an end nozzle of scan 1 is set to a nozzle number 29, a branch nozzle of scan 1 and scan 2 is set to a nozzle number 21, and a nozzle disposed at an end of the scan 2 nozzle group is set to a nozzle number 15. Further, a jetting rate of the nozzle number 29 is set to 0%, a jetting rate of the nozzle number 21 is set to 40%, and a jetting rate of the nozzle number 15 is set to 100%, respectively. Further, linear interpolation is performed with respect to respective nozzles therebetween to obtain and jetting rates of the respective nozzles.

The jetting rates of each scan nozzle group of the second half scan nozzle group is set so that sums of the jetting rates of each scan nozzle group of the second half scan nozzle group and the jetting rates of each scan nozzle group of the first half scan nozzle group become constant. To this end, first, the jetting rates of the scan 4 nozzle group are calculated to be in the complementary relationship with scan 2. First, a jetting rate of the nozzle number 0 of scan 4 is set to 0%. Then, the jetting rate 100% of the nozzle number 15 of scan 2 is added to the jetting rate 0% of the nozzle number 0 of scan 4 to obtain 100%. This value corresponds to T2 in Expression [6].

Then, using T2=100%, jetting rates of the nozzle numbers 16 to 21 of scan 2 are subtracted from T2, respectively, according to Expression [6] to obtain jetting rates of the nozzle numbers 1 to 6 of scan 4 that form pairs with respect to the nozzle numbers 16 to 21 of scan 2. Alternatively, the jetting rate of each nozzle of scan 4 may also be obtained according to Expression [7]. That is, since an inclination A2 in Expression [7] is an inclination 10% of the jetting rates of the scan 2 nozzle group, the jetting rate of each nozzle may be calculated by increasing the inclination 10% from t[4, 6]=0% that is the jetting rate of the nozzle number 0 of scan 4.

Then, a jetting rate of the nozzle number 7 that is a gap nozzle is calculated. Since, in the first half scan, the jetting rate is reduced by 5% from the nozzle number 21 to the nozzle number 22, a jetting rate of the nozzle number 6 is set to 65% by increasing the jetting rate by 5%, which is set as the jetting rate of the nozzle number 7, in the second half scan.

Finally, jetting rates of the scan 3 nozzle group are calculated. First, a jetting rate of the nozzle number 8 of scan 3 is calculated. Since the jetting rate is reduced by 5% from the nozzle number 22 to the nozzle number 23 in the first half scan, a jetting rate of the nozzle number 7 is set to 70% by increasing the jetting rate by 5%, which is set as the jetting rate of the nozzle number 8, in the second half scan. Further, the jetting rate 30% of the nozzle number 23 of scan 1 is added to the jetting rate 70% of the nozzle number 8 of scan 3 to obtain 100%. This value corresponds to T1 in Expression [6].

Then, using T1=100%, jetting rates of the nozzle numbers 24 to 29 of scan 1 are subtracted from T1, respectively, according to Expression [6] to obtain jetting rates of the nozzle numbers 9 to 14 of scan 3 that form pairs with respect to the nozzle numbers 24 to 29 of scan 1.

Alternatively, the jetting rate of each nozzle of scan 3 may be obtained according to Expression [7]. That is, since an inclination A1 in Expression [7] is an inclination 5% of the jetting rates of the scan 1 nozzle group, the jetting rate of each nozzle may be calculated by increasing the inclination 5% from t[3, 6]=70% that is the jetting rate of the nozzle number 8 of scan 3.

According to the above-described procedure, it is possible to design nozzle jetting rates of respective target nozzles.

Figure 40:
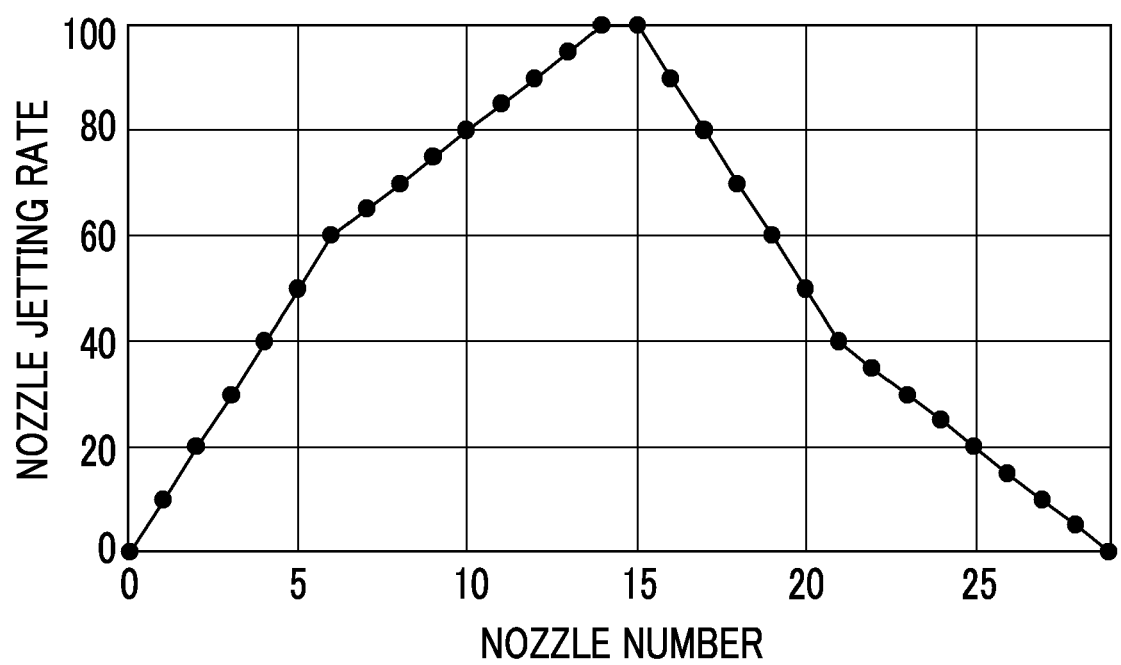
FIG. 40 is a graph of nozzle jetting rates designed in accordance with a nozzle jetting rate design method according to Example 2.

FIG. 40 is a graph of nozzle jetting rates designed in accordance with a nozzle jetting rate design method according to Example 2. A lateral axis in FIG. 40 represents a nozzle number, and a longitudinal axis represents a nozzle jetting rate.

Figure 42:
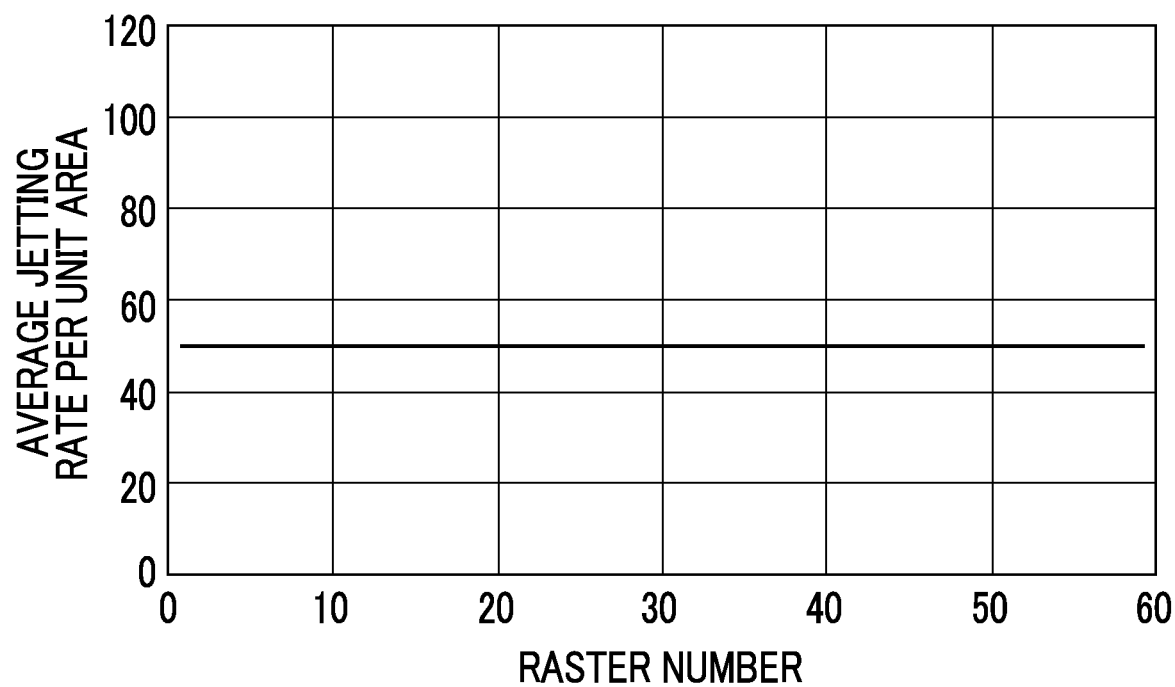
FIG. 42 is a graph showing an average jetting rate per unit area based on the jetting pattern shown in FIG. 41.

FIG. 41 is a diagram showing a jetting pattern based on the nozzle jetting rates shown in FIG. 40. FIG. 42 is a graph showing an average jetting rate per unit area based on the jetting pattern shown in FIG. 41. A lateral axis in FIG. 42 represents a raster number, and a longitudinal axis represents an average jetting rate per unit area. As shown in FIG. 42, the average jetting rate per unit area is generally uniform.

[Example 3 of Nozzle Jetting Rate Design Method]

Next, in a case where an inclination is changed only at a branch of respective scan nozzle groups, a nozzle jetting rate design method in which the complementary relationship is not one-to-one will be described. Here, as shown in FIG. 23, an example in which the complementary relationship is one-to-two will be specifically described. In Example 3, a case where the number of nozzles is 28 (nozzle numbers 0 to 27), a paper feed amount is "14", a nozzle pitch is "3", and the number of overlaps is "2" will be considered. This is an example of a case where the number of main scan operations necessary for completion of recording of each scan band is N=6.

Figure 43:
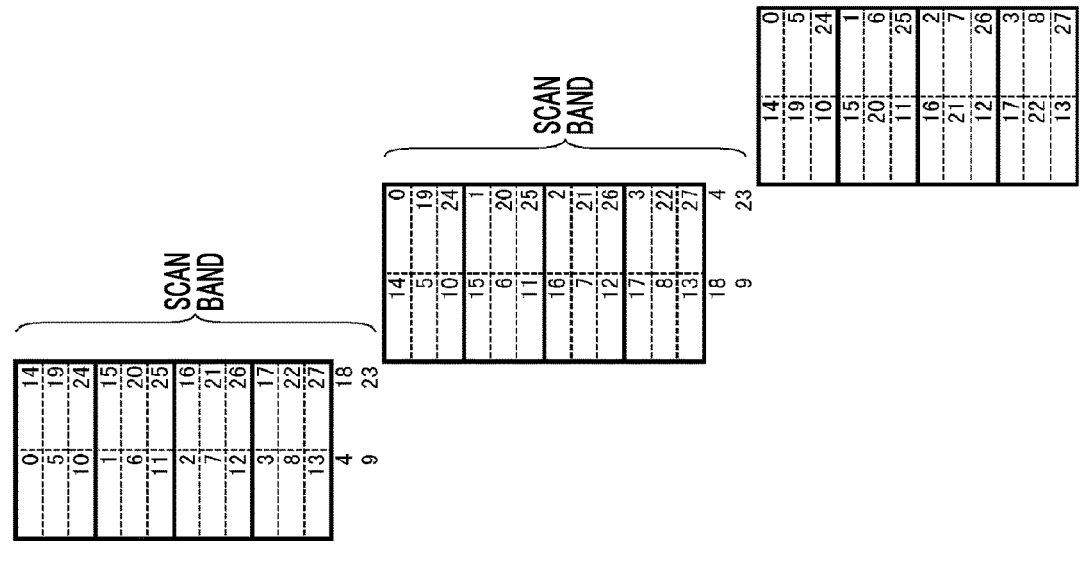
FIG. 43 is a diagram showing a relationship between nozzles and a raster in each scan, and a part of a nozzle pattern, according to Example 3.

FIG. 43 is a diagram showing a relationship between nozzles and a raster in each scan, and a part of a nozzle pattern, according to Example 3. A left view of FIG. 43 shows a state where recording operations of scan 1 to scan 6 are repeated. A central view of FIG. 43 shows a part of a nozzle pattern. A right view of FIG. 43 shows a part of a nozzle pattern for respective scan bands.

Figures 44, 45, 46:
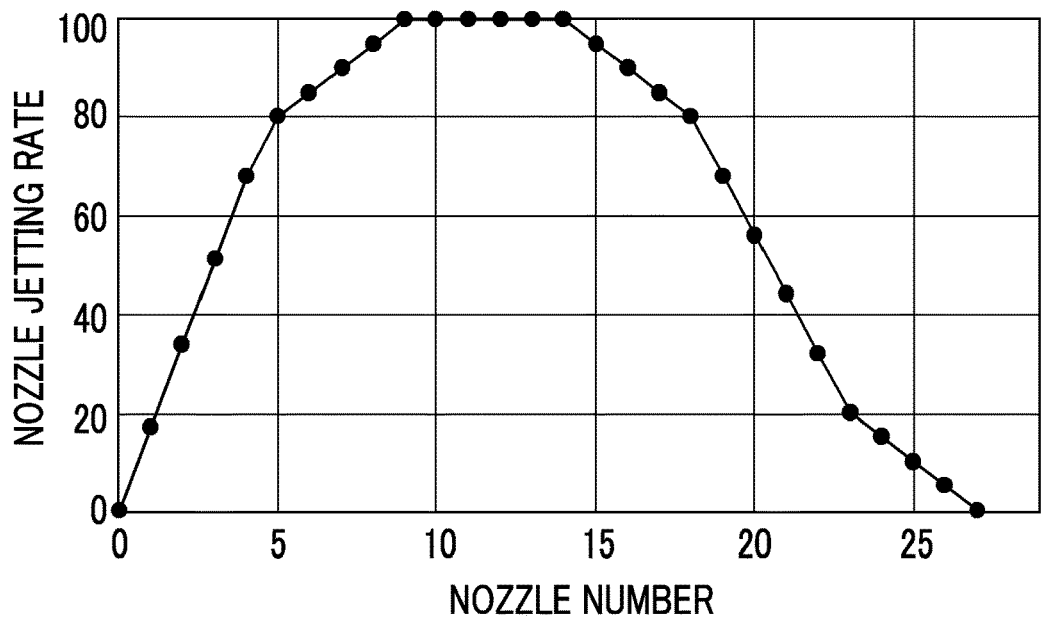
FIG. 44 is a chart showing a nozzle group of each scan for recording a scan band.
FIG. 45 is a chart showing an example of jetting rates of each scan nozzle group that are finally obtained according to Example 3.
FIG. 46 is a graph of nozzle jetting rates designed in accordance with a nozzle jetting rate design method according to Example 3.

Further, FIG. 44 shows nozzle groups of each scan. A notation rule in FIGS. 43 and 44 is similar to a notation rule in FIGS. 33 and 34.

In the case of the scan method of Example 3 shown in FIGS. 43 and 44, the nozzle number 18 and the nozzle number 23 in the first half scan, and the nozzle number 4 and the nozzle number 9 in the second half scan correspond to gap nozzles.

FIG. 45 shows an example of jetting rates of each scan nozzle group that are finally obtained according to Example 3. A nozzle jetting rate design method will be described with reference to this example. First, as described above, a nozzle disposed at an end of each scan nozzle group and a branch nozzle in the first half scan nozzle group are determined, respective jetting rates of the nozzle disposed at the end of each scan nozzle group and the branch nozzle are determined, and linear interpolation is performed to obtain jetting rates of respective nozzles of the first half scan nozzle group. In Example 3, an end nozzle of scan 1 is set to a nozzle number 27, a branch nozzle of scan 1 and scan 2 is set to a nozzle number 23, a branch nozzle of scan 2 and scan 3 is set to a nozzle number 18, and a nozzle disposed at an end of scan 3 is set to a nozzle number 14. Further, a jetting rate of the nozzle number 27 is set to 0%, a jetting rate of the nozzle number 23 is set to 20%, a jetting rate of the nozzle number 18 is set to 80%, and a jetting rate of the nozzle number 14 is set to 100%, respectively. Further, linear interpolation is performed with respect to respective nozzles therebetween to obtain and jetting rates of the respective nozzles.

Then, the jetting rates of each scan nozzle group of the second half scan nozzle group are set so that sums of the jetting rates of each scan nozzle group of the second half scan nozzle group and the jetting rates of each scan nozzle group of the first half scan nozzle group become constant. First, jetting rates of the scan 6 nozzle group are calculated to be in the complementary relationship with sums of jetting rates of scan 1 and scan 2.

First, in scan 6, a jetting rate of the nozzle number 0 is set to 0%. Then, a jetting rate 83% that is a sum of a jetting rate 15% of the nozzle number 24 of scan 1 and a jetting rate 68% of the nozzle number 19 of scan 2 is added to the jetting rate 0% of the nozzle number 0 of scan 6 to obtain 83%. This value corresponds to T1 in Expression [8].

Then, after "sum jetting rates" that are sums (t[1, j]+t[2, j]) of jetting rates of corresponding nozzles of the nozzle numbers 25 to 27 of scan 1 and the nozzle numbers 20 to 22 of scan 2 are respectively calculated using T1=83%, and according to Expression [8], the sum jetting rates are subtracted from T1, respectively, to obtain jetting rates of the nozzle numbers 1 to 3 of scan 6 that form pairs with respect to the nozzle numbers 25 to 27 of scan 1 and the nozzle numbers 20 to 22 of scan 2.

Alternatively, the jetting rate of each nozzle in scan 6 may be calculated according to Expression [9]. That is, since an inclination A1 in Expression [9] is an inclination 5% of the jetting rates of the scan 1 nozzle group and an inclination A2 is an inclination 12% of the jetting rates of the scan 2 nozzle group, a sum inclination thereof becomes 17%. Thus, the jetting rates of the respective nozzles of the nozzle numbers 1 to 3 may be calculated by increasing the inclination by 17% from t[6, 3]=0% that is the jetting rate of the nozzle number 0 of scan 6.

Then, a jetting rate of a gap nozzle number 4 is calculated. Since a combination of scan 1 and scan 2 of the first half scan and scan 6 of the second half scan are in a two-to-one complementary relationship, the jetting rate in the gap nozzle number 4 of scan 6 is also increased by the same amount as an increase of a jetting rate of a gap nozzle number 23 included in scan 1 and scan 2 of the first half scan. Since the jetting rate is increased by 5% from the nozzle number 24 to the nozzle number 23, and the jetting rate is increased by 12% from the nozzle number 23 to the nozzle number 22, so that both the jetting rates are totally increased by 17%, 68% obtained by increasing the jetting rate by 17% from the jetting rate 51% of the nozzle number 3 is set as the jetting rate of the gap nozzle number 4.

Then, jetting rates of the scan 5 nozzle group are calculated. First, a jetting rate of the nozzle number 5 of scan 5 is calculated. Since the jetting rate is increased by 12% from the nozzle number 19 to the nozzle number 18 in the first half scan, a jetting rate of the nozzle number 4 is set to 80% by increasing the jetting rate by 12%, which is set as the jetting rate of the nozzle number 5.

Further, the jetting rate 100% of the nozzle number 14 in scan 3 is added to the jetting rate 80% of the nozzle 5 in scan 5 to obtain 180%. This value corresponds to T3 in Expression [8].

Then, using T3=180%, jetting rates of the nozzle numbers 15 to 17 in scan 3 are subtracted from T3, respectively, according to Expression [8] to obtain jetting rates of the nozzle numbers 6 to 8 of scan 5 that form pairs with respect to the nozzle numbers 15 to 17 in scan 3.

Alternatively, the jetting rate of each nozzle in scan 5 may be calculated according to Expression [9]. That is, since an inclination A3 in Expression [9] is an inclination 5% of the jetting rates of the scan 3 nozzle group, the jetting rate of each nozzle of the nozzle numbers 6 to 8 may be calculated by increasing the inclination 5% from t[5, 3]=80% that is the jetting rate of the nozzle number 5 in scan 5.

Further, since the jetting rate is increased by 5% from the gap nozzle number 18 to the nozzle number 17 in scan 3, 100% obtained by increasing the jetting rate by 5% from the jetting rate 95% of the nozzle number 8 in scan 5 is set to the jetting rate of the gap nozzle number 9.

Finally, the jetting rates of the scan 4 nozzle group are all set to 100%.

According to the above-described procedure, it is possible to design nozzle jetting rates of respective target nozzles.

FIG. 46 is a graph of nozzle jetting rates designed in accordance with a nozzle jetting rate design method according to Example 3. A lateral axis in FIG. 46 represents a nozzle number, and a longitudinal axis represents a nozzle jetting rate.

Figures 48, 49:
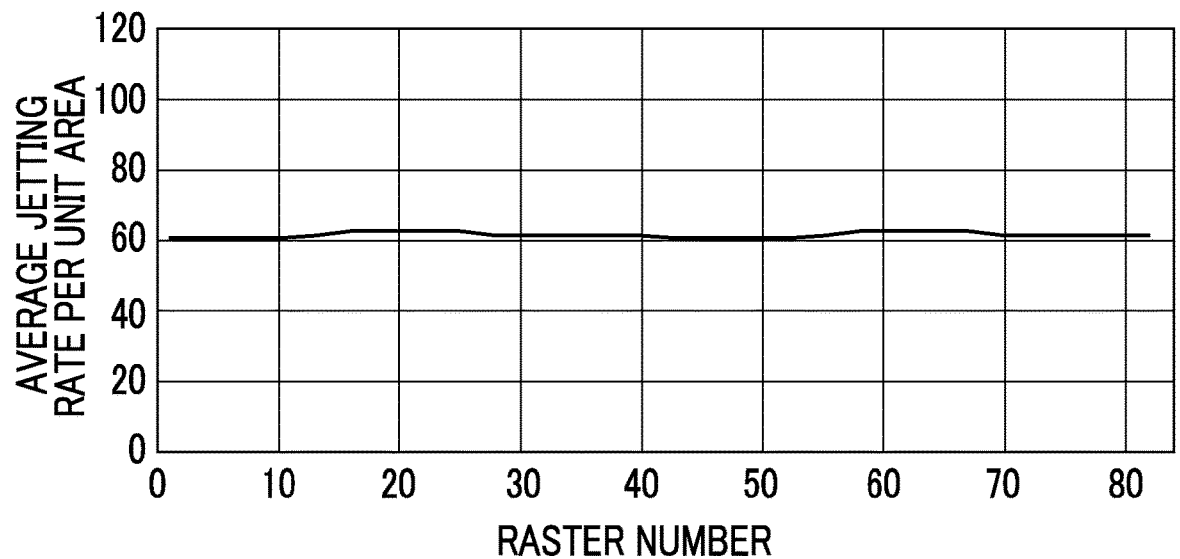
FIG. 48 is a graph showing an average jetting rate per unit area based on the jetting rate pattern shown in FIG. 47.
FIG. 49 is a chart showing an example of jetting rates of each scan nozzle group that are finally obtained according to Example 4.

FIG. 47 is a diagram showing a jetting rate pattern based on the nozzle jetting rates shown in FIG. 46. FIG. 48 is a graph showing an average jetting rate per unit area based on the jetting rate pattern shown in FIG. 47. A lateral axis in FIG. 48 represents a raster number, and a longitudinal axis represents an average jetting rate per unit area. As shown in FIG. 48, the average jetting rate per unit area is generally uniform.

<Case where Inclination of Jetting Rates of each Scan Nozzle Group is not Constant >

Next, a nozzle jetting rate design method in a case where an inclination is changed inside each scan nozzle group will be described as a specific example.

[Example 4 of Nozzle Jetting Rate Design Method]

Here, first, as shown in FIG. 24 or 25, an example in which an inclination is changed at one location or several locations inside a scan nozzle group will be described. As a specific example, as shown in FIG. 25, an example in which an inclination is changed at two locations inside a scan nozzle group will be described. Here, for the convenience of comparison with the example shown in FIG. 36 or the example disclosed in JP2010-162770A, jetting rates of nozzles at opposite ends in a nozzle row is set to 25%. In Example 4, scan conditions such as the number of nozzles in the nozzle row, a paper feed amount, a nozzle pitch, and the number of overlaps in a main scan direction are set to be identical to the example shown in FIGS. 33 and 34.

FIG. 49 shows an example of jetting rates of each scan nozzle group that are finally obtained according to Example 4. A nozzle jetting rate design method will be described with reference to this example. First, a nozzle disposed at an end of each scan nozzle group, a branch nozzle, and a nozzle at an inclination change point in the first half scan nozzle group are determined, and jetting rates of the nozzle disposed at the end, the branch nozzle, and a change point nozzle are determined. The change point nozzle refers to the nozzle at the inclination change point.

In Example 4, an end nozzle of scan 1 is set to a nozzle number 29, a branch nozzle of scan 1 and scan 2 is set to a nozzle number 21, and a nozzle disposed at an end of scan 2 is set to a nozzle number 15. Further, a jetting rate of the nozzle number 29 is set to 25%, a jetting rate of the nozzle number 21 is set to 100%, and a jetting rate of the nozzle number 15 is set to 100%, respectively. In addition, the change point nozzle is set at two locations of the nozzle number 28 and the nozzle number 24, in which a jetting rate of the nozzle number 28 is set to 32.5%, and a jetting rate of the nozzle number 24 is set to 77.5%. Further, respective nozzle jetting rates between the nozzle disposed at the end of each scan nozzle group, the branch nozzle, and the change point nozzle in the first half scan nozzle group are obtained through linear interpolation.

Then, the jetting rates of each scan nozzle group of the second half scan nozzle group are set so that sums of the jetting rates of each scan nozzle group of the second half scan nozzle group and the jetting rates of each scan nozzle group of the first half scan nozzle group become constant. First, jetting rates of the scan 4 nozzle group are calculated to be in the interpolation relationship with scan 1.

First, in scan 4, a jetting rate of the nozzle number 0 is set to 25%. Then, a jetting rate 85% of the nozzle number 23 of scan 1 is added to the jetting rate 25% of the nozzle number 0 of scan 4 to obtain 110%. This value corresponds to T1 in Expression [4].

Then, using T1+110%, jetting rates of the nozzle numbers 24 to 29 in scan 1 are subtracted from T1, respectively, according to Expression [4] to obtain jetting rates of the nozzle numbers 1 to 6 of scan 4 that form pairs with respect to the nozzle numbers 24 to 29 of scan 1.

Further, a jetting rate of each nozzle in the scan 4 may be calculated according to Expression [10]. First, F1(j) in Expression [10] is calculated. In scan 1, j=0 to 6 correspond to the nozzle numbers 29 to 23, respectively. Further, since a jetting rate t[1, 0] of the nozzle number 29 is 25% and there are differences between jetting rates of nozzles corresponding to F1(0) to F1(6) and t[1, 0] (25%), respectively, F1(0) to F1(6) are set so that F1(0)=10%, F1(1)=7.5%, F1(2)=18.75%, F1(3)=30%, F1(4)=41.25%, F1(5)=52.5%, and F1(6)=60%.

On the basis of Expression [10], by subtracting F1(1) to F1(6) from the jetting rate t[4, 0] of the nozzle number 6 of the scan 4, it is possible to respectively obtain jetting rates of the nozzle numbers 6 to 0 of the scan 4. However, at this point of time, since the value t[4, 0] is not known and a jetting rate t[4, 6] of the nozzle number 0 of scan 4 is known as 25%, the values F1(0) to F1(6) are converted into values corresponding to increases based on t[4, 6].

That is, the values F1(0) to F1(6) are respectively subtracted from the value F1(6) to newly obtain F1S(0) to F1S(6). That is, F1S(0) to F1S(6) are set so that F1S(0)=60-0=60%, F1S(1)=60-7.5=52.5%, F1S(2)=60-18.75=41.25%, F1S(3)=60-30=30%, F1 S(4)=60-41.25=18.75%, F1 S(5)=60-52.5=7.5%, and F1 S(6)=60-60=0%.

Further, 32.5% obtained by adding F1S(5)=7.5% to the jetting rate t[4, 6]=25% of the nozzle number 0 is set as a jetting rate of the nozzle number 1, and 43.75% obtained by adding F1S(4)=18.75% to t[4, 6]=25% is set as a jetting rate of the nozzle number 2. Similarly, jetting rates of the respective nozzle numbers 1 to 6 of the scan 4 are calculated.

Then, a jetting rate of the gap nozzle number 7 is calculated. Since the jetting rate is increased by 7.5% from the nozzle number 23 to the nozzle number 22 in the first half scan, a jetting rate of the nozzle number 6 is set to 92.5% by increasing the jetting rate by 7.5%, which is set as the jetting rate of the nozzle number 7, in the second half scan.

Finally, jetting rates of the scan 3 nozzle group are calculated. First, a jetting rate of the nozzle number 8 of scan 3 is calculated. Since the jetting rate is increased by 7.5% from the nozzle number 22 to the nozzle number 21 in the first half scan, a jetting rate of the nozzle number 7 is set to 100% by increasing the jetting rate by 7.5%, which is set as the jetting rate of the nozzle number 8, in the second half scan. Further, the jetting rate 100% of the nozzle number 15 of scan 2 is added to the jetting rate 100% of the nozzle number 8 of scan 3 to obtain 200%. This value corresponds to T2 in Expression [4]. Then, using T2=200%, jetting rates of the nozzle numbers 16 to 21 in scan 2 are subtracted from T2, respectively, according to Expression [4] to obtain jetting rates of the nozzle numbers 9 to 14 of scan 3 that form pairs with respect to the nozzle numbers 16 to 21 of scan 2.

Alternatively, the jetting rate of each nozzle in scan 3 may be calculated according to Expression [10]. First, F2(j) in Expression [10] is calculated from the jetting rate of each nozzle of scan 2, and the jetting rate of each nozzle of scan 3 may be calculated from the calculated F2(j) and the jetting rate t[3, 6] of the nozzle number 8 of scan 3. A method for calculating the jetting rate of each nozzle of scan 4 based on Expression [10] is as described above.

According to the above-described procedure, it is possible to design nozzle jetting rates of respective target nozzles.

Figure 50:
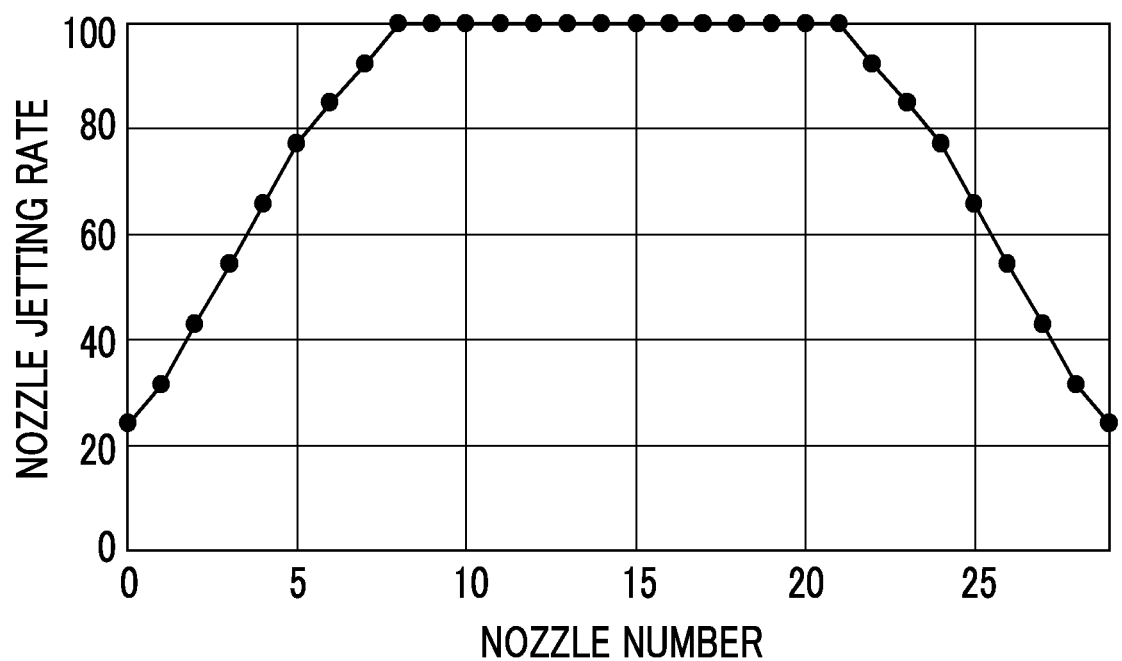
FIG. 50 is a graph of nozzle jetting rates designed in accordance with a nozzle jetting rate design method according to Example 4.

FIG. 50 is a graph of nozzle jetting rates designed in accordance with a nozzle jetting rate design method according to Example 4. A lateral axis in FIG. 50 represents a nozzle number, and a longitudinal axis represents a nozzle jetting rate.

Figures 52, 53:
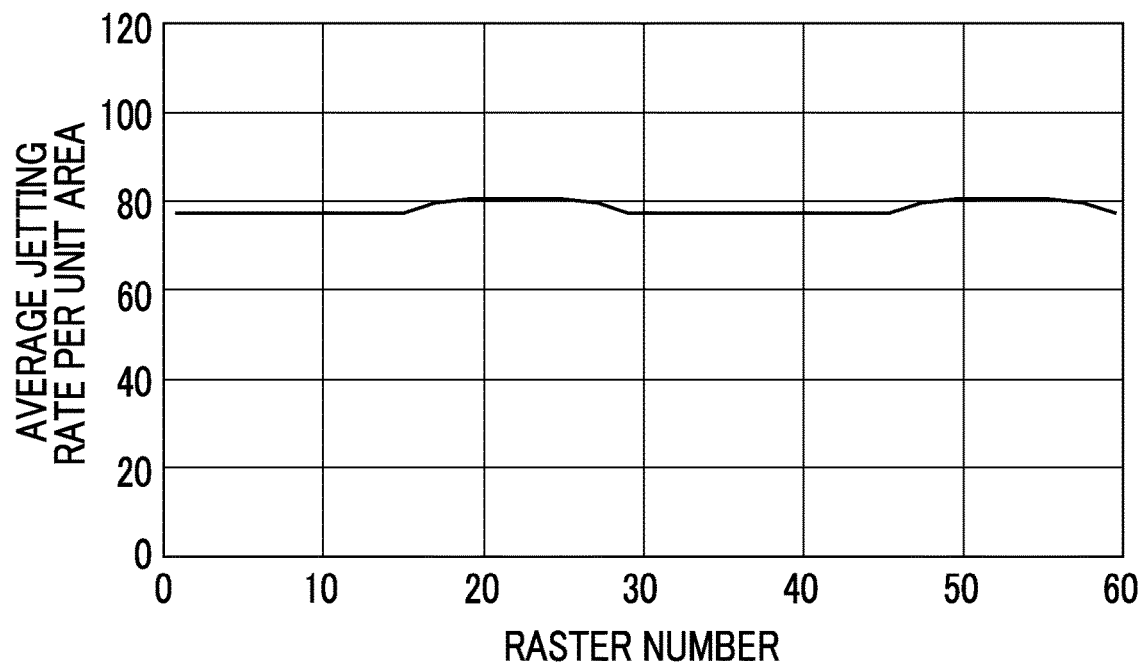
FIG. 52 is a graph showing an average jetting rate per unit area based on the jetting rate pattern shown in FIG. 51.
FIG. 53 is a chart showing an example of jetting rates of each scan nozzle group that are finally obtained according to Example 5.

FIG. 51 is a diagram showing a jetting rate pattern based on the nozzle jetting rates shown in FIG. 50. FIG. 52 is a graph showing an average jetting rate per unit area based on the jetting rate pattern shown in FIG. 51. A lateral axis in FIG. 52 represents a raster number, and a longitudinal axis represents an average jetting rate per unit area. As shown in FIG. 52, the average jetting rate per unit area is generally uniform.

[Example 5 of Nozzle Jetting Rate Design Method]

Next, a case where an inclination is changed inside each scan nozzle group, that is, an example in which an inclination is consecutively changed as shown in FIGS. 26 to 28 will be described. For the convenience of comparison with the example shown in FIG. 36 or the example disclosed in JP2010-162770A, jetting rates of nozzles at opposite ends in a nozzle row are set to 25%.

FIG. 53 shows an example of jetting rates of each scan nozzle group that are finally obtained according to Example 5. First, a nozzle disposed at an end of each scan nozzle group, a branch nozzle, and a nozzle at an inclination change point in the first half scan nozzle group are determined, and jetting rates of the nozzles are determined. In Example 5, the same setting as in FIG. 49 in Example 4 is performed. That is, an end nozzle of scan 1 is set to a nozzle number 29, a branch nozzle of scan 1 and scan 2 is set to a nozzle number 21, and a nozzle disposed at an end of scan 2 is set to a nozzle number 15. Further, a jetting rate of the nozzle number 29 is set to 25%, a jetting rate of the nozzle number 21 is set to 100%, and a jetting rate of the nozzle number 15 is set to 100%, respectively. In addition, the change point nozzle is set at two locations of the nozzle number 28 and the nozzle number 24, in which a jetting rate of the nozzle number 28 is set to 32.5%, and a jetting rate of the nozzle number 24 is set to 77.5%.

Further, jetting rates of respective nozzles between the nozzle disposed at the end of each scan nozzle group, the branch nozzle, and the change point nozzle are obtained through curve interpolation. For example, spline interpolation is used as the curve interpolation.

Since a method for calculating jetting rates of the second half scan nozzle group is identical to the case of Example 4, description thereof will not be repeated.

According to the above-described procedure, it is possible to design nozzle jetting rates of respective target nozzles.

Figure 54:
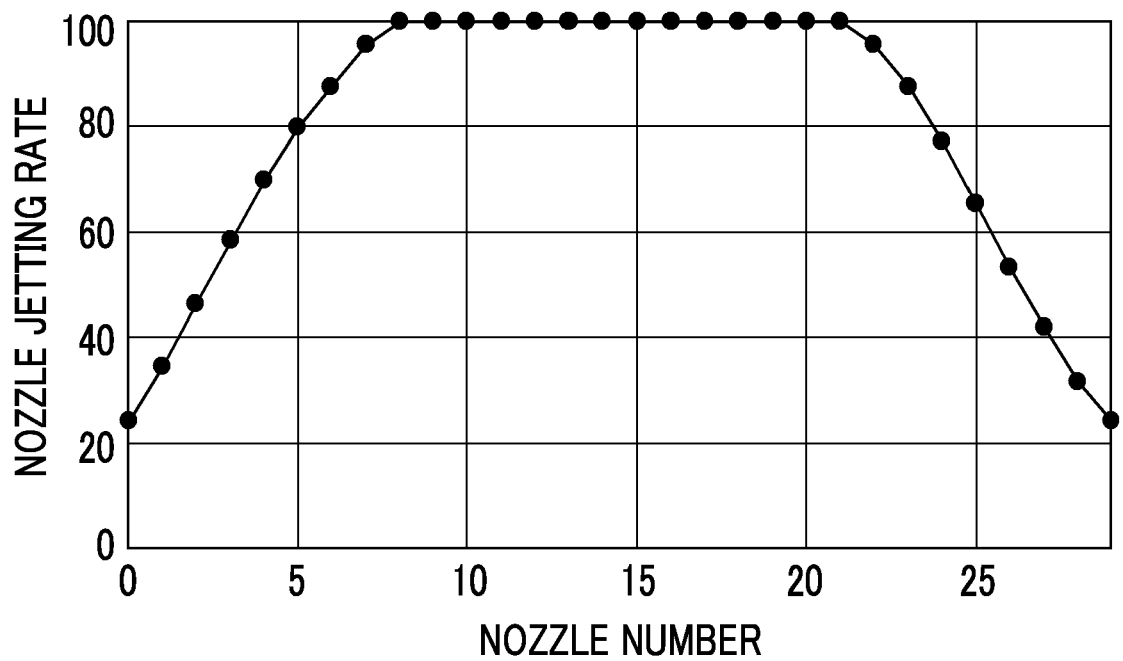
FIG. 54 is a graph of nozzle jetting rates designed in accordance with a nozzle jetting rate design method according to Example 5.

FIG. 54 is a graph of nozzle jetting rates designed in accordance with a nozzle jetting rate design method according to Example 5. A lateral axis in FIG. 54 represents a raster number, and a longitudinal axis represents a nozzle jetting rate.

Figure 56:
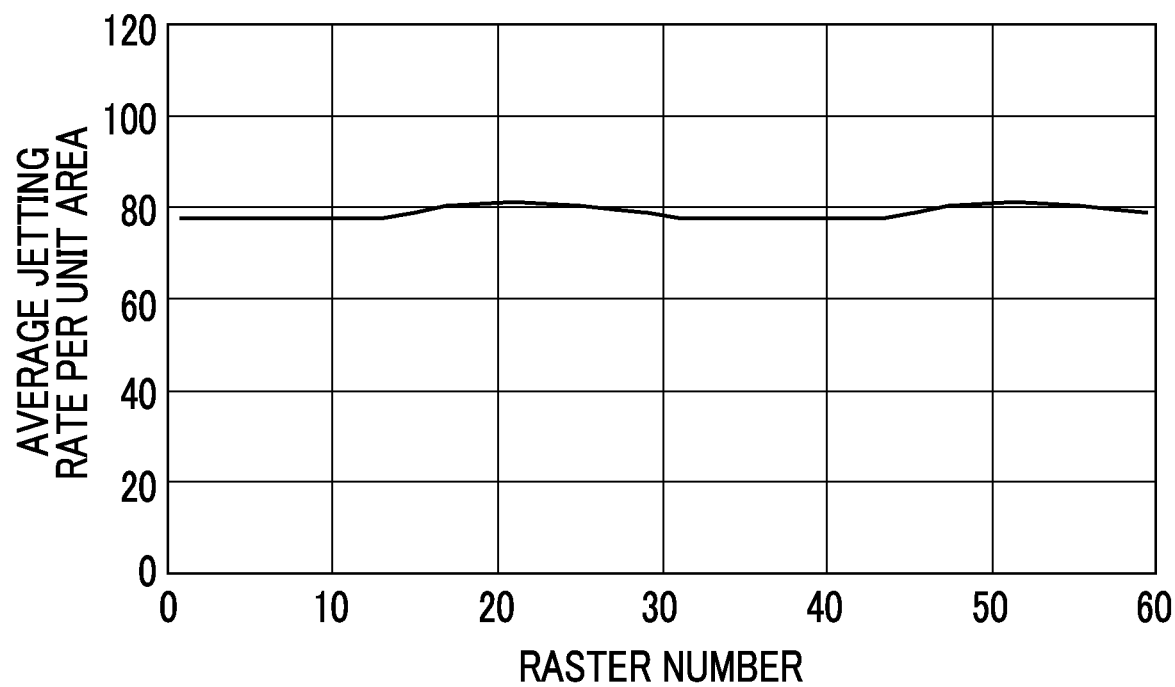
FIG. 56 is a graph showing an average jetting rate per unit area based on the jetting rate pattern shown in FIG. 55.

FIG. 55 is a diagram showing a jetting rate pattern based on the nozzle jetting rates shown in FIG. 54. FIG. 56 is a graph showing an average jetting rate per unit area based on the jetting rate pattern shown in FIG. 55. A lateral axis in FIG. 56 represents a raster number, and a longitudinal axis represents an average jetting rate per unit area. As shown in FIG. 56, the average jetting rate per unit area is generally uniform.

<Profile of Preferable Nozzle Jetting Rates>

As described above, in order to reduce banding, it is preferable to make an inclination of jetting rates constant in each scan nozzle group as shown in FIG. 36. Further, in order to suppress bleeding and/or agglutination of ink as described in JP2009-184344A, there is a case where it is effective to suppress the amount of ink for initial recording on a sheet with respect to each scan band. In this case, as shown in FIG. 40 or 46, there is a case where it is effective to suppress jetting rates of the scan 1 nozzle group to become low, or as shown in FIG. 50 or 54, it is effective to suppress jetting rates of a nozzle group particularly disposed on an end side in the scan 1 nozzle group to become low.

<<Example of Case where the Number of Overlaps is "1">>

Hereinbefore, a case where the number of overlaps is "2" has been described, but a case where the number of overlaps is "1" may be present in realization of the invention. With respect to the case where the number of overlaps is "1", a nozzle jetting rate design method of each nozzle in a nozzle row is completely the same as the case where the number of overlaps is "2", which has already been sufficiently described, and thus, detailed description will not be repeated. FIGS. 57 to 62 show examples of a scan method in a case where the number of overlaps is "1".

[Example 1 of Scan Method in Case where the Number of Overlaps is "1"]

Figure 57:
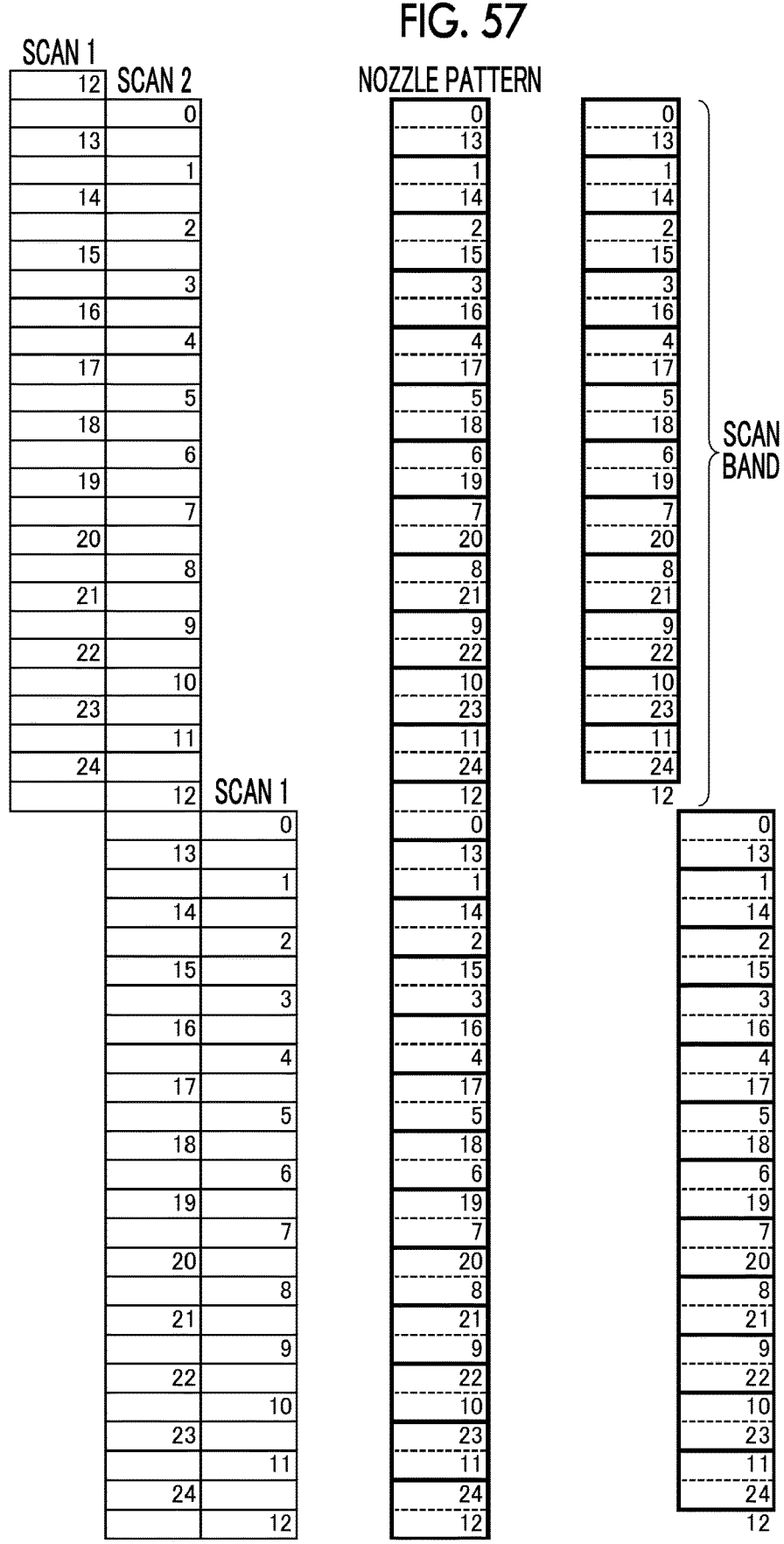
FIG. 57 is a diagram showing an example of a relationship between nozzles and a raster in each scan, and a part of a nozzle pattern.

FIG. 57 is a diagram showing a relationship between nozzles and a raster in each scan, and a part of a nozzle pattern in a case where a nozzle pitch in a nozzle row is "2", the number of nozzles is "25", and a paper feed amount is "25".

FIG. 58 is a diagram showing nozzle groups of respective scans of scan 1 and scan 2. A nozzle number 12 represents a gap nozzle. In this example, each scan band is two scans. In a case where scan 1 and scan 2 are in the complementary relationship, it is possible to uniformize a distribution of an average jetting rate per unit area in the jetting rate pattern.

[Example 2 of Scan Method in Case where the Number of Overlaps is "1"]

Figure 59:
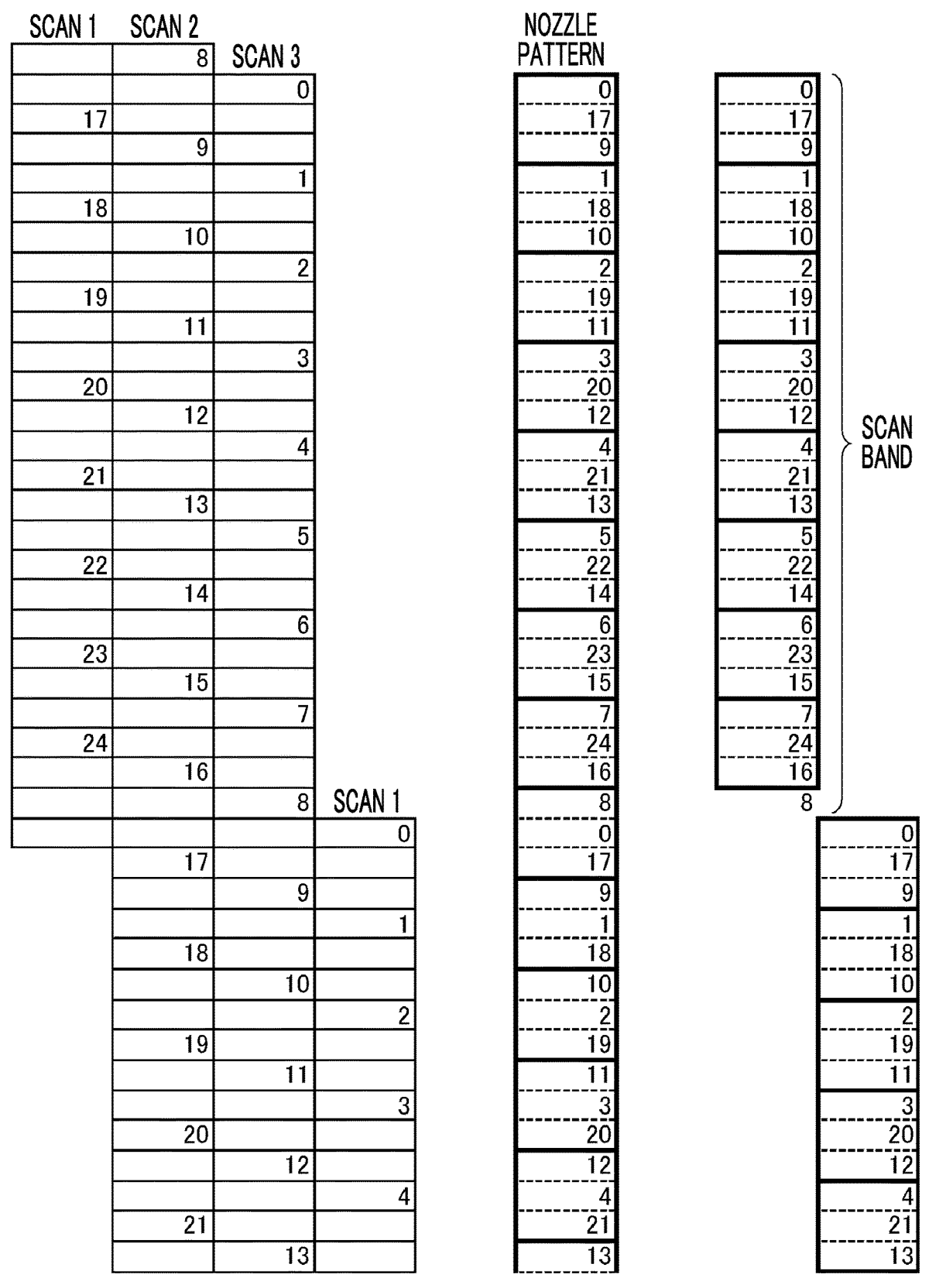

FIG. 59 is a diagram showing a relationship between nozzles and a raster in each scan, and a part of a nozzle pattern in a case where a nozzle pitch in a nozzle row is "3", the number of nozzles is "25", and a paper feed amount is "25".

FIG. 60 is a chart showing nozzle groups of respective scans of scan 1, scan 2, and scan 3. The nozzle number 8 is a gap nozzle. In this example, each scan band is three scans. Accordingly, it is necessary to make jetting rates constant with respect to a nozzle group of scan 2 in the middle of the three scans. Further, in a case where scan 1 and scan 3 are in the complementary relationship, it is possible to uniformize a distribution of an average jetting rate per unit area in the jetting rate pattern.

[Example 3 of Scan Method in Case where the Number of Overlaps is "1"]

Figure 61:
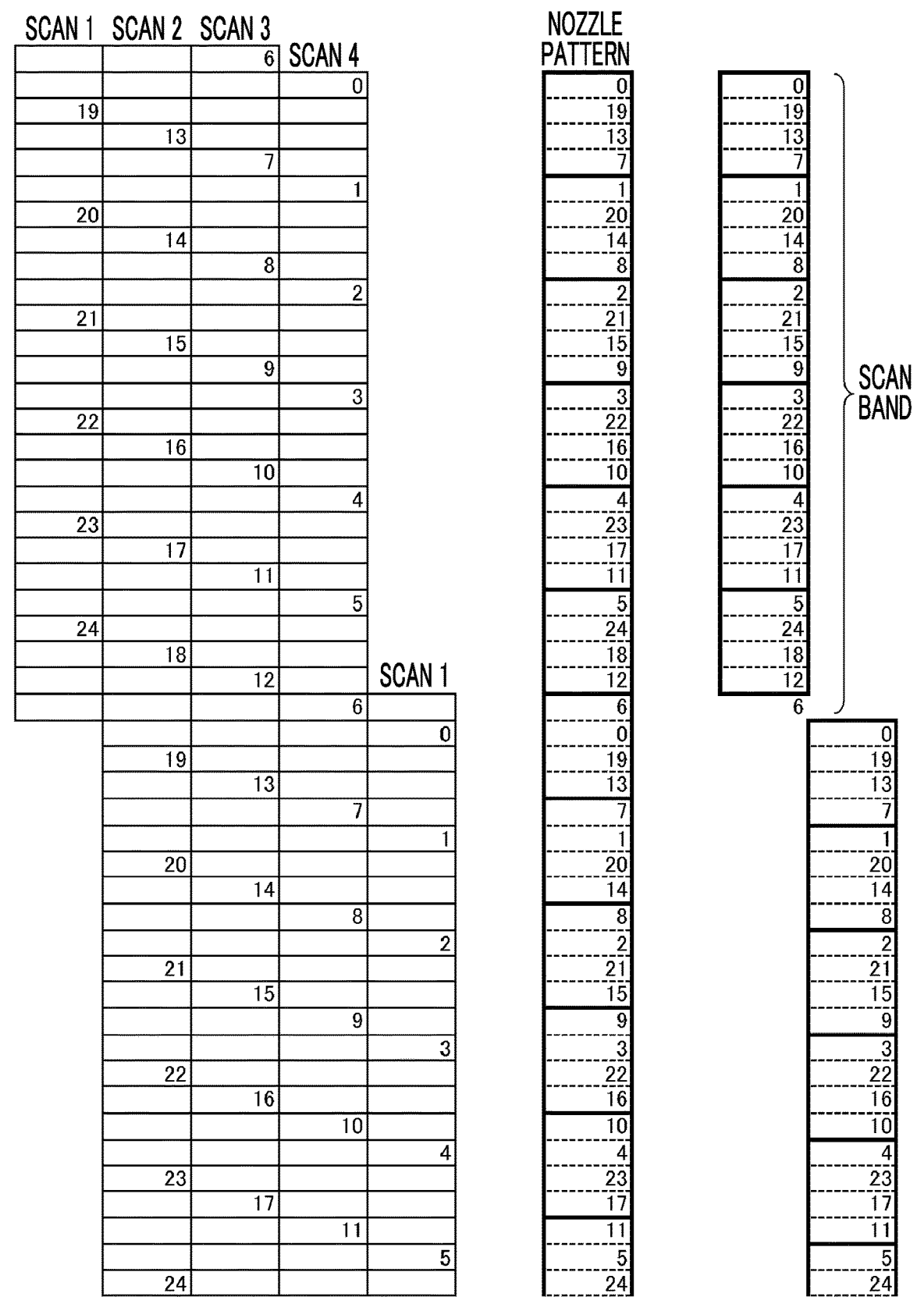

FIG. 61 is a diagram showing a relationship between nozzles and a raster in each scan, and a part of a nozzle pattern in a case where a nozzle pitch in a nozzle row is "4", the number of nozzles is "25", and a paper feed amount is "25".

Figures 62, 63, 64:
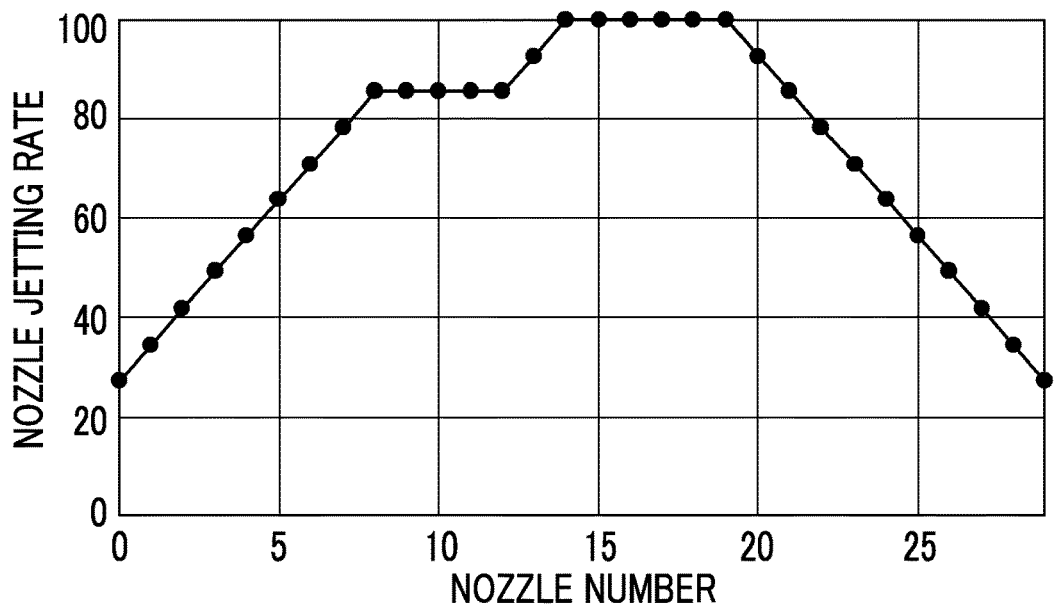
FIG. 62 is a chart showing nozzle groups of respective scans of scan 1 to scan 4.
FIG. 63 is a chart showing an example of jetting rates of respective scan nozzle groups obtained according to Example 6.
FIG. 64 is a graph of nozzle jetting rates designed in accordance with a nozzle jetting rate design method according to Example 6.

FIG. 62 is a diagram showing nozzle groups of respective scans of scan 1 to scan 4. The nozzle number 6 is a gap nozzle. In this example, each scan band is recorded by four scans. In a case where sums of jetting rates of corresponding nozzles of respective scan nozzle groups of scan 1 and scan 2 that are the first half scan are set as first half scan nozzle group jetting rates, sums of jetting rates of corresponding nozzles of respective scan nozzle groups of scan 3 and the scan 4 that are the second half scan are set as second half scan nozzle group jetting rates, and the first half scan and the second half scan are in the complementary relationship, it is possible to uniformize a distribution of an average jetting rate per unit area in the jetting rate pattern.

<Example in which Inclination is not Changed in Branch of Scan Nozzle Groups>

The above-described Example 1 to Example 5 are all examples in which an inclination is changed in a branch of scan nozzle groups. In realizing the invention, it is not essential that an inclination is changed in a branch of respective scan nozzle groups. The invention is not limited to a case where the inclination is changed in the branch of the scan nozzle groups, and a configuration in which an inclination is changed inside a scan nozzle group instead of the branch, without changing the inclination in the branch, may be employed. In this case, similarly, a jetting rate of each nozzle may be designed by the same method as the above-described method. Hereinafter, a specific example thereof will be described.

[Example 6 of Nozzle Jetting Rate Design Method]

FIG. 63 shows an example of jetting rates of respective scan nozzle groups obtained according to Example 6. It is assumed that the scan method of Example 6 is the scan method shown in FIGS. 32 to 34. First, a nozzle disposed at an end in the first half scan nozzle group and a nozzle at an inclination change point are determined, jetting rates are determined with respect to the respective nozzles of the nozzle disposed at the end and the change point nozzle, and linear interpolation is performed with respect to nozzles therebetween to obtain jetting rates of the respective nozzles. In Example 6, a nozzle that is a branch of respective scan nozzle groups is not determined. In Example 6, an end nozzle of the scan 1 nozzle group is set to a nozzle number 29, a nozzle disposed at an end of the scan 2 nozzle group is set to a nozzle number 15, and a change point nozzle is set to a nozzle number 19. Further, a jetting rate of the nozzle number 29 is set to 25%, a jetting rate of the nozzle number 19 is set to 100%, and a jetting rate of the nozzle number 15 is set to 100%, respectively.

Then, jetting rates of the second half scan nozzle group are calculated, but the calculating method is as described above, and description thereof will not be repeated.

FIG. 64 is a graph of nozzle jetting rates designed in accordance with a nozzle jetting rate design method according to Example 6. A lateral axis in FIG. 64 represents a nozzle number, and a longitudinal axis represents a nozzle jetting rate.

Figures 66, 67:
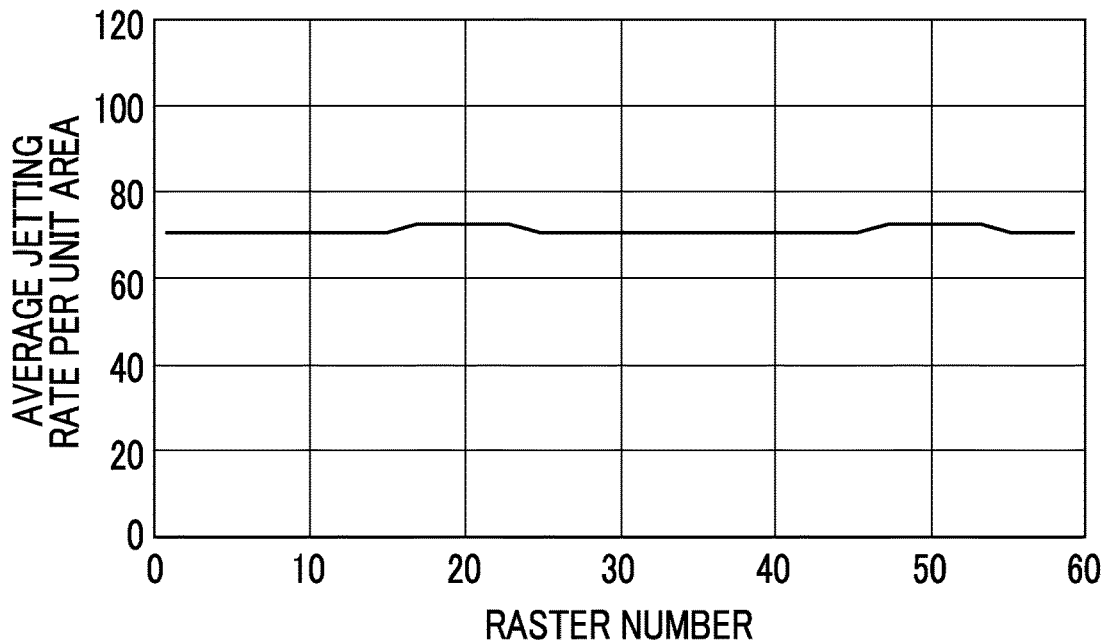
FIG. 66 is a graph showing an average jetting rate per unit area based on the jetting rate pattern shown in FIG. 65.
FIG. 67 is a diagram partially showing a partial scan band shown in FIG. 33.

FIG. 65 is a diagram showing a jetting rate pattern based on the nozzle jetting rates shown in FIG. 64. FIG. 66 is a graph showing an average jetting rate per unit area based on the jetting rate pattern shown in FIG. 65. A lateral axis in FIG. 66 represents a position in a sub scan direction using a raster number, and a longitudinal axis represents an average jetting rate per unit area. As shown in FIG. 66, the average jetting rate per unit area is generally uniform.

<Summary for Nozzle Jetting Rate Design Methods>

Various design examples have been described using Examples 1 to 6, but nozzle jetting rate design methods are collectively summarized.

Procedure 1: First, jetting rates of the first half scan nozzle group are discretionally designed. Here, the design is performed so that jetting rate differences between adjacent nozzles are small and consecutive.

Procedure 2: Then, jetting rate of the second half scan nozzle group are calculated so that the second half scan nozzle group and the first half scan nozzle group are in the complementary relationship. The procedure 2 includes a procedure 21 to a procedure 24 described below.

Procedure 21: First, a jetting rate of an end nozzle of the final scan of the second half scan is set to the same value as in a jetting rate of an end nozzle of a first scan in the first half scan.

As in the example of FIG. 34, the jetting rate of the nozzle number 0 of the scan 4 is set to the same value as the jetting rate of the nozzle number 29 of scan 1.

Procedure 22: Respective nozzle jetting rates of the final scan of the second half scan are calculated to be in the complementary relationship with jetting rates of a scan that forms a pair with the first half scan.

In the case of the example of FIG. 35, jetting rates of scan 4 are calculated to be in the complementary relationship with jetting rates of scan 1 that forms a pair with scan 4. Here, as in the example of FIG. 45, in a case where the complementary relationship between the respective scans of the first half scan and the second half scan is a one-to-two relationship, a one-to-three relationship, or the like, other than a one-to-one relationship, the jetting rates of scan 4 are calculated to be in the complementary relationship with sum jetting rates according to the complementary relationship.

Procedure 23: Then, in a case where there is a gap nozzle, a jetting rate of the gap nozzle and a jetting rate of a nozzle at an end of the next scan are calculated, and in a case where there is no gap nozzle, the jetting rate of the nozzle at the end of the next nozzle is calculated.

In the case of the example of FIG. 35, since the gap nozzle number 7 is present, jetting rates of the gap nozzle number 7 and the nozzle number 8 at an end of the next scan 3 are calculated. In this case, the jetting rate calculating method is performed so that jetting rates are changed in moving from an end of a current scan to an end of the next scan in the second half scan, by the same amount as a change of jetting rates in moving from an end of a scan in a complementary relationship to an end of a scan in the next complementary relationship. According to a correspondence relationship between the current scan and the next scan in the second half scan and the scan in the complementary relationship in the first scan of the next scan, the positive and negative of the change are reversed.

In the example of FIG. 35, since the jetting rate is increased by 9.375% from the nozzle number 23 at the end of scan 1 to the gap nozzle number 22 in the first half scan, the jetting rate is increased by 9.375% from the nozzle number 6 at the end of the scan 4 to the gap nozzle number 7 in the second half scan, so that a jetting rate of the gap nozzle number 7 is set to 90.625%. Further, since the jetting rate is increased by 9.375% from the gap nozzle number 22 in the first half scan to the nozzle number 21 at the end of scan 2, the jetting rate is increased by 9.375% from the gap nozzle number 7 of scan 4 in the second half scan to the nozzle number 8 at the end of scan 3, so that a jetting rate of the nozzle number 8 is set to 100%.

The calculation of the jetting rates of the gap nozzle in the second half scan and the nozzle at the end of each scan of the second half scan is performed to prevent occurrence of a step difference by matching jetting rates of central nozzles in the first half scan and the second half scan. In the case of the example of FIG. 34, the nozzle number 15 corresponds to the central nozzle of the first half scan, and the nozzle number 14 corresponds to the central nozzle of the second half scan.

By matching a change of the jetting rates in each gap nozzle in the second half scan and the nozzle at the end of each scan and a change of the jetting rates in each gap nozzle in the first half scan and the nozzle at the end of each scan, jetting rates of the central nozzle of the first half scan and the central nozzle of the second half scan that are adjacent to each other in the vicinity of the center of the nozzle row. The change of the jetting rates in each scan nozzle group in the second half scan matches the change of the jetting rates in each scan nozzle group that is in the complementary relationship in the first half scan.

Further, since the jetting rates of the first half scan nozzle group are designed so that jetting rate differences between adjacent nozzles become small and consecutive, by matching the change of the jetting rates in each gap nozzle in the second half scan and the nozzle at the end of each scan and a change of the jetting rates in the first half scan, it is possible to perform design so that jetting rate differences between adjacent nozzles become small and consecutive.

In a case where the complementary relationship between the respective scans of the first half scan and the second half scan is one-to-two, one-to-three, one-to-four, . . . , two-to-two, two-to-three, . . . , and so on, instead of the one-to-one relationship, jetting rates are calculated so that the jetting rates are changed in moving from an end of a current scan to an end of the next scan in the second half scan, by the same amount as a change of jetting rates in moving from an end of a scan in a complementary relationship to an end of a scan in the next complementary relationship.

Procedure 24: After, through the above-described procedures, each nozzle jetting rate of the final scan of the second half scan is calculated, the jetting rate of the gap nozzle and the jetting rate of the nozzle at the end of the next scan are calculated in a case where there is the gap nozzle, and the jetting rate of the nozzle at the end of the next nozzle is calculated in a case where there is no gap nozzle, each nozzle jetting rate of the next scan is calculated to be in the complementary relationship with a nozzle jetting rate of a scan of the first half scan that forms a pair with the next scan. As in the example of FIG. 35, the jetting rates of scan 3 are calculated to be in the complementary relationship with the jetting rates of scan 2 that forms a pair with scan 3.

By repeating the procedure 24, the jetting rates of the second half scan nozzle group may be calculated.

<Method for Calculating Jetting Rate of Second Half Scan Nozzle Group>

Referring to the method for calculating the jetting rates of the second half scan nozzle group described in the procedure 21 to the procedure 24, the jetting rates of the second half scan nozzle group may be calculated according to the following procedures.

Procedure 31: The jetting rate of the end nozzle of the final scan of the second half scan is determined.

Procedure 32: Each nozzle jetting rate of the final scan is calculated to be in the complementary relationship with the first half scan.

Procedure 33: A jetting rate of a gap nozzle and a jetting rate of a nozzle at an end of the second scan to last are calculated so that the jetting rates are changed by the same amount as a change in the first half scan.

Procedure 34: Each nozzle jetting rate of the second scan to last is calculated to be in the complementary relationship with the first half scan.

Procedure 35: A jetting rate of a gap nozzle and a jetting rate of a nozzle at an end of the third scan to last are calculated so that the jetting rates are changed by the same amount as a change in the first half scan.

Procedure 36: Each nozzle jetting rate of the third scan to last is calculated to be in the complementary relationship with the first scan.

Thereafter, by repeating the same procedures, jetting rates of all scan nozzle groups are calculated up to a scan nozzle group of the first scan in the second half scan, to obtain jetting rates of the second half scan nozzle group.

In a case where the second half scan nozzle group is configured of only one scan nozzle group, the procedure 33 and the subsequent procedures are not performed. In a case where the second half scan nozzle group is configured of only two scan nozzle groups, the procedure 35 and the subsequent procedures are not performed.

<Modification Example of Jetting Rate Calculating Method of Second Half Scan Nozzle Group>

The procedures indicated by the procedures 31 to 36 are procedures for calculating jetting rates of respective nozzles from a scan nozzle group of the final scan, but may be procedures for calculating the jetting rates of the respective nozzles from the scan nozzle group of the first scan including the central nozzle. In this case, the following procedures are used.

Procedure 41: A jetting rate of the central nozzle of the first scan in the second half scan is determined.

Procedure 42: A jetting rate of each nozzle of the first scan is calculated to be in the complementary relationship with the first half scan.

Procedure 43: A jetting rate of a gap nozzle and a jetting rate of a nozzle at an end of the second scan from the first are calculated so that the jetting rates are changed by the same amount as a change in the first half scan.

Procedure 44: A jetting rate of each nozzle of the second scan from the first is calculated to be in the complementary relationship with the first half scan.

Procedure 45: A jetting rate of a gap nozzle and a jetting rate of a nozzle at an end of the third scan from the first are calculated so that the jetting rates are changed by the same amount as a change in the first half scan.

Procedure 46: A jetting rate of each nozzle of the third scan from the first is calculated to be in the complementary relationship with the first half scan.

Thereafter, by repeating the same procedures, jetting rates of all scan nozzle groups are calculated up to a scan nozzle group of the final scan in the second half scan, to obtain jetting rates of the second half scan nozzle group.

In a case where the second half scan nozzle group is configured of only one scan nozzle group, the procedure 43 and the subsequent procedures are not performed. In a case where the second half scan nozzle group is configured of only two scan nozzle groups, the procedure 45 and the subsequent procedures are not performed.

In the case of the procedures indicated by the procedures 41 to 46, in the procedure 41, as the jetting rate of the central nozzle of the first scan in the second half scan, the same value as the jetting rate of the central nozzle in the first half scan is determined. For example, in the case of the example of FIG. 35, as the jetting rate of the nozzle number 14 that is the central nozzle in the second half scan, the same value as the jetting rate of 100% of the nozzle number 15 that is the central nozzle in the first half scan is determined. Since the calculation method of the procedure 42 and the subsequent procedures is the same as the above-described calculation method, description thereof will not be repeated.

<<Nozzle Jetting Rate Design Support Apparatus that Supports Design of Nozzle Jetting Rate>>

A nozzle jetting rate design support apparatus for performing a process of determining a nozzle jetting rate of each nozzle that satisfies a specific target condition in accordance with the above-described nozzle jetting rate design methods according to the present disclosure may be realized by a combination of hardware and software of a computer. That is, the above-described respective procedures of the nozzle jetting rate design methods according to the present disclosure may be executed by the computer.

By executing a program for causing a computer to realize functions of processes corresponding to the respective procedures of the procedure 1, the procedure 2, the procedures 21 to 24, and the procedures 31 to 36 using the computer, it is possible to determine nozzle jetting rates of respective nozzles in which an average jetting rate per unit area of a jetting rate pattern is uniformized.

Further, by executing a program for causing the computer to realize functions of processes corresponding to the respective procedures of the procedures 41 to 46 instead of the procedures 31 to 36 using the computer, it is possible to determine nozzle jetting rates of respective nozzles in which an average jetting rate per unit area of a jetting rate pattern is uniformized.

The nozzle jetting rate design support apparatus may be incorporated inside a dither mask apparatus (which will be described later), or may be provided as an individual apparatus separated from the dither mask apparatus.

<<Each Scan Nozzle Group and Gap Nozzle>>

A nozzle group of each scan for recording each unit region in each scan band is changed in accordance with setting methods of the respective scan bands. The example of the scan method of FIG. 33 will be described.

FIG. 67 is a diagram partially showing the first scan band shown in FIG. 33. In the above description, a range of a scan band [1] in which a raster of the nozzle number 0 of the final scan is used as a first row in each scan band is considered as a "scan band" for description.

However, the range considered as the "scan band" may be present in a scan band other than the scan band [1]. In each scan band, it is necessary to include a final nozzle of the first scan and a first nozzle of the final scan, but a plurality of setting methods of the range of the scan band may be present. For example, in the case of FIG. 67, as another setting of a range of a scan band including a nozzle number 29 that is the final nozzle of the first scan and a nozzle number 0 that is the first nozzle of the final scan, there is a setting method for setting a range of a scan band [2]. A nozzle pattern in this case, and nozzles of respective scans for recording respective unit regions are shown in FIGS. 68 and 69.

FIG. 68 shows a nozzle pattern in a case where the setting of the scan band [2] shown in FIG. 67 with respect to the scan band range.

FIG. 69 is a chart showing nozzles of respective scans for recording each unit region in a case where the setting of the scan band [2] shown in FIG. 67 is employed with respect to the scan band range.

In comparison of FIGS. 34 and 69, it can be understood that combinations of nozzles of respective scans for recording respective unit regions are different from each other and gap nozzles are different from each other. In this way, the respective scan nozzle groups or gap nozzles are changed in accordance with the scan band range setting methods.

However, no matter which setting method is employed with respect to the scan band range, the respective nozzle jetting rates may be designed to be identical to each other in accordance with the above-described nozzle jetting rate design methods.

<<Configuration Example of Ink Jet Recording Apparatus>>

Figure 70:
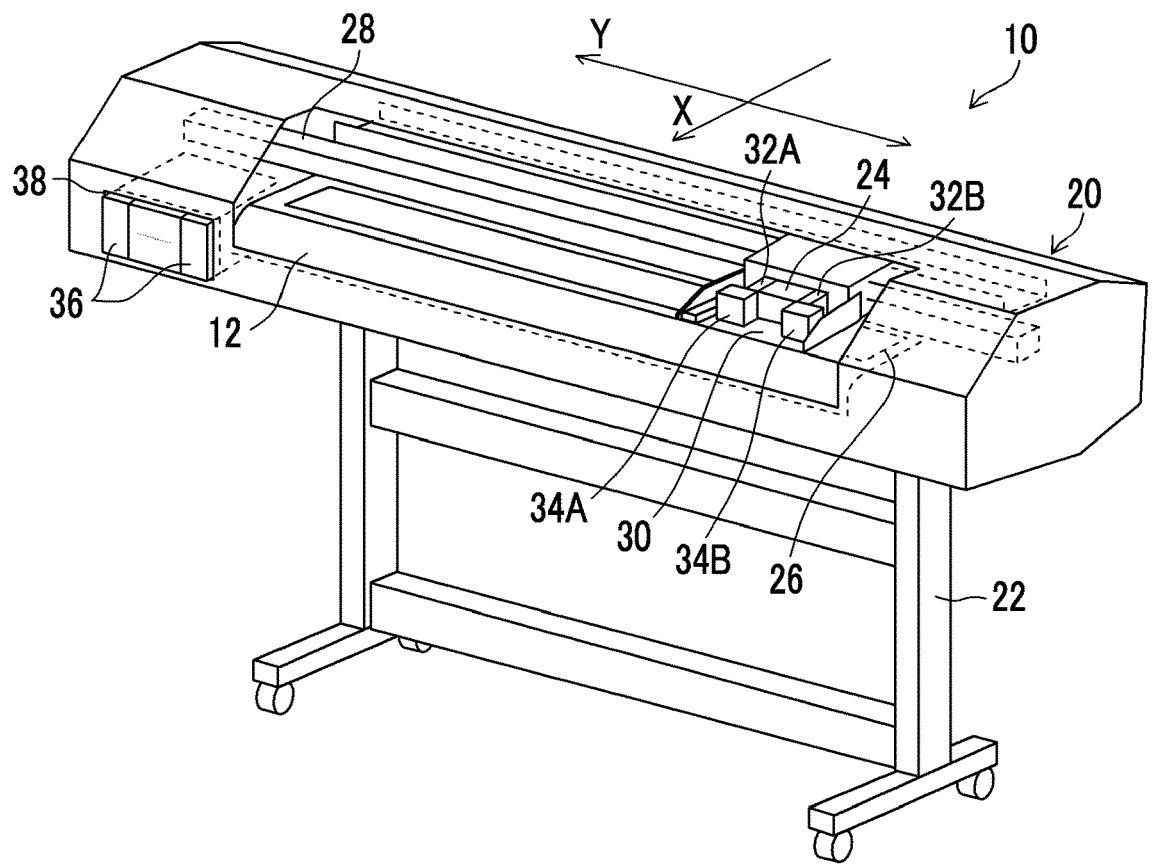
FIG. 70 is a perspective view showing an appearance of a configuration example of an ink jet recording apparatus.

FIG. 70 is a perspective view showing an appearance of a configuration example of an ink jet recording apparatus. An ink jet recording apparatus 10 is an example of a serial type ink jet printer, which is a wide format printer for recording a color image on a recording medium 12 using an ultraviolet curable ink. In application of the invention, the type of the ink jet recording apparatus is not limited to this example.

The ink jet recording apparatus 10 comprises an apparatus body 20 and a support foot 22 that supports the apparatus body 20. A recording head 24, a platen 26, a guide mechanism 28, and a carriage 30 are provided in the apparatus body 20.

The recording head 24 is a drop-on-demand type ink jet head that jets ink toward the recording medium 12. The term "recording head" is synonymous with a term such as a print head, a plotting head, an ink jet head, a liquid jet head, a droplet jet head, or a droplet jet head. Further, the term "ink jet recording apparatus" is synonymous with a term such as an ink jet printing apparatus, an ink jet printer, or an ink jet type image forming apparatus. The term "recording" is used as a term that includes a meaning of "printing", "print", "plotting" or "image forming".

A variety of mediums may be used as the recording medium 12, regardless of materials such as paper, non-woven fabric, vinyl chloride, synthetic chemical fibers, polyethylene, polyester, or tarpaulin. The recording medium 12 may be a permeable medium, or may be a non-permeable medium. The term "recording medium" is a generic term for mediums to which ink is attached, and may include mediums called a variety of terms such as a printing medium, a medium for recording, a medium for image forming, an image receiving medium, a medium for jetting, a print medium, a recording sheet, or a printing sheet.

The platen 26 is a member that supports the recording medium 12. The guide mechanism 28 and the carriage 30 function as head moving means for supporting the recording head 24 to be movable. The guide mechanism 28 is disposed to extend along a head scan direction that crosses a transport direction of the recording medium 12 and is a direction parallel to a medium support surface of the platen 26, above the platen 26. The "above the platen 26" means that the guide mechanism 28 is disposed at an upper and higher position with reference to the platen 26 when a gravity direction is a "downward" direction. The transport direction of the recording medium 12 may be referred to as a "paper feed direction". Further, a direction that is perpendicular to the paper feed direction and is parallel to a recording surface of the recording medium 12 may be referred to as a "sheet width direction".

The carriage 30 is supported to be reciprocally movable in the sheet width direction along the guide mechanism 28. A direction that is parallel to the reciprocal direction of the carriage 30 corresponds to a "main scan direction". Further, a direction that is parallel to the transport direction of the recording medium 12 corresponds to a "sub scan direction". That is, the paper width direction is the main scan direction, and the paper feed direction is the sub scan direction. In FIG. 70, the sub scan direction is expressed as an X direction, and the main scan direction is expressed as a Y direction.

The recording head 24, temporary curing light sources 32A and 32B, and main curing light sources 34A and 34B are mounted on the carriage 30. The recording head 24, the temporary curing light sources 32A and 32B, and the main curing light sources 34A and 34B integrally move together with the carriage 30 along the guide mechanism 28. By reciprocating the carriage 30 along the guide mechanism 28, the recording head 24 may be relatively moved in the main scan direction with respect to the recording medium 12.

The temporary curing light sources 32A and 32B emit infrared rays for temporarily curing ink landed on the recording medium 12. The temporary curing means partially curing ink to such a degree as to prevent movement or deformation of ink drops after dropping. A temporary curing process may be referred to as "partial curing", "half curing", "pinning", "set", or the like. In the present specification, the term "temporary curing" is used.

On the other hand, a process of further emitting infrared rays after the temporary curing and sufficiently curing ink is referred to as "main curing" or "curing". In the present specification, the term "main curing" is used. The main curing light sources 34A and 34B are light sources that perform additional exposure after the temporary curing and finally emit infrared rays for mainly curing ink.

The apparatus body 20 is provided with a mounting portion 38 for mounting of an ink cartridge 36. The ink cartridge 36 is an exchangeable ink tank that stores infrared curing ink. The ink cartridge 36 is provided corresponding to ink of each color used in the ink jet recording apparatus 10. The ink jet recording apparatus 10 in this example has a configuration in which ink of four colors, that is, cyan (C), magenta (M), yellow (Y), and black (K) is used. The respective color ink cartridges 36 are connected to the recording head 24 by ink supply paths that are independently formed. In a case where an ink remaining amount of each color becomes small, exchange of the ink cartridge 36 is performed. Although not shown, a maintenance portion of the recording head 24 is provided on a right side when looking at the front of the apparatus body 20. The maintenance portion is provided with a cap for moisturization or nozzle suction of the recording head 24 when printing is not performed, and a dispense member for cleaning a nozzle surface that is an ink jet face of the recording head 24. A blade and/or a web may be used as the dispense member.

[Configuration of Recording Medium Transport Path]

Figure 71:
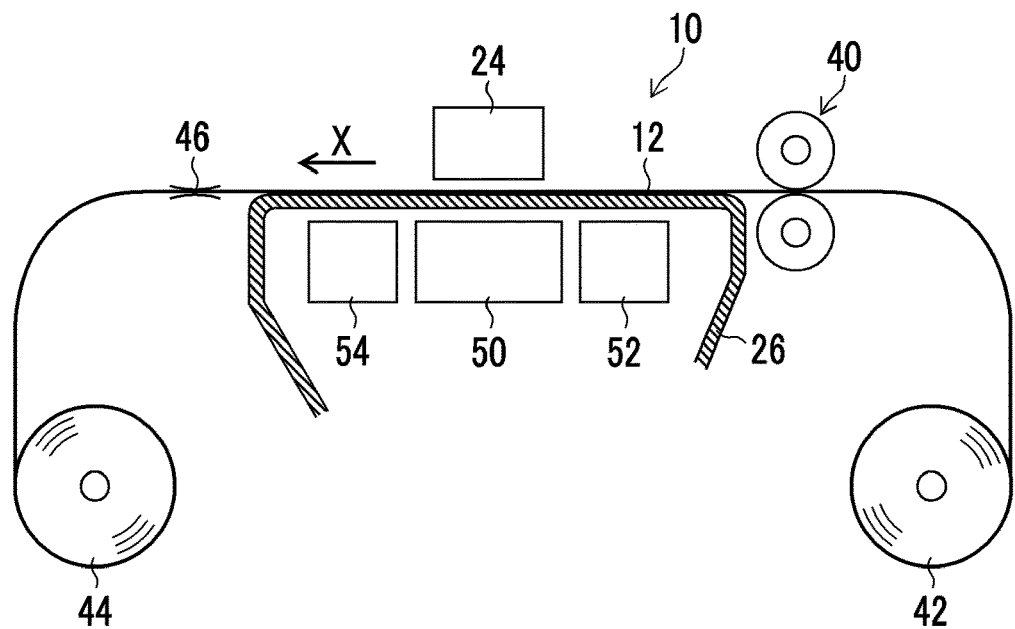
FIG. 71 is a diagram schematically showing a recording medium transport path of the ink jet recording apparatus.

FIG. 71 is a diagram schematically showing a recording medium transport path of the ink jet recording apparatus 10. As shown in FIG. 71, the platen 26 has an upper face that is a support face of the recording medium 12. On an upstream side in the paper feed direction with reference to a position of the platen 26, nip rollers 40 are disposed.

The recording medium 12 in this example is supplied in continuous form paper that is rolled (may be referred to as roll paper). The recording medium 12 sent out from a supply side roll 42 is transported by the nip rollers 40. With respect to the recording medium 12 that reaches an area directly below the recording head 24, an image is the recording head 24. On a downstream side in the paper feed direction with reference to the position of the recording head 24, a winding roll 44 that winds the recording medium 12 after recording of the image is provided. Further, a guide 46 is provided at a transport path of the recording medium 12 between the platen 26 and the winding roll 44.

In the ink jet recording apparatus 10 of the present embodiment, roll-to-roll type paper transport means in which the recording medium 12 sent from the supply side roll 42 is wound by the winding roll 44 through the platen 26. Here, in execution of the invention, a configuration of the paper transport means is not limited to this example. For example, a configuration in which the winding roll 44 is not provided, or a configuration in which a cutter that cuts the recording medium 12 in a desired size is provided, or other configurations may be used. Further, the recording medium 12 is not limited to the continuous form paper, and cut paper (that is, flat paper) separated one by one may be used.

On a rear surface side of the platen 26, that is, on a side opposite to the medium support face that supports the recording medium 12 in the platen 26, a temperature control section 50 that controls a temperature of the recording medium 12 during image recording is provided. By the temperature control of the temperature control section 50, it is possible to obtain desired values of physical properties such as a viscosity and a surface tension of ink landed on the recording medium 12, and to obtain desired dot diameters. Further, a pre-temperature control section 52 is provided on an upstream side of the temperature control section 50 in the paper feed direction, and an after-temperature control section 54 is provided on a downstream side of the temperature control section 50 in the paper feed direction. A configuration in which the pre-temperature control section 52 and/or the after-temperature control section 54 are not provided may be used.

[Configuration Example of Recording Head>

Figure 72:
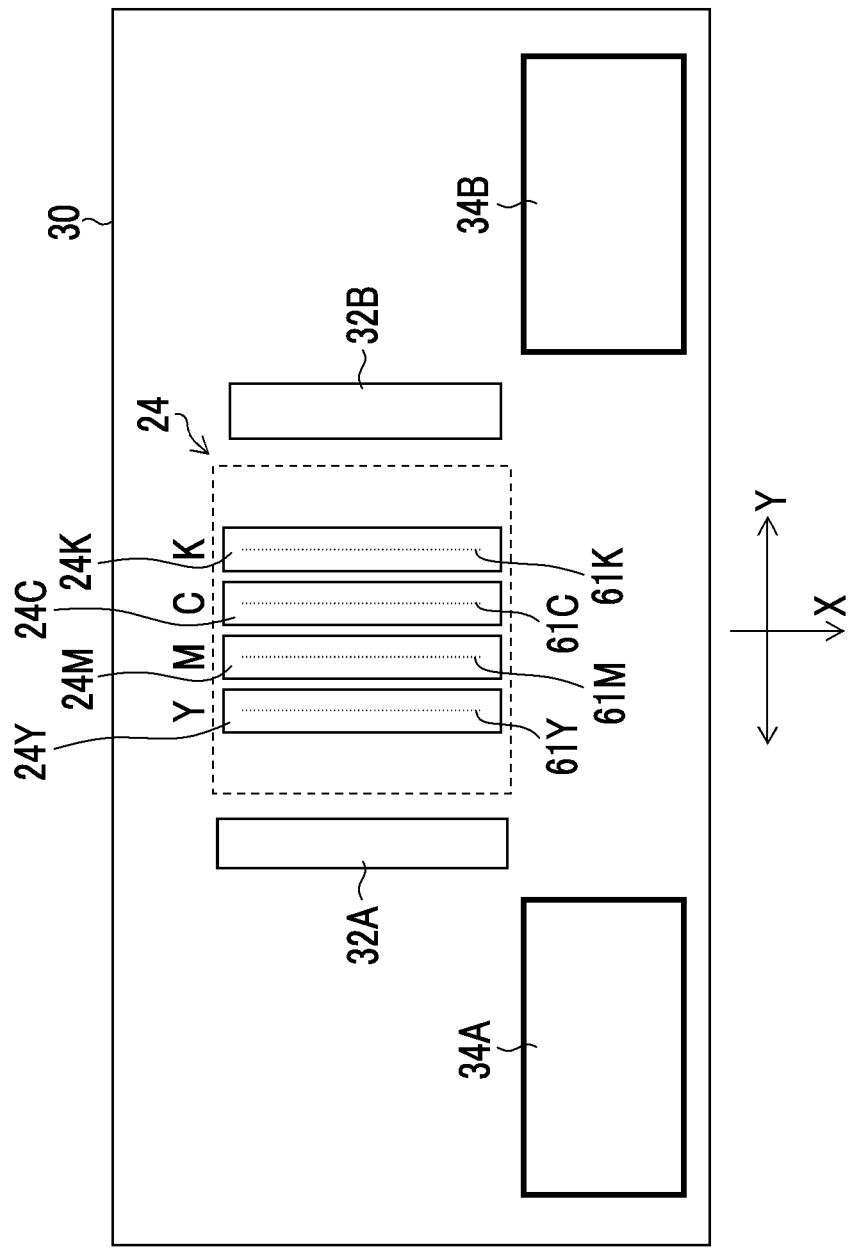
FIG. 72 is a planar perspective view showing an example of a disposition configuration of a recording head, a temporary curing light source, and a main curing light source.
Figure 73:
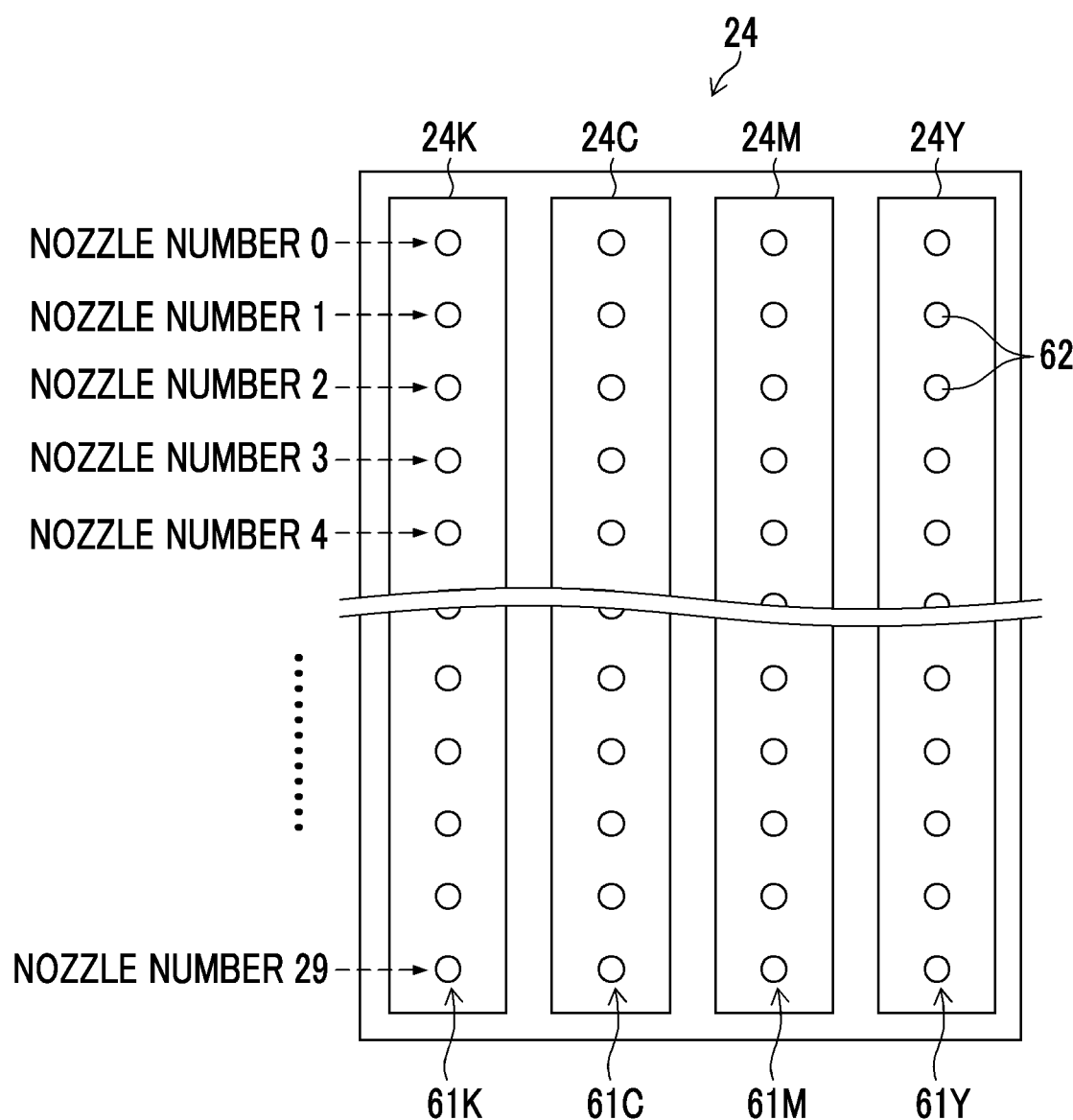
FIG. 73 is an enlarged view of a recording head.

FIG. 72 is a planar perspective view showing an example of a disposition configuration of the recording head 24, the temporary curing light sources 32A and 32B, and the main curing light sources 34A, and 34B, disposed on the carriage 30. FIG. 73 is an enlarged view of the recording head 24. In FIG. 73, the paper feed direction is a direction that directs from the bottom of the drawing to the top thereof.

As shown in FIGS. 72 and 73, nozzle rows 61C, 61M, 61Y, and 61K in which nozzles 62 (see FIG. 4) for jetting ink of the respective colors of cyan (C), magenta (M), yellow (Y), and black (K) are disposed in the sub scan direction are provided in the recording head 24.

In FIG. 72, the nozzle rows are indicated by dotted lines, and individual illustrations of the nozzles are omitted. In the recording head 24 shown in FIG. 72, an example in which the respective nozzle rows are disposed in the order of the nozzle row 61Y of yellow, the nozzle row 61M of magenta, the nozzle row 61C of cyan, and the nozzle row 61K of black from the left of FIG. 72 is shown, but kinds (color numbers) of ink colors or color combinations are not limited to the present embodiment.

For example, in addition to four colors of C, M, Y, and K, a configuration in which light ink such as light cyan or light magenta is used, or a configuration in which ink of a special color instead of the light ink or in combination thereof is used may be used. In accordance with the kind of an ink color to be used, a configuration in which a nozzle row that jets ink corresponding thereto is added may be used. Further, the disposition order of the nozzle rows of the colors is not particularly limited. Here, it is preferable that a configuration in which a nozzle row of ink that has a relatively low curing sensitivity with respect to ultraviolet rays among a plurality of kinds of ink is disposed on a side close to the temporary curing light source 32A or 32B is used.

In this embodiment, the recording head 24 is configured by forming a head module for each of the nozzle rows 61C, 61M, 61Y, and 61K of the respective colors and arranging the head modules. Specifically, a head module 24Y having the nozzle row 61Y that jets yellow ink, a head module 24M having the nozzle row 61M that jets magenta ink, a head module 24C having the nozzle row 61C that jets cyan ink, and a head module 24K having the nozzle row 61K that jets black ink are disposed at equal intervals to be parallel to each other in the reciprocal direction of the carriage 30 (that is, in the main scan direction).

The entirety of the module group of the head modules 24Y, 24M, 24C, and 24K of the respective colors may be considered as the "recording head", or each head module may be considered as the "recording head". Further, instead of a configuration in which the head modules 24Y, 24M, 24C, and 24K of the respective colors are combined, a configuration in which ink passages for respective colors are dividedly formed inside one recording head and nozzle rows that jet ink of a plurality of colors are provided may be used.

As shown in FIG. 73, the respective nozzle rows 61C, 61M, 61Y, and 61K are formed so that a plurality of nozzles 62 are arranged in parallel at regular intervals in the sub scan direction. In FIG. 73, an example in which 30 nozzles 62 are respectively disposed in the nozzle rows 61C, 61M, 61Y, and 61K of the respective colors is shown. Nozzle numbers 0 to 29 are assigned to the respective nozzles 62.

The nozzle numbers in this example are sequentially assigned to the respective nozzles 62 as consecutive numbers from one end side toward the other end side of the nozzle row in the sub scan direction. In this example, the nozzle number starts from the number 0, but a leading number among the nozzle numbers may be the number 1. The leading number may be a random integer that is equal to or greater than 0. The nozzle numbers may be used as identification numbers indicating positions of the respective nozzles 62.

Further, this example shows a nozzle row in which 30 nozzles 62 are arranged in a row along the sub scan direction, but the number of nozzles that form the nozzle row and a disposition form of the nozzles are not limited to this example. For example, a nozzle row in which nozzles are arranged at equal intervals in the sub scan direction using a two-dimensional nozzle arrangement in which a plurality of nozzle rows are combined may be formed.

As an ink jet method of the recording head 24, a piezo jet method for jetting ink through deformation of a piezoelectric element is employed. A configuration in which an electrostatic actuator instead of the piezoelectric element is used as a jet energy generating element may be used. Further, a thermal jet method for heating ink using a heating body (a heat generating element) such as a heater to generate an air bubble and jetting ink drops by its pressure may be employed. Since the ultraviolet curable ink generally has a viscosity higher than that of solvent ink, in a case where the ultraviolet curable ink is used, it is preferable to employ the piezo jet method having a relatively large jetting rate.

The recording head 24 jets ink onto the recording medium 12 while being moved in the main scan direction to perform image recording in a region having a predetermined length of the recording medium 12 in the sub scan direction. Further, in a case where the recording medium 12 is moved by a predetermined distance in the sub scan direction after the image recording, the recording head 24 performs the same recording in the next region, and thereafter, the same image recording is repeated whenever the recording medium 12 is moved by the predetermined distance in the sub scan direction, so that the image recording may be performed over the entire surface of the recording region of the recording medium 12.

In this way, the recording head 24 is a serial type recording head. The ink jet recording apparatus 10 of the present embodiment employs a multipath method in which a predetermined recording resolution is realized through a plurality of scans of the recording head 24 in the main scan direction.

[Configuration of Control System of Ink Jet Recording Apparatus]

Figure 74:
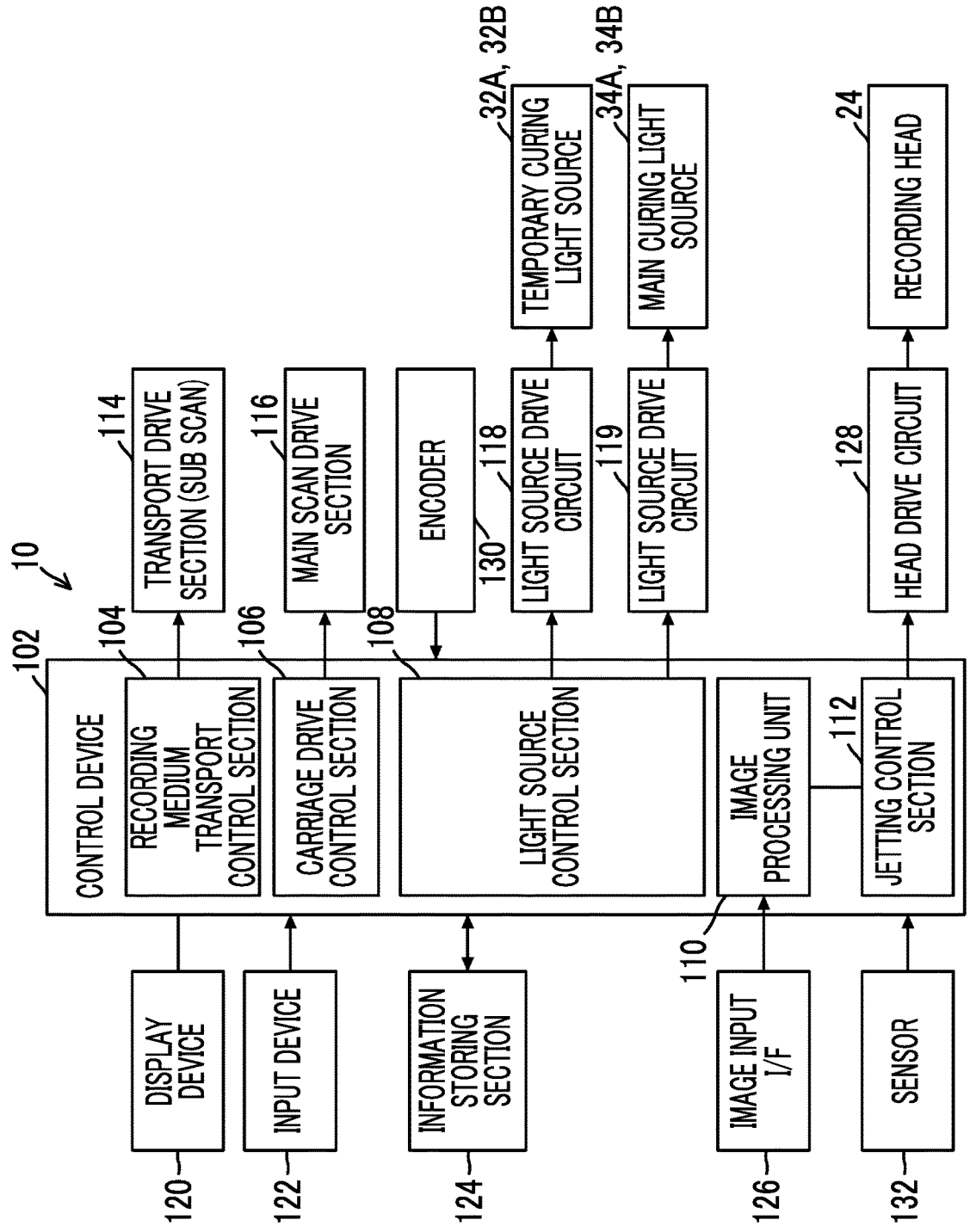
FIG. 74 is a block diagram showing a configuration of the ink jet recording apparatus.

FIG. 74 is a block diagram showing a configuration of the ink jet recording apparatus 10. As shown in FIG. 74, the ink jet recording apparatus 10 comprises a control device 102. A computer that comprises a central processing unit (CPU) may be used as the control device 102, for example. The control device 102 executes a variety of programs read from an information storing section 124 to generally control the entirety of the ink jet recording apparatus 10.

The control device 102 includes a recording medium transport control section 104, a carriage drive control section 106, a light source control section 108, an image processing unit 110, and a jetting control section 112. The respective sections may be realized by hardware or software, or a combination thereof. The "software" is synonymous with a "program" or an "application".

The recording medium transport control section 104 controls the transport drive section 114 that transport the recording medium 12. The transport drive section 114 includes a drive motor for driving the nip rollers 40 (see FIG. 71), and a drive circuit thereof. The recording medium transport control section 104 serves as a sub scan drive section. The recording medium 12 transported on the platen 26 is intermittently fed in the sub scan direction in a swath width unit in accordance with a scan (a movement of a printing path) in the main scan direction of the recording head 24. Here, the "swath width" refers to a length in the sub scan direction determined at a repetitive scan cycle by reciprocation of the carriage 30, and is calculated by dividing a nozzle row length that is the length of the nozzle row in the sub scan direction by the number of paths that is the number of repetitive scans. The "swath" is synonymous with a scan band. The number of paths that is the number of repetitive scans is the number of scans necessary for completing drawing of a set recording resolution, and is determined by a drawing mode. Details of the drawing mode will be described.

The carriage drive control section 106 controls the main scan drive section 116 that moves the carriage 30 in the main scan direction. The main scan drive section 116 includes a drive motor connected to a moving mechanism of the carriage 30, and a control circuit thereof.

An encoder 130 is provided in the drive motor of the main scan drive section 116 and the drive motor of the transport drive section 114. The encoder 130 inputs a pulse signal based on a rotation amount and a rotating speed of each drive motor to the control device 102. Thus, the control device 102 may recognize a position of the carriage 30 and a position of the recording medium 12 on the basis of the pulse signal input from the encoder 130.

The light source control section 108 controls emission of light of the temporary curing light sources 32A and 32B through a light source drive circuit 118, and controls emission of light of the main curing light sources 34A and 34B through a light source drive circuit 119.

The image processing unit 110 performs image processing with respect to image data input through an image input interface 126, and converts the result into dot data for printing. In FIG. 5, for ease of notation, "IF" is simply used instead of "the interface. IF is an abbreviation of "interface".

The image processing unit 110 functions as a halftone processing unit that performs halftone processing using a dither method. That is, the image processing unit 110 performs quantification processing of pixel values using a dither mask with respect to a continuous-tone image that corresponds to input image data, and generates a halftone image corresponding to dot data for printing. The dither mask used in the halftone processing of the image processing unit 110 is generated by reflecting nozzle jetting rates designed by applying the nozzle jetting rate design methods according to the present disclosure. An example of a dither mask generating method will be described later.

The jetting control section 112 controls the head drive circuit 128 that drives the recording head 24 on the basis of dot data generated in the image processing unit 110, to thereby control jetting of ink from each nozzle 62 of the recording head 24. The control device 102 is a form of a recording control section. A process of performing the halftone processing by the image processing unit 110 corresponds to a form of a halftone processing process. A process of controlling an image recording operation by the control device 102 corresponds to a form of a recording control process. A process of recording an image on a recording medium by the ink jet recording apparatus 10 corresponds to a form of an image recording method.

As the information storing section 124, for example, a non-volatile memory is used. The information storing section 124 stores a variety of programs or a variety of data necessary for control of the control device 102. For example, the information storing section 124 stores a control program executed by the respective sections of the control device 102, a scan pattern program, and the like, as the programs. The scan pattern program is a multipath type image recording program, and defines a reciprocating scan (a movement of a printing path) of the recording head 24 in the main scan direction with respect to the recording medium 12 that is intermittently transported in the sub scan direction or the number of paths (the number of repetitive scans). The movement of the printing path that is accompanied by the movement of the recording head 24 in the main scan direction includes at least one of a movement direction of the recording head 24 in formation of dots, selection of a nozzle for jetting ink, or a jetting timing. A pattern of scans determined by a combination of the movement of the printing path and the number of paths is referred to as a "scan pattern".

To the control device 102, an input device 122 and a display device 120 are connected. The input device 122 may employ a variety of units such as a keyboard, a mouse, a touch panel, or an operating button, for example, and may employ an appropriate combination thereof. The input device 122 inputs an external operating signal that is manually operated by an operator who is a user to the control device 102.

A liquid crystal display or the like is used as the display device 120. An operator may input a variety of information using the input device 122. Further, the operator may confirm input contents, other various types of information, a status of a system, or the like, through display on the display device 120.

A sensor 132 is provided in the carriage 30. The control device 102 may recognize the width of the recording medium 12 on the basis of a sensor signal input from the sensor 132.

[Description of Multi-Path Type Image Recording Method]

Figure 75:
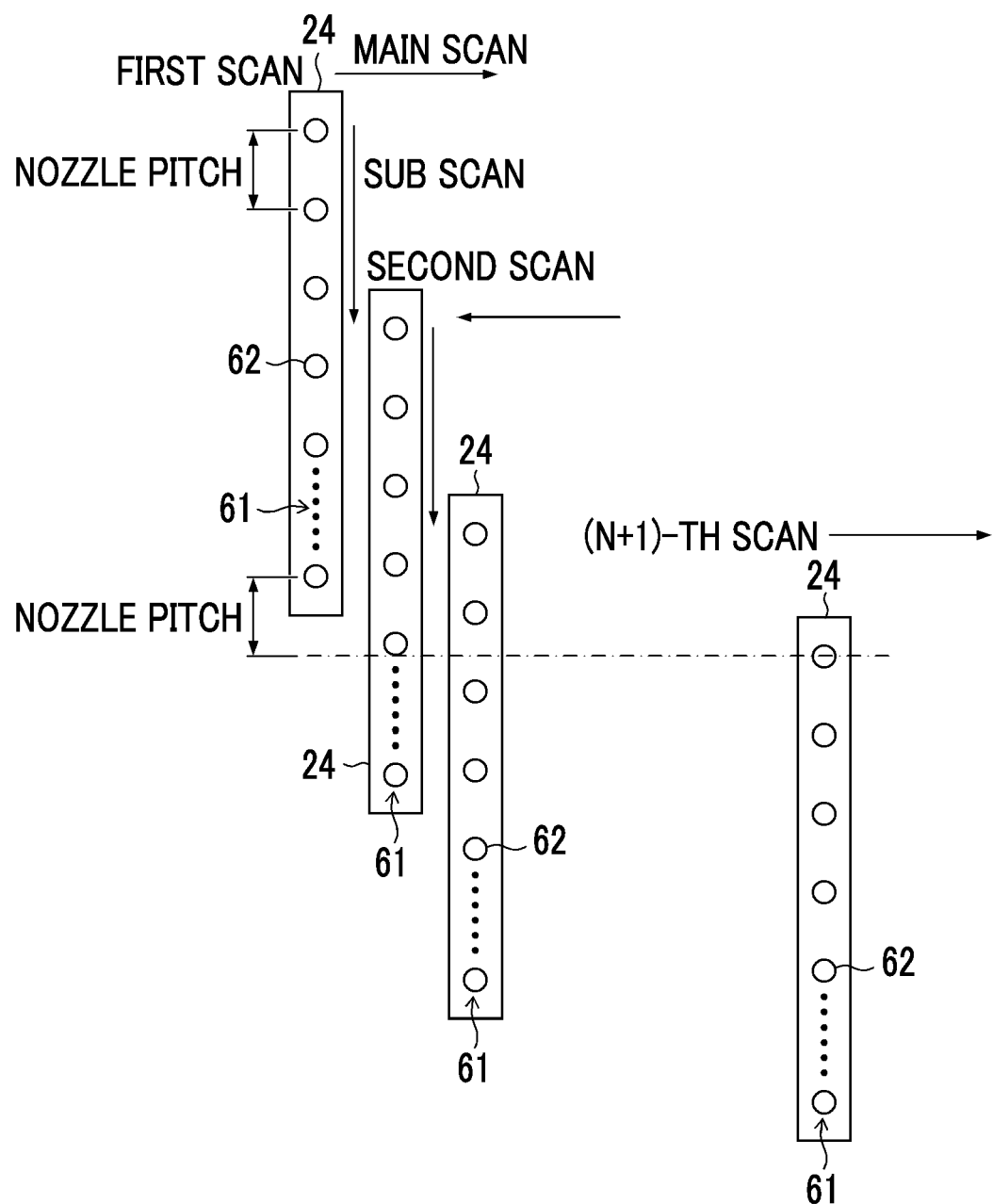
FIG. 75 is a diagram for illustrating an example of an image recording method of a multipath type.

FIG. 75 is a diagram for illustrating an example of an image recording method of a multipath type. Here, for ease of description, a case where a configuration of the recording head 24 is simplified, the number of nozzle rows of the recording head 24 is set to only one row, and recording is performed by the one-row nozzle row 61 will be described as an example. It may be understood that the nozzle row 61 represents any one row of the nozzle rows 61C, 61M, 61Y, and 61K described in FIG. 73.

Further, with respect to a configuration in which a recording medium is intermittently fed in the sub scan direction, for ease of illustration, in FIG. 75, a configuration in which the recording medium is at a stopped state and the recording head 24 is intermittently moved in the sub scan direction is shown. In FIG. 75, the recording medium is not shown, and only the movement of the recording head 24 is shown. A lateral direction in FIG. 75 represents the main scan direction. A longitudinal direction in FIG. 75 is the sub scan direction.

As shown in FIG. 75, in a case where the recording head 24 is moved in the main scan direction, jetting of ink is performed from the nozzles 62. Further, as described above, two-dimensional image recording is performed on the recording medium by a combination of reciprocation of the recording head 24 along the main scan direction and the intermittent feeding of the recording medium in the sub scan direction. The term "image recording" may be replaced with a term such as drawing, printing, or image formation.

A main scan operation for performing recording of dots by jetting of ink from the nozzles 62 while the recording head 24 is being moved in the main scan direction may include a scan performed at a forward path and a scan performed at a backward path in the main scan direction. An image may be a bidirectional scan at the forward path and the backward path, or may be a certain one-directional scan at the forward path or the backward path. In a case where the bidirectional scan at the forward path and the backward path is performed, one reciprocating scan is counted as execution of two scans of the forward path scan and the backward path scan.

In a case where an image of a predetermined recording resolution is completed by N scans where N is a natural number, a relative positional relationship (here, a positional relationship in the sub scan direction) between the recording medium and the recording head 24 in an (N+1)-th scan becomes a relationship as shown in FIG. 75. That is, in order to perform image recording of the predetermined recording resolution by N writings, the recording medium is intermittently fed in the sub scan direction in the first writing, the second writing, the third writing, and so on, and a positional relationship in which connection is performed at a position corresponding to the length of the nozzle row is obtained just in the (N+1)-th scan is obtained. In order to connect N writing operations in a seamless manner, the recording medium is moved in the sub scan direction by an amount of "nozzle row length+1 nozzle pitch" from the sub scan directional position of the first scan, and the (N+1)-th scan is performed. Here, the "nozzle row length" represents the length of the nozzle row 61 in the sub scan direction in which the nozzles 62 are arranged in a row in the sub scan direction, and corresponds to a distance between nozzles disposed at opposite ends of the nozzle row. The "nozzle pitch" represents a nozzle interval in the nozzle row in the sub scan direction.

For example, let's consider a case where a recording resolution of main scan 600 dpi×sub scan 400 dpi is realized by 8 paths (8 writings) of 2 paths in the main scan direction and 4 paths in the sub scan direction using the recording head 24 having the nozzle row 61 in which the nozzles 62 are arranged at a nozzle arrangement density of 100 npi. Here, npi (nozzle per inch) is a unit indicating the number of nozzles per 1 inch. Further, dpi (dot per inch) is a unit indicating the number of dots per 1 inch. 1 inch corresponds to about 25.4 millimeters.

Here, an interval of jetting points determined from a recording resolution is referred to as a "jetting point interval", and a grid indicating a position of a recordable jetting point is referred to as a "jetting point grid". The "jetting point" is synonymous with a "pixel" capable of controlling recording or non-recording of a dot. The "jetting point interval" is synonymous with a "pixel interval", and corresponds to a minimum dot interval in the recording resolution. The "jetting point grid" is synonymous with a "pixel grid". The "grid" is synonymous with a cell of a matrix indicated by rows and columns.

In the case of the recording resolution of the main scan 600 dpi×sub scan 400 dpi, a jetting point interval in the main scan direction is 42.3 micrometers ($\approx$25.4 (millimeters)/600), and a jetting point interval in the sub scan direction is 63.5 micrometer (=25.4 (millimeters)/400). This represents the size "42.3 micrometers×63.5 micrometers" of one cell (corresponding to one pixel) of the jetting point grid. With respect to the feed control of the recording medium 12 or the control of the jetting position (that is, a jetting timing) from the recording head 24, a feed amount or position is controlled by using the jetting point interval determined from the recording resolution as a unit. The jetting point interval determined from the recording resolution may be referred to as a "resolution pitch" or a "pixel pitch". Further, the nozzle pitch may be indicated by a length unit, but instead, may be indicated in the unit of a jetting point interval (pixel pitch) in the sub scan direction. For example, in a case where a nozzle arrangement density is 100 npi with respect to the recording resolution of sub scan 400 dpi, since the nozzle pitch is four times the pixel pitch in the sub scan direction, the nozzle pitch may be expressed as "4" in the unit of the pixel pitch in the sub scan direction.

In the case of N=8 of 2 paths in the main scan direction 2 paths and 4 paths in the sub scan direction, recording of a grid of 2×4 jetting points is performed by 8 scans (that is, 8 paths) so that a jetting point line in the main scan direction is filled by two scans and a jetting point line in the sub scan direction is filled by four scans. Here, the "jetting point line" means a scan line, which is synonymous with raster.

Figure 76:
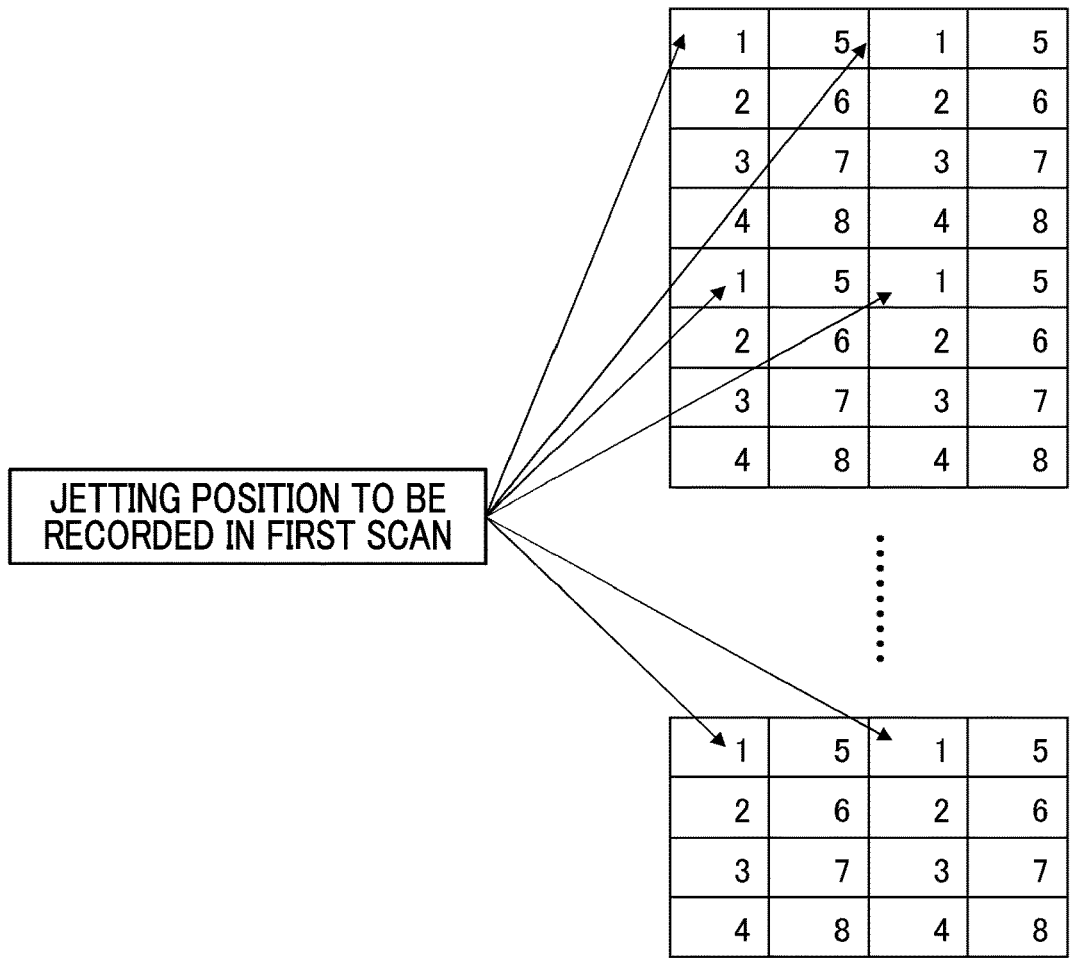
FIG. 76 is a diagram schematically showing a relationship between numbers of respective scans and jetting positions recorded by the respective scans in eight writing-drawing operations.

FIG. 76 is a diagram schematically showing a relationship between numbers (from 1 to 8) of respective scans and jetting positions recorded by the respective scans in eight writing-drawing operations. In FIG. 76, respective cells with the numbers of 1 to 8 represent jetting positions (pixel positions) nozzles, and each of the numbers of 1 to 8 represents a scan number indicating an order of a scan by which a certain pixel position is recorded. For example, a cell (pixel) with the number "1" represents a jetting position that is the first scan.

As is obvious from FIG. 76, a disposition distribution of the numbers of 1 to 8 indicating scan orders for recording respective jetting positions has a basic unit in which a grid of "2×4" of two in the main scan direction and four in the sub scan direction is repeated. The grid of 2×4 is referred to as a "basic unit grid" or a "2×4 grid". The "basic unit grid" is synonymous with the "unit region". A method (jetting order) for filling the 2×4 grid is not limited to the example shown in FIG. 76, and a variety of methods may be considered.

In the drawing mode, a recording resolution and a scan pattern are determined, and the number of cells of the basic unit grid, a cell arrangement form, and scan numbers of respective cells are determined. The scan number represents a scan order.

[Example of Drawing Mode]

As described above, the multipath type drawing control is applied to the ink jet recording apparatus 10, and the recording resolution may be changed by changing the number of printing paths. For example, three type modes of a high production mode, a standard mode, and a high image quality mode are prepared, and respective recording resolutions are different from each other in the respective modes. The recording resolution is synonymous with a "printing resolution". The drawing mode may be selected in accordance with a printing purpose or usage. The term "drawing mode" may be replaced with a "printing mode".

This will be specifically described using a simple numerical value example. It is assumed that a nozzle arrangement density of the nozzle row 61 in the sub scan direction in the recording head 24 is 100 npi.

In the high production mode, recording is performed at the recording resolution of main scan 600 dpi×sub scan 400 dpi, and in the main scan direction, the recording based on the recording resolution of 600 dpi is realized by two paths, that is, two scans. That is, in the first scan, dots are formed at a resolution of 300 dpi. The first scan is performed at a forward path of the carriage 30, for example. In the second scan, dots are formed so that centers of the dots formed in the first scan are complemented at 300 dpi, so that the resolution of 600 dpi is obtained in the main scan direction. The second scan is performed at a backward path of the carriage 30, for example.

On the other hand, with respect to the sub scan direction, a nozzle pitch is 100 npi, and dots are formed at a resolution of 100 dpi in the sub scan direction by one main scan. Accordingly, the recording resolution of 400 dpi is realized by performing complementary printing through four path printing (four scans).

In the standard mode, recording is realized at a recording resolution of 600 dpi×800 dpi, in which a resolution of 600 dpi×800 dpi is obtained by 2-path printing in the main scan direction and 8-path printing in the sub scan direction.

In the high image quality mode, printing is executed at a recording resolution of 1200 dpi×1200 dpi, in which a recording resolution of 1200 dpi×1200 dpi is obtained by 4-path printing in the main scan direction and 12-path printing in the sub scan direction.

<Dither Mask used in Halftone Processing>

Using each nozzle jetting rate of each nozzle generated according to the above-described nozzle jetting rate design method, a dither mask in which the nozzle jetting rate is reflected is generated.

In generating the dither mask, a nozzle jetting rate that is a control target is determined, a threshold of each pixel of the dither mask is set so that an absolute nozzle jetting rate is increased in accordance with an increase of a duty in a state where a nozzle jetting rate is generally retained.

<Example of Dither Mask Generating Method>

Figure 77:
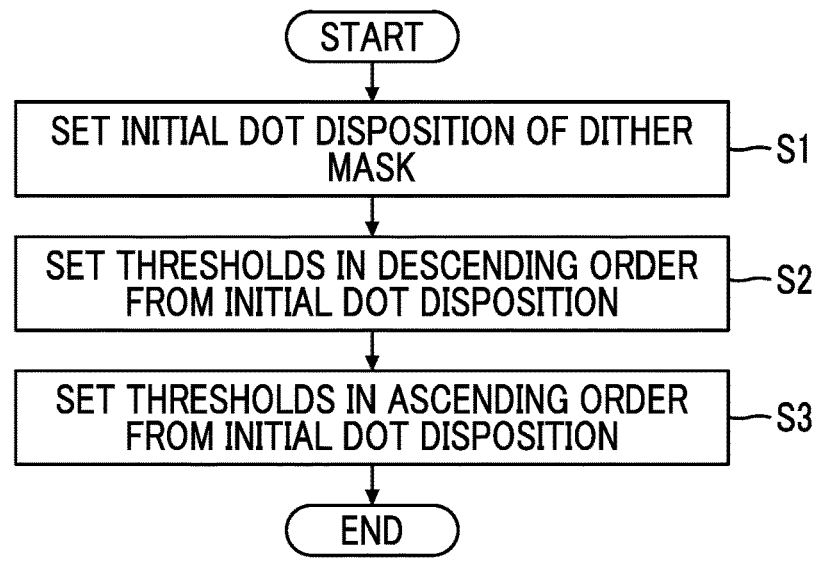
FIG. 77 is a flowchart showing a procedure of a dither mask generating method according to an embodiment.

FIG. 77 is a flowchart showing a procedure of a dither mask generating method according to an embodiment. The dither mask generating method of the present embodiment includes a process of setting an initial dot disposition of the dither mask (step S1), a process of setting a threshold in a descending order from the initial dot disposition (step S2), and a process of setting a threshold in an ascending order from the initial dot disposition (step S3).

Processing of the respective processes of the flowchart shown in FIG. 77 is performed by a computer that functions as a dither mask generating device. The computer functions as the dither mask generating device by executing a program.

Here, in order to simplify the dither mask generating method, it is assumed that the initial dot disposition is a dot disposition with an excessively low duty and a nozzle jetting rate is not reflected. An initial duty of the "excessively low duty" corresponding to the initial dot disposition may have a value that is larger than 0% and is equal to or smaller than 1%, for example, and more preferably, is set to a value that is equal to or greater than 0.1% and is equal to or smaller than 0.5%. In the case of such a low duty, an influence of setting of the nozzle jetting rate may be nearly ignored. The duty of the initial dot disposition (initial duty) is not limited to the above-described numerical value, and may have any value as long as the influence of setting of the nozzle jetting rate can be ignored.

In the initial dot disposition setting process of step S1, dots of a number corresponding to a predetermined initial duty are disposed in a mask region that is a pixel array region that is the same as a mask size of the dither mask.

The descending-order threshold setting process of step S2 is a process of performing a process of setting a threshold of each gradation without reflecting the nozzle jetting rate, using a known threshold setting method. The "descending order" is an order of sequentially setting thresholds from a large threshold value to a small threshold value. The "descending order" in step S2 means that the process is performed while sequentially setting thresholds from a gradation threshold corresponding to the initial dot disposition to a small threshold.

That is, in step S2, a process of sequentially setting small thresholds to threshold non-setting pixels in the descending order while gradually excluding dots from the initial dot disposition. The "threshold non-setting pixels" in the descending order are pixels with dots. The "dot pixel" is synonymous with "dot-on".

The ascending order threshold setting process of step S3 is a process of performing a process of setting thresholds to the threshold non-setting pixels in an ascending order by reflecting a nozzle jetting rate. The "ascending order" in step S3 is an order of sequentially setting thresholds from a small threshold value to a large threshold value. The "ascending order" in step S3 means that the process is performed while sequentially setting thresholds from a gradation threshold corresponding to the initial dot disposition to a large threshold.

The orders of the descending-order threshold setting process (step S2) and the ascending-order threshold setting process (step S3) may be replaced with each other.

Figure 78:
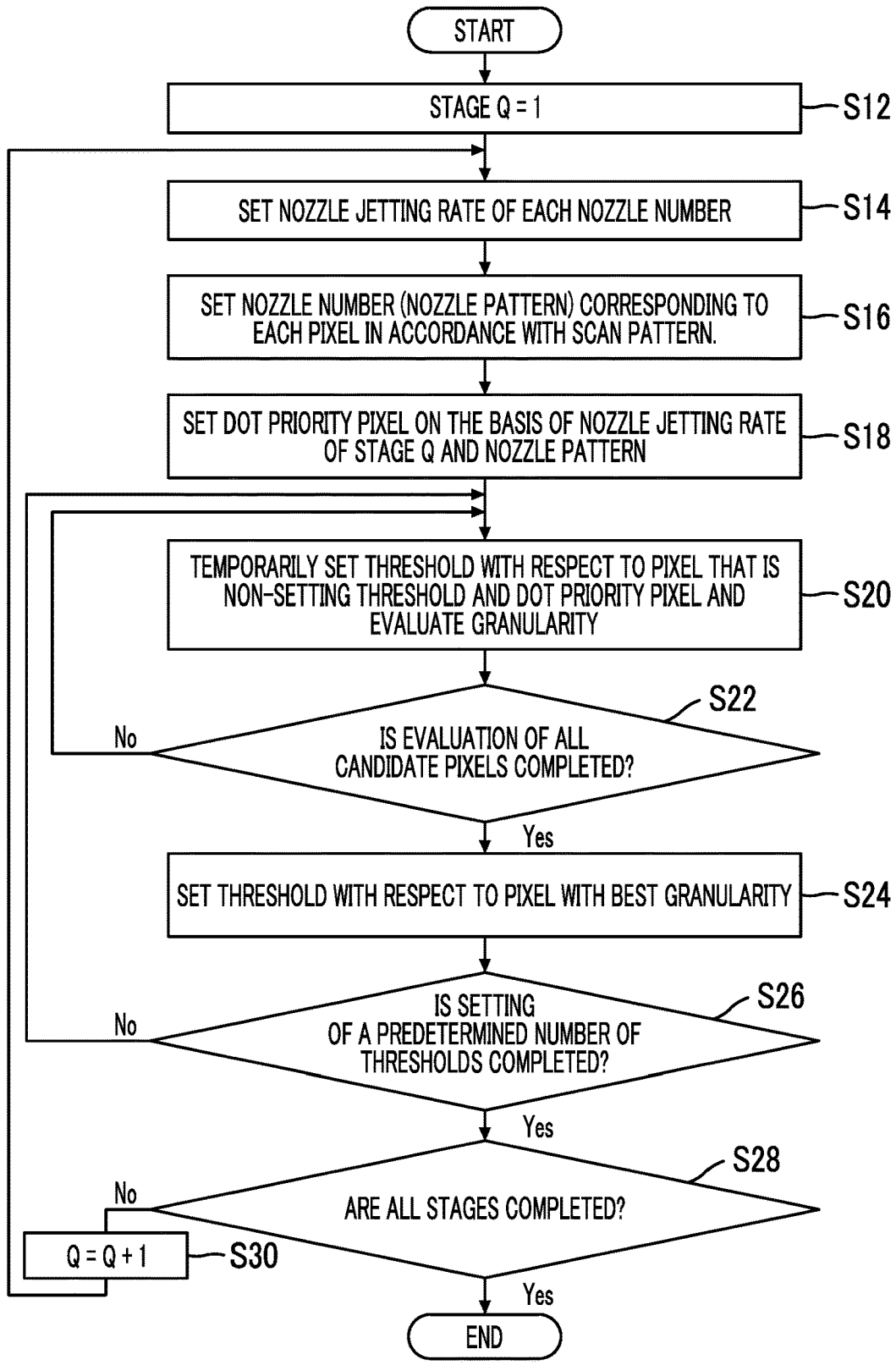
FIG. 78 is a flowchart showing an example of an ascending-order threshold setting process that is applied to an ascending-order threshold setting process (step S3 in FIG. 77).

FIG. 78 is a flowchart showing an example of an ascending-order threshold setting process that is applied to the ascending-order threshold setting process (step S3 in FIG. 77).

In the ascending-order threshold setting process according to the embodiment shown in FIG. 78, first, a setting stage Q of a nozzle jetting rate is set to "stage Q=1" that is an initial value (step S12). In this embodiment, since nozzle jetting rates of respective nozzles are set by being switched in stages in accordance with regions of duties, the nozzle jetting rates are provided in stages. The stage Q is a variable indicating a stage of a nozzle jetting rate.

In this embodiment, the nozzle jetting rate may be used as a "priority pixel setting rate", and the term "nozzle jetting rate" may be replaced with the "priority pixel setting rate".

Figure 79:
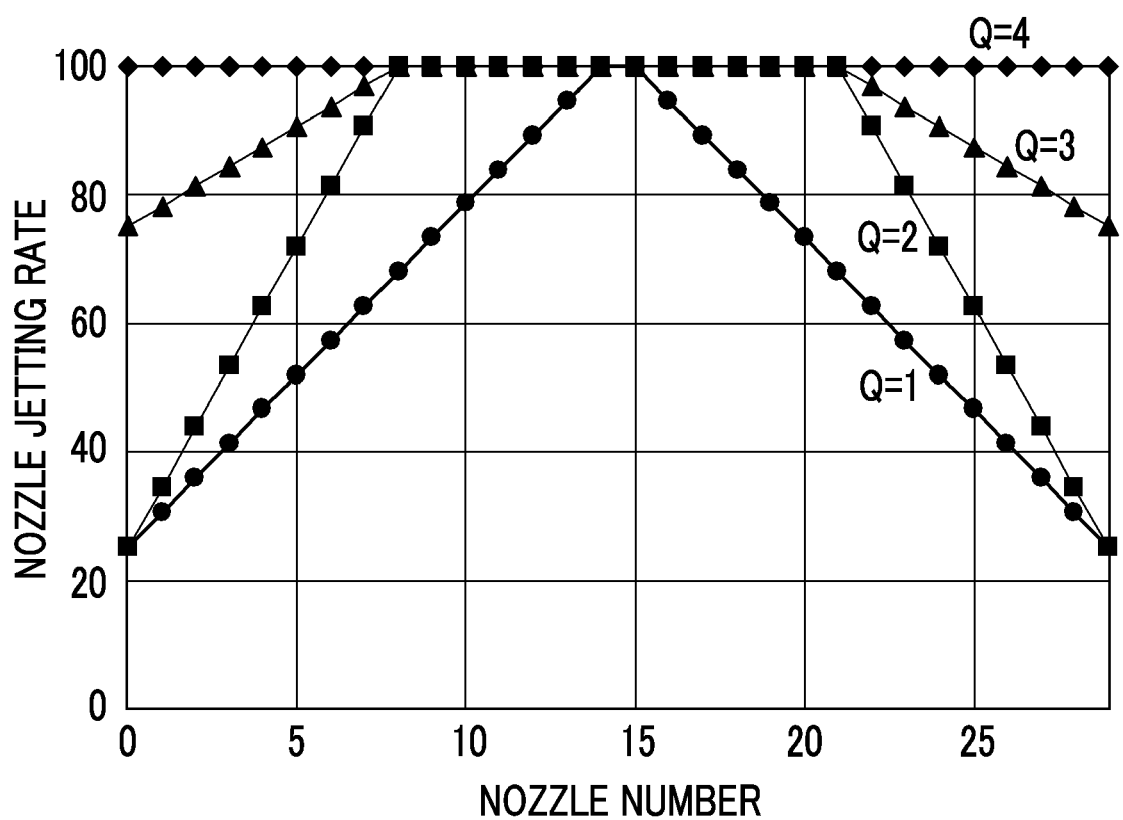
FIG. 79 is a graph showing an example of nozzle jetting rates in respective steps in a case where the number of steps is 4.

FIG. 79 is a graph showing an example of nozzle jetting rates in respective stages in a case where the number of stages is 4. A lateral axis in FIG. 79 represents a nozzle number, and a longitudinal axis represents a nozzle jetting rate. In FIG. 79, a graph of Q=1 represents nozzle jetting rates in a stage 1, a graph of Q=2 represents nozzle jetting rates in a stage 2, a graph of Q=3 represents nozzle jetting rates in a stage 3, and a graph of Q=4 represents nozzle jetting rates in a stage 4. Here, a recording head in which the number of nozzles is 30 will be described as an example.

The "Q" indicating the stage may have an integer value from Q=1 to a stage maximum value in a descending order of nozzle jetting rates. That is, in a case where k is an integer that is equal to or greater than 1, nozzle jetting rates of a stage k+1 are larger than nozzle jetting rates of a stage k. Jetting rates of the stage 1 are the lowest, and jetting rates of a final stage (nozzle jetting rates of the stage 4 in FIG. 79) are set to "100% for all nozzles.

The respective nozzle jetting rates of Q=1, 2, and 3 are designed so that a distribution of jetting rate patterns is uniform in an average jetting rate per unit area by applying the nozzle jetting rate design methods according to the present disclosure. For example, the jetting rates shown in Q=2 of FIG. 79 are the nozzle jetting rates shown in FIG. 36. The nozzle jetting rates of Q=1 in FIG. 79 do not correspond to jetting rates having two kinds of inclinations, but may be designed by the same method as in the examples of the above-described nozzle jetting rate design methods.

Under the setting of the nozzle jetting rates of the stage 1, respective nozzles can record dots only in a range of nozzle absolute jetting rates shown in the graph of stage 1. That is, in a case where the nozzle jetting rates of the respective nozzles are set as in the graph of the stage 1, an upper limit in a recordable duty under the setting is determined. In the case of the stage 1 in FIG. 79, the upper limit in the recordable duty is generally set to 63%. Accordingly, in order to set a threshold of the dither mask up to the maximum duty 100%, the jetting rates are further increased from the stage 1, and nozzle jetting rates of all the nozzles should be set to "100%" in the final stage. That is, in accordance with an increase of a value of a threshold that is set with respect to threshold non-setting pixels of the dither mask, it is necessary to change the setting of the nozzle jetting rates into a plurality of stages of at least two stages.

In FIG. 79, a setting type of nozzle jetting rates of four stages (Q=1, 2, 3, and 4) is shown, but the number of stages number is at least 2. The number of stages may be discretionally set to be equal to or greater than 2.

Figure 80:
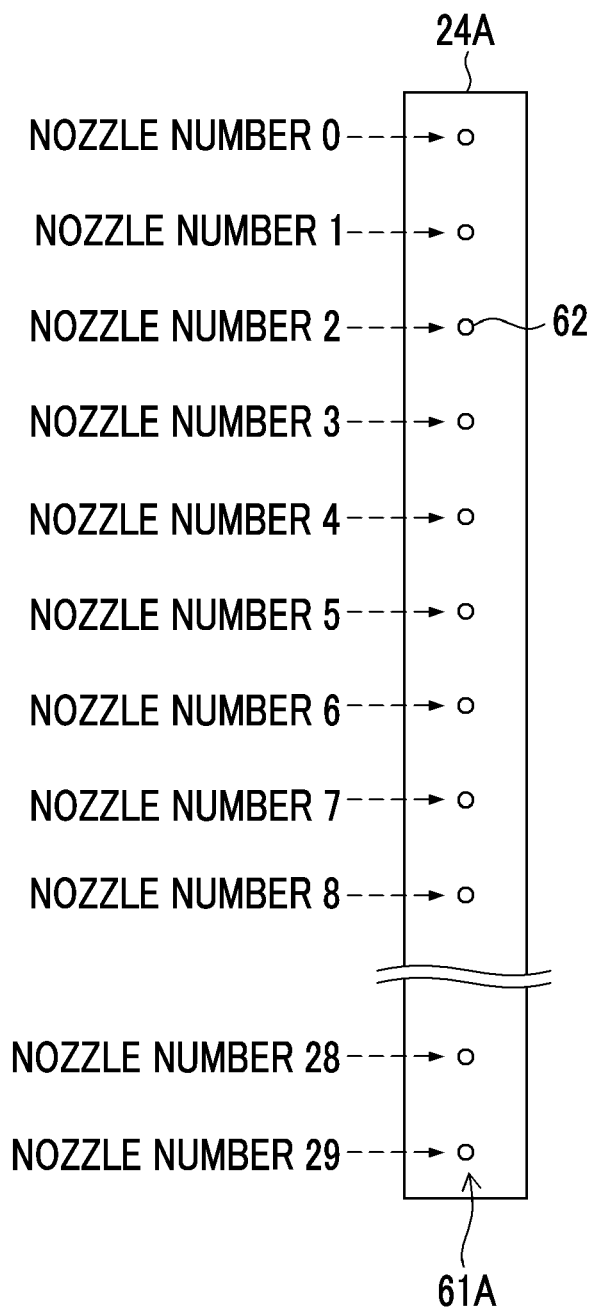
FIG. 80 is a diagram schematically showing of a recording head.

FIG. 80 is a diagram schematically showing of a recording head of which the number of nozzles is 30. As shown in FIG. 80, a recording head 24A includes a nozzle row 61A in which 30 nozzles 62 are arranged in a row at regular intervals in the sub scan direction. Unique nozzle numbers 0, 1, 2, . . . , and 30 are sequentially assigned to the respective nozzles 62, from the nozzle 62 at an upper end in FIG. 80 that is one end of the nozzle row 61A toward a lower end of FIG. 80 that is the other end thereof. A nozzle arrangement density of the nozzle row 61A may be variously designed, but for example, the nozzle arrangement density is set to 300 npi in the sub scan direction.

Nozzle jetting rates of the respective nozzles 62 in the nozzle row 61A of the recording head 24A shown in FIG. 80 may be replaced with the nozzle jetting rates of the respective stages 1 to 4, as shown in FIG. 79, for example. In this embodiment, thresholds are set up to a duty of 50% by applying the jetting rate of Q=1 shown in FIG. 79. In a case where the duty is 50%, since an absolute jetting rate of a central nozzle is suppressed to 80% even in the nozzle jetting rates of Q=1, streaks or bleeding due to the central nozzle does not occur. Similarly, thresholds are set up to a duty of 65% by applying the jetting rate of Q=2. In this case, since the absolute jetting rate of the central nozzle is suppressed to 84%, streaks or bleeding due to the central nozzle does not occur. Further, thresholds are set up to a duty of 80% by applying the jetting rate of Q=3. In this case, since the absolute jetting rate of the central nozzle is suppressed to 86%, streaks or bleeding due to the central nozzle does not occur.

In step S12 of FIG. 78, after the stage Q=1 is set, the procedure proceeds to step S14. In step S14, the nozzle jetting rates of the respective nozzles 62 in the recording head 24A are set. Here, the set nozzle jetting rate corresponds to one form of a priority pixel setting rate, and the nozzle jetting rate setting process of step S14 corresponds to one form of a priority pixel setting rate setting process. In a case where the stage Q=1 is set, the nozzle jetting rates of the respective nozzles 62 in the nozzle row 61A of the recording head 24A shown in FIG. 80 are set as in the graph shown in the stage Q=1 of FIG. 79.

Then, in step S16 of FIG. 78, nozzle numbers (that is, a nozzle pattern) corresponding to respective pixels are set in accordance with a scan pattern. The process of step S16 is a process of setting nozzle numbers corresponding to respective pixels of the dither mask, in accordance with a scan pattern in performing image recording using the ink jet recording apparatus 10 with respect to an image region (that is, a mask region) having a pixel array having the number of pixels that is identical to the mask size of the dither mask.

The nozzle numbers corresponding to the respective pixels means nozzle numbers of nozzles that record the respective pixels. The process of step S16 is a process of determining corresponding nozzle numbers with respect to the respective pixels of the dither mask.

When m and n are natural numbers, in a case where a dither mask that is a generation target is a matrix of m rows×n columns, corresponding nozzle numbers are respectively determined with respect to respective pixels in an image region formed by a two-dimensional pixel array of m rows×n columns. A pattern of nozzle numbers in which the corresponding nozzle numbers are determined with respect to the respective pixels of the dither mask is referred to as a nozzle pattern of the dither mask.

The process of step S16 corresponds to a process of setting a nozzle pattern indicating a correspondence relationship between the respective pixels of the dither mask and the nozzle numbers for recording at respective pixel positions, and corresponds to one form of a "nozzle pattern setting process".

The nozzle pattern of the dither mask is formed such that a nozzle pattern of a repetitive minimum unit shown in FIG. 33 is repeated.

After the nozzle pattern of the dither mask is set in step S16 of FIG. 78, the procedure proceeds to step S18 in FIG. 78. In step S18, on the basis of the nozzle jetting rates of the stage Q set in step S14 and the nozzle pattern set in step S16, dot priority pixels are set. Step S18 corresponds to one form of a "dot priority pixel setting process". The dot priority pixels refer to a pixel group that becomes pixel candidates for which a threshold is set, among the pixels of the dither mask.

FIG. 81 is a diagram showing an example of disposition of dot priority pixels. FIG. 81 shows a disposition example of dot priority pixels set on the basis of the nozzle jetting rates of the stage Q=1 described in FIG. 79 and the nozzle pattern described in FIG. 33. The nozzle numbers shown in FIG. 81 are identical to those of the example in FIG. 33. The nozzle pattern shown in FIG. 33 is repeated by 60 pixels (paper feed amount: 15 pixels×4 times) in the sub scan direction, but in FIG. 81, only 18 pixels among the 60 pixels are shown.

It is preferable that the size of the dither mask is set such that the size in the sub scan direction is a size of integer times of the repetitive minimum unit of the nozzle pattern and the size in the main scan direction is a size of integer times of the repetitive minimum unit of the nozzle pattern. In the case of this example, since the nozzle pattern is repeated by 60 pixels in the sub scan direction, the size of the dither mask is set to a multiple of the repetitive minimum unit, for example, 60×60 pixels. FIG. 81 shows dot priority pixels of 20×18 pixels that are a part of the dither mask of 60×60 pixels. Further, in FIG. 81, values of jetting rates are rounded to the third decimal place, and are shown up to the second decimal place.

As obvious from the nozzle pattern described in FIG. 33, in a case where the number of paths in the main scan direction is 2, a nozzle pattern corresponding to the dither mask of 60×60 pixels have different nozzles to be used in odd rows and even rows. Hereinafter, for ease of description, nozzles used for recording of odd rows (the first row, the third row, the fifth row, and so on from the left of FIG. 81) are referred to as "left nozzles", and nozzles used for recording of even rows (the second row, the fourth row, the sixth row, and so on from the left of FIG. 81) are referred to as "right nozzles".

FIG. 81 shows an example of disposition of dot priority pixels set on the basis of the nozzle jetting rates shown in FIG. 79 and the nozzle pattern shown in FIG. 33.

In FIG. 81, "left nozzle jetting rates" refer to nozzle jetting rates of respective pixels for recording pixels that belong to the odd rows in the nozzle pattern corresponding to the dither mask of 60×60 pixels. Further, in FIG. 81, "right nozzle jetting rates" refer to nozzle jetting rates of respective pixels for recording pixels that belong to the even rows in the nozzle pattern corresponding to the dither mask of 60×60 pixels.

"The number of left nozzle priority pixels" refers to the number of dot priority pixels in main scan directional rasters formed by the pixels that belong to the odd rows in the nozzle corresponding to the dither mask of 60×60 pixels. "The number of right nozzle priority pixels" refers to the number of dot priority pixels in main scan directional rasters formed by the pixels that belong to the even rows in the nozzle corresponding to the dither mask of 60×60 pixels.

In FIG. 81, a flag of a number "1" is assigned to a dot priority pixel, and a cell indicating the pixel is painted with a gray tone. Further, a number "0" is assigned to a non-dot priority pixel. That is, the pixel with the number "1" in a matrix region of 20×18 pixels represents "dot priority pixel-on" and the pixel with the number "0" represents "dot priority pixel-off".

Further, in FIG. 81, nozzle numbers of nozzles for recording respective rasters, nozzle jetting rates, and dot priority pixel numbers of the respective rasters are shown together with the disposition example of the dot priority pixels. Here, the "raster" refers to the main scan directional raster in which pixels are arranged in the main scan direction that is the lateral direction (row direction) in FIG. 81.

The number of dot priority pixels of each raster is obtained by multiplying the nozzle jetting rates of the nozzles for recording the raster by "the number of main scan pixels of the dither mask/the number of paths in the main scan direction". The number of main scan pixels of the dither mask refers to the number of pixels of the dither mask in the main scan direction. In the case of the example of FIG. 81, since the number of main scan pixels of the dither mask is 60, and the number of paths in the main scan direction is "2", the "number of main scan pixels of the dither mask/the number of paths in the main scan direction" is 30. A first row raster shown in FIG. 81 is recorded by the nozzle number 0 and the nozzle number 15 with the number of paths in the main scan direction being "2", in which the nozzle jetting rate of the nozzle number 0 is 25% and the nozzle jetting rate of the nozzle number 15 is 100%. Accordingly, the number of left nozzle priority pixels of the first row raster is calculated as 7.5 (=25%×60/2). Further, the number of right nozzle priority pixels of the first row raster is calculated as 30 (=100%×60/2).

The number of entire dot priority pixels in the mask size of the dither mask is a sum of the numbers of dot priority pixels of the respective nozzles of the respective rasters obtained by multiplying the nozzle jetting rates of the respective nozzles for recording each raster by "the number of main scan pixels/the number of paths in the main scan direction". The dot priority pixels of the respective nozzles of each raster are set so that an occurrence probability of a dot priority pixel is proportional to a nozzle jetting rate.

<<Specific Example of Dot Priority Pixel Setting Method>>

<First Example of Dot Priority Pixel Setting Method>

Dot priority pixels of respective nozzles of each raster are set according to the following conditional expression, for example.

[Conditional Expression 1]Only in a case where rand( )≤nozzle jetting rate is satisfied, the "dot priority pixel-on" is set.

Here, "rand( )" in the conditional expression 1 represents a random number in a range that is equal to or greater than 0 and is smaller than 100.

In each pixel position, the random number in the range that is equal to or greater than 0 and is smaller than 100 is generated at a regular probability by the rand 0 function, and rand( ) that is a generated random number value is compared with a nozzle jetting rate. In a case where rand( ) is equal to or smaller than the nozzle jetting rate, the pixel is set to a dot priority pixel.

By determining the dot priority pixels in accordance with the conditional expression 1, dot priority pixels are set in a random number manner by setting a value of "nozzle jetting rate×the number of main scan pixels/the number of paths in the main scan direction" to a target number, in each raster recorded by respective nozzles.

The number of dot priority pixels calculated by the "nozzle jetting rate×the number of main scan pixels/the number of paths in the main scan direction" and the number of dot priority pixels that are actually set in accordance with the conditional expression 1 should not necessarily match each other.

That is, the number of left nozzle dot priority pixels of each raster shown in FIG. 81 is a target number of dot priority pixels of left nozzles in each raster, and may be calculated in advance by the above-described calculation. The number of right nozzle dot priority pixels of each raster shown in FIG. 81 is a target number of dot priority pixels of right nozzles in each raster, and may be calculated in advance by the above-described calculation. Here, the number of the actually set dot priority pixels may be changed depending on the values of the random numbers.

<Second Example of Dot Priority Pixel Setting Method>

In addition to the conditional expression 1, the method for randomly setting the dot priority pixels may employ a variety of methods. For example, first, the number of priority pixels set in each raster recorded by respective nozzles is calculated as an integer value, and then, a first dot priority pixel is set as a pixel of a number calculated as "rand( )RAND_MAX% the number of recording pixels". Here, the "number of recording pixels" represents the number of pixels of which recording is allocated to each nozzle in each raster, which is identical to "the number of main scan pixels/the number of paths in the main scan direction". The rand( )RAND_MAX represents a random number that is an integer in a range that is equal to or greater than 0 and is smaller than RAND_MAX. "RAND_MAX" is an integer that is at least larger than the number of recording pixels. For example, RAND_MAX may be set to 65536. Here, "%" is a remainder operator. Further, a%b represents a remainder obtained by dividing a by b. That is, "rand( )RAND_MAX% the number of recording pixels" is a number corresponding to a remainder obtained by dividing the random number that is the integer in the range that is equal to or greater than 0 and is smaller than RAND_MAX by the "number of recording pixels". Through this operation, integers in a range that is equal to or greater than 0 and is smaller than "the number of recording pixels−1" may be obtained. In the example of FIG. 81, "the number of recording pixels is 30".

A pixel number corresponding to an integer calculated by "rand( )RAND_MAX% the number of recording pixels" is set to a first dot priority pixel with integers of 0 to 29 being associated with pixel numbers of 30 pixels.

Then, a pixel of a number corresponding to an integer calculated by rand( )RAND_MAX% (the number of recording pixels−1) excluding the first dot priority pixel is set to a second dot priority pixel. In the example of FIG. 81, "the number of recording pixels is 30", a pixel number corresponding to an integer calculated by rand( )RAND_MAX% (the number of recording pixels−1) is set to a second dot priority pixel with integers of 0 to 28 being associated with pixel numbers of 29 pixels excluding the first dot priority pixel. Hereinafter, similarly, a pixel number corresponding to an integer calculated by rand( )RAND_MAX% (the number of recording pixels−2) excluding the first and second dot priority pixels is set to a third dot priority pixel. A fourth dot priority pixel and subsequent dot priority pixels may be sequentially set up to the number of dot priority pixels by the same procedure.

In setting the dot priority pixels, pixels of thresholds set up to a previous stage may be included in dot priority pixels in the corresponding stage, or may not be included therein. In setting the dot priority pixels, in a case where the pixels of the thresholds set up to the previous stage are considered, in the above-described setting method according to the example 2, the pixels of the thresholds set up to the previous stage are excluded from pixels that are candidates of the dot priority pixels in the corresponding stage, and the number of thresholds are excluded from the number of dot priority pixels.

With respect to the dot priority pixel setting method, in the first example and the second example, a case where the rand( )function is used is shown, but the method for randomly setting the dot priority pixels may employ a variety of methods, and is not limited to the case where the rand( )function is used.

<Third Example of Dot Priority Pixel Setting Method>

Further, the dot priority pixel setting method is not limited to the method for randomly setting the dot priority pixels, and may employ a method for setting the dot priority pixels at regular intervals. An example of the method for setting the dot priority pixels at regular intervals will be described.

For example, a jetting pixel interval of respective nozzles in each raster is set to 1, "1/nozzle jetting rate" is determined as a regular interval, and a dot priority pixel may be set to a pixel with a number obtained by rounding a value of an integer multiple of the "1/nozzle jetting rate" to an integer value. The jetting pixel interval refers to a jetting interval of respective nozzles in each raster. In a case where the number of paths in the main scan direction is 1, the interval corresponds to 1 pixel, and in a case where the number of paths in the main scan direction is 2, the interval corresponds to 2 pixels.

This will be described with reference to the example of FIG. 81. In FIG. 81, for example, since a nozzle jetting rate with respect to a left nozzle of a second row raster is 67.86%, a dot priority pixel is set to a pixel with a number obtained by rounding a value of an integer multiple of 1/67.86%=1.47 to an integer value. Here, in FIG. 81, since the number of paths in the main scan direction is 2, the jetting pixel interval "1" corresponds to 2 pixels. Accordingly, in a case where the integer values are rounded, dot priority pixels are set to a first pixel, a fifth pixel, a seventh pixel, an eleventh pixel, and so on (pixels of numbers corresponding to 1, 3, 4, 6, and so on obtained by respectively rounding 1.47, 2.94, 4.41, 5.88, and so on to integer values) in which a left end pixel is the first pixel. Further, since a nozzle jetting rate with respect to a right nozzle of the second row raster is 57.14%, a dot priority pixel is set to a pixel with a number obtained by rounding a value of an integer multiple of 1/57.14%=1.75 to an integer value. That is, in a case where the integer values are rounded, dot priority pixels are set to a fourth pixel, an eighth pixel, a tenth pixel, a fourteenth pixel, and so on (pixels of numbers corresponding to 2, 4, 5, 7, and so on obtained by respectively rounding 1.75, 3.5, 5.25, 7, and so on to integer values).

Using the methods described in the above-mentioned first example to the third example, for example, dot priority pixels are set in step S18 shown in FIG. 78, and then, the procedure proceeds to step S20.

In step S20, among all pixels of the dither mask, a threshold is temporarily set with respect to a pixel that is a threshold non-setting threshold and a dot priority pixel, and then, its granularity is evaluated. An index of the granularity evaluation may be a known index such as a root mean square (RMS) granularity, for example. The RMS granularity is a standard deviation calculated by applying a blur filter that considers human visual characteristics such as a visual transfer function (VTF) to a dot disposition.

An evaluation result of the granularity in step S20 is stored in a memory or the like, and then, the procedure proceeds to step S22. In step S22, it is determined whether the evaluation of the granularity in step S20 is completed with respect to all candidate pixels that are candidates of pixels to which thresholds are to be set. All candidate pixels correspond to a set of the pixels that are the threshold non-setting pixels and the dot priority pixels, to which the thresholds are capable of temporarily setting in step S20.

In step S22, in a case where there is a candidate pixel of which the granularity is not evaluated, the determination of step S22 is negative (No), and then, the procedure returns to step S20. That is, pixels to which thresholds are to be temporarily set are changed in the range of the candidate pixels that are the threshold non-setting pixels and the dot priority pixels, and then, the process of step S20 is repeated.

In a case where the process of the granularity evaluation in step S20 is completed with respect to all the candidate pixels, the determination of step S22 is affirmative (Yes), and then, the procedure proceeds to step S24.

In step S24, on the basis of the result obtained by evaluating the granularity with respect to all the candidate pixels, a threshold is set to a pixel with the best granularity. The process of step S24 corresponds to one form of a "threshold setting process".

Then, in step S26, it is determined whether setting of a predetermined number of thresholds is completed. Here, the "predetermined number" is a specified value that is determined in advance as the number of thresholds set under setting of nozzle jetting rates in the same stage. The "predetermined number" in the flowchart shown in FIG. 78 is set to a number that is smaller than the number of all dot priority pixels set in step S18, for example, "the number of all dot priority pixels×0.8". In a case where the predetermined number is set to be equal to the number of all dot priority pixels, there is a concern that the granularity deteriorates in the vicinity of the predetermined number. By setting the predetermined number to the value that is smaller than the number of all dot priority pixels, it is possible to reduce the granularity deterioration. Here, in a case where the predetermined number is set to be an excessively small value, the performance for suppressing a jetting rate of an end nozzle in a nozzle row is lowered. Accordingly, in setting the predetermined number, it is preferable to set the predetermined number to an appropriate value from both viewpoints of the reduction of the granularity deterioration and the performance for suppressing the jetting rate of the end nozzle. For example, the predetermined number is set to a value in a range that is equal to or greater than 0.6 times the number of all dot priority pixels and is equal to or smaller than 0.9 times the number of all dot priority pixels, and more preferably, to a value in a range that is equal to or greater than 0.7 times the number of all dot priority pixels and is equal to or smaller than 0.8 times the number of all dot priority pixels.

In step S26, in a case where the setting of the predetermined number of thresholds is not completed, the procedure returns to step S20. On the other hand, in step S26, in a case where the setting of the predetermined number of thresholds is completed, the procedure proceeds to step S28.

In step S28, it is determined whether the processes of all stages are completed. In a case where the processes of all the stages are not completed with respect to the stage Q of the nozzle jetting rate, "1" is added to the value of the stage Q, and the value of the stage Q is changed to "Q+1" (step S30), and then, the procedure returns to step S14.

The setting is changed to nozzle jetting rates of the next stage changed in step S30, and then, the above-described processing routine (step S14 to step S28) is repeated. Since the same setting as in the previous stage may be used with respect to the nozzle pattern described in step S16, the process of step S16 may be omitted.

A process for newly setting dot priority pixels in step S18 under the setting of the nozzle jetting rates in a stage different from the previous stage performed through step S30 corresponds to one form of "a process of changing dot priority pixels".

As the loop from step S14 to step S28 is repeated after step S30, setting of nozzle jetting rates of respective nozzles set by the nozzle jetting rate process of step S14 is changed to a plurality of stages, that is, at least two stages, in accordance with a threshold region corresponding to the number of thresholds corresponding to the predetermined number of thresholds in step S26 (that is, in accordance with the values of the thresholds set in step S24).

Further, before thresholds are set with respect to all of the dot priority pixels that are once set in step S18, that is, in a case where setting of a predetermined number of thresholds that is smaller than the number of dot priority pixels is completed, the setting is newly changed to setting of separate dot priority pixels in step S18 after step S30.

In this way, the same processes are performed with respect to all stages, and the respective thresholds are set. In a case where it is determined in step S28 that the processes of all the stages are completed, the procedure shown in the flowchart of FIG. 78 is terminated.

With respect to step S28, in the final stage, the jetting rates of all nozzles are set to "100%", the dot priority pixels are set to all the pixels, and the number of all pixels is set as the "predetermined number" in step S26.

Instead of the procedure shown in the flowchart shown in FIG. 78, only in the final stage, the threshold setting may be performed in a separate loop, and the setting of the dot priority pixels and the determination may not be performed. That is, in a case where the nozzle jetting rates of all nozzles in the final stage are set to "100%", without executing the process of setting the nozzle jetting rate of each nozzle to "100%" and the process of setting all pixels to the dot priority pixels, a separate processing loop in which the setting of the nozzle jetting rates and the setting of the dot priority pixels are excluded and the determination of the dot priority pixels is not performed may be performed.

Even in a case where the above-described separate processing loop is employed, the processes are substantially equivalent to those in a case where the processes of setting the nozzle jetting rates of all nozzles to "100%" and setting all the pixels to the dot priority pixels, and transition to the separate processing loop corresponds to one form of setting of the "final stage" among the "plurality of stages".

The procedure shown in the flowchart described in FIG. 78 is applied with respect to setting of thresholds that are a part of all the thresholds set in the dither mask. That is, a process of changing the dot priority pixels that are once set is applied with respect to the setting of at least a part of all the thresholds.

According to the procedure shown in the flowchart in FIG. 78, it is possible to increase a nozzle absolute jetting rate of each nozzle while generally maintaining a relative percentage of jetting of respective nozzles in accordance with nozzle jetting rates (that is, priority pixel setting rates), together with an increase of the set thresholds. The "relative percentages of jetting of respective nozzles" are based on the nozzle jetting rates, which should not be completely equivalent to each other.

<Configuration of Dither Mask Generating Device>

Figure 82:
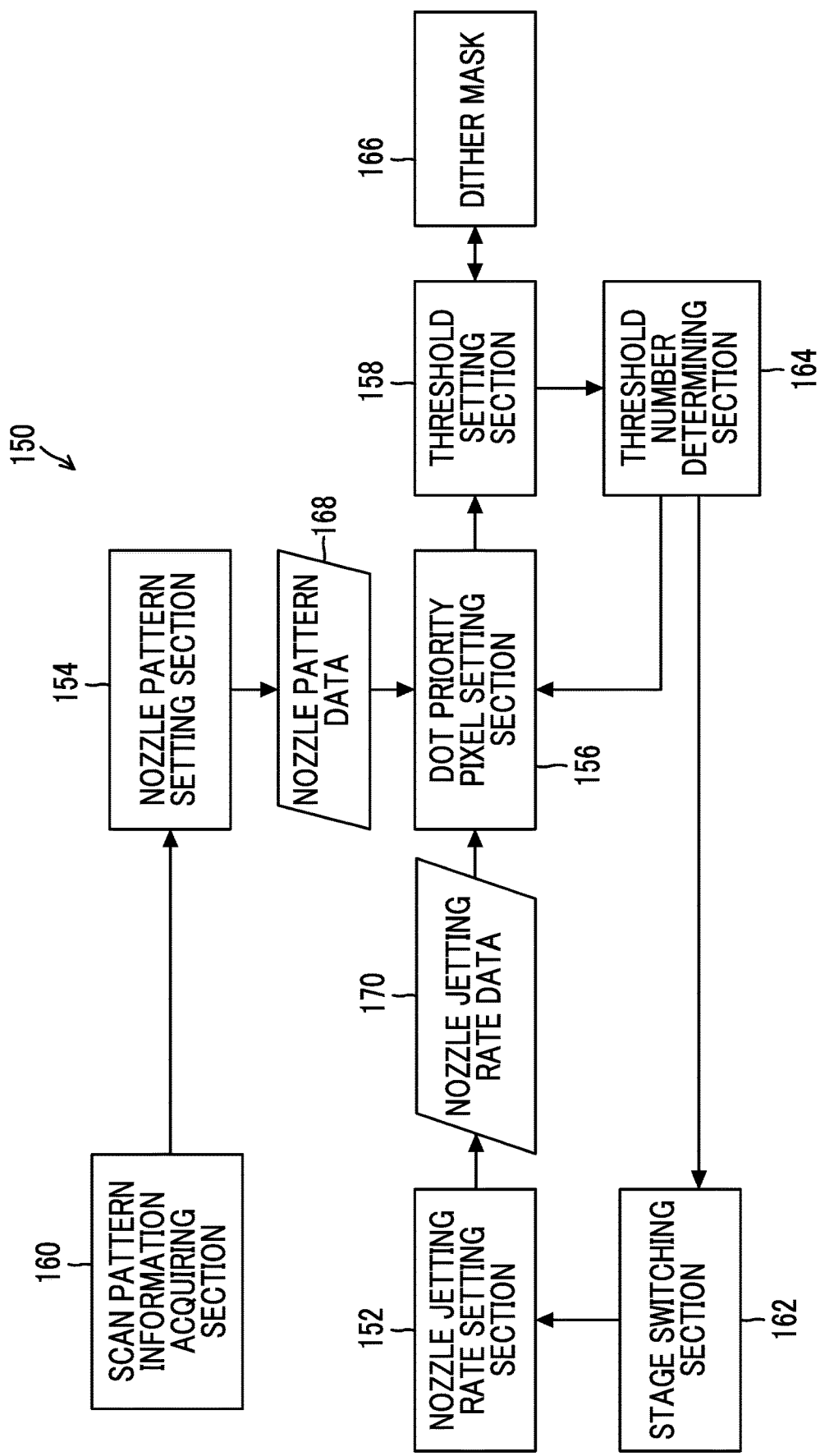
FIG. 82 is a block diagram showing a dither mask generating device according to an embodiment.

FIG. 82 is a block diagram showing a dither mask generating device according to an embodiment. The dither mask generating device 150 comprises a nozzle jetting rate setting section 152, a nozzle pattern setting section 154, a dot priority pixel setting section 156, and a threshold setting section 158. Further, the dither mask generating device 150 includes a scan pattern information acquiring section 160, a stage switching section 162, and a threshold number determining section 164. The respective sections may be realized by a hardware circuit such as an integrated circuit, hardware and software of a computer, or an appropriate combination thereof. Further, functions of the dither mask generating device 150 may be provided in the control device 102 described in FIG. 74.

The nozzle jetting rate setting section 152 shown in FIG. 82 performs a process of setting a nozzle jetting rate of each nozzle in the recording head 24 (see FIG. 73). The nozzle jetting rate setting section 152 sets the nozzle jetting rate of each nozzle in accordance with stages of nozzle jetting rates that are prepared in advance, as shown in FIG. 79. The nozzle jetting rate setting section 152 performs the process described in step S14 of FIG. 78. The nozzle jetting rate setting section 152 corresponds to one form of a priority pixel setting rate setting section.

The stage switching section 162 shown in FIG. 82 designates a stage of the nozzle jetting rates set by the nozzle jetting rate setting section 152. The stage switching section 162 performs the process described in step S30 of FIG. 78. The nozzle jetting rate setting section 152 sets nozzle jetting rates in the stage designated by the stage switching section 162.

The nozzle pattern setting section 154 performs a process of specifying a nozzle corresponding to each pixel of a dither mask 166, on the basis of information on a scan pattern obtained from the scan pattern information acquiring section 160. That is, the nozzle pattern setting section 154 performs a process of associating at least one nozzle for recording at each pixel position with respect to each pixel of the dither mask 166.

The scan pattern information acquiring section 160 acquires the information on the scan pattern based on a drawing mode from a scan pattern program or the like. As described above, since the scan pattern program specifies a reciprocating scan of the recording head 24 in the main scan direction with respect to the recording medium 12 that is intermittently transported in the sub scan direction or the number of paths, it is possible to discriminate the scan pattern of the recording head 24 from the scan pattern program.

The nozzle pattern setting section 154 discriminates a scan pattern in a case where the recording head 24 is relatively moved in the main scan direction and the sub scan direction with respect to the recording medium 12. The nozzle pattern setting section 154 performs a process of determining which nozzle 62 of the recording head 24 is to record each pixel of the dither mask 166 on the basis of the scan pattern. The nozzle pattern setting section 154 generates nozzle pattern data 168 that is data on a nozzle pattern indicating a correspondence relationship between each pixel of the dither mask 166 and a nozzle for recording each pixel. The nozzle pattern data 168 is generated from data on the nozzle pattern described in FIG. 33. The nozzle pattern setting section 154 performs the process described in step S16 of FIG. 78.

A method for generating the nozzle pattern data 168 is not limited to the method determined on the basis of the scan pattern program, and may employ a variety of methods. Since the nozzle pattern data 168 may be determined according to the drawing mode and the size of the dither mask 166 or a disposition method thereof, nozzle pattern data corresponding to each of a plurality of types of drawing modes may be stored in an information storing section such as a memory.

The dot priority pixel setting section 156 performs a process of setting dot priority pixels on the basis of the nozzle jetting rate data 170 and the nozzle pattern data 168. Further, the dot priority pixel setting section 156 performs a process of changing dot priority pixels before thresholds are set with respect to all dot priority pixels that are once set. Changing the dot priority pixels before the thresholds are set with respect to all the dot priority pixels that are once set means changing the dot priority pixels in a state where at least a part of the dot priority pixels that are once set are pixels for which thresholds are not set. The dot priority pixel setting section 156 performs the process described in step S18 of FIG. 78.

The threshold setting section 158 performs a process of preparing the dither mask 166 including pixels for which thresholds are not set and setting thresholds with respect to the pixels of the dither mask 166 for which the thresholds are not set. The threshold setting section 158 performs the process described in step S20 to step S24 in FIG. 78. As the thresholds of all the pixels of the dither mask 166 are set by the threshold setting section 158, the dither mask 166 that is a generating target is completed.

The threshold number determining section 164 manages the number of thresholds set by the threshold setting section 158, and determines whether setting of a predetermined number of thresholds is completed. The threshold number determining section 164 performs the process described in step S26 of FIG. 78.

The determination result of the threshold number determining section 164 is notified to the dot priority pixel setting section 156. The dot priority pixel setting section 156 performs a process of changing dot priority pixels on the basis of information obtained from the threshold number determining section 164.

Further, the determination result of the threshold number determining section 164 is reported to the stage switching section 162. The stage switching section 162 performs a process of changing the stage of the nozzle jetting rates on the basis of information obtained from the threshold number determining section 164.

A function of the nozzle jetting rate setting section 152 corresponds to one form of a priority pixel setting rate setting function. A function of the nozzle pattern setting section 154 corresponds to one form of a nozzle pattern setting function. A function of the dot priority pixel setting section 156 corresponds to one form of a dot priority pixel setting function and a function of changing dot priority pixels. A function of the threshold setting section 158 corresponds to one form of a threshold setting function.

<Hardware Configuration of Respective Processing Units and Control Sections>

A hardware structure of processing units that execute a variety of processes, such as the recording medium transport control section 104, the carriage drive control section 106, the light source control section 108, the image processing unit 110, the jetting control section 112, and the information storing section 124 of the control device 102 described in FIG. 74, and the nozzle jetting rate setting section 152, the nozzle pattern setting section 154, the dot priority pixel setting section 156, the threshold setting section 158, the scan pattern information acquiring section 160, the stage switching section 162, and the threshold number determining section 164 of the dither mask generating device 150 described in FIG. 82 corresponds to a variety of processors which will be described hereinafter.

The variety of processors may include a central processing unit (CPU) that is a general-purpose processor that executes a program to function as a variety of processing units, a programmable logic device (PLD) that is a processor of which a circuit configuration is changeable after manufacturing, such as a field programmable gate array (FPGA), a dedicated electric circuit that is a processor having a circuit configuration that is dedicatedly designed for executing a specific process, such as an application specific integrated circuit (ASIC), or the like.

One processing unit may be configured by one processor among the variety of processors described above, or may be configured by the same type or different types of two or more processors. For example, one processing unit may be a combination of a plurality of FPGAs, or a combination of a CPU and an FPGA. Further, a plurality of processing units may be configured by one processor. Furthermore, as an example in which a plurality of processing units are configured by one processor, first, as represented by a computer such as a client or a server, a configuration in which a combination of one or more CPUs and software forms one processor and this processor functions as a plurality of processing units may be employed. Second, as represented by a system on chip (SoC) or the like, a configuration in which a processor for realizing entire functions of a system including a plurality of processing units using one integrated circuit (IC) chip is used may be employed. In this way, the variety of processing units may be configured by using one or more of the variety of processors as the hardware structure.

Further, the hardware structure of the variety of processors is, more specifically, electric circuitry in which circuit elements such as semiconductors are combined.

<Summary of Dither Mask Generating Method According to Present Disclosure>

A summary of the dither mask generating method according to the present disclosure described in the above description is as follows. That is, the dither mask generating method according to the present disclosure includes a nozzle pattern setting process of setting a nozzle pattern indicating a correspondence relationship between each pixel of a dither mask and a nozzle for recording a position of each pixel, a dot priority pixel setting process of setting dot priority pixels that are candidates of pixels for which thresholds are set, among the pixels of the dither mask, a threshold setting process of setting thresholds to pixels that belong to the dot priority pixels, and a process of changing the dot priority pixels before the thresholds are set to all of the dot priority pixels that are once set in the dot priority pixel setting process with respect to at least a part of the thresholds.

According to the dither mask generating method, in setting thresholds in the dither mask, a nozzle pattern is reflected to set dot priority pixels, and the thresholds are set to pixels that belong to the dot priority pixels. Further, before the thresholds are set with respect to all the dot priority pixels that are once set, the dot priority pixels are changed, and the setting of the thresholds is performed with respect to pixels that belong to the changed dot priority pixels. In this way, by changing the dot priority pixels to set the thresholds, it is possible to generate a dither mask in which constraint in threshold disposition is reduced and granularity is good.

Here, "before the thresholds are set with respect to all the dot priority pixels that are once set, the dot priority pixels are changed" means that the dot priority pixels are changed in a state where thresholds are not set with respect to at least a part of the dot priority pixels that are once set.

Further, in the above-described dither mask generating method, a configuration in which a priority pixel setting rate setting process of setting priority pixel setting rates indicating a ratio of dot priority pixels in recording allocated pixels that are allocated to each nozzle, which are pixels of which recording is allocated to each of a plurality of nozzles, among pixels of the dither mask is provided, and the dot priority pixel setting process sets dot priority pixels on the basis of a nozzle pattern and the priority pixel setting rate of each nozzle.

"The pixel priority setting rate" may be expressed as the ratio of the dot priority pixels in the recording allocated pixels allocated to each nozzle or the number thereof. In a case where the priority pixel setting rate is expressed as the ratio, for example, "the pixel priority setting rate" may be defined as a quotient of division in which the number of recording allocated pixels is a denominator and the number of dot priority pixels is a numerator, that is, "the number of dot priority pixels/the number of recording allocated pixels". The ratio may be defined as a percentage. Further, the priority pixel setting rate may be defined as the number of dot priority pixels. Since the number of recording allocated pixels of each nozzle in the pixels of the dither mask may be specified on the basis of the nozzle pattern, the number of dot priority pixels of each nozzle corresponds to information indicating the ratio of the dot priority pixels in the recording allocated pixels.

The priority pixel setting rate may be determined on the basis of a target nozzle jetting rate. The nozzle jetting rates designed in accordance with the above-described nozzle jetting rate design method may be used as priority pixel setting rates. The priority pixel setting rates of each nozzle may be appropriately set from a viewpoint of obtaining a banding reducing effect. A priority pixel setting rate for suppressing banding may be determined in accordance with a nozzle arrangement form, and additionally, characteristics of a recording head, a drawing condition, or the like.

<Another Example of Dither Mask Generating Method>

A method for generating a dither mask on the basis of a nozzle jetting rate that is a control target is not limited to the above-described method. For example, the dither mask may be generated by the method disclosed in JP2016-107603A. The method disclosed in JP2016-107603A is a method in which nozzle jetting rates are reflected in an evaluation index in a case where thresholds of the dither mask are set.

In a case where a nozzle jetting rate of each nozzle that is a control target is given, as a dither mask generating method in which a dot disposition capable of achieving the nozzle jetting rates can be obtained, a variety of methods including known methods may be applied.

<<Characteristics of Dither Mask>>

In the dither mask according to this embodiment, threshold setting is performed so that a sum of a sum of nozzle jetting rates of corresponding nozzles of respective nozzle groups used in recording a first half scan for recording each scan band and a sum of nozzle jetting rates of corresponding nozzles of respective nozzle groups used in recording a second half scan becomes a specific value that is in a defined allowable range, with respect to at least a part of a recording duty range.

In the example shown in FIG. 79, in an intermediate tone duty range in which thresholds are set by applying at least the nozzle jetting rates shown in Q=2 and the nozzle jetting rates shown in Q=3, the thresholds are set so that a dot disposition that shows nozzle jetting rates that satisfy a specific condition, which correspond to a control target, can be obtained. The nozzle jetting rate used for the control target in a case where the dither mask is generated corresponds to "a predetermined specific nozzle jetting rate", that is, "a nozzle jetting rate that satisfies a specific condition".

<<Effects According to Technique of the Present Disclosure and its Verification Method>>

The technique of the present disclosure includes a method for "designing respective nozzle jetting rates so that an average jetting rate per unit area becomes uniform while unbalancing the respective nozzle jetting rates to become non-uniform" as one characteristic thereof.

The average jetting rate per unit area means an average jetting rate of each unit area. As the average jetting rate per unit area becomes uniform, a dot disposition density becomes uniform as a result.

In a case where the respective nozzle jetting rates are unbalanced to become non-uniform, a jetting pattern also becomes necessarily non-uniform, but in consideration of an average jetting rate in a unit area, the average jetting rate in the unit area may become generally uniform. The "generally uniform" means that a nozzle pitch and a paper feed amount are mutually prime, and since a gap raster that cannot be divided into the unit area is present in each scan band, it is not possible to completely record each unit area by nozzles that are in a complementary relationship. Here, in accordance with scan types, there may be a case where it is possible to perform completely uniform recording while including a gap.

On the basis of the characteristics of the present disclosure, effects of the technique of the present disclosure may be measured using an index indicating how much non-uniformity of respective nozzle jetting rates can be uniformized". For example, an index expressed as the following expression may be defined as a "uniformization ratio", and effects may be verified from a value of the uniformization ratio.

[Expression 13]

$$\text{uniformization ratio} = \frac{\text{maximum value of average jetting rates per unit area} - \text{minimum value of average jetting rates per unit area}}{\text{maximum value of respective nozzle jetting rates} - \text{minimum value of respective nozzle jetting rates}}$$

"Each nozzle jetting rate" in the above expression for defining the uniformization ratio may be an absolute jetting rate or a relative jetting rate. In any case, the value of the uniformization ratio is the same.

In the above expression, the "maximum value of the respective nozzle jetting rates" refers to a "maximum value of jetting rates of respective pixels in a jetting rate pattern", and the "minimum value of the respective nozzle jetting rates" refers to a "minimum value of the jetting rates of the respective pixels in the jetting rate pattern". Further, the "maximum value of the average jetting rates per unit area" refers to a maximum value of average jetting rates in a case where the jetting rates of the respective pixels in the jetting rate pattern are averaged for each unit area. The "minimum value of the average jetting rates per unit area" refers to a minimum value of average jetting rates in a case where the jetting rates of the respective pixels in the jetting rate pattern are averaged for each unit area. That is, the uniformization ratio becomes the index indicating "how much non-uniform jetting rates can be uniformized".

In a case where a difference between the maximum value and the minimum value of the average jetting rates per unit area in the jetting rate pattern is defined as "uniformity", the uniformity is changed in accordance with nozzle jetting rates of respective nozzles. That is, in a case where the nozzle jetting rates of the respective nozzles are uniform, the average jetting rate per unit area in the jetting rate pattern also becomes uniform.

However, the uniformization ratio based on the calculation expression shown in [Expression 13] becomes the same value regardless of the uniformity of the respective nozzle jetting rates, and thus, it is possible to properly evaluate the effects of uniformization according to the method of the present disclosure.

Further, similarly, the uniformity of the average jetting rate per unit area is changed in accordance with absolute jetting rates (nozzle absolute jetting rates) of respective nozzles and duties thereof. That is, as the absolute jetting rates of the respective nozzles become large and as the duties become high, the average jetting rate per unit area becomes non-uniform.

However, the uniformization ratio based on the calculation expression shown in [Expression 13] becomes the same value regardless of the uniformity of the absolute jetting rates of the respective nozzles and duties thereof, and thus, it is possible to properly evaluate the effects of uniformization according to the method of the present disclosure.

<Verification Method of Effects Based on Methods of the Present Disclosure>

Next, a criterion for determining whether the technique of the present disclosure is applied or used will be described. In determining whether the technique of the present disclosure is applied, the "uniformization ratio" is used.

In the "nozzle jetting rate design method" according to the present disclosure, a variety of design examples of jetting rates have been shown, but the value of the "uniformization ratio" with respect to the respective design examples is calculated as follows.

[Uniformization Ratio in Example Shown in FIGS. 36 to 38]

The uniformization ratio is calculated with respect to the example shown in FIGS. 36 to 38. It can be understood from the nozzle jetting rates of FIG. 36 and the jetting rate pattern of FIG. 37 that a maximum value and a minimum value of the nozzle jetting rates are 100% and 25%, respectively.

Further, a maximum value of an average jetting rate is 78.91% and a minimum value thereof is 76.56% from the average jetting rate per unit area of FIG. 38. These values are rounded to the third decimal place. In a case where the values are substituted into the expression of [Expression 13], the uniformization ratio becomes 3.1%. The value of the uniformization ratio calculated from [Expression 13] is multiplied by 100 to be expressed as a percentage, and then, is rounded to the second decimal place. That is, in a case where a change width of the nozzle jetting rates of the respective nozzles is set to 100%, a change width of the average jetting rate per unit area may be suppressed to 3.1% to be uniformized.

[Uniformization Ratio in Example Shown in FIGS. 40 to 42]

Similarly, the uniformization ratio in the case of example shown in FIGS. 40 to 42 are calculated to 0.0%. That is, it can be understood that complete uniformization is achieved.

[Uniformization Ratio in Example Shown in FIGS. 46 to 48, and Another Example]

The uniformization ratio in the case of the example shown in FIGS. 46 to 48 is 2%. The uniformization ratio in the case of the example shown in FIGS. 50 to 52 is 3.8%. The uniformization ratio in the case of the example shown in FIGS. 54 to 56 is 4.0%. The uniformization ratio in the case of the example shown in FIGS. 64 to 66 is 2.5%.

[Uniformization Ratios in Comparative Examples]

On the other hand, as comparative examples, uniformization ratios of the respective examples in the above description are calculated as follows.

The uniformization ratio in the example ("FIG. 8" in JP2010-162770A) shown in FIG. 1 is 25%. The uniformization ratio in the example ("FIG. 11" in JP2010-162770A) shown in FIG. 4 is 12.5%. The uniformization ratio in the example ("FIG. 13" in JP2010-162770A) shown in FIG. 7 is 25%. The uniformization ratio in the example ("FIG. 14A" in JP2010-162770A) shown in FIG. 10A is 25%. The uniformization ratio in the example ("FIG. 14B" in JP2010-162770A) shown in FIG. 10B is 25%. The uniformization ratio in the example shown in FIG. 4 among the respective comparative examples is a minimum, but the uniformization ratio is 12.5%, which is three or more times the uniformization ratio realized by the setting example based on the nozzle jetting rate design method according to the present disclosure.

On the basis of the above result, as one criterion for determining whether the method of the present disclosure is used, a determination criterion for determining whether the uniformization ratio is "equal to or greater than 0% and is equal to or smaller than 10%" may be provided. Nozzle jetting rates of which the uniformization ratio is equal to or smaller than 10% may be estimated as nozzle jetting rates designed using the method of the present disclosure.

The uniformization ratio may be used as an index indicating a change in an average nozzle jetting rate per unit area.

<Inspection Method using Printed Matter>

Next, a method for acquiring information on "nozzle jetting rate of respective nozzles" and an "average jetting rate per unit area" from a printed matter will be described. First, the "nozzle jetting rates of the respective nozzles" may be easily recognized from a printed matter that is recorded by only one main scan using a method for performing recording of a first main scan (scan 1), and then, stopping printing without performing the next main scan (scan 2), for example.

Dots recorded by the respective nozzles are separately disposed on the printed matter recorded only by one main scan, and the dots recorded by the respective nozzles may be dividedly counted.

Further, a method for recording respective main scans separately in the sub scan direction by a method for controlling a paper feed amount, for example and counting the number of dots recorded by each nozzle for each main scan may be used. In this case, by averaging the number of dots counted for each main scan for each nozzle, it is possible to calculate the number of dots recorded by each nozzle with high accuracy.

The number of pixels that are to be recorded by each nozzle in one main scan is determined from a recording resolution, a recording width of a main scan, and the number of overlaps in the main scan direction. Further, a percentage of the number of dots that are actually recorded by each nozzle with respect to the number of pixels of which recording is allocated to each nozzle becomes a jetting rate of each nozzle. The jetting rate obtained in this way is an absolute jetting rate (nozzle absolute jetting rate) that is changed in accordance with duties, but the nozzle absolute jetting rate may be replaced with a relative jetting rate (nozzle jetting rate).

Next, information corresponding to the "nozzle pattern" as shown in FIG. 33 is acquired. The nozzle pattern is information indicating "which nozzle each pixel is recorded by?". That is, the information on the nozzle pattern may be acquired from information on a scan method including the number of nozzles in a nozzle row, a nozzle pitch, a paper feed amount, the number of overlaps in a main scan direction, a scan for starting recording, and the like, and a printing result of a dedicated chart obtained by recording based on only a specific nozzle.

In a case where a "nozzle jetting rate of each nozzle" and a "nozzle pattern" are known, the "jetting rate of each nozzle" may be developed into a "jetting rate pattern" in accordance with the "nozzle pattern", and an "average jetting rate per unit area" may be calculated from the jetting rate pattern.

Instead of a printed matter, in a case where digital data of a dot disposition is present, a corresponding "nozzle pattern may be acquired, a percentage of the number of dot-on pixels in the respective recording allocated pixels with respect to the number of pixels of which recording is allocated to each nozzle (that is, the number of corresponding pixels of each nozzle in the nozzle pattern) may be calculated to be set as a "nozzle jetting rate of each nozzle", the "nozzle jetting rate of each nozzle" may be developed into a "jetting rate pattern" in accordance with the "nozzle pattern", and an "average jetting rate per unit area" may be calculated from the jetting rate pattern.

Here, it is necessary that an image in a case where a nozzle jetting rate is calculated from a printed matter or digital data on a dot disposition is a solid image. The solid image is an image having a predetermined uniform gradation. Further, in a case where the gradation of the image is low, the number of recorded dots is small, or the number of dots of the digital data of the dot disposition is small, which causes difficulties in accurate calculation of jetting rates or percentages. Further, in a case where the gradation is excessively high, contrarily, dots are recorded by most recording allocated pixels, which causes difficulties in accurate calculation of jetting rates or percentages. In a case where the duty is in a range of 30% to 70%, a sufficient number of dots are recorded, and since there is a blank in recording allocated pixels, it is possible to accurately calculate jetting rates or percentages. That is, it is preferable to calculate information on nozzle jetting rates using a printed matter or digital data of a dot disposition relating to a solid image of a predetermined gradation in which the duty is in the range of 30% to 70%.

Further, in a case where a change width of nozzle jetting rates of respective nozzles is small, the denominator in the definition expression of the uniformization ratio is small, and thus, it is difficult to accurately calculate the uniformization ratio. In a case where the change width of the nozzle jetting rates is equal to or greater than 10%, it is possible to accurately calculate the uniformization ratio.

In summary, nozzle jetting rates of respective nozzles and an average jetting rate per unit area in a jetting rate pattern are acquired from a printing result (printed matter) or digital data of a dot disposition relating to an image having a predetermined uniform duty that is in the duty range of 30% to 70% using the above-described methods, and in a case where the change width of the nozzle jetting rates of the respective nozzles is equal to or greater than 10% and the uniformization ratio is equal to or smaller than 10%, it may be determined that design is performed using the methods of the present disclosure.

<Multi Dot Size>

The latest ink jet printer is able to record dots of different sizes. In a case where dots of two or more kinds of different sizes are mixed to be recorded, a duty of a disposition of dots of a certain size, or a combination disposition of dispositions of the dots of the respective sizes is in the range of 30% to 70%, information on a "nozzle jetting rate of each nozzle" and an "average jetting rate per unit area" is acquired, and in a case where a change width of the nozzle jetting rates is equal to or greater than 10% and a uniformization ratio is equal to or smaller than 10%, it may be determined that the methods of the present disclosure are used.

For example, in a case where three kinds of dots of small dots, medium dots, and large dots are mixed to be recorded, any one of a "disposition of the small dots", a "disposition of the medium dots", a "disposition of the large dots", a "combination disposition of the disposition of the large dots and the disposition of the medium dots", a "combination disposition of the disposition of the large dots, the disposition of the medium dots, and the disposition of the small dots", a "combination disposition of the disposition of the large dots and the disposition of the small dots", and a "combination disposition of the disposition of the medium dots and the disposition of the small dots" is in the duty range of 30% to 70%, the change width of the nozzle jetting rate of the respective nozzles is equal to or greater than 10%, and the uniformization ratio is equal to or smaller than 10%, it may be determined that the methods of the present disclosure are used.

<Modification Examples>

In the above-described embodiments, as an ink jet recording apparatus that is an example of an image recording apparatus, a wide format printer that uses an ultraviolet curable ink has been described as an example, but the invention is not limited to the ultraviolet curable ink, and the invention may be applied to a variety of ink jet recording apparatuses for recording an image on a recording medium using various kinds of ink.

With respect to the main scan operation and the sub scan operation, it is sufficient if the relative movement of the recording medium and the recording head is performed in each of the main scan direction and the sub scan direction, and thus, the recording medium may be moved in the main scan direction to perform the main scan operation, or the recording head may be moved in the sub scan direction to perform the sub scan operation.

<Other Terms>

The term "image apparatus" includes a concept of a term such as a printer, a printing device, an image forming device, an image output device, or a drawing device. Further, the term "image recording device" includes a concept of a printing system formed by combining a plurality of devices.

The "image" should be interpreted in a broad sense, and includes a color image, a white black image, a single color image, a gradation image, a uniform concentration (solid) image, or the like. The "image" is not limited to a photo image, and is used as a generic term including a figure, a character, a symbol, a line, a mosaic pattern, a color-filled pattern, other a variety of patterns, or an appropriate combination thereof.

In this specification, the term "perpendicular" or "vertical" includes a configuration that generates the same effects as in a case where two elements cross each other at an angle that is substantially 90°, among configurations in which two elements cross each other at an angle that is smaller than 90° or at an angle that exceeds 90°. In this specification, the term "parallel" includes a configuration in which two elements can be considered to be substantially parallel, capable of obtaining substantially the same effects as in a case where two elements are parallel, among configurations in which two elements are not strictly parallel.

<Combinations of Embodiments and Modification Examples>

The configurations described in the above-described embodiments or the content described in the modification examples may be appropriately combined for use, and a part thereof may be switched.

The above-described embodiments of the invention may include appropriate changes, additions, or deletions of the components in a range without departing from the concept of the invention. The invention is not limited to the above-described embodiments, and a variety of modifications may be made by those skilled in the art in the technical idea of the invention.

EXPLANATION OF REFERENCES

10: ink jet recording apparatus
12: recording medium
20: apparatus body
22: support foot
24: recording head
24A: recording head
24C, 24M, 24Y, 24K: head module
26: platen
28: guide mechanism
30: carriage
32A, 32B: temporary curing light source
34A, 34B: main curing light source
36: ink cartridge
40: nip roller
42: supply side roll
44: winding roll
46: guide
50: temperature control section
52: pre temperature control section
54: after temperature control section
61, 61A: nozzle row
61C, 61K, 61M, 61Y: nozzle row
62: nozzle
102: control device
104: recording medium transport control section
106: carriage drive control section
108: light source control section
110: image processing unit
112: jetting control section
114: transport drive section
116: main scan drive section
118: light source drive circuit
119: light source drive circuit
120: display device
122: input device
124: information storing section
126: image input interface
128: head drive circuit
130: encoder
132: sensor
150: dither mask generating device
152: nozzle jetting rate setting section
154: nozzle pattern setting section
156: dot priority pixel setting section
158: threshold setting section
160: scan pattern information acquiring section
162: stage switching section
164: threshold number determining section
166: dither mask
168: nozzle pattern data
170: nozzle jetting rate data
500: shape
S1 to S3: step of dither mask generating method
S12 to S30: step of threshold setting process

What is claimed is:

1. An image recording apparatus comprising:
a recording head that includes a nozzle row in which a plurality of nozzles that jet ink are arranged in a sub scan direction;
a halftone processing unit that performs halftone processing with respect to image data by using a dither mask; and
a recording control section that controls the jetting of the ink from the nozzles on the basis of dot data generated through the halftone processing and performs a control for recording an image on a recording medium by repeating a main scan operation of jetting the ink from the nozzles while relatively moving the recording head with respect to the recording medium in a main scan direction that is orthogonal to the sub scan direction to perform recording and a sub scan operation of relatively moving the recording medium with respect to the recording head in the sub scan direction,
wherein in a recording process of completing, with respect to each scan band that is a region having a width of a sub scan movement amount of one sub scan operation of the recording medium in the sub scan direction, recording of the scan band by repeating a plurality of the main scan operations,
in a case where the plurality of scans necessary for the completion of the recording of the scan band are divided into a first half scan and a second half scan on the basis of a scan order, when a nozzle disposed closest to a central side of the nozzle row in a first half scan nozzle group that is a nozzle group used in the recording of the first half scan in the nozzle row is referred to as a first half side central nozzle, a nozzle disposed closest to an end side of the nozzle row in the first half scan nozzle group is referred to as a front end nozzle, a nozzle disposed closest to a central side of the nozzle row in a second half scan nozzle group that is a nozzle group used in the recording of the second half scan in the nozzle row is referred to as a second half side central nozzle, a nozzle disposed closest to an end side of the nozzle row in the second half scan nozzle group is referred to as a rear end nozzle, the number of the main scan operations necessary for recording of one of rasters formed in the main scan direction is referred to as the number of overlaps, a region of a unit area represented by a product of the number of overlaps in the main scan direction and a nozzle pitch of the nozzle row in the sub scan direction is referred to as a unit region, and nozzles that record the same unit region in the nozzle groups for the respective scans used in the recording of the plurality of scans are referred to as corresponding nozzles,
the dither mask is subjected to threshold setting for generating a dot disposition in which nozzle jetting rates that are relative usage rates of the respective nozzles of the nozzle row become nozzle jetting rates that satisfy a predetermined specific condition, in at least a part of a range of a recording duty, and
the nozzle jetting rates that satisfy the specific condition are set such that
the nozzle jetting rates are decreased at two or more kinds of different inclinations, from the first half side central nozzle toward the front end nozzle in the first half scan nozzle group, the nozzle jetting rates are decreased at two or more kinds of different inclinations, from the second half side central nozzle toward the rear end nozzle in the second half scan nozzle group, with respect to the nozzle groups for each scan used in recording of each scan that belongs to the first half scan, a first half jetting rate sum obtained by summing up the nozzle jetting rates of the corresponding nozzles is increased from the front end nozzle to the first half side central nozzle, with respect to the nozzle groups for each scan used in recording of each scan that belongs to the second half scan, a second half jetting rate sum obtained by summing up the nozzle jetting rates of the corresponding nozzles is decreased from the second half side central nozzle toward the rear end nozzle, and with respect to the nozzle groups for each scan used in recording of each of the plurality of scans, a sum of the first half jetting rate sum and the second half jetting rate sum of the corresponding nozzles becomes a specific value that is in a defined allowable range.

2. The image recording apparatus according to claim 1, wherein when a relationship between nozzle jetting rates of nozzle groups, for which a sum of nozzle jetting rates of corresponding nozzles becomes constant, in different nozzle groups in the nozzle row, is referred to as a complementary relationship, the nozzle jetting rates of any one nozzle group among the nozzle groups for each scan used in the recording of each scan that belongs to the second half scan are in the complementary relationship with the nozzle jetting rates of the nozzle group for each scan used in the recording of each scan that belongs to the first half scan.

3. The image recording apparatus according to claim 2, wherein the nozzle groups for each scan used in the recording of each scan that belongs to the first half scan and the nozzle groups of the scan that belongs to the second half scan, which are respectively in the complementary relationship with the nozzle groups of the scan that belongs to the first half scan, are in a positional relationship in which positions of the scan nozzle groups are symmetrical with reference to the center of the nozzle row.

4. The image recording apparatus according to claim 1, wherein an inclination of the nozzle jetting rates is constant in the nozzle group for each scan used in the recording of each of the plurality of scans.

5. The image recording apparatus according to claim 4, wherein an inclination of the nozzle jetting rates of the nozzle group used in recording of at least one of a first scan or a final scan, among inclinations of the nozzle jetting rates in the nozzle group for each scan used in the recording of each of the plurality of scans, is the largest.

6. The image recording apparatus according to claim 1, wherein an inclination of the nozzle jetting rates is changed inside at least one nozzle group among the nozzle groups for each scan used in the recording of each of the plurality of scans.

7. The image recording apparatus according to claim 6, wherein the first half jetting rate sum non-linearly increases with respect to a nozzle position change from the front end nozzle to the first half side central nozzle, and wherein the second half jetting rate sum non-linearly decreases with respect to a nozzle position change from the second half side central nozzle to the rear end nozzle.

8. The image recording apparatus according to claim 6, wherein the nozzle jetting rates are changed at two or more kinds of inclinations inside the nozzle group used in recording of a first scan in the first half scan, and wherein when an inclination from the front end nozzle inside the nozzle group used in the recording of the first scan is referred to as a first inclination, in a case where the inclination of the nozzle jetting rates is changed from the first inclination to a second inclination from the front end nozzle toward the first half side central nozzle, the first inclination is smaller than the second inclination.

9. The image recording apparatus according to claim 1, wherein an inclination of nozzle jetting rates of a nozzle group used in recording of a scan in a central portion among the plurality of scans is zero.

10. The image recording apparatus according to claim 1, wherein with respect to a graph shape in a case where a relationship between a position of each nozzle in the nozzle row and a nozzle jetting rate of each nozzle is expressed by a graph, a nozzle jetting rate of each nozzle that belongs to the first half scan nozzle group and a nozzle jetting rate of each nozzle that belongs to the second half scan nozzle group are symmetrical.

11. The image recording apparatus according to claim 1, wherein with respect to a graph shape in a case where a relationship between a position of each nozzle in the nozzle row and a nozzle jetting rate of each nozzle is expressed by a graph, a nozzle jetting rate of each nozzle that belongs to the first half scan nozzle group and a nozzle jetting rate of each nozzle that belongs to the second half scan nozzle group are asymmetrical.

12. The image recording apparatus according to claim 11, wherein the first half jetting rate sum is smaller than the second half jetting rate sum.

13. The image recording apparatus according to claim 11, wherein a value obtained by averaging nozzle jetting rates of respective nozzles of a nozzle group used in recording of a first scan in the first half scan is smaller than a value obtained by averaging nozzle jetting rates of respective nozzles of a nozzle group used in recording of a final scan in the second half scan.

14. The image recording apparatus according to claim 11, wherein in a case where average values of inclinations of the nozzle jetting rates with respect to the nozzle groups for each scan used in the recording of each of the plurality of scans are compared with each other, except for a nozzle group of a scan in which the average value of the inclinations is zero, an average value of an inclination of the nozzle jetting rates of the nozzle group used in the recording of the first scan in the first half scan is the smallest.

15. The image recording apparatus according to claim 1, wherein the defined allowable range is a range where a change of an average nozzle jetting rate per unit area is equal to or greater than 0% and equal to or smaller than 10%.

16. A dither mask used in halftone processing for recording an image on a recording medium by repeating a main scan operation of jetting ink from nozzles, while relatively moving a recording head that includes a nozzle row in which a plurality of the nozzles that jet the ink are arranged in a sub scan direction with respect to the recording medium in a main scan direction that is orthogonal to the sub scan direction, to perform recording and a sub scan operation of relatively moving the recording medium with respect to the recording head in the sub scan direction, wherein in a recording process of completing, with respect to each scan band that is a region having a width of a sub scan movement amount of one sub scan operation of the recording medium in the sub scan direction, recording of the scan band by repeating a plurality of the main scan operations, in a case where the plurality of scans necessary for the completion of the recording of the scan band are divided into a first half scan and a second half scan on the basis of a scan order, when a nozzle disposed closest to a central side of the nozzle row in a first half scan nozzle group that is a nozzle group used in the recording of the first half scan in the nozzle row is referred to as a first half side central nozzle, a nozzle disposed closest to an end side of the nozzle row in the first half scan nozzle group is referred to as a front end nozzle, a nozzle disposed closest to a central side of the nozzle row in a second half scan nozzle group that is a nozzle group used in the recording of the second half scan in the nozzle row is referred to as a second half side central nozzle, a nozzle disposed closest to an end side of the nozzle row in the second half scan nozzle group is referred to as a rear end nozzle, the number of the main scan operations necessary for recording of one of rasters formed in the main scan direction is referred to as the number of overlaps, a region of a unit area represented by a product of the number of overlaps in the main scan direction and a nozzle pitch of the nozzle row in the sub scan direction is referred to as a unit region, and nozzles that record the same unit region in the nozzle groups for the respective scans used in the recording of the plurality of scans are referred to as corresponding nozzles, the dither mask is subjected to threshold setting for generating a dot disposition in which nozzle jetting rates that are relative usage rates of the respective nozzles of the nozzle row become nozzle jetting rates that satisfy a predetermined specific condition, in at least a part of a range of a recording duty, and the nozzle jetting rates that satisfy the specific condition are set such that the nozzle jetting rates are decreased at two or more kinds of different inclinations, from the first half side central nozzle toward the front end nozzle in the first half scan nozzle group, the nozzle jetting rates are decreased at two or more kinds of different inclinations, from the second half side central nozzle toward the rear end nozzle in the second half scan nozzle group, with respect to the nozzle groups for each scan used in recording of each scan that belongs to the first half scan, a first half jetting rate sum obtained by summing up the nozzle jetting rates of the corresponding nozzles is increased from the front end nozzle to the first half side central nozzle, with respect to the nozzle groups for each scan used in recording of each scan that belongs to the second half scan, a second half jetting rate sum obtained by summing up the nozzle jetting rates of the corresponding nozzles is decreased from the second half side central nozzle toward the rear end nozzle, and with respect to the nozzle groups for each scan used in recording of each of the plurality of scans, a sum of the first half jetting rate sum and the second half jetting rate sum of the corresponding nozzles becomes a specific value that is in a defined allowable range.

17. An image recording method for recording an image on a recording medium using a recording head that includes a nozzle row in which a plurality of nozzles that jet ink are arranged in a sub scan direction, the method comprising:

a halftone processing step of performing halftone processing with respect to image data by using a dither mask; and a recording control step of controlling the jetting of the ink from the nozzles on the basis of dot data generated through the halftone processing and performs a control for recording an image on a recording medium by repeating a main scan operation of jetting the ink from the nozzles while relatively moving the recording head with respect to the recording medium in a main scan direction that is orthogonal to the sub scan direction to perform recording and a sub scan operation of relatively moving the recording medium with respect to the recording head in the sub scan direction, wherein in a recording process of completing, with respect to each scan band that is a region having a width of a sub scan movement amount of one sub scan operation of the recording medium in the sub scan direction, recording of the scan band by repeating a plurality of the main scan operations, in a case where the plurality of scans necessary for the completion of the recording of the scan band are divided into a first half scan and a second half scan on the basis of a scan order, when a nozzle disposed closest to a central side of the nozzle row in a first half scan nozzle group that is a nozzle group used in the recording of the first half scan in the nozzle row is referred to as a first half side central nozzle, a nozzle disposed closest to an end side of the nozzle row in the first half scan nozzle group is referred to as a front end nozzle, a nozzle disposed closest to a central side of the nozzle row in a second half scan nozzle group that is a nozzle group used in the recording of the second half scan in the nozzle row is referred to as a second half side central nozzle, a nozzle disposed closest to an end side of the nozzle row in the second half scan nozzle group is referred to as a rear end nozzle, the number of the main scan operations necessary for recording of one of rasters formed in the main scan direction is referred to as the number of overlaps, a region of a unit area represented by a product of the number of overlaps in the main scan direction and a nozzle pitch of the nozzle row in the sub scan direction is referred to as a unit region, and nozzles that record the same unit region in the nozzle groups for the respective scans used in the recording of the plurality of scans are referred to as corresponding nozzles, the dither mask is subjected to threshold setting for generating a dot disposition in which nozzle jetting rates that are relative usage rates of the respective nozzles of the nozzle row become nozzle jetting rates that satisfy a predetermined specific condition, in at least a part of a range of a recording duty, and the nozzle jetting rates that satisfy the specific condition are set such that the nozzle jetting rates are decreased at two or more kinds of different inclinations, from the first half side central nozzle toward the front end nozzle in the first half scan nozzle group, the nozzle jetting rates are decreased at two or more kinds of different inclinations, from the second half side central nozzle toward the rear end nozzle in the second half scan nozzle group, with respect to the nozzle groups for each scan used in recording of each scan that belongs to the first half scan, a first half jetting rate sum obtained by summing up the nozzle jetting rates of the corresponding nozzles is increased from the front end nozzle to the first half side central nozzle, with respect to the nozzle groups for each scan used in recording of each scan that belongs to the second half scan, a second half jetting rate sum obtained by summing up the nozzle jetting rates of the corresponding nozzles is decreased from the second half side central nozzle toward the rear end nozzle, and with respect to the nozzle groups for each scan used in recording of each of the plurality of scans, a sum of the first half jetting rate sum and the second half jetting rate sum of the corresponding nozzles becomes a specific value that is in a defined allowable range.

\* \* \* \* \*